United States Patent
Kawamura et al.

(10) Patent No.: US 6,259,565 B1
(45) Date of Patent: Jul. 10, 2001

(54) DISPLAY APPARATUS

(75) Inventors: Akira Kawamura, Kanagawa; Takeshi Matsui, Tokyo; Shunichi Hashimoto, Kanagawa; Yoshinori Tanaka, Kanagawa; Takeshiro Nakatsue, Kanagawa, all of (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/117,050

(22) PCT Filed: Nov. 19, 1997

(86) PCT No.: PCT/JP97/04201

§ 371 Date: Jul. 17, 1998

§ 102(e) Date: Jul. 17, 1998

(87) PCT Pub. No.: WO98/22844

PCT Pub. Date: May 28, 1998

(30) Foreign Application Priority Data

Nov. 19, 1996 (JP) .................................... 8-307667
Nov. 25, 1996 (JP) .................................... 8-313215

(51) Int. Cl.⁷ ............................ G02B 27/14; G02B 27/22
(52) U.S. Cl. .................... 359/630; 359/464; 359/466; 359/472; 359/476; 359/477; 359/631; 359/632; 359/633; 345/7; 345/8; 345/32; 348/46; 348/121; 434/4; 248/917
(58) Field of Search .................... 359/462, 464, 359/466, 471, 472, 476, 477, 630, 632, 631, 633; 345/7, 8, 32; 348/46, 121; 434/4; 248/917

(56) References Cited

U.S. PATENT DOCUMENTS

| | | |
|---|---|---|
| 2,482,115 | 9/1949 | Laird, Jr. . |
| 3,418,033 | 12/1968 | Hope . |
| 3,432,219 | 3/1969 | Shenker et al. . |
| 3,711,188 | * 1/1973 | Zehnpfennig .................... 359/730 |
| 4,082,440 | * 4/1978 | Bennett ............................ 359/630 |
| 4,348,187 | 9/1982 | Dotsko . |
| 4,756,601 | 7/1988 | Schröder . |
| 5,253,116 | 10/1993 | Lacroix . |

(List continued on next page.)

FOREIGN PATENT DOCUMENTS

| | | |
|---|---|---|
| 0 473 343 A1 | 3/1992 | (EP) . |
| 07294876 | 10/1995 | (EP) . |
| 2 680 017 | 2/1993 | (FR) . |
| 2 274 727 | 8/1994 | (GB) . |
| 2 287 551 | 9/1995 | (GB) . |
| 7-294876 | 10/1995 | (JP) . |
| 93/16776 | 9/1993 | (WO) . |
| 96/05532 | 2/1996 | (WO) . |

OTHER PUBLICATIONS

Toshifu Ogura, "The Introduction of Science of Lens" (First Volume); Asahi Sonorama Co., Ltd., Kazumi Murata, "Optics", Science Co., Ltd. No Date Available.

"Glasses Optics", Kyoritsu Publishing Co., Ltd., p. 101. No Date Available.

Jiro Ohara, Ken Uchida, Yoshiyuki Ueno, and kazutoshi Uchida, "The Human Body is Measured", Nihon shuppan Service Co., Ltd. No Date Available.

Primary Examiner—Georgia Epps
Assistant Examiner—Evelyn A. Lester
(74) Attorney, Agent, or Firm—Ronald P. Kananen; Rader, Fishman & Grauer

(57) ABSTRACT

A semi-spherical system holding mechanism 8 such as to cover the head portion of the user is provided in the upper portion of a user holding mechanism 9 such as chair, sofa, or the like. A display apparatus 7 is fixed in the system holding mechanism 8. In the display apparatus 7, a video image displayed on a display panel 14 is enlarged by a lens 13, so that a virtual image is formed. The virtual images which are observed by the right and left eyes of the user are arranged at the same position in a space.

42 Claims, 149 Drawing Sheets

U.S. PATENT DOCUMENTS

| | | | |
|---|---|---|---|
| 5,414,461 | * 5/1995 | Kishi et al. | 345/7 |
| 5,566,370 | 10/1996 | Young . | |
| 5,677,700 | * 10/1997 | Schwalba et al. | 345/7 |
| 5,682,171 | * 10/1997 | Yokoi | 345/7 |
| 5,684,634 | * 11/1997 | Rogers | 359/630 |
| 5,751,259 | * 5/1998 | Iwamoto | 345/7 |
| 5,855,344 | * 1/1999 | Rogers | 359/632 |
| 6,057,810 | * 5/2000 | Roell et al. | 359/632 |

\* cited by examiner

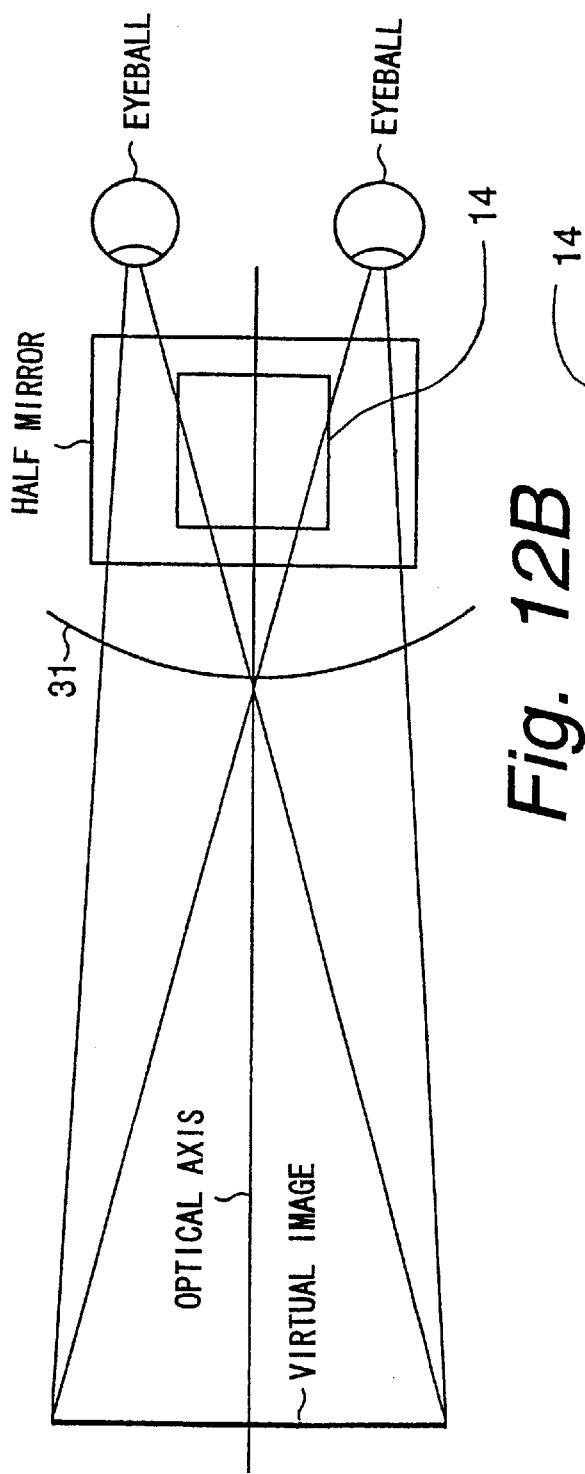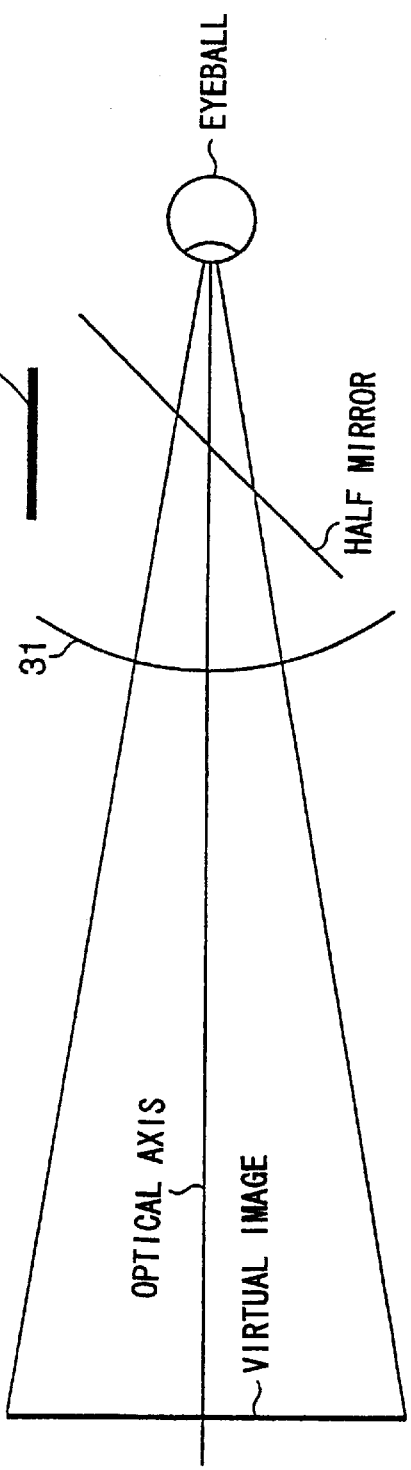

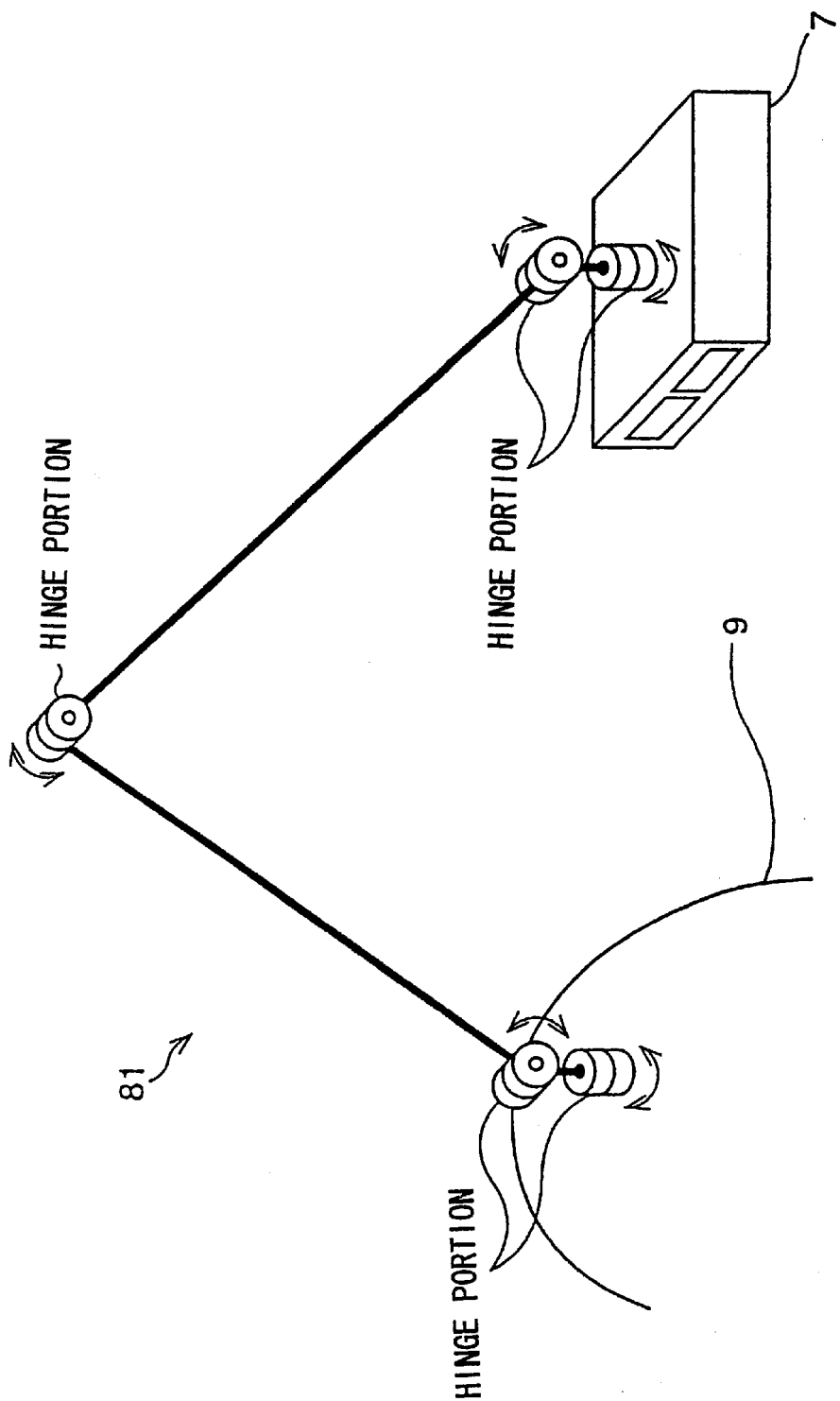

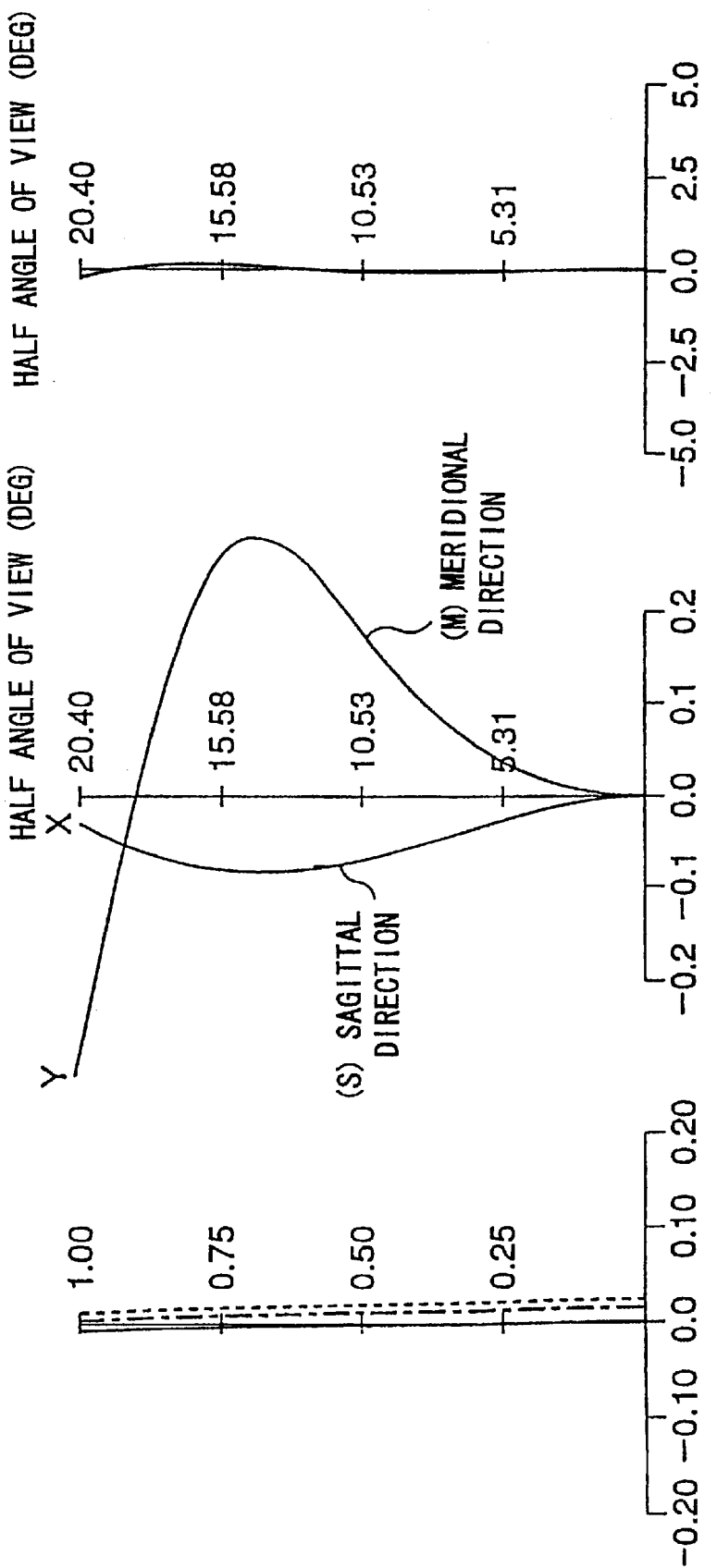

------ 615.0NM  ——— 525.0NM  — - — 470.0NM

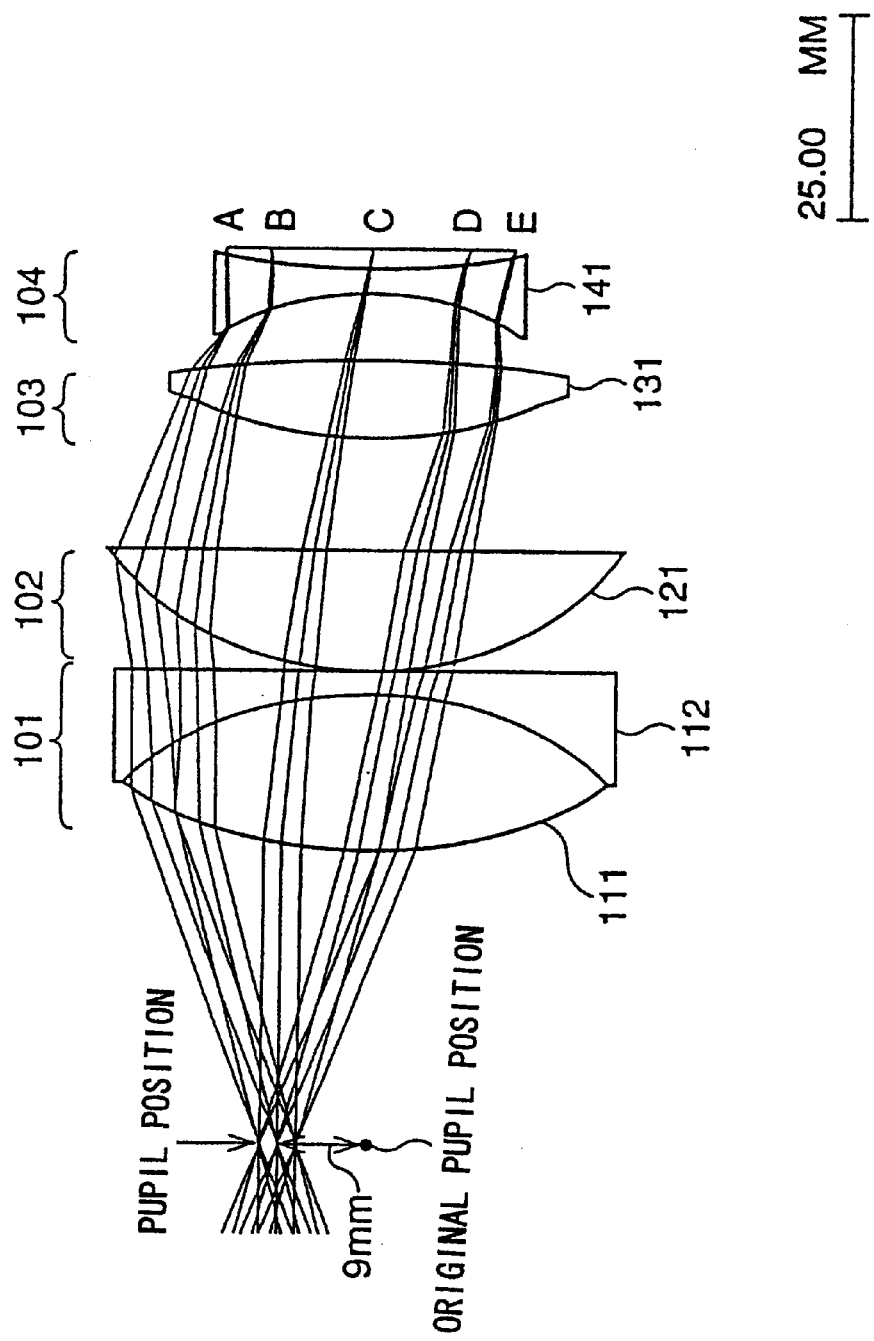

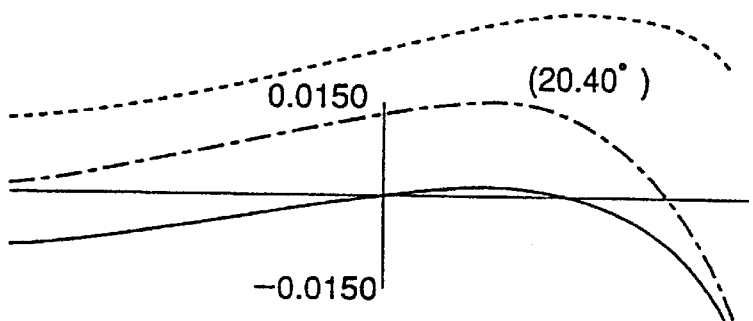
Fig. 27A
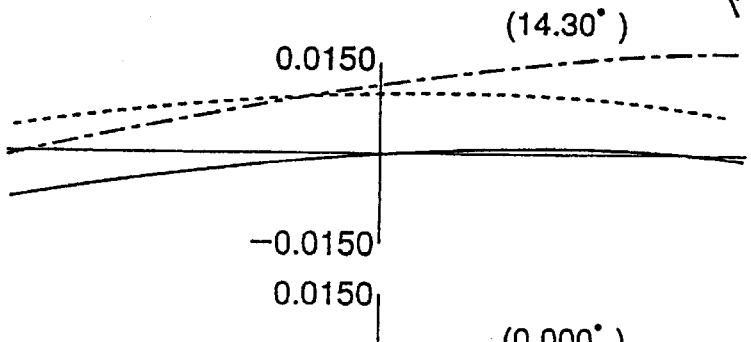
Fig. 27B
Fig. 27C
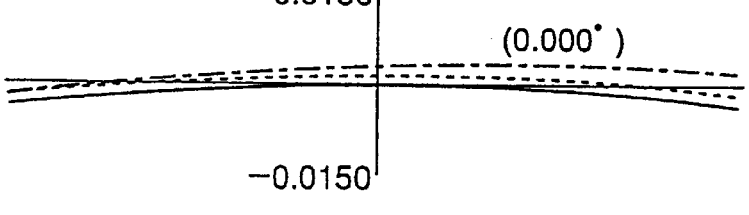
Fig. 27D
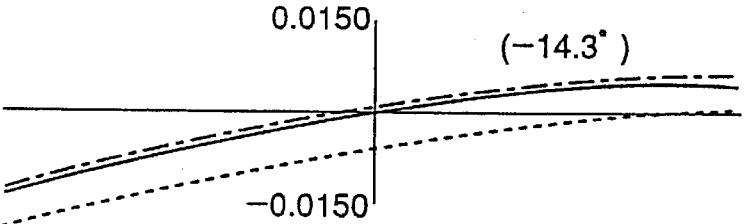
Fig. 27E
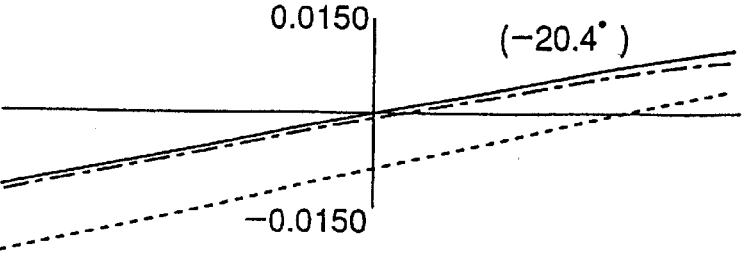
------ 615.0NM ——— 525.0NM —·—· 470.0NM

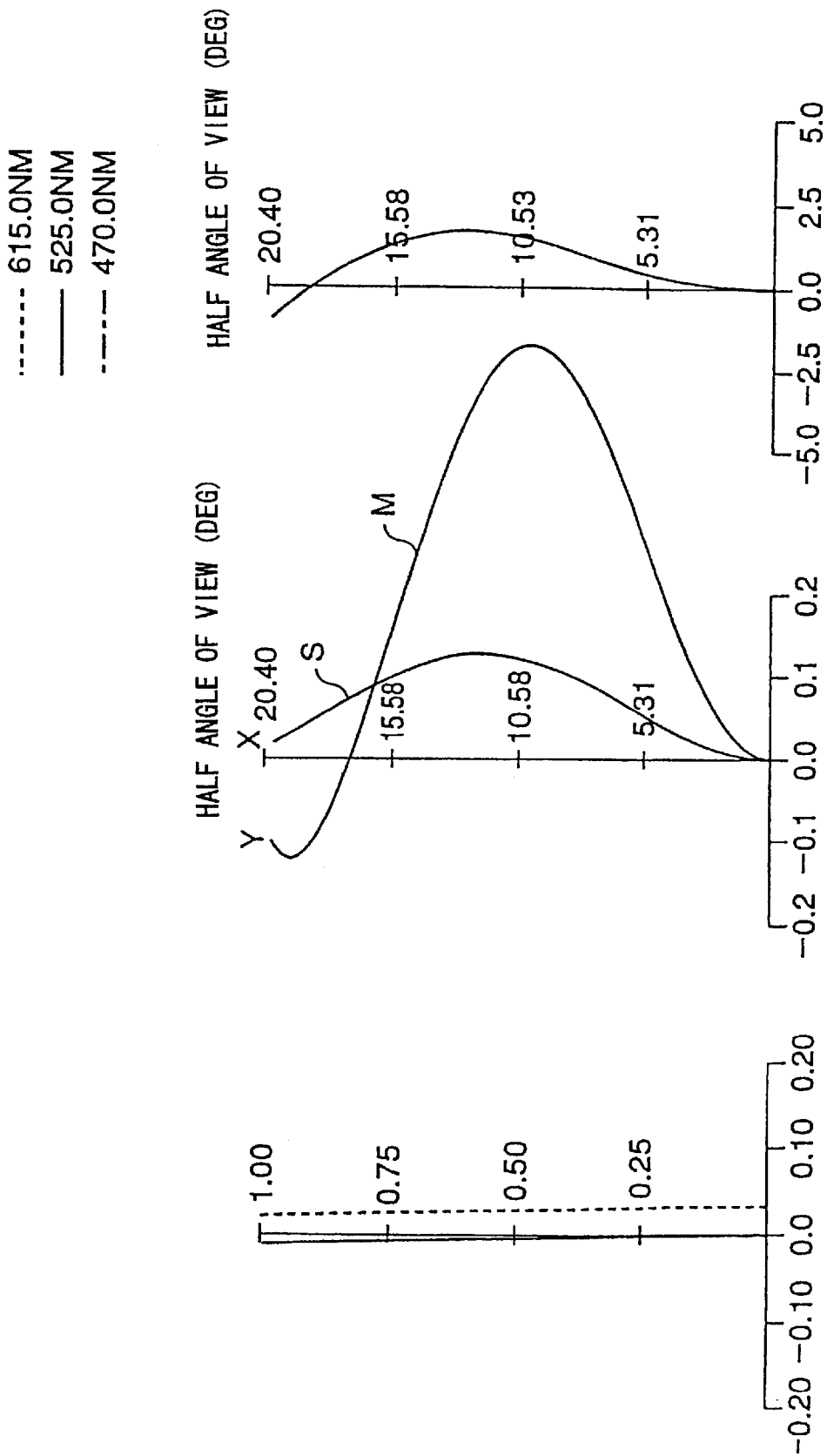

------ 615.0NM ——— 525.0NM —·—· 470.0NM

----- 615.0NM ——— 525.0NM —·— 470.0NM

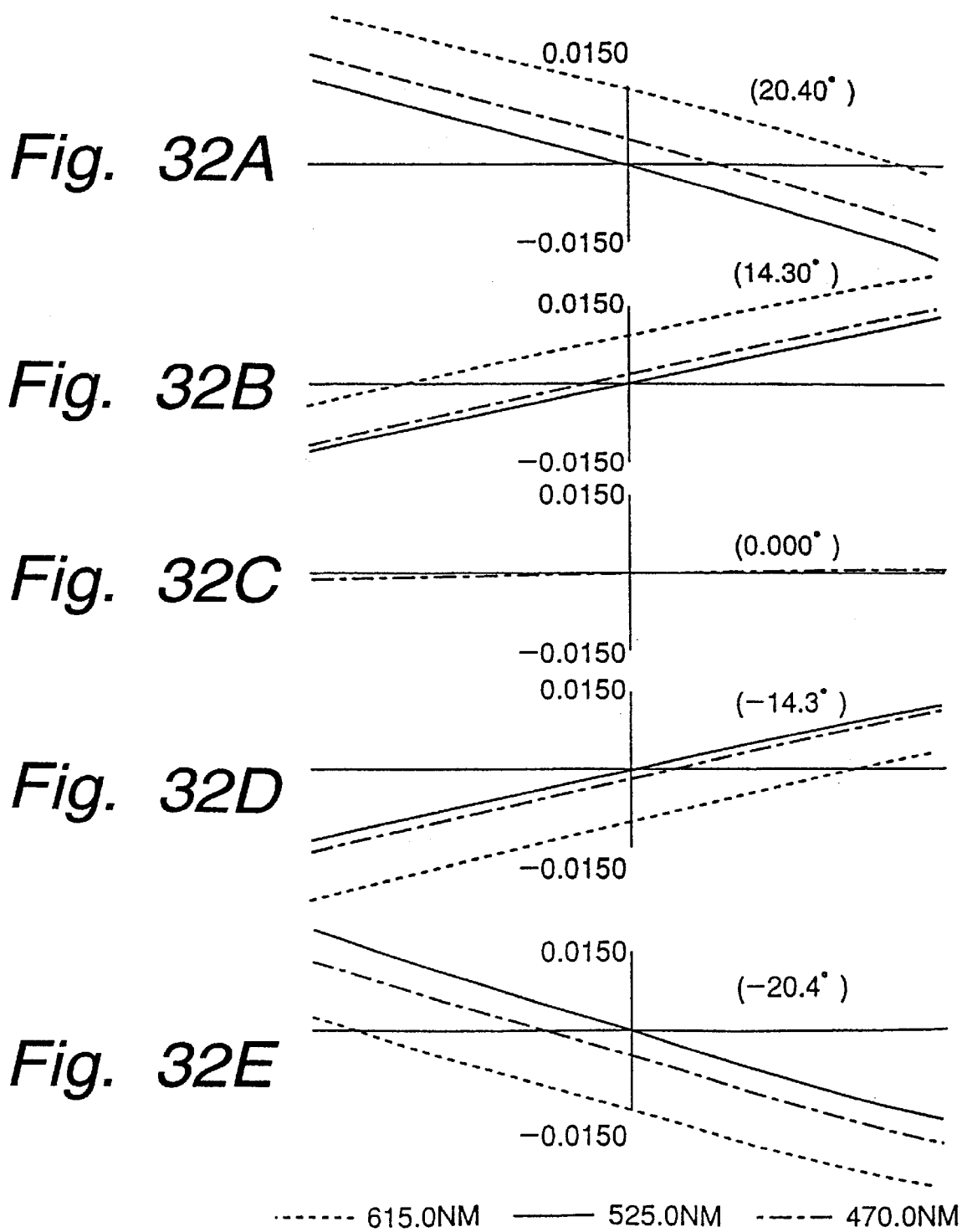

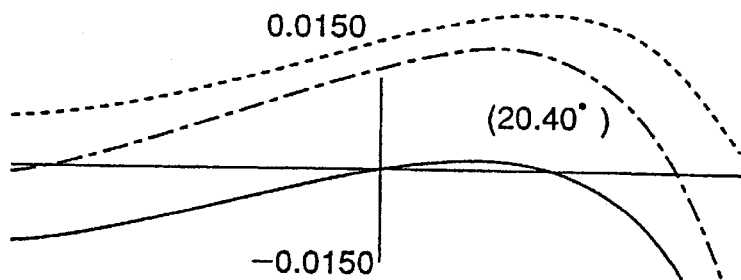
Fig. 33A
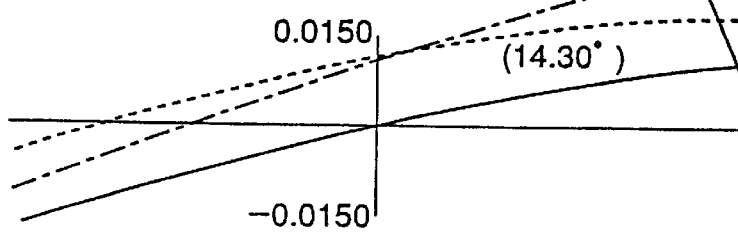
Fig. 33B
Fig. 33C
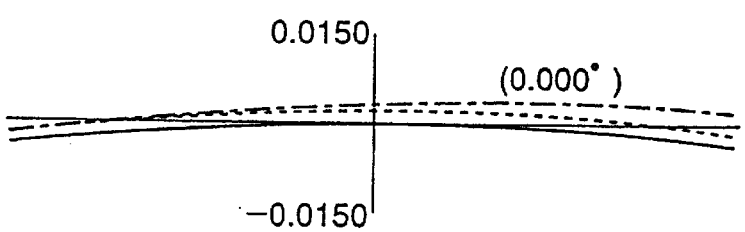
Fig. 33D
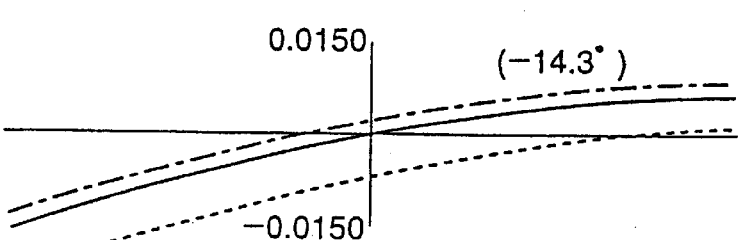
Fig. 33E
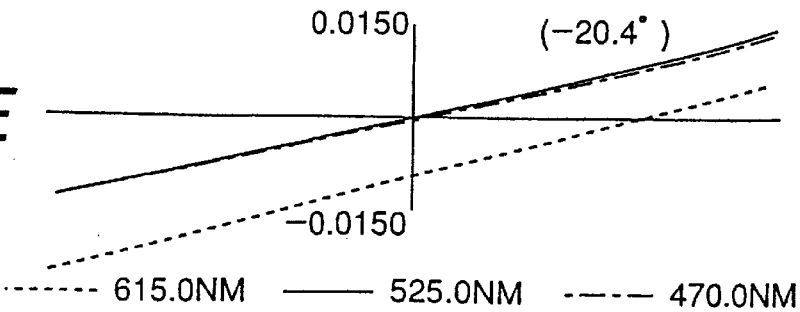

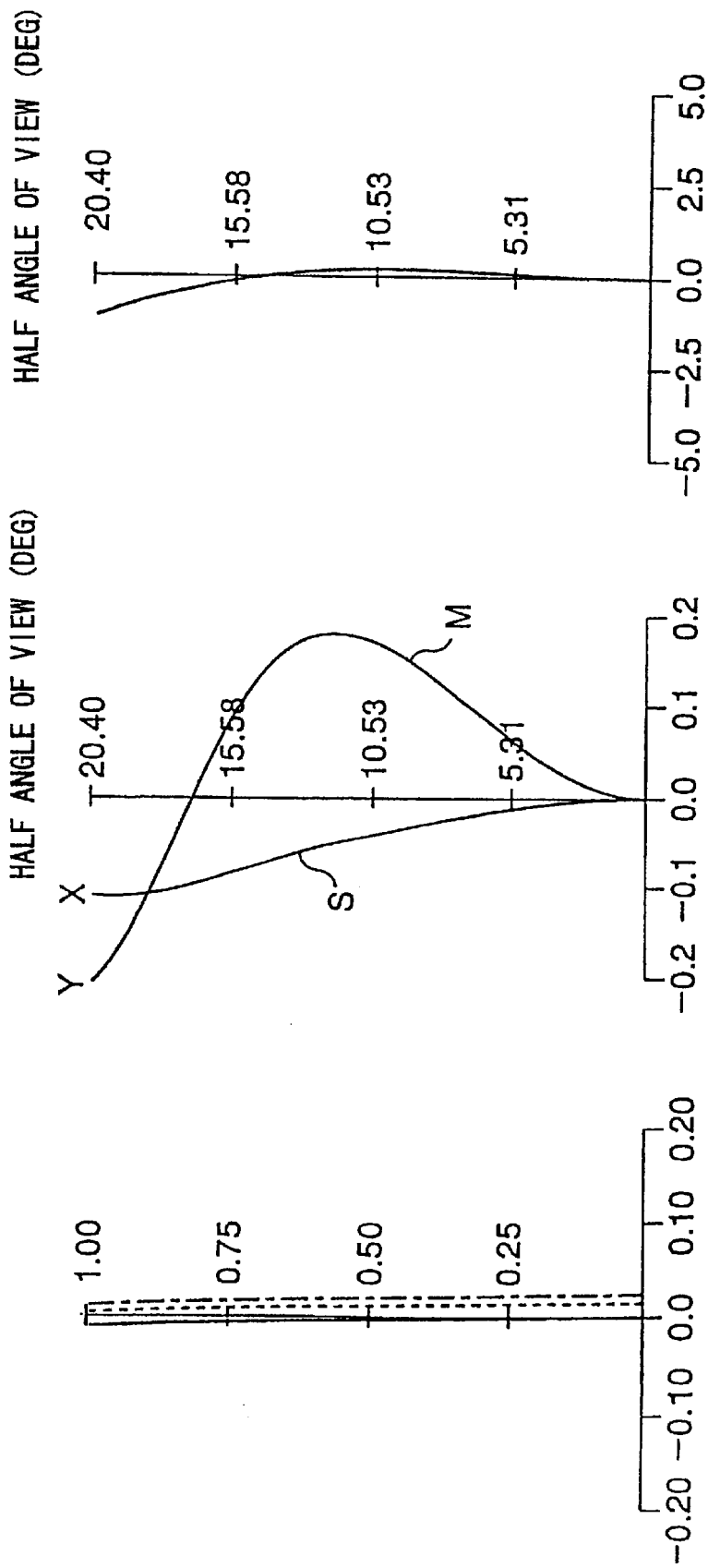

----- 615.0NM ——— 525.0NM -·-·- 470.0NM

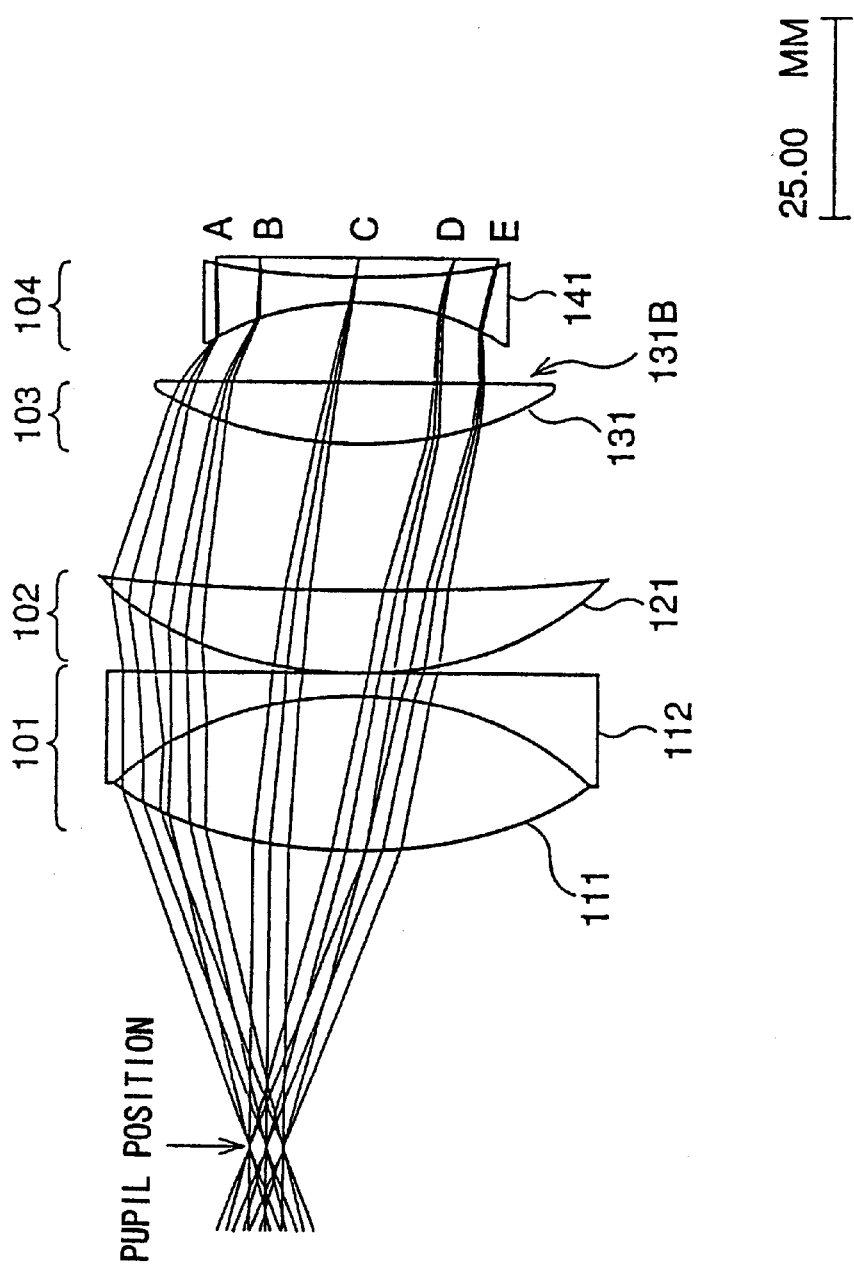

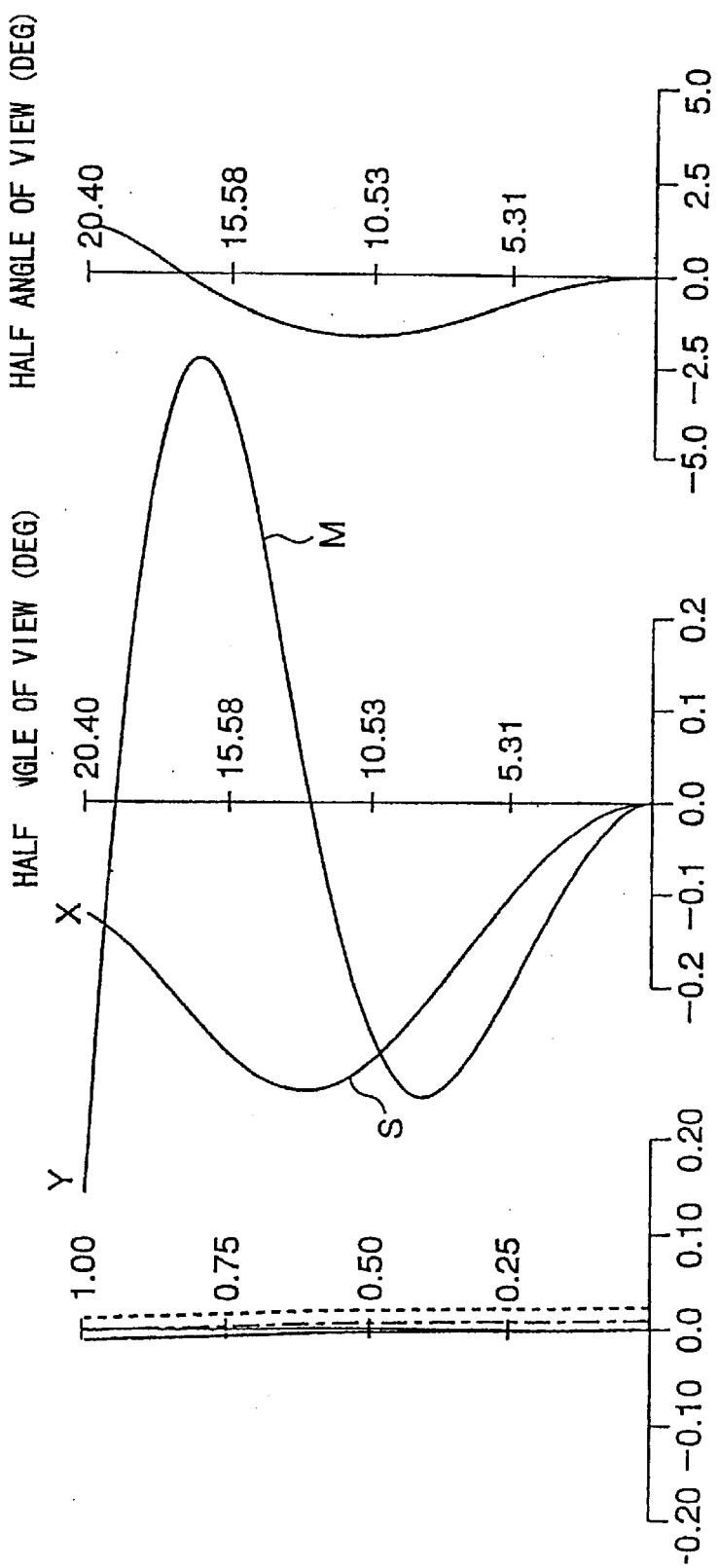

------ 615.0NM ——— 525.0NM — - — 470.0NM

------ 615.0NM ———— 525.0NM —·—·— 470.0NM

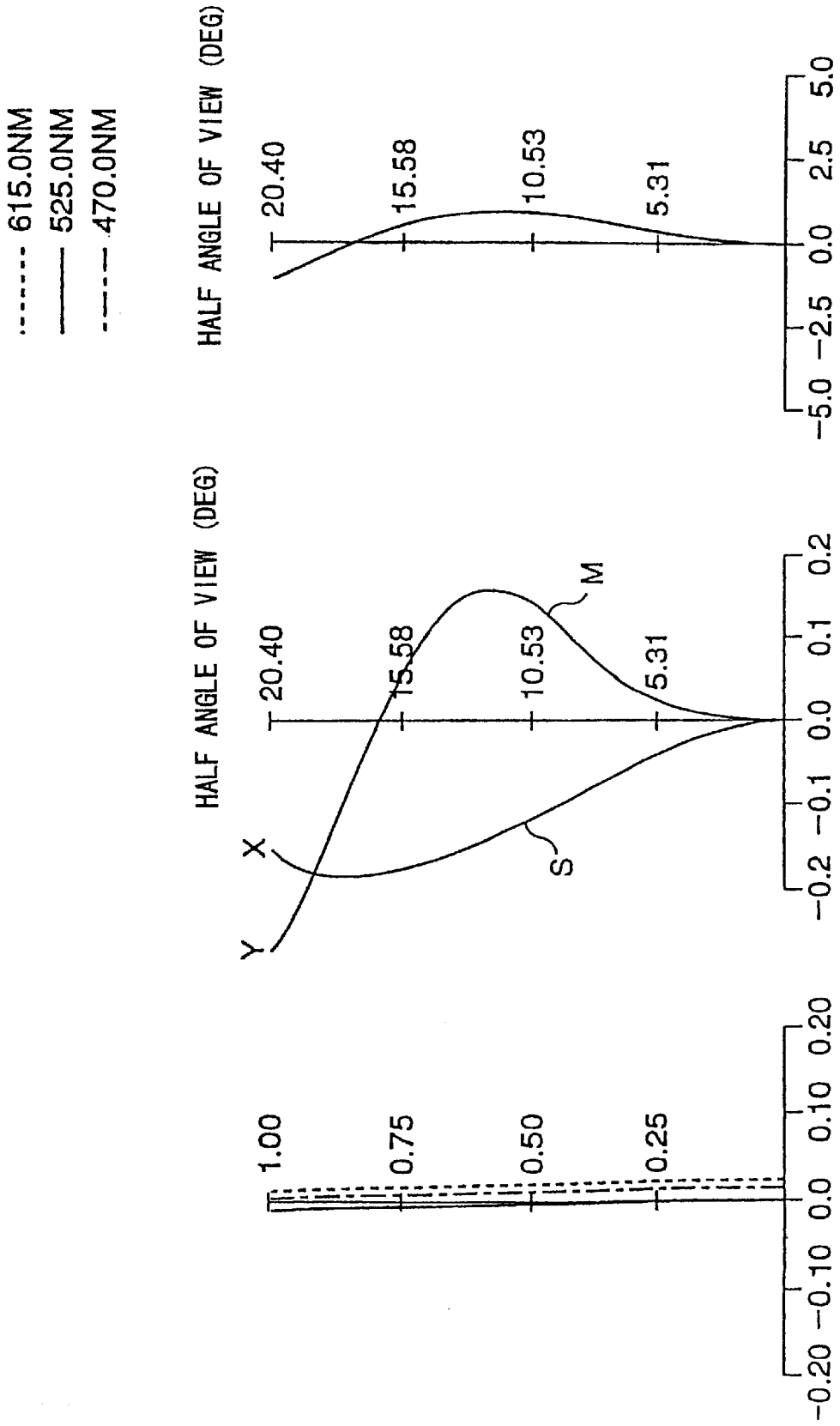

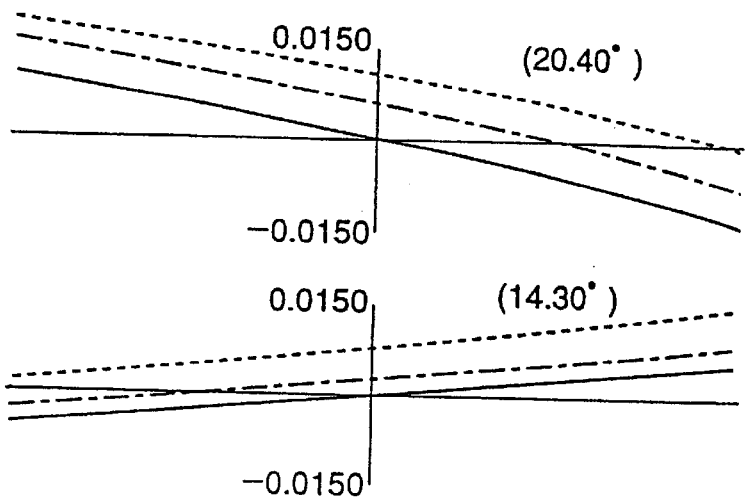
Fig. 43A
Fig. 43B
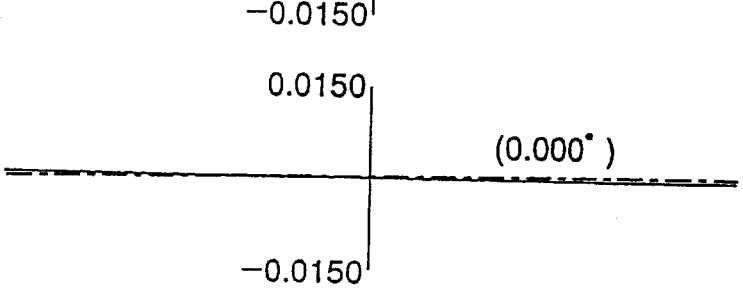
Fig. 43C
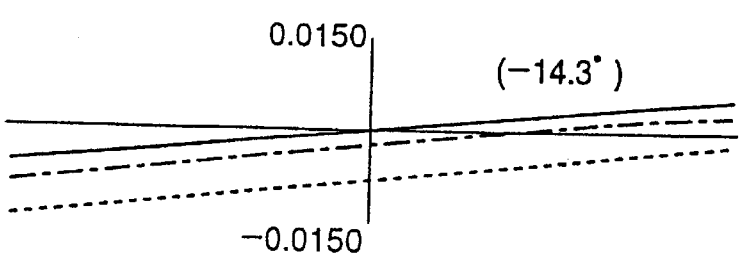
Fig. 43D
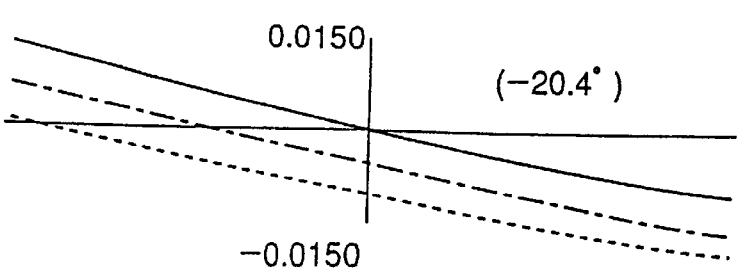
Fig. 43E
------ 615.0NM  ——— 525.0NM  ---- 470.0NM

------ 615.0NM ——— 525.0NM —·— 470.0NM

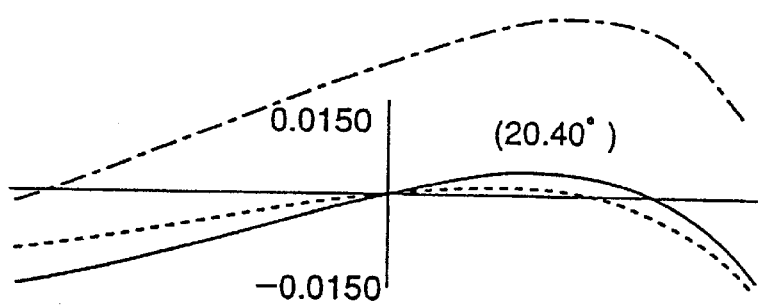
Fig. 49A
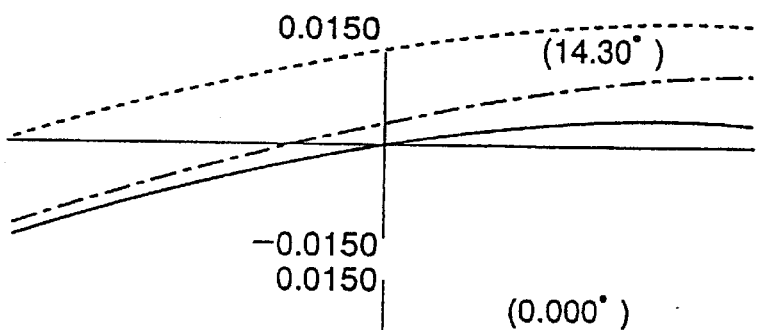
Fig. 49B
Fig. 49C
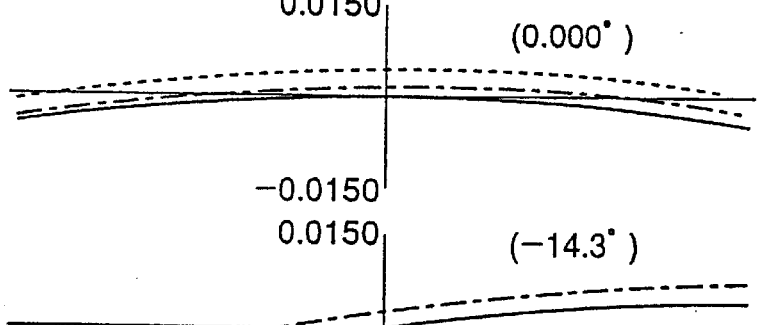
Fig. 49D
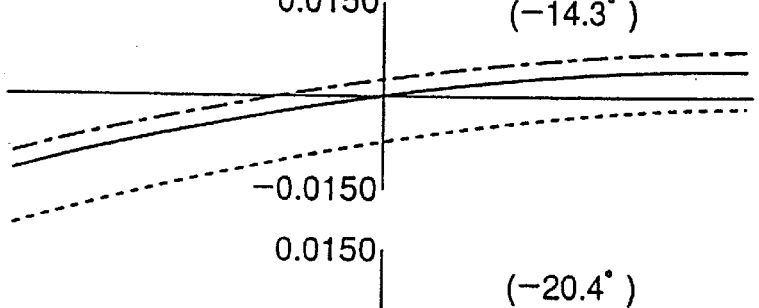
Fig. 49E
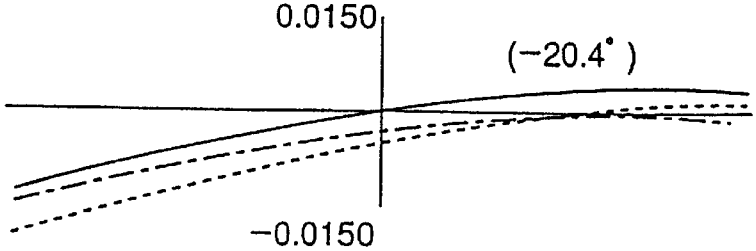
------ 615.0NM ——— 525.0NM —·—·— 470.0NM

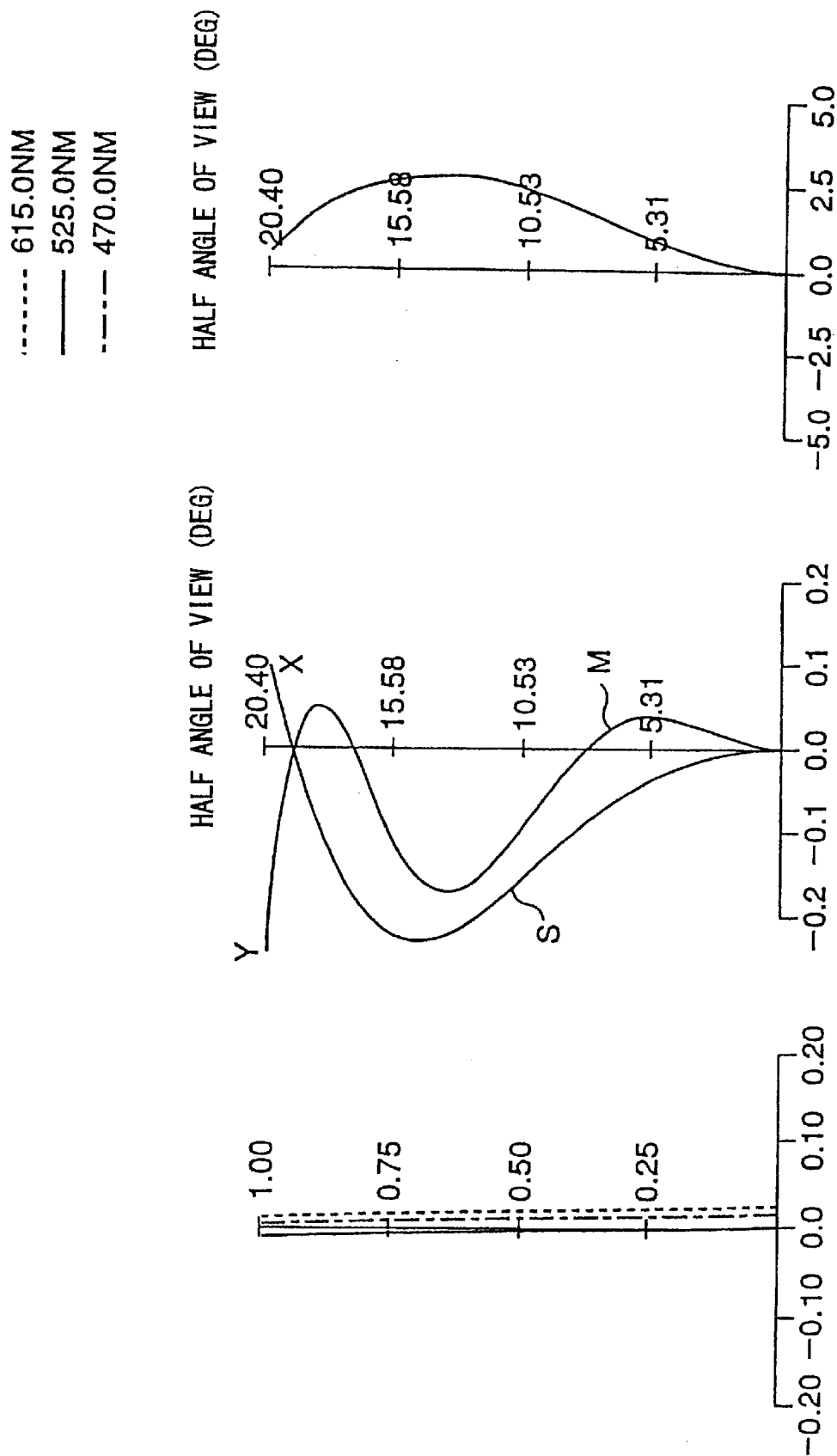

------ 615.0NM ——— 525.0NM —·— 470.0NM

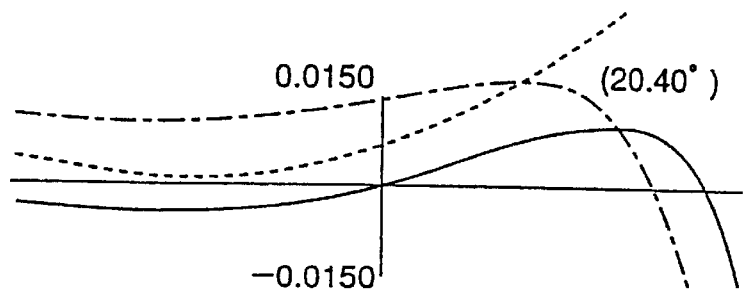
Fig. 52A
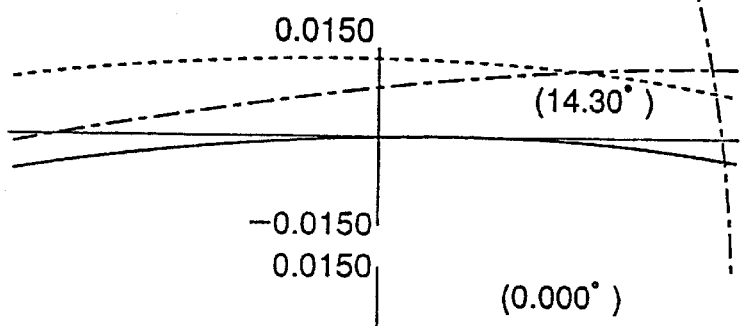
Fig. 52B
Fig. 52C
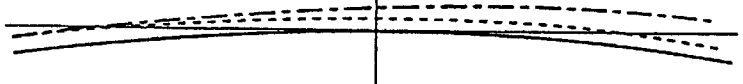
Fig. 52D
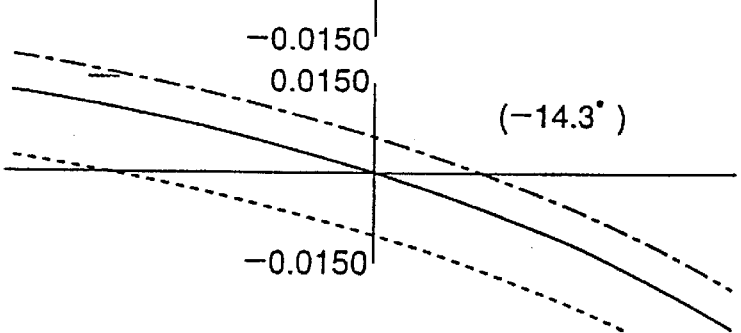
Fig. 52E
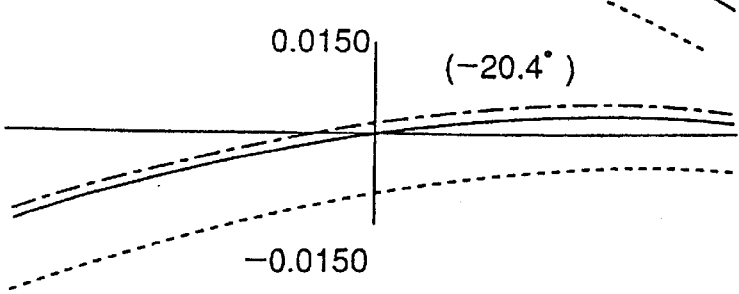
------ 615.0NM ——— 525.0NM —·— 470.0NM

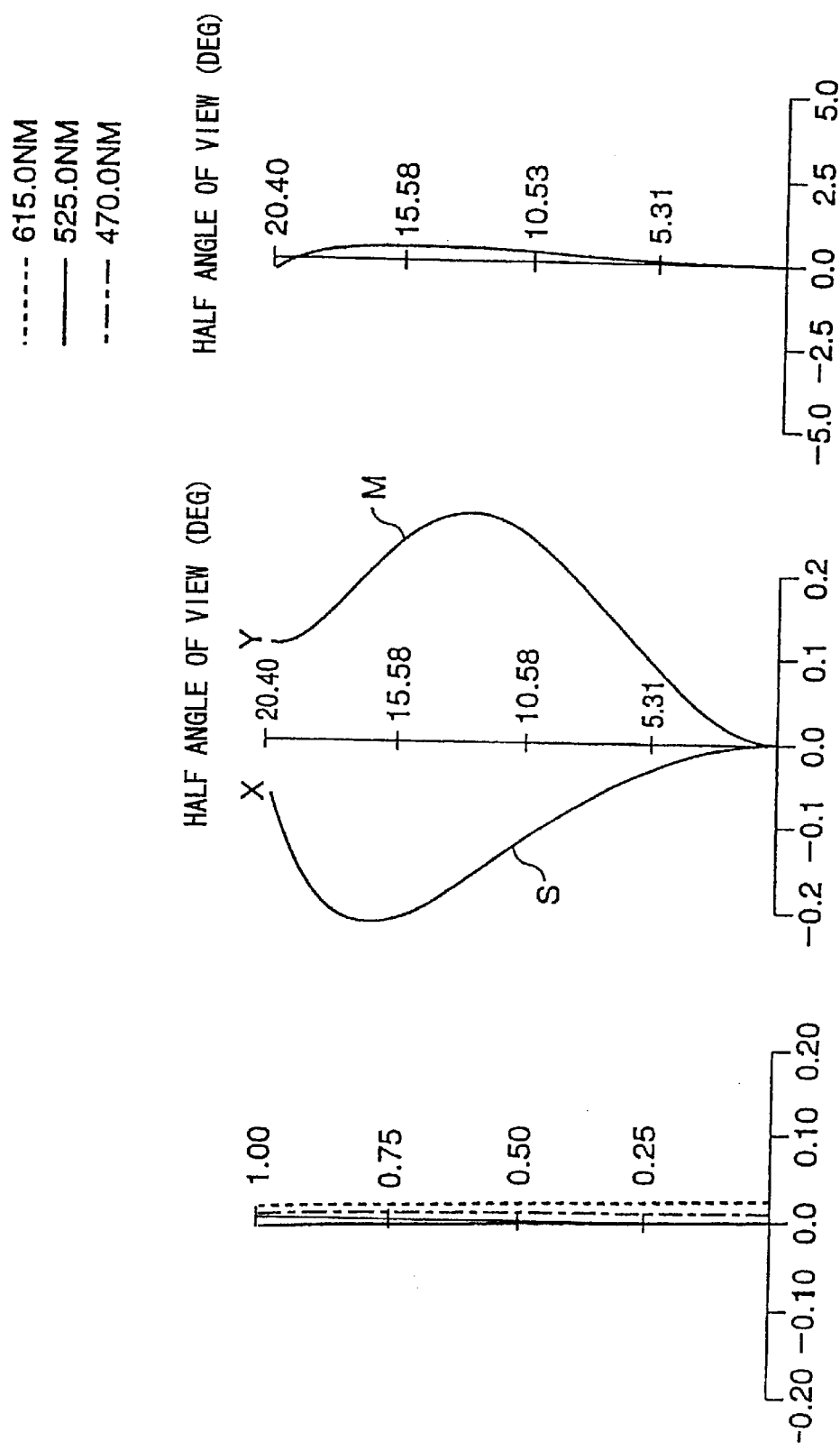

------ 615.0NM  ───── 525.0NM  ─·─·─ 470.0NM

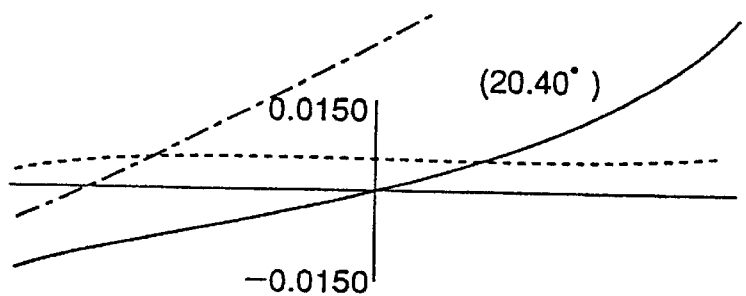
Fig. 55A
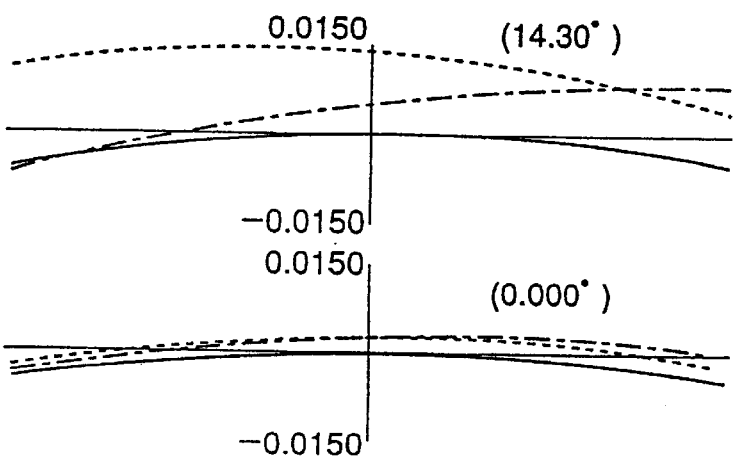
Fig. 55B
Fig. 55C
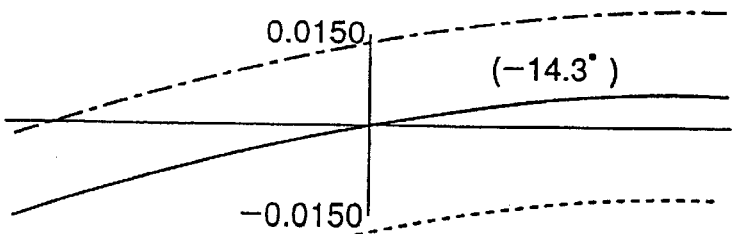
Fig. 55D
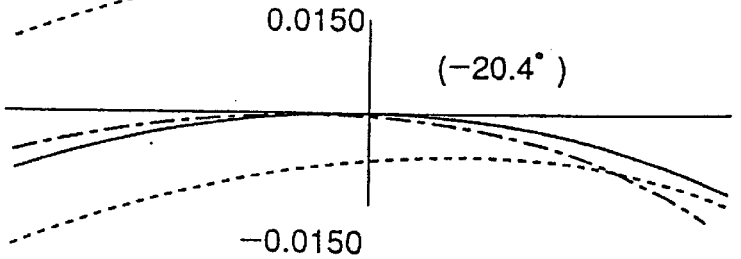
Fig. 55E
------ 615.0NM ——— 525.0NM —·— 470.0NM

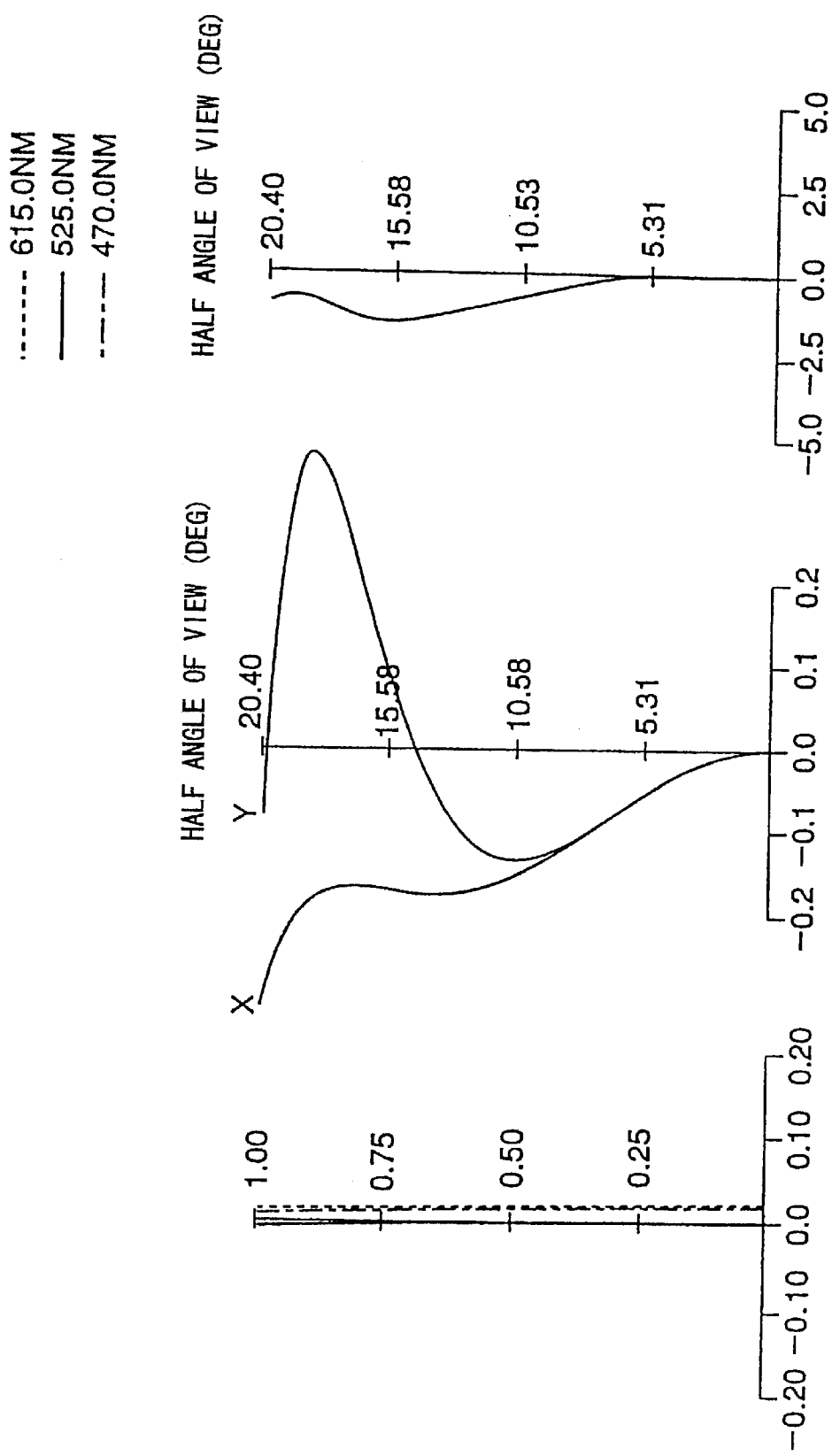

------ 615.0NM  ——— 525.0NM  —-— 470.0NM

----- 615.0NM ——— 525.0NM —·— 470.0NM

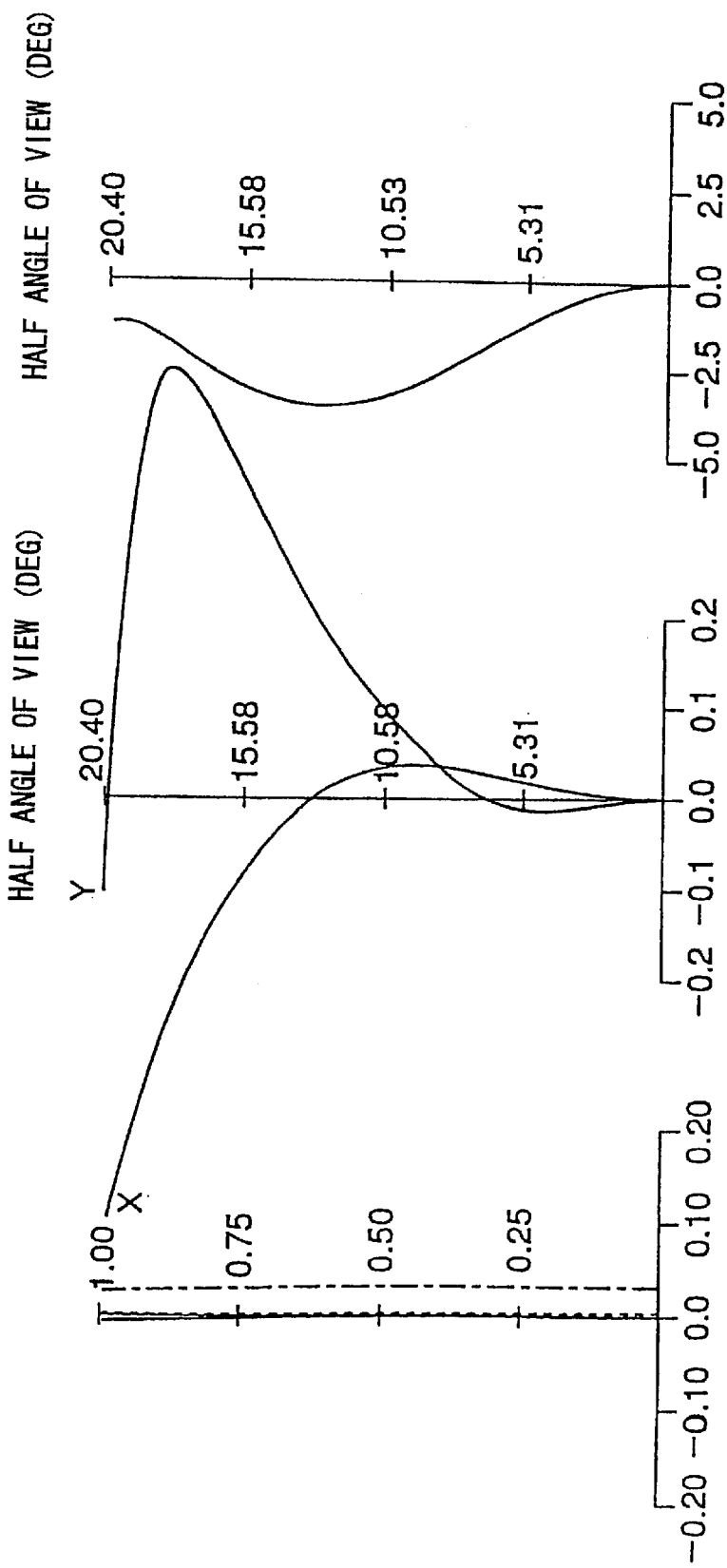

------ 615.0NM ———— 525.0NM —·—·— 470.0NM

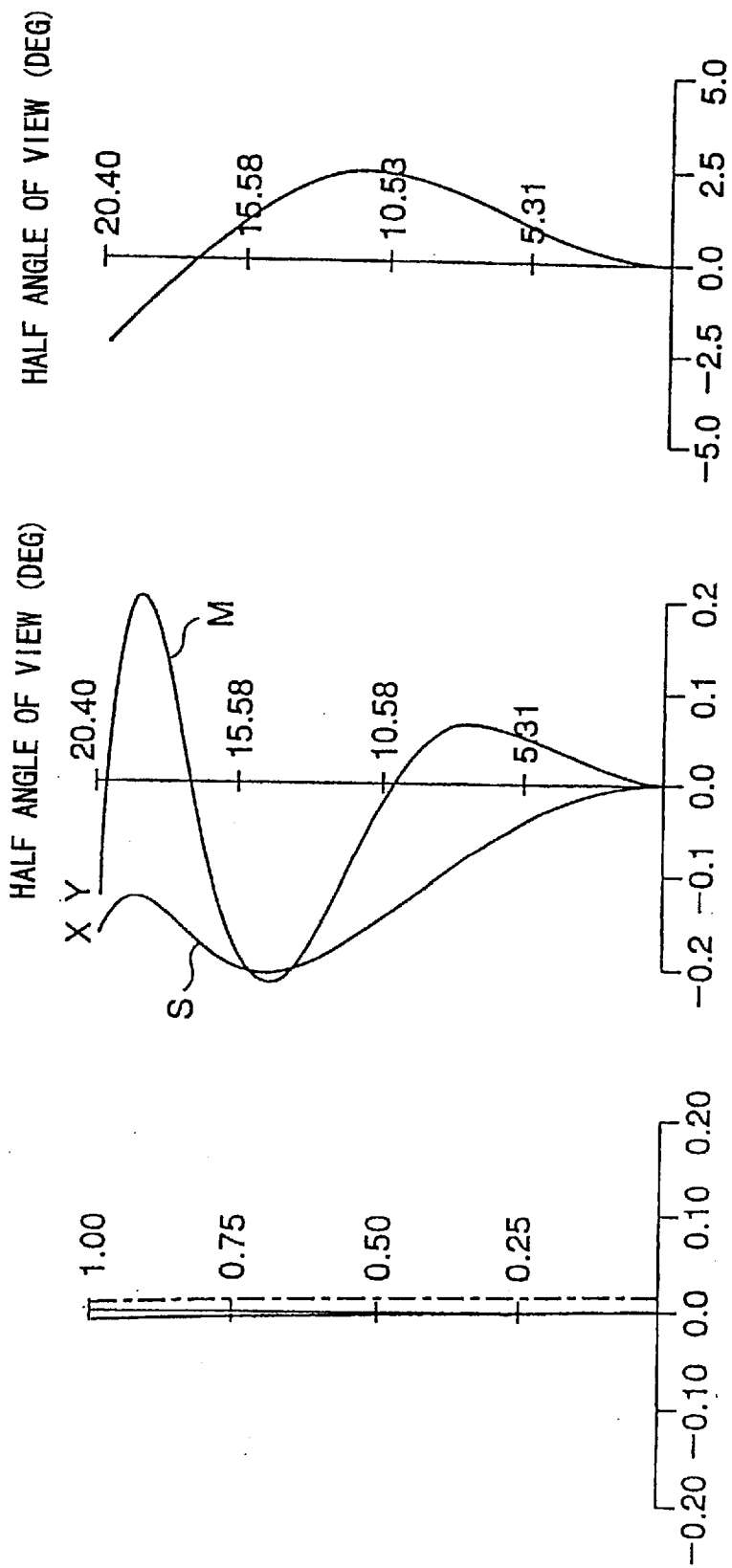

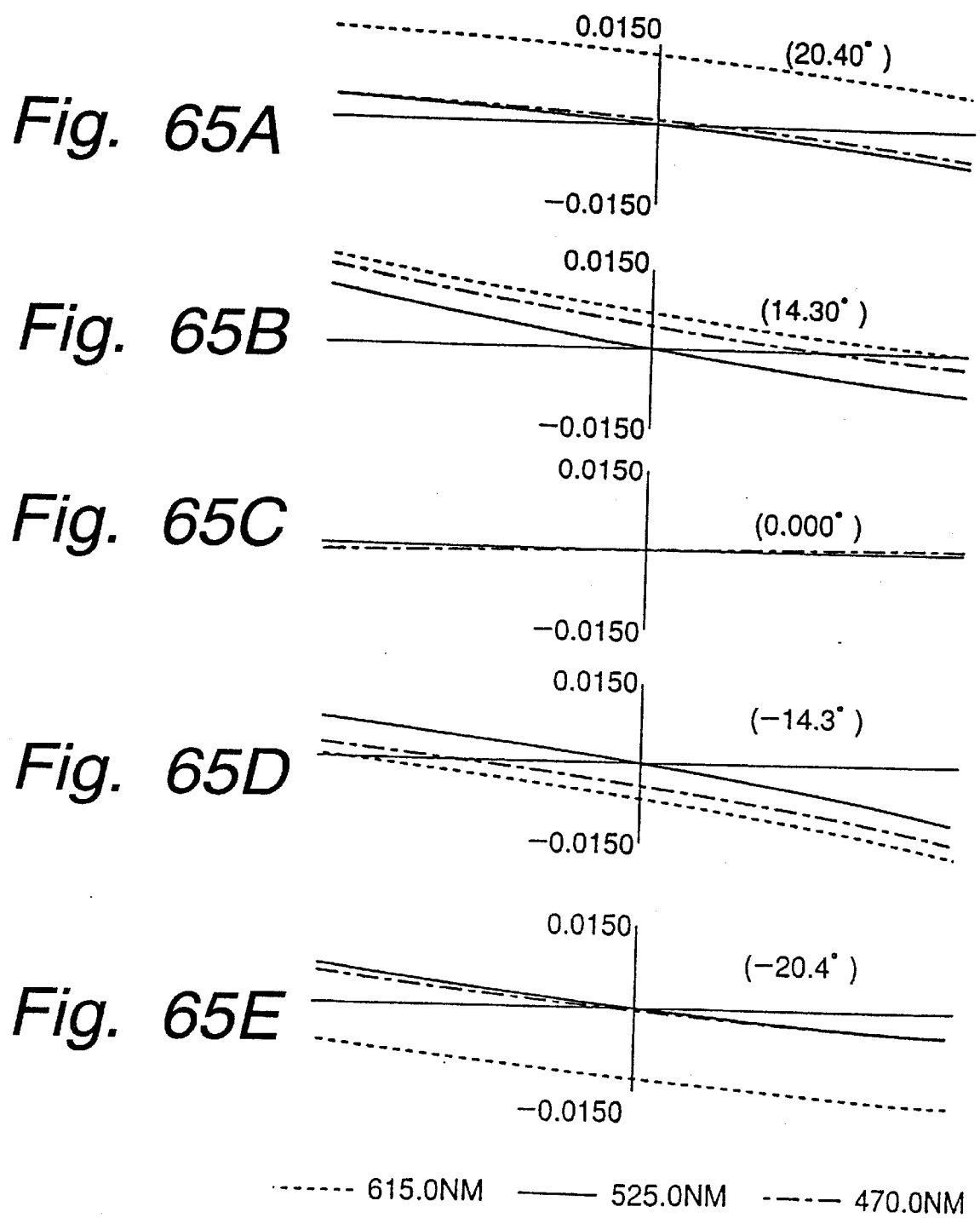

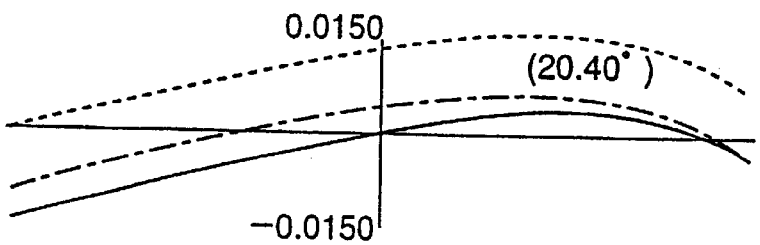
Fig. 66A
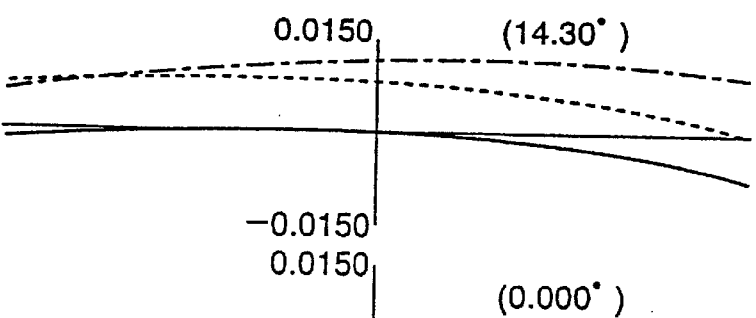
Fig. 66B
Fig. 66C
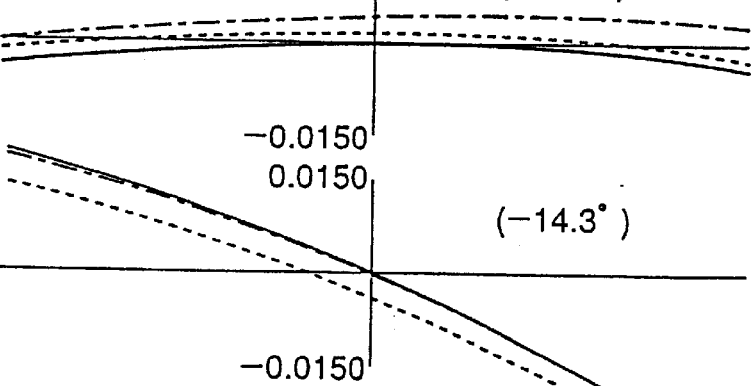
Fig. 66D
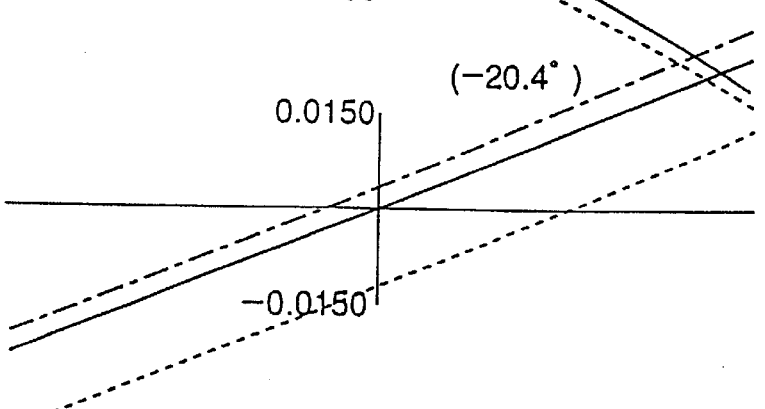
Fig. 66E
------ 615.0NM ——— 525.0NM —·—· 470.0NM

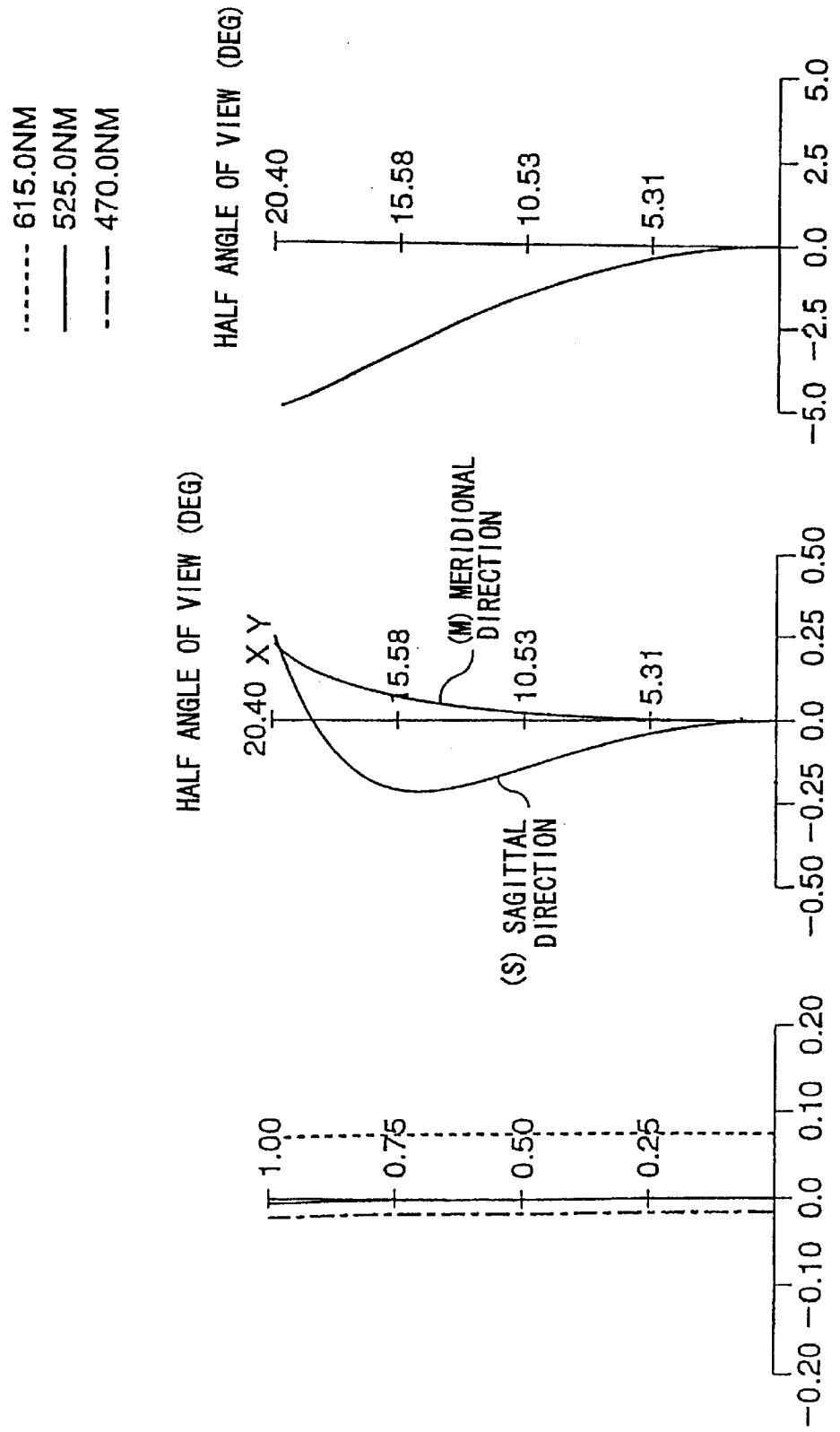

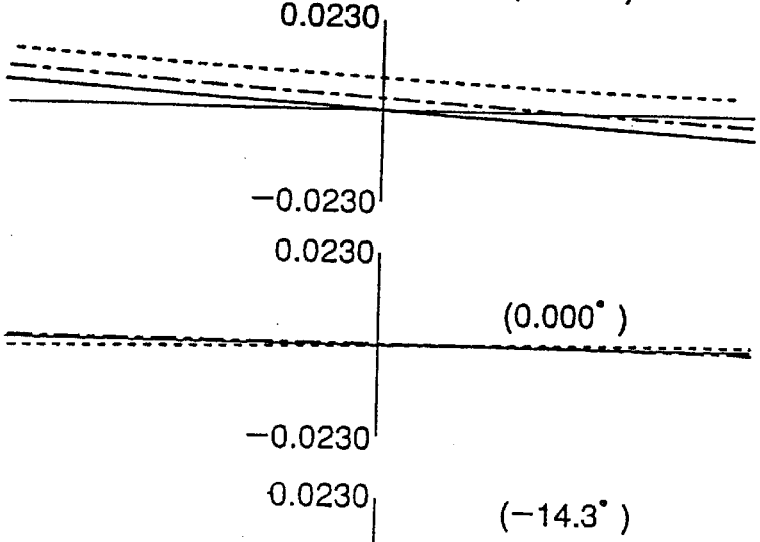

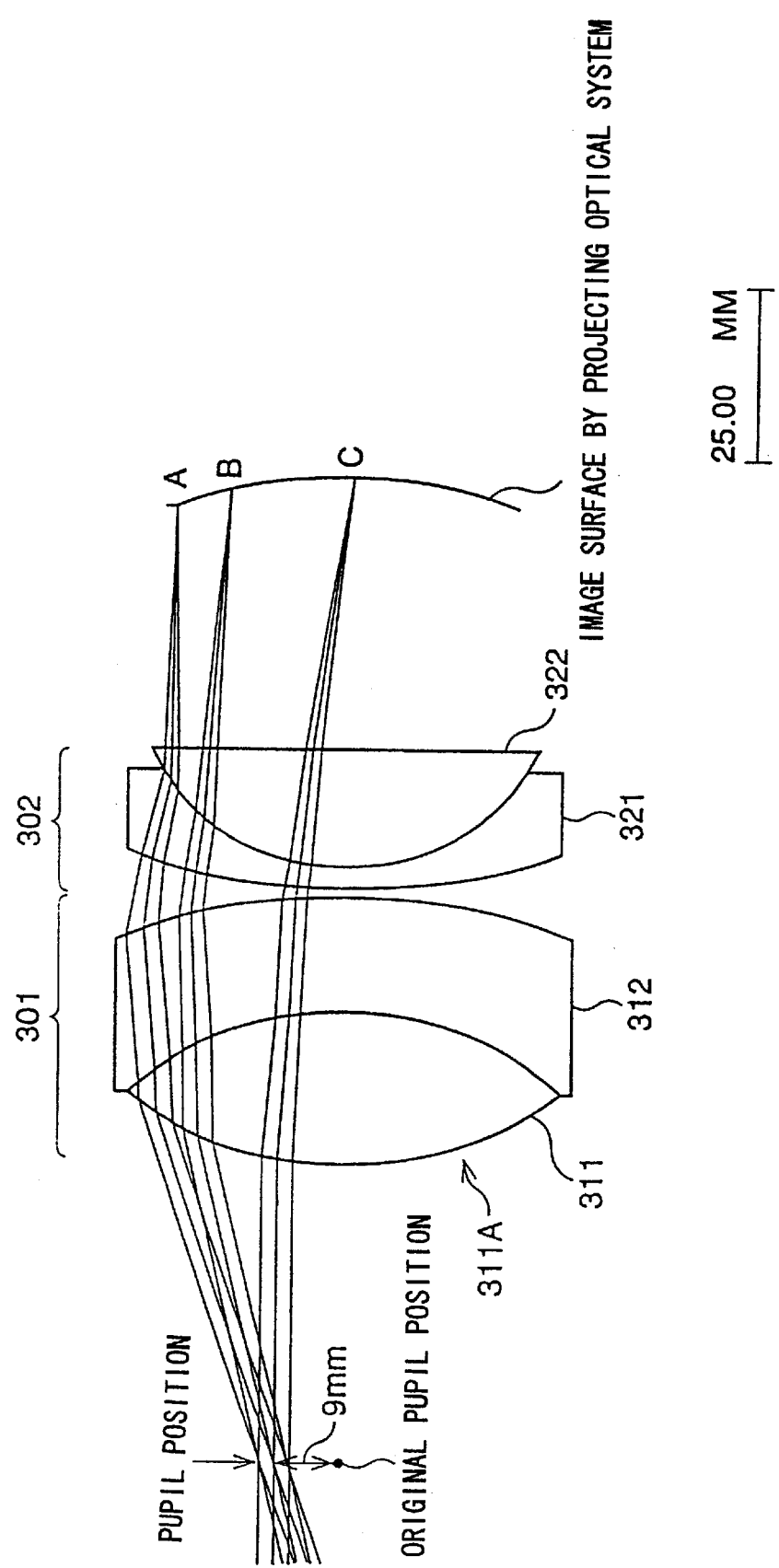

Fig. 82A
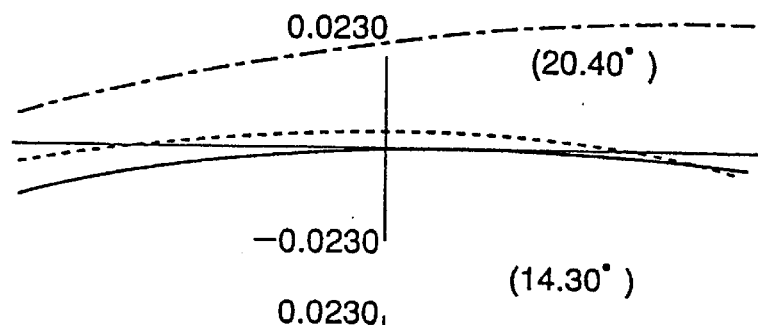
Fig. 82B
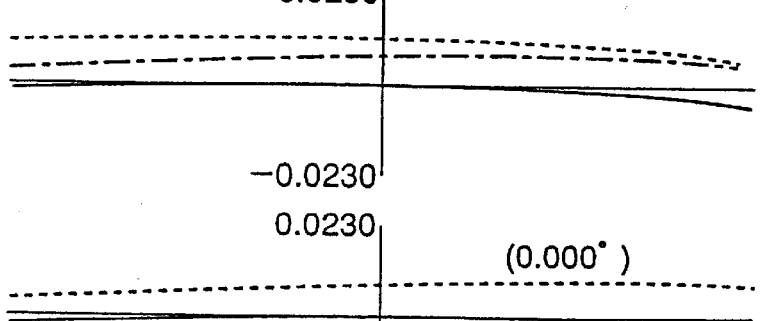
Fig. 82C
Fig. 82D
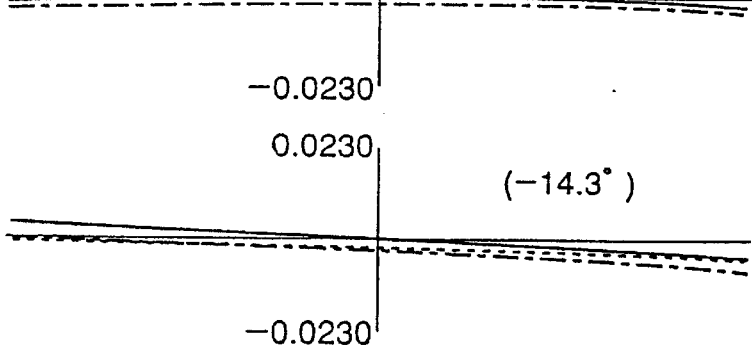
Fig. 82E
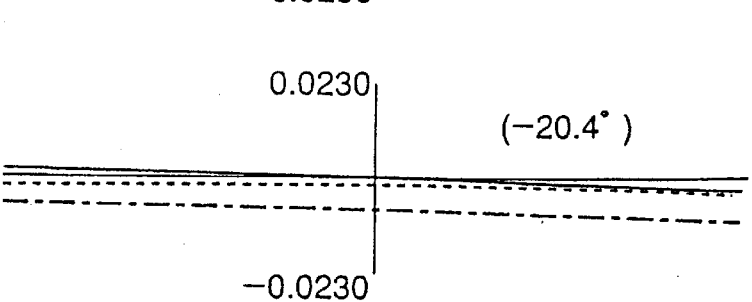
------ 615.0NM ——— 525.0NM —·— 470.0NM

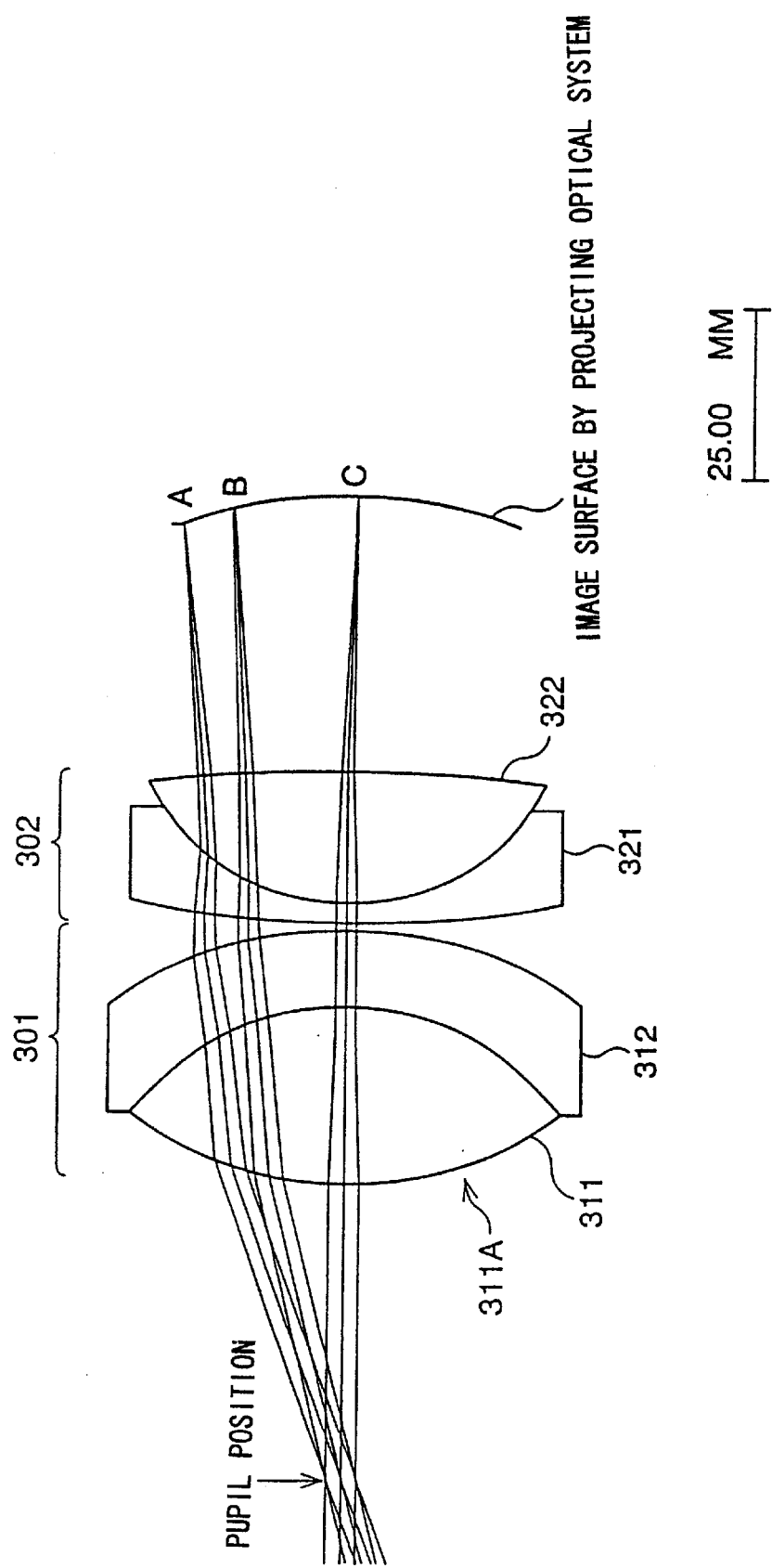

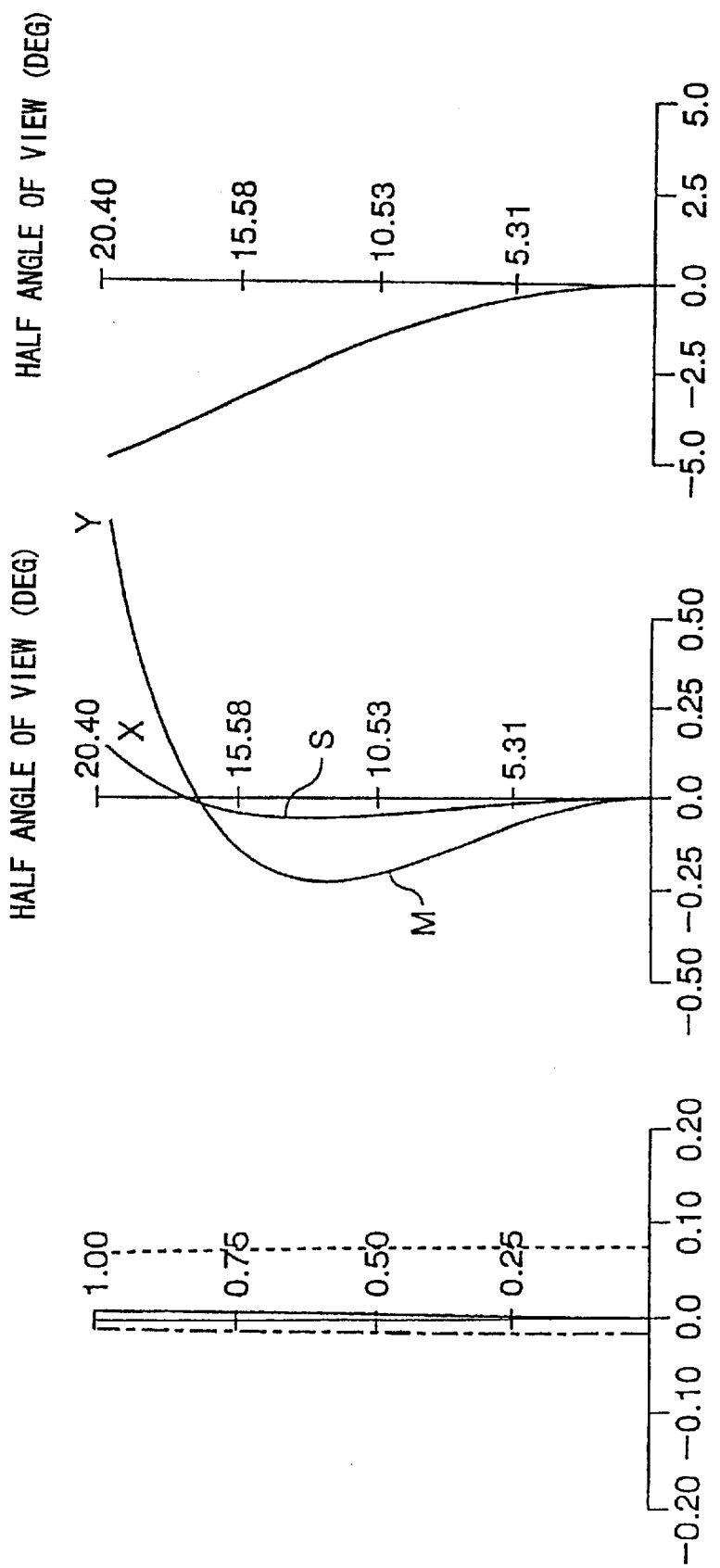

------ 615.0NM ——— 525.0NM —·— 470.0NM

------ 615.0NM ——— 525.0NM ---- 470.0NM

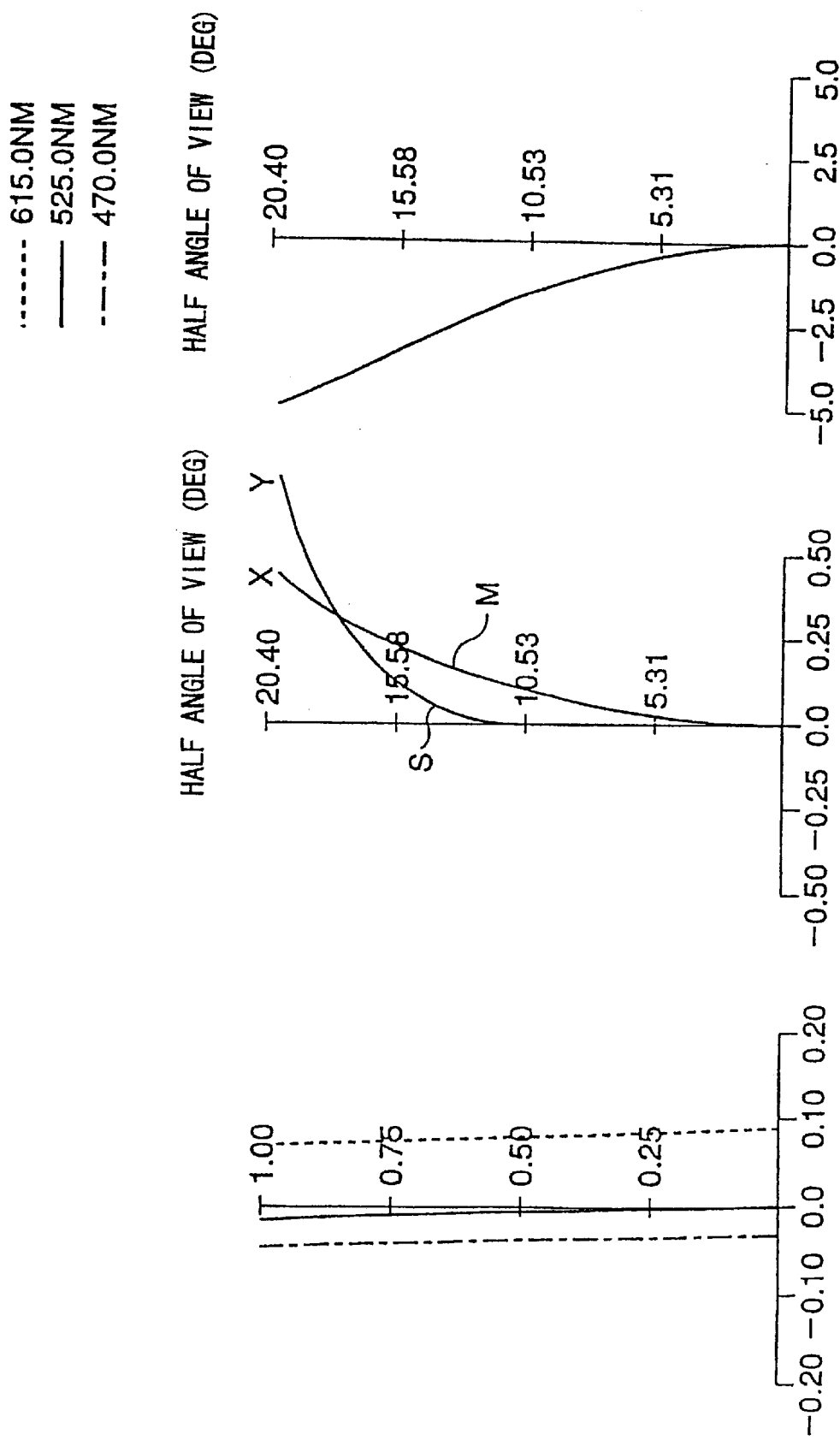

------ 615.0NM ——— 525.0NM -·-·- 470.0NM

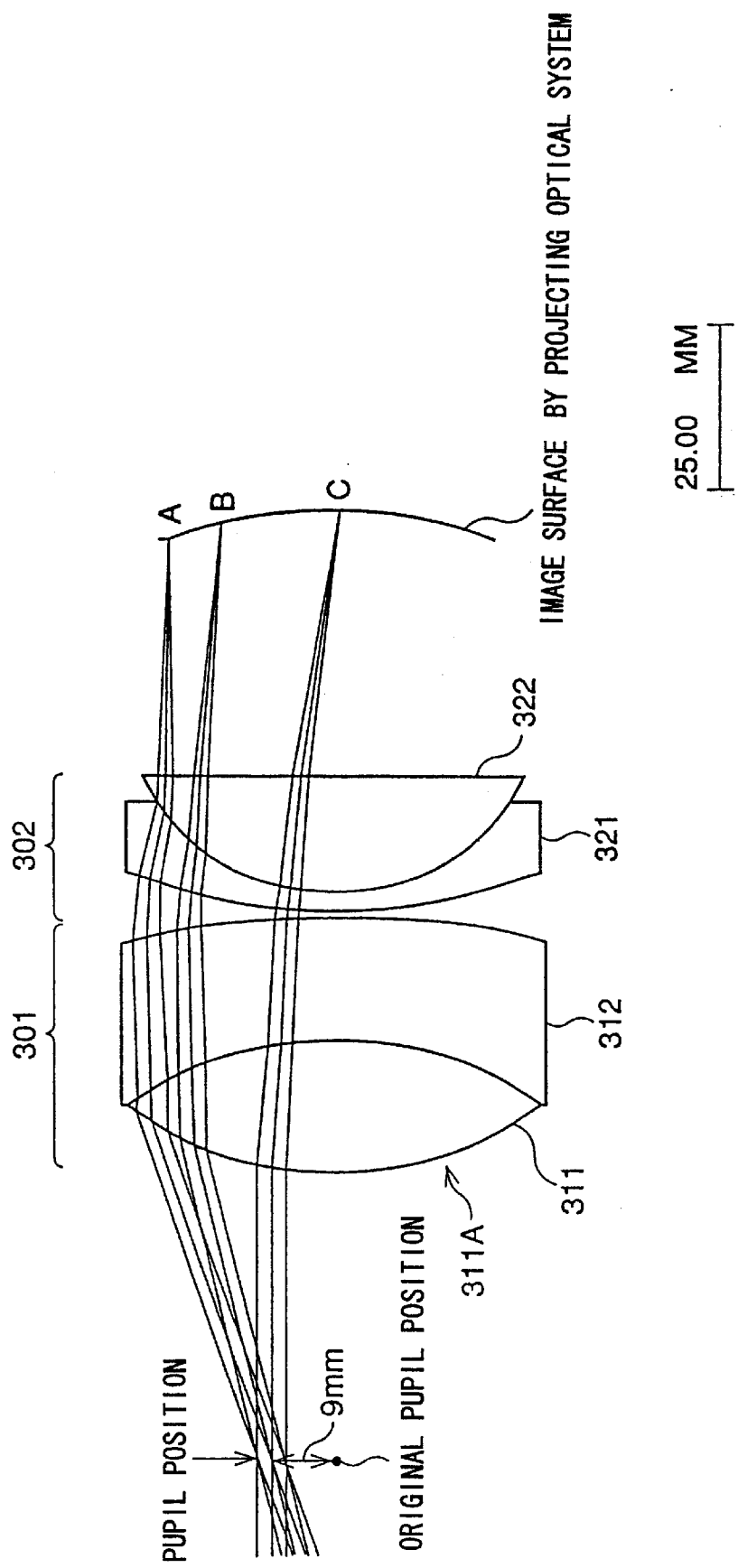

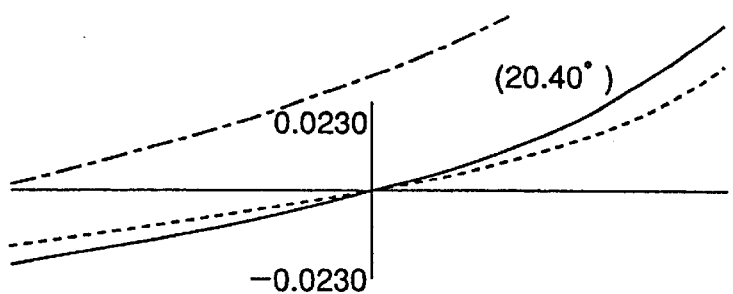
Fig. 92A
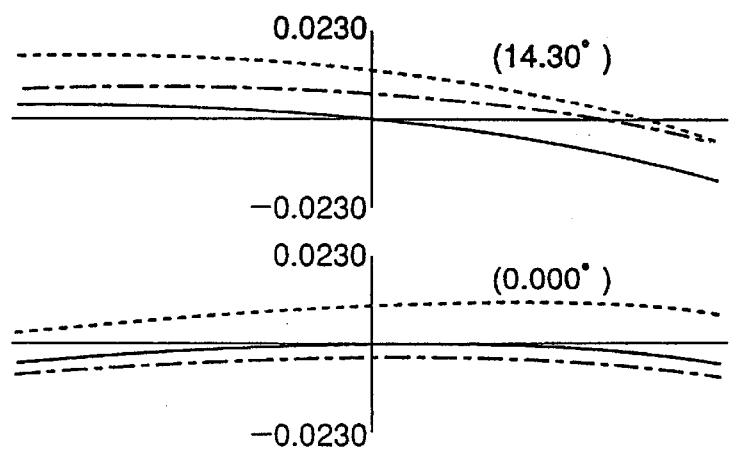
Fig. 92B
Fig. 92C
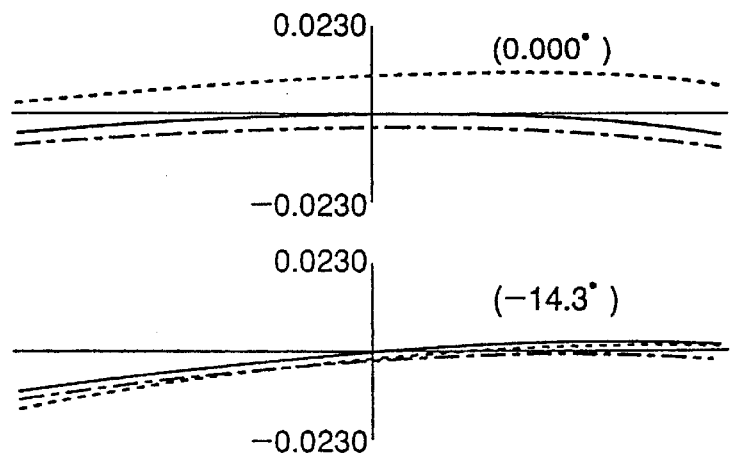
Fig. 92D
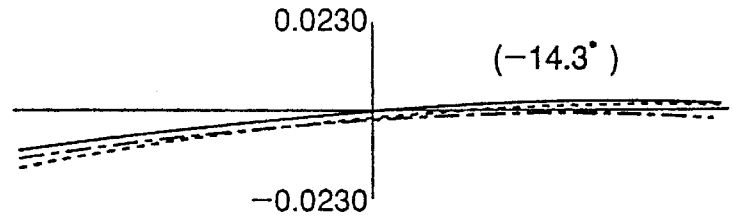
Fig. 92E
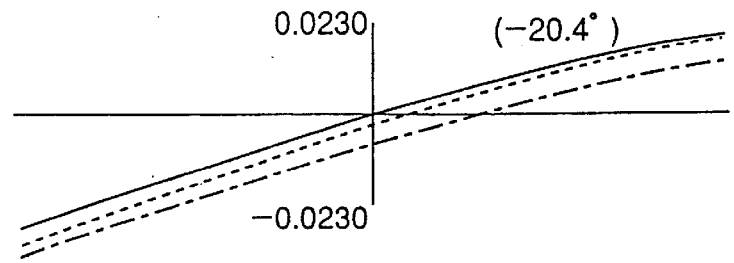
------ 615.0NM  ——— 525.0NM  ---- 470.0NM

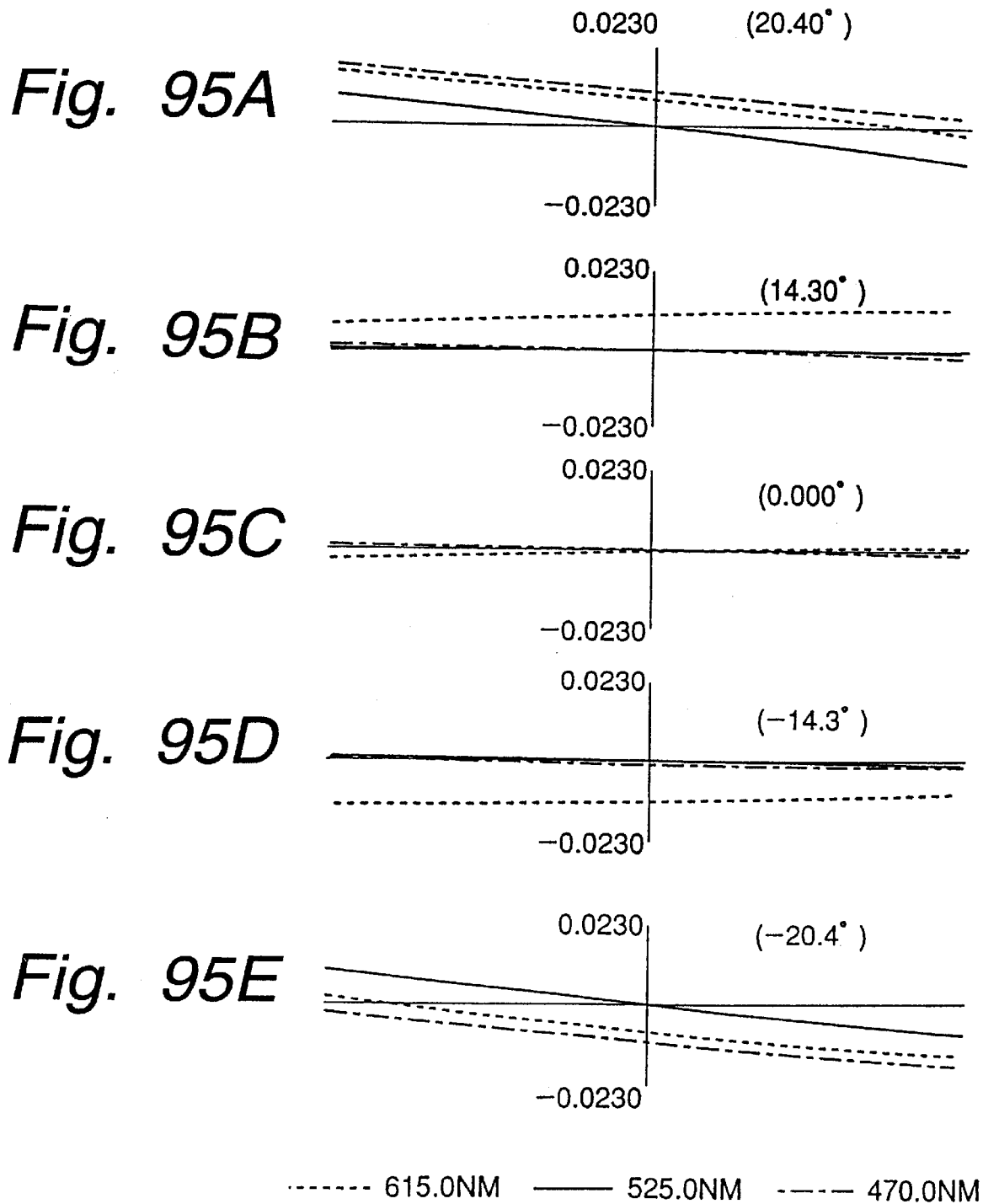

------ 615.0NM ——— 525.0NM —·—· 470.0NM

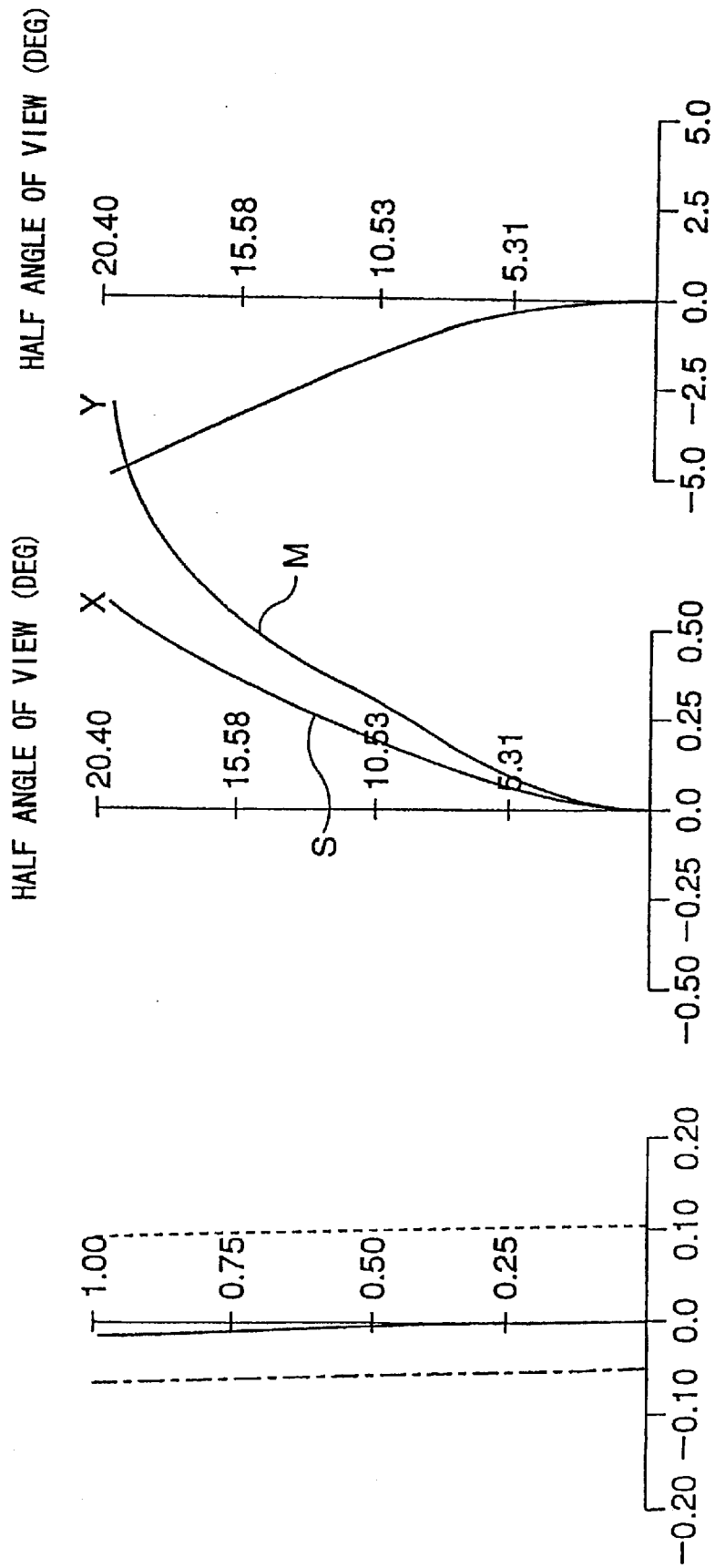

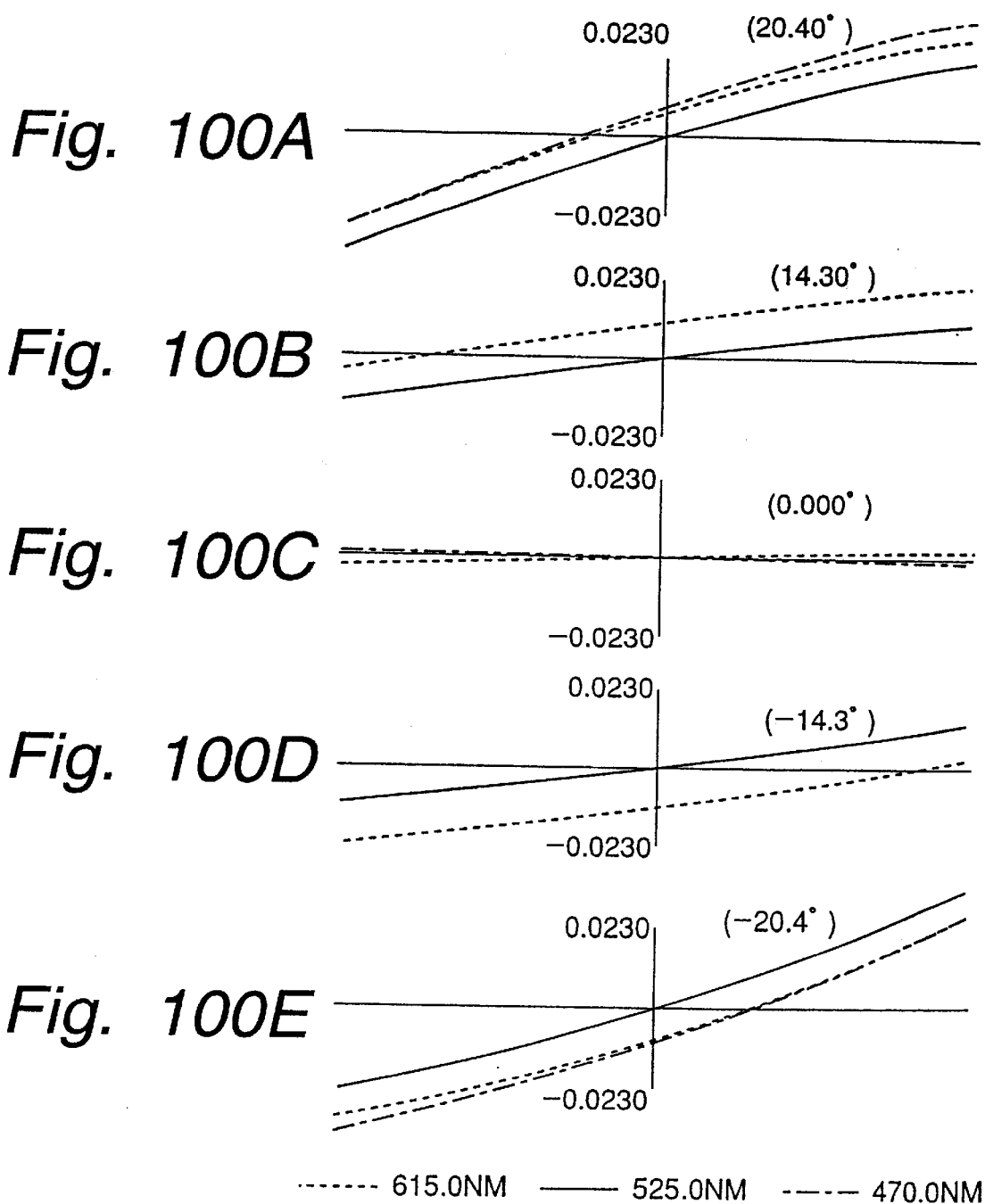

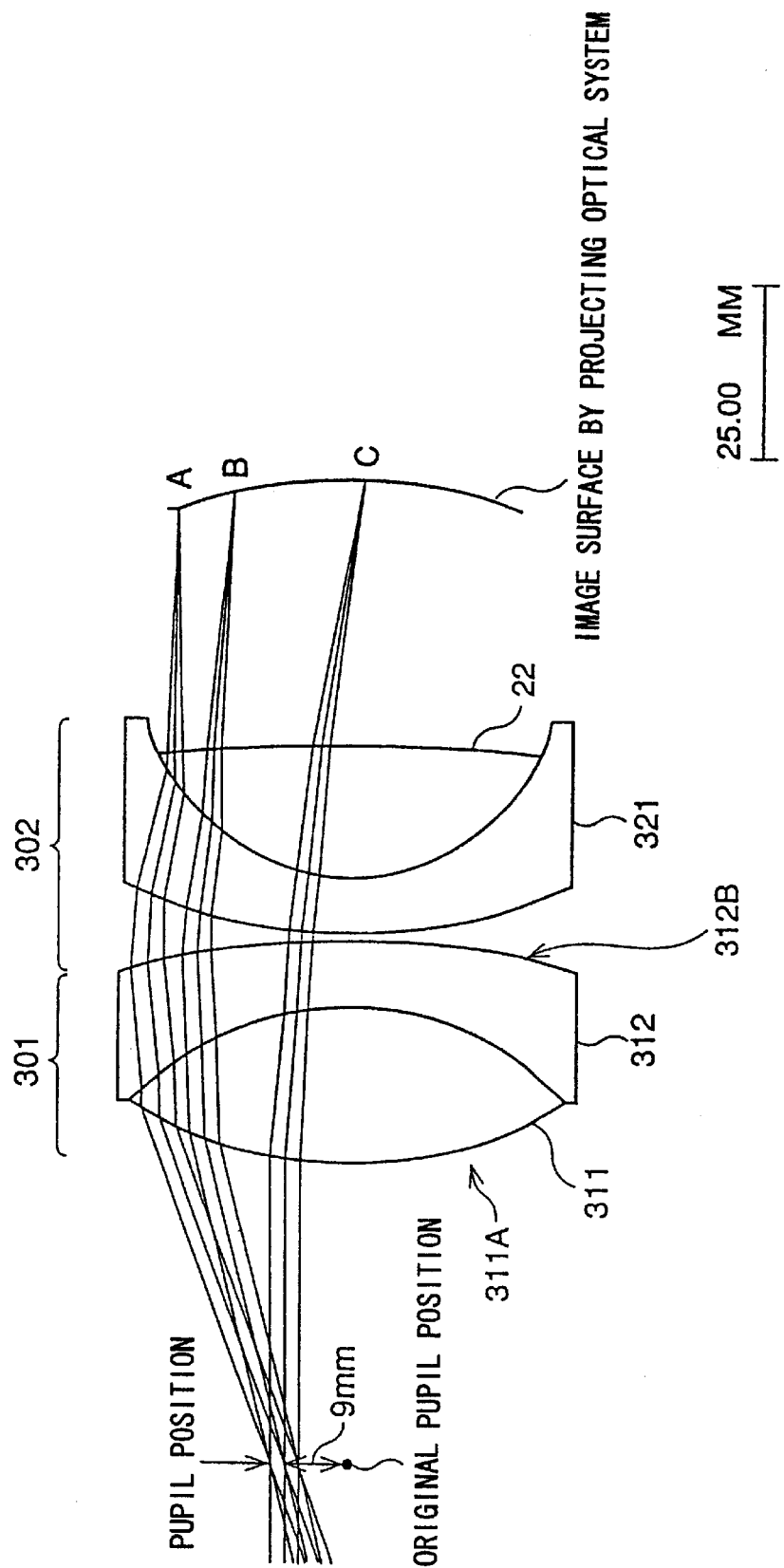

------ 615.0NM ——— 525.0NM —·—· 470.0NM

------ 615.0NM ——— 525.0NM —·— 470.0NM

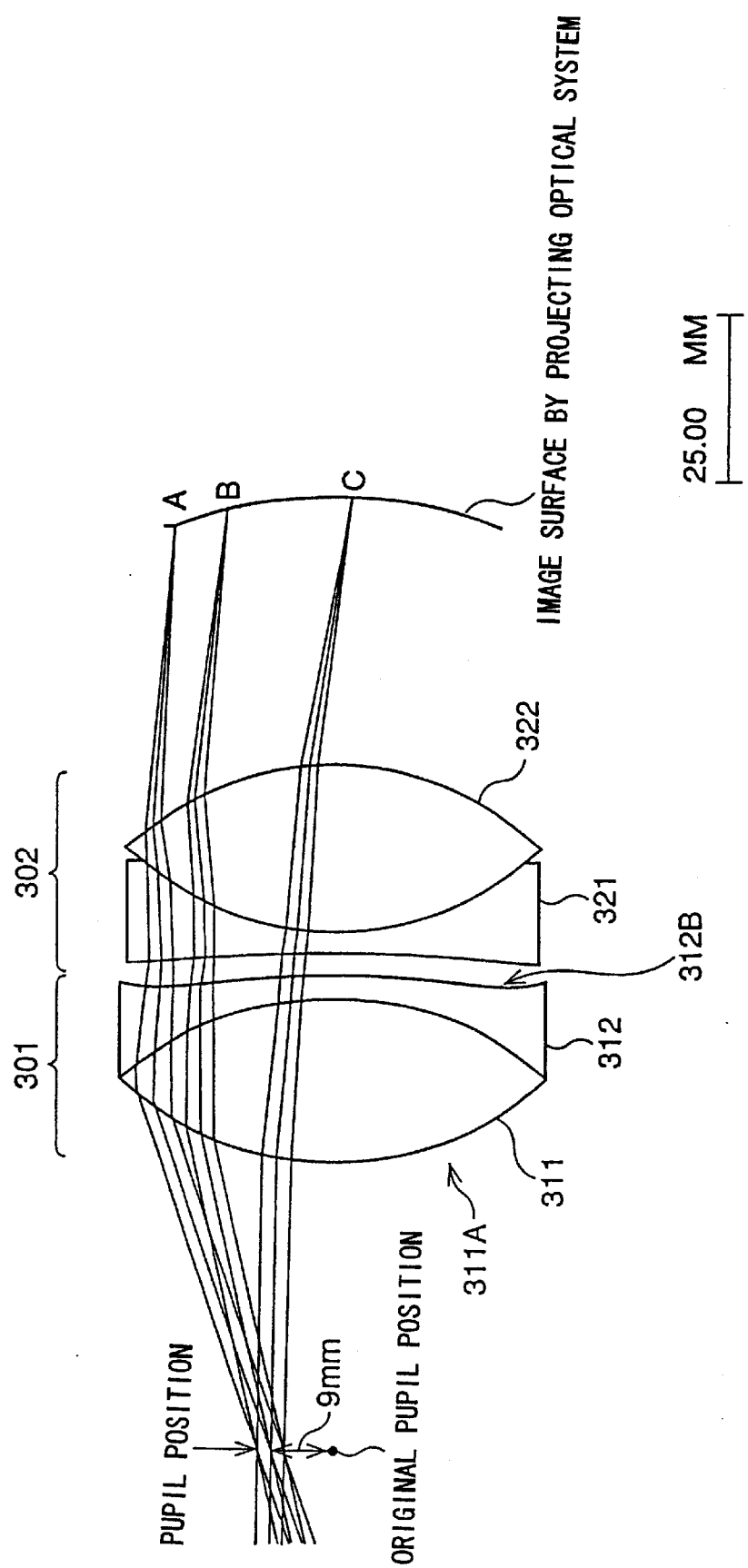

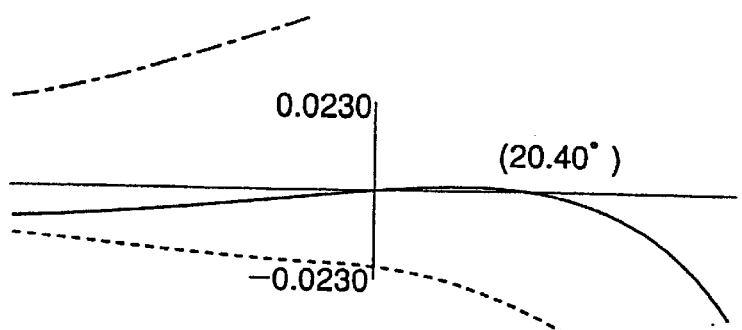
Fig. 107A
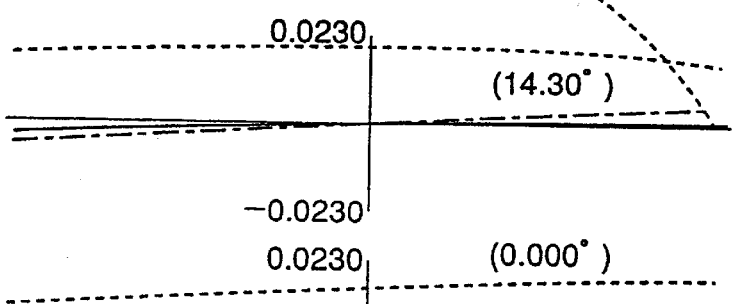
Fig. 107B
Fig. 107C
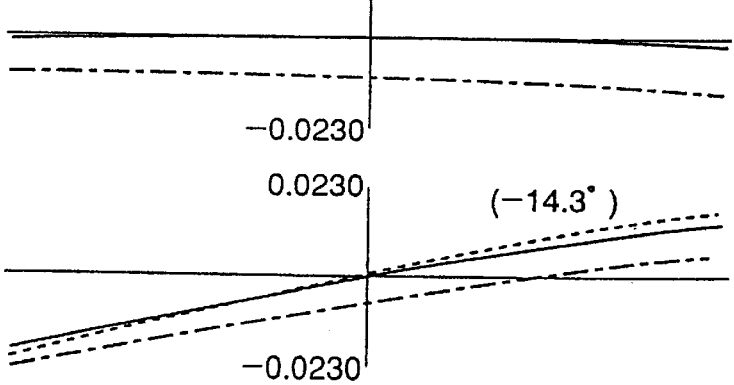
Fig. 107D
Fig. 107E
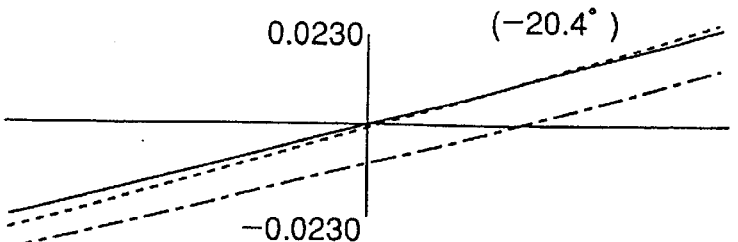
------ 615.0NM ——— 525.0NM —·— 470.0NM

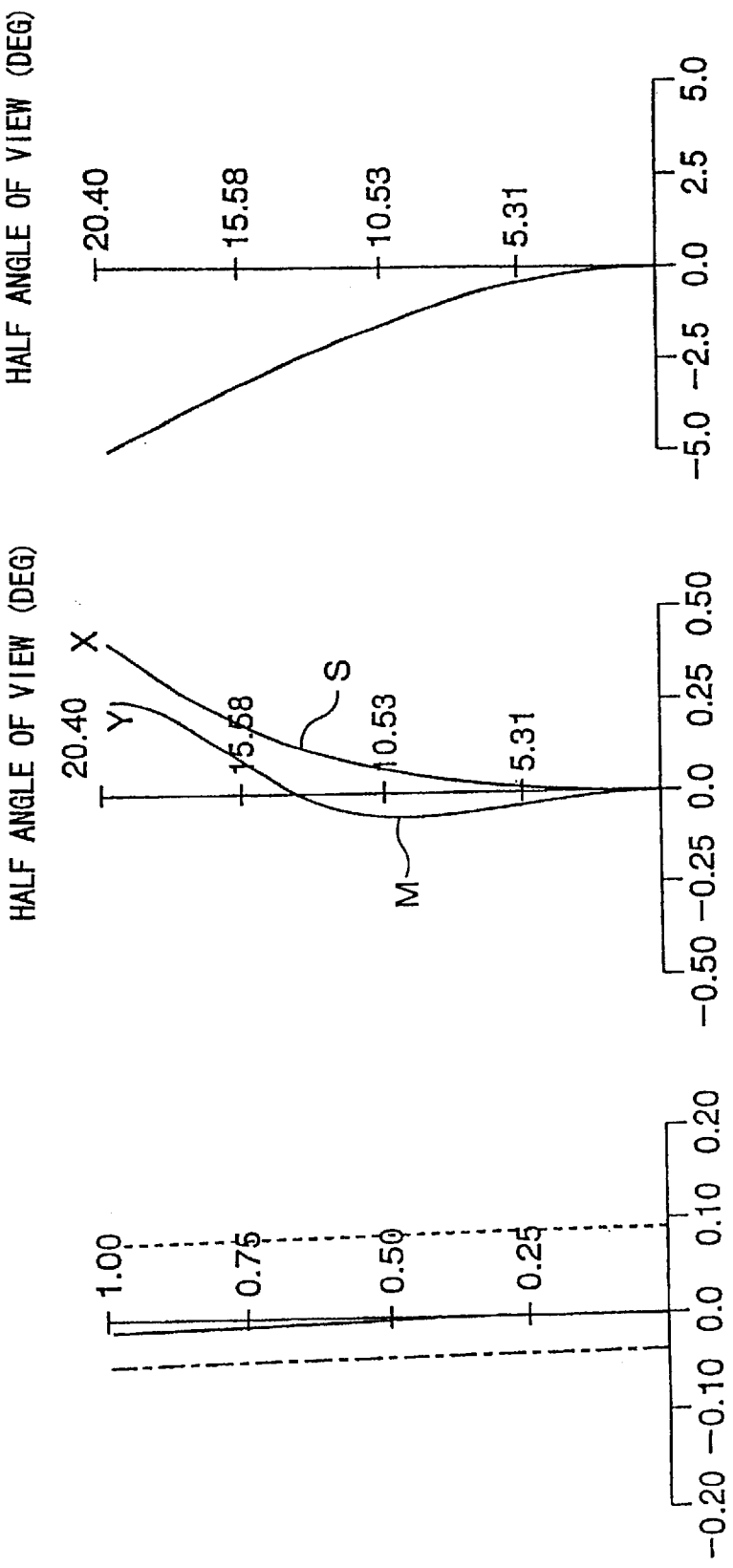

------ 615.0NM ——— 525.0NM —·—— 470.0NM

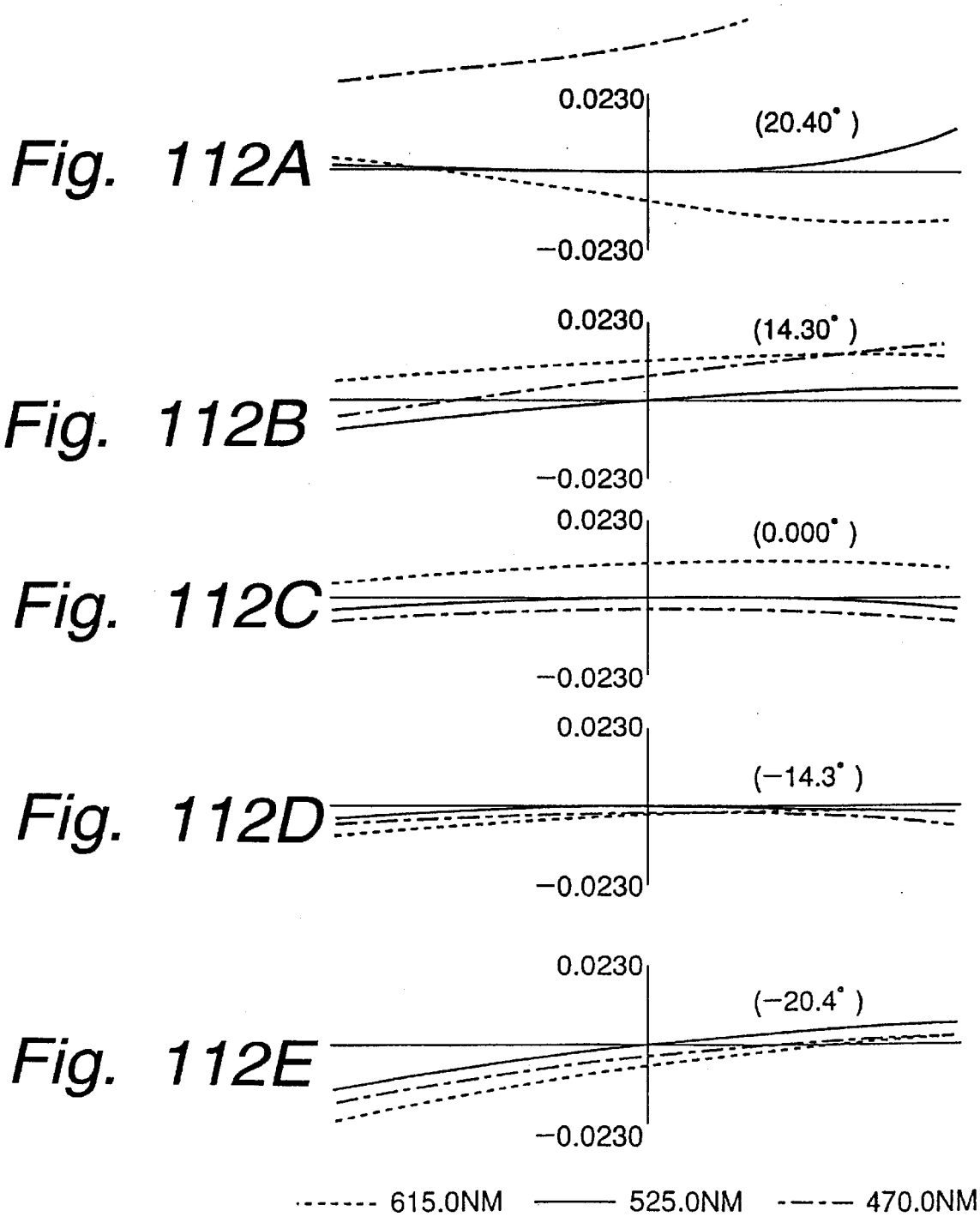

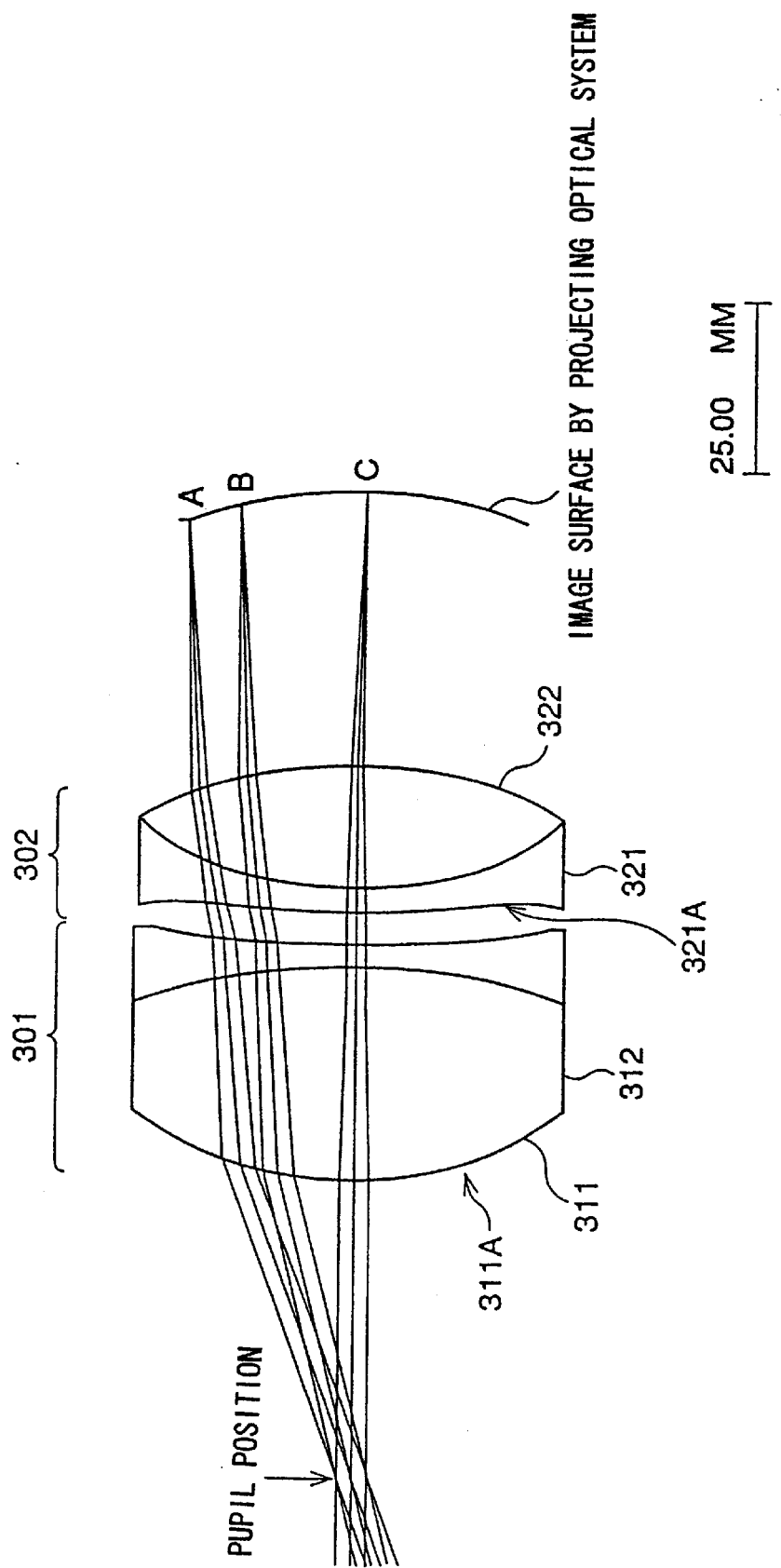

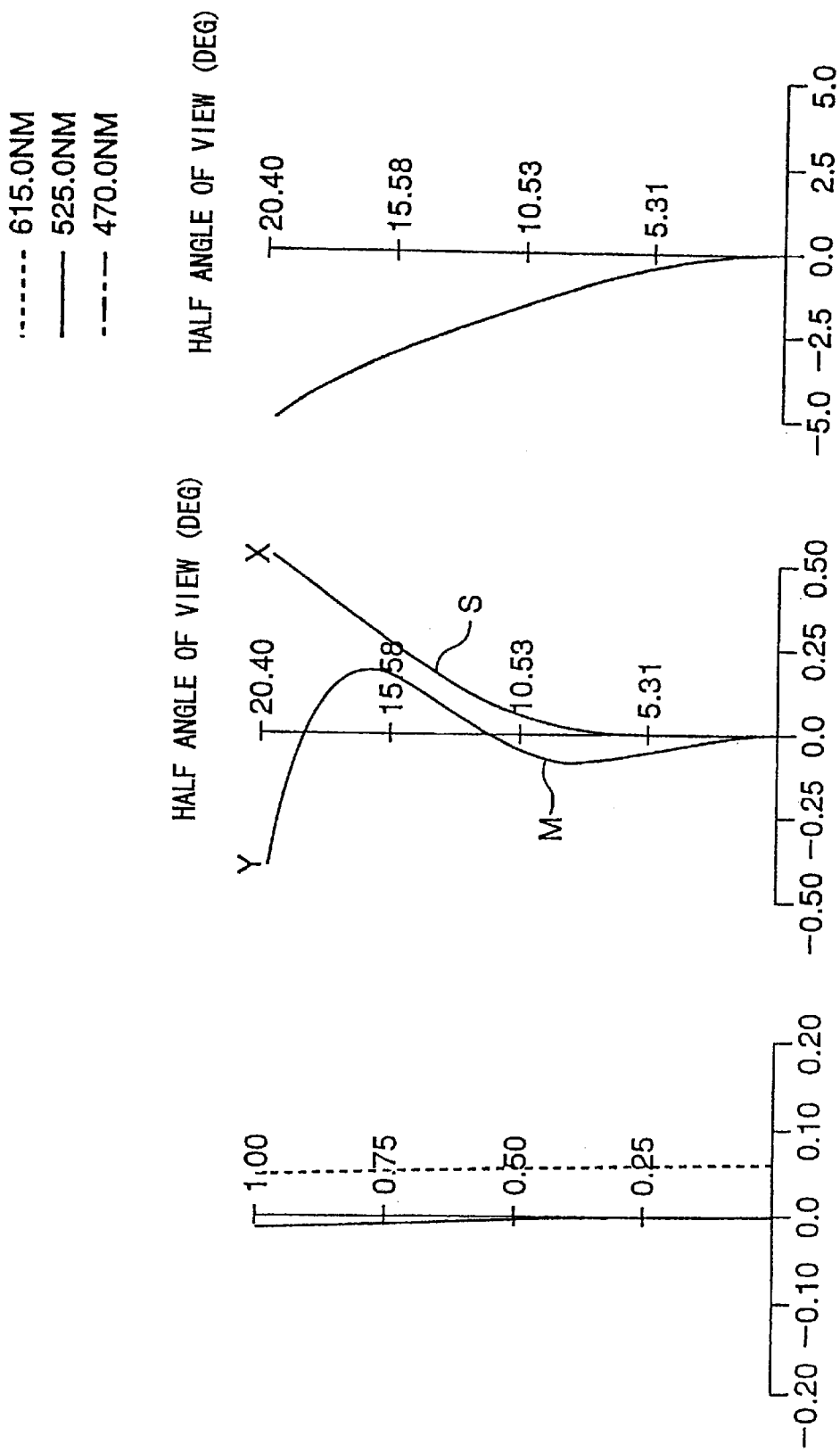

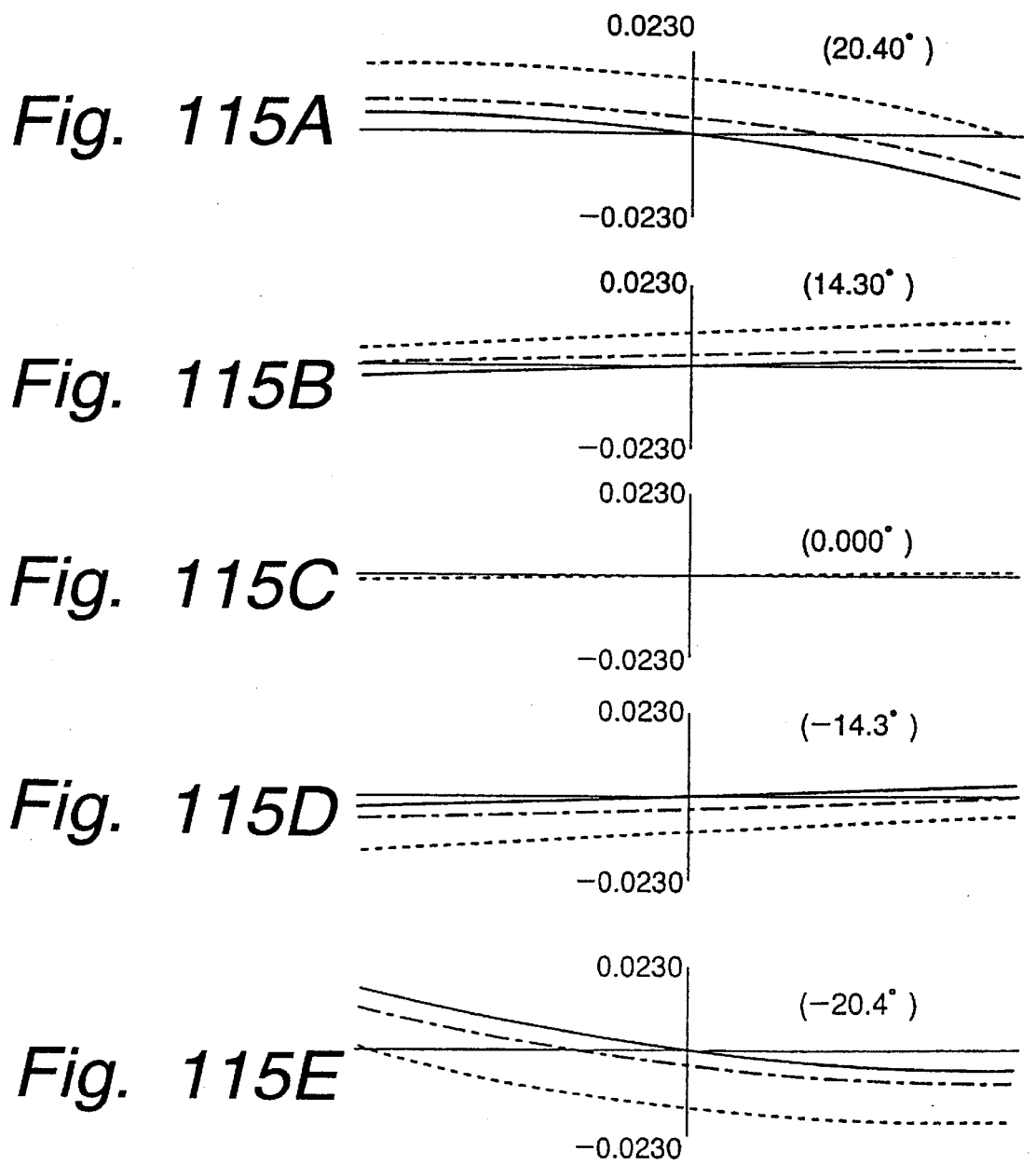

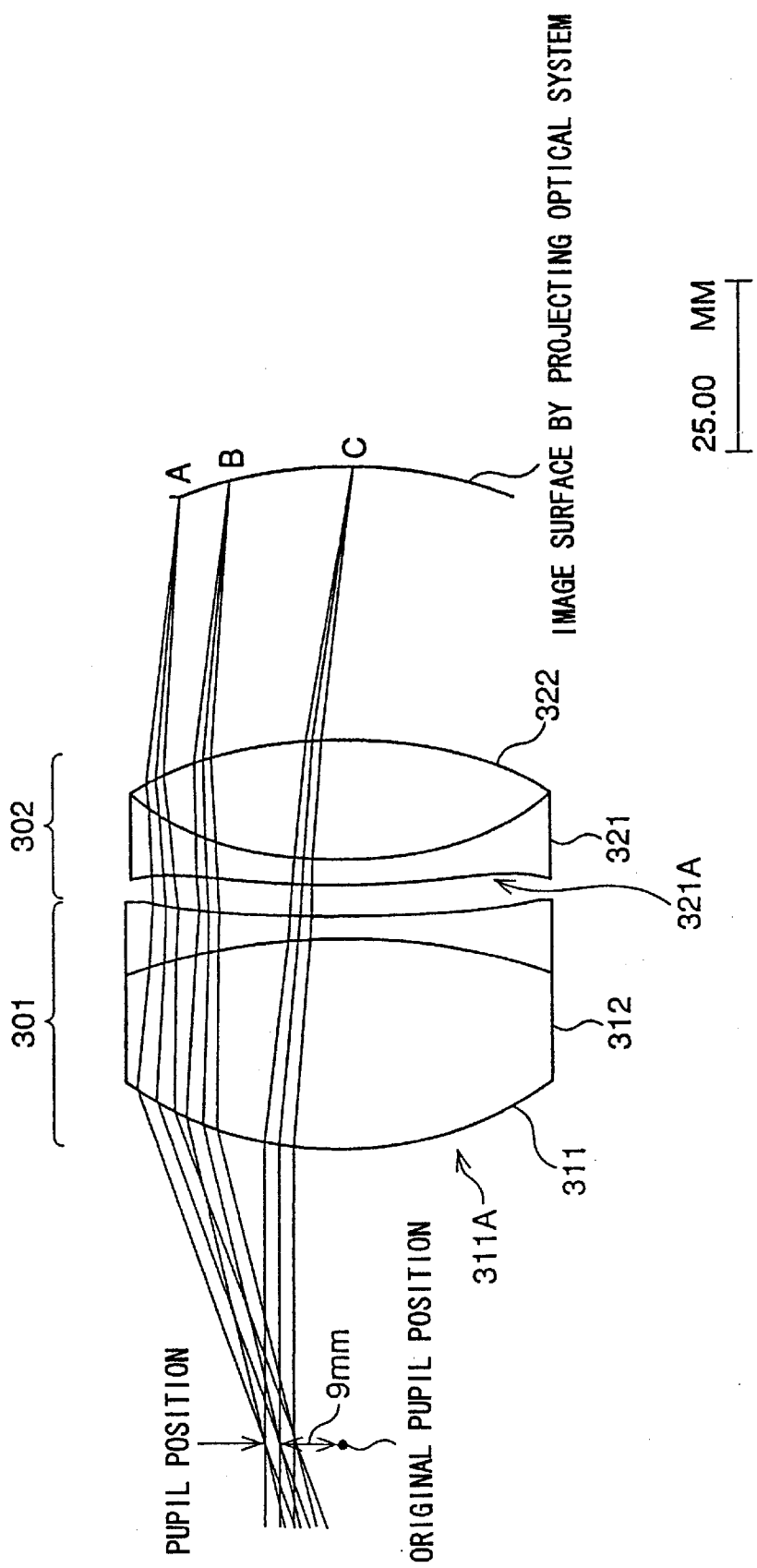

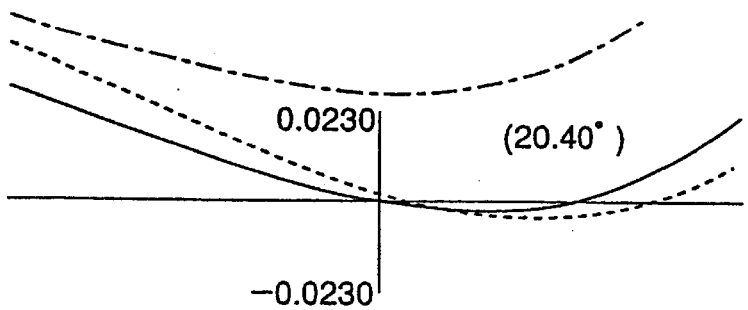
Fig. 117A
Fig. 117B
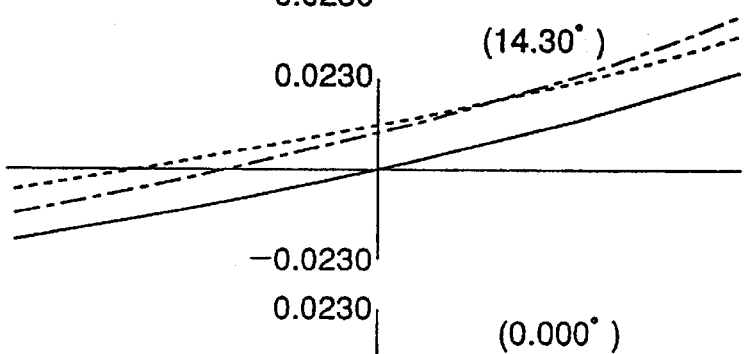
Fig. 117C
Fig. 117D
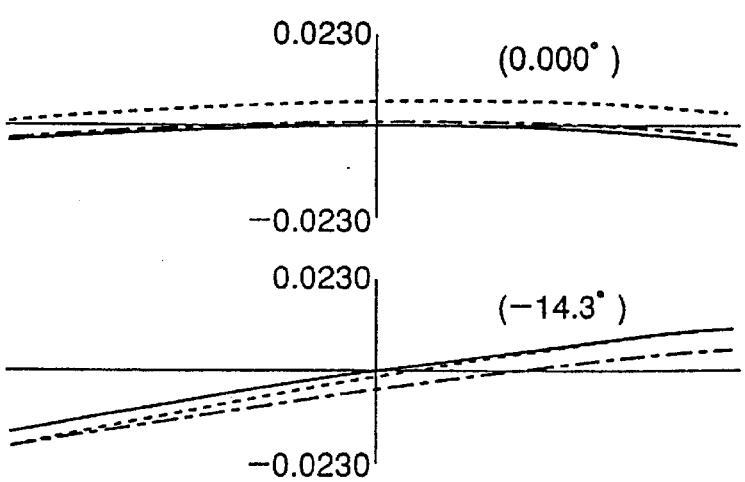
Fig. 117E
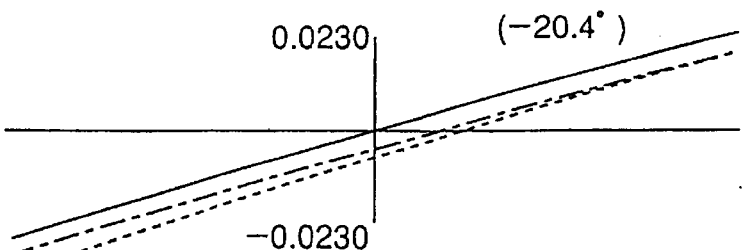
------ 615.0NM ——— 525.0NM — - — 470.0NM

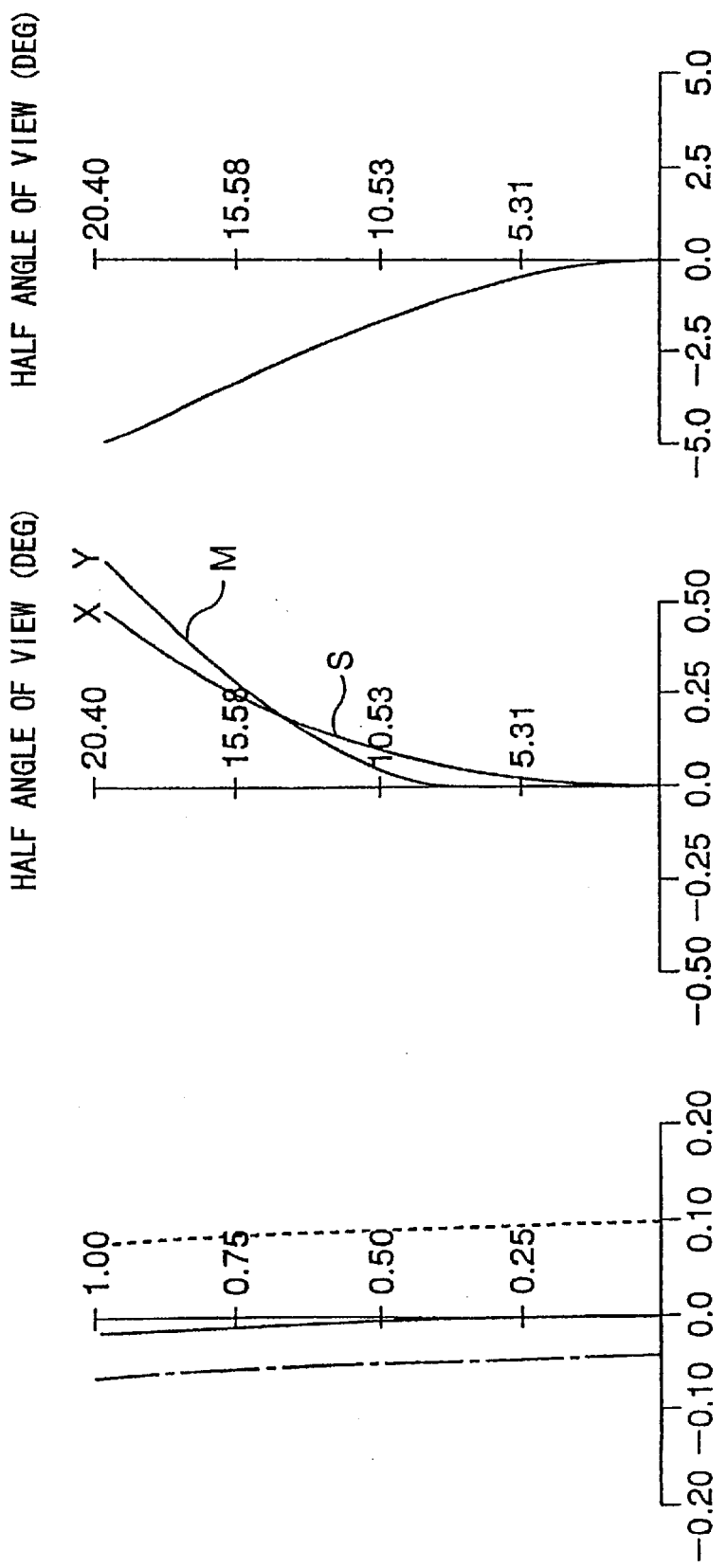

------ 615.0NM ——— 525.0NM ---- 470.0NM

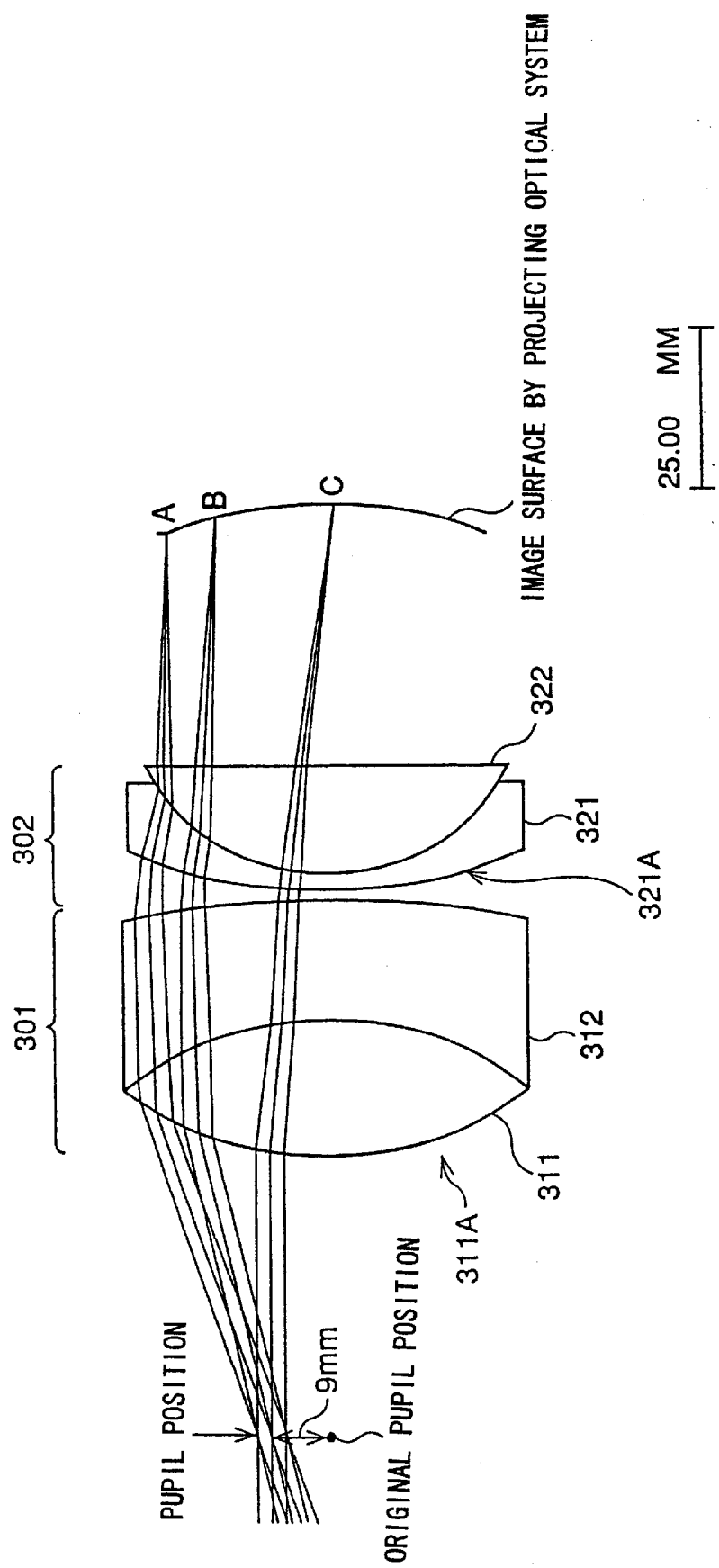

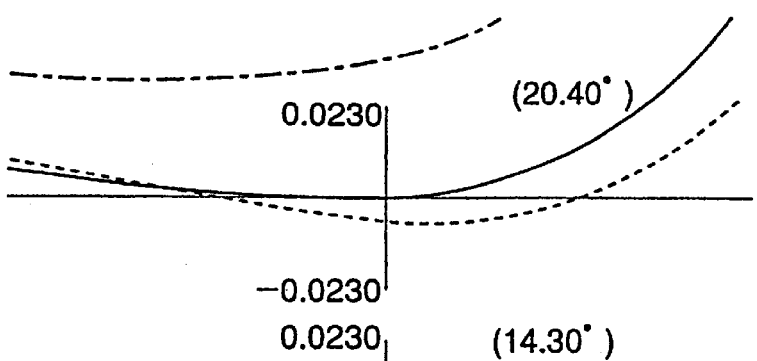
Fig. 122A
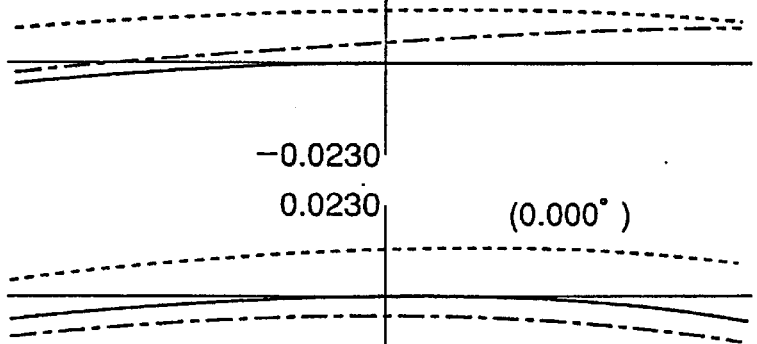
Fig. 122B
Fig. 122C
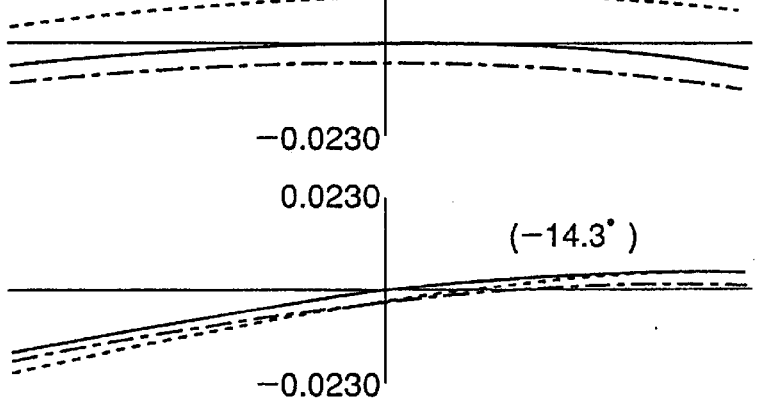
Fig. 122D
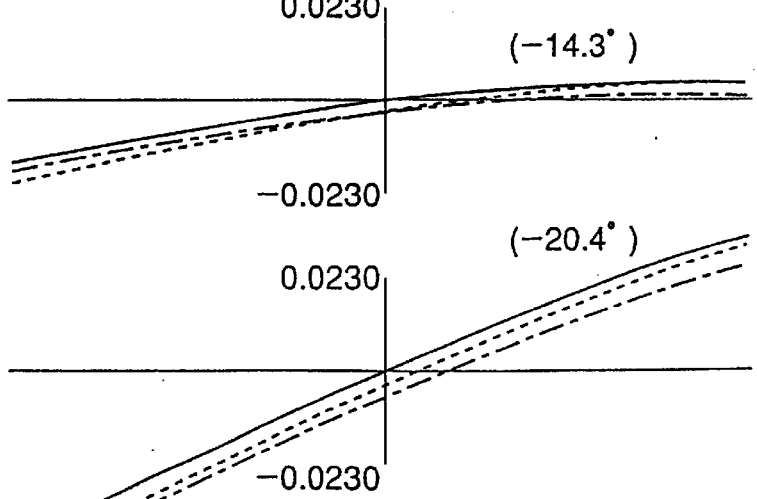
Fig. 122E
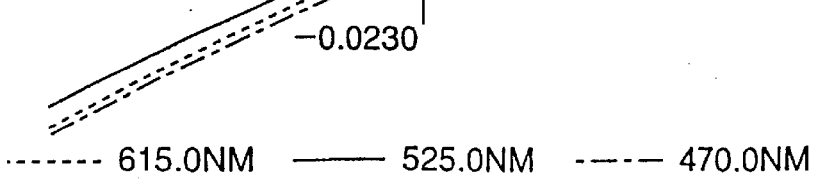

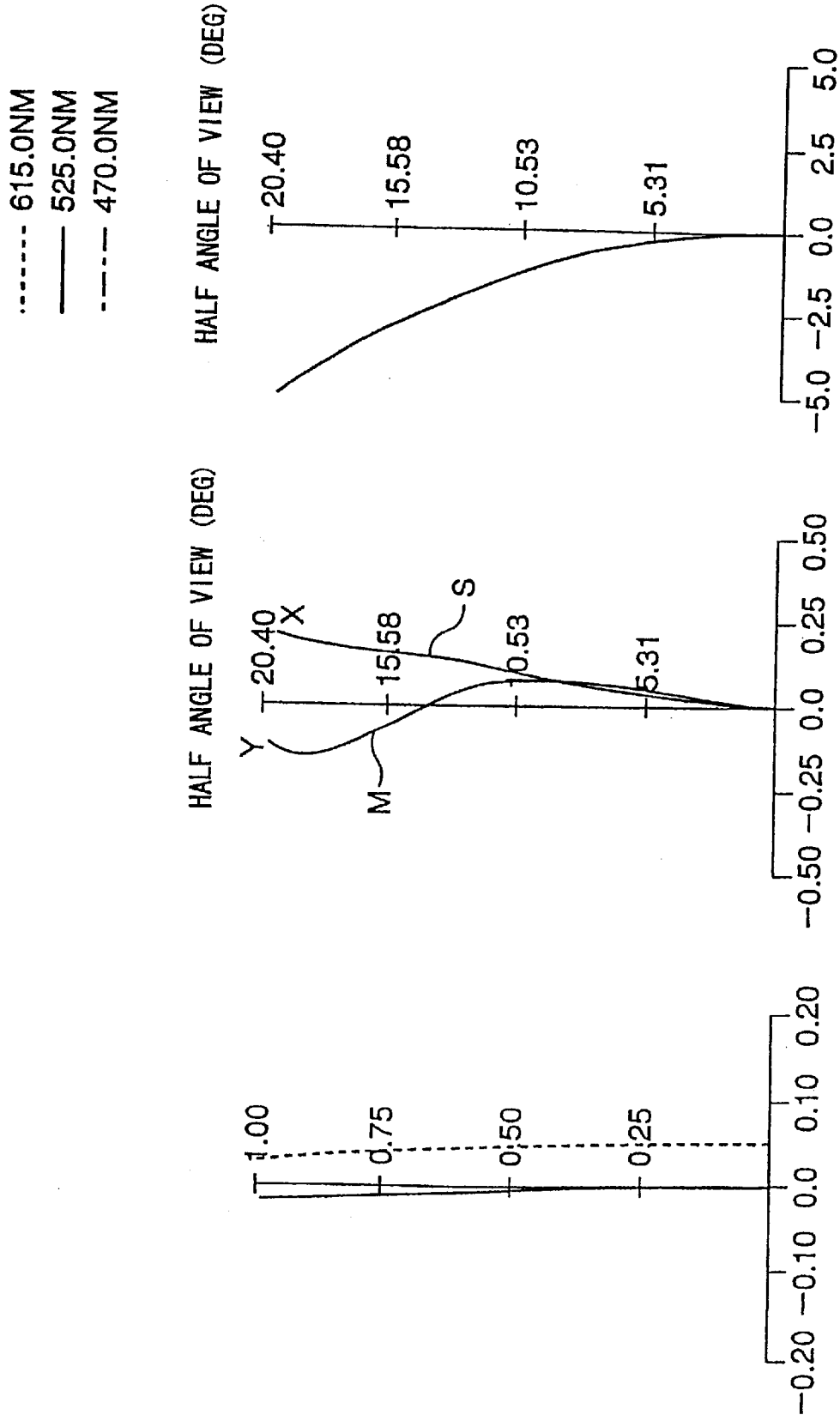

------ 615.0NM ⎯⎯⎯ 525.0NM ⎯·⎯ 470.0NM

------ 615.0NM ——— 525.0NM —-—- 470.0NM

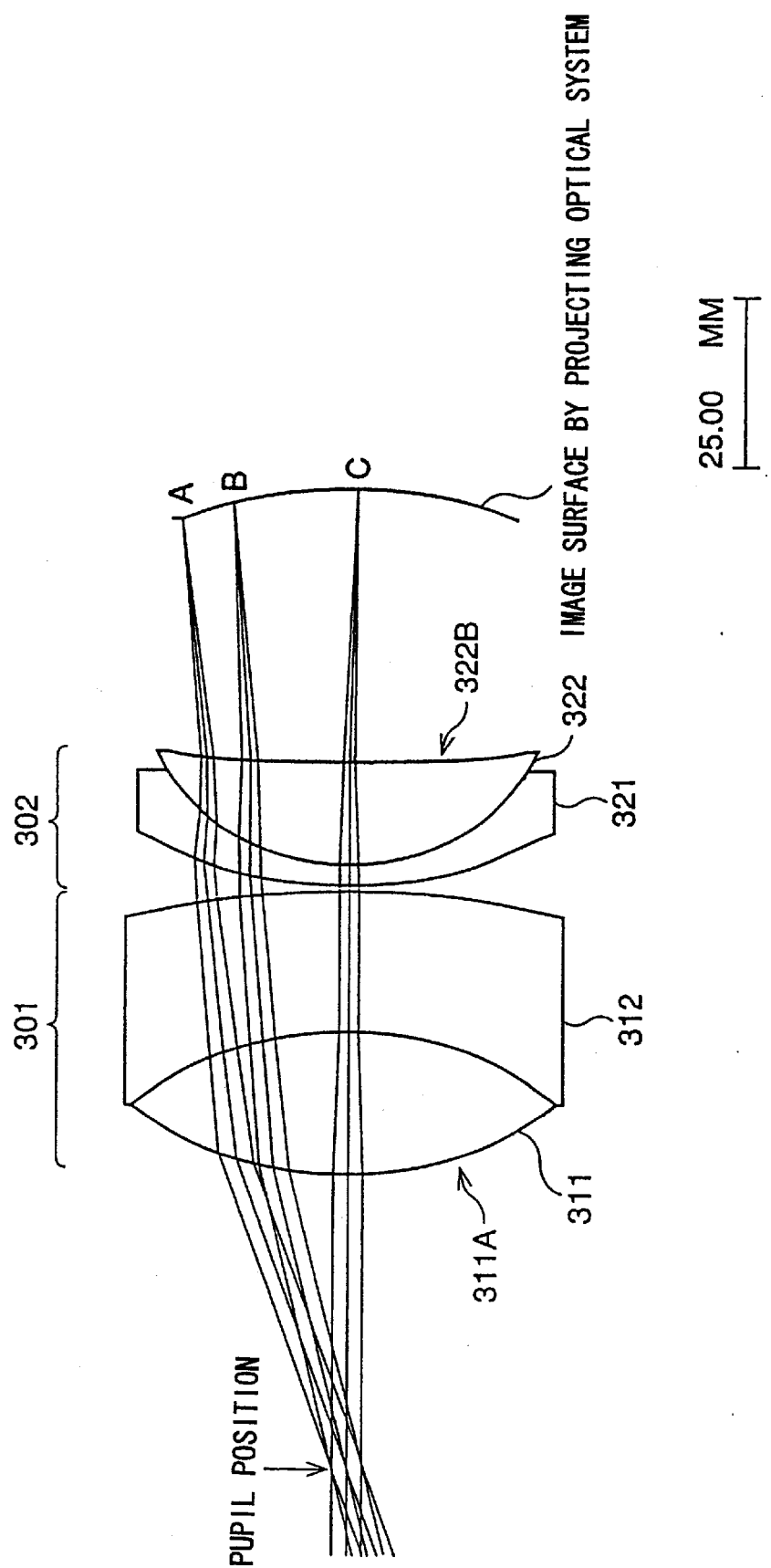

------ 615.0NM ——— 525.0NM ---- 470.0NM

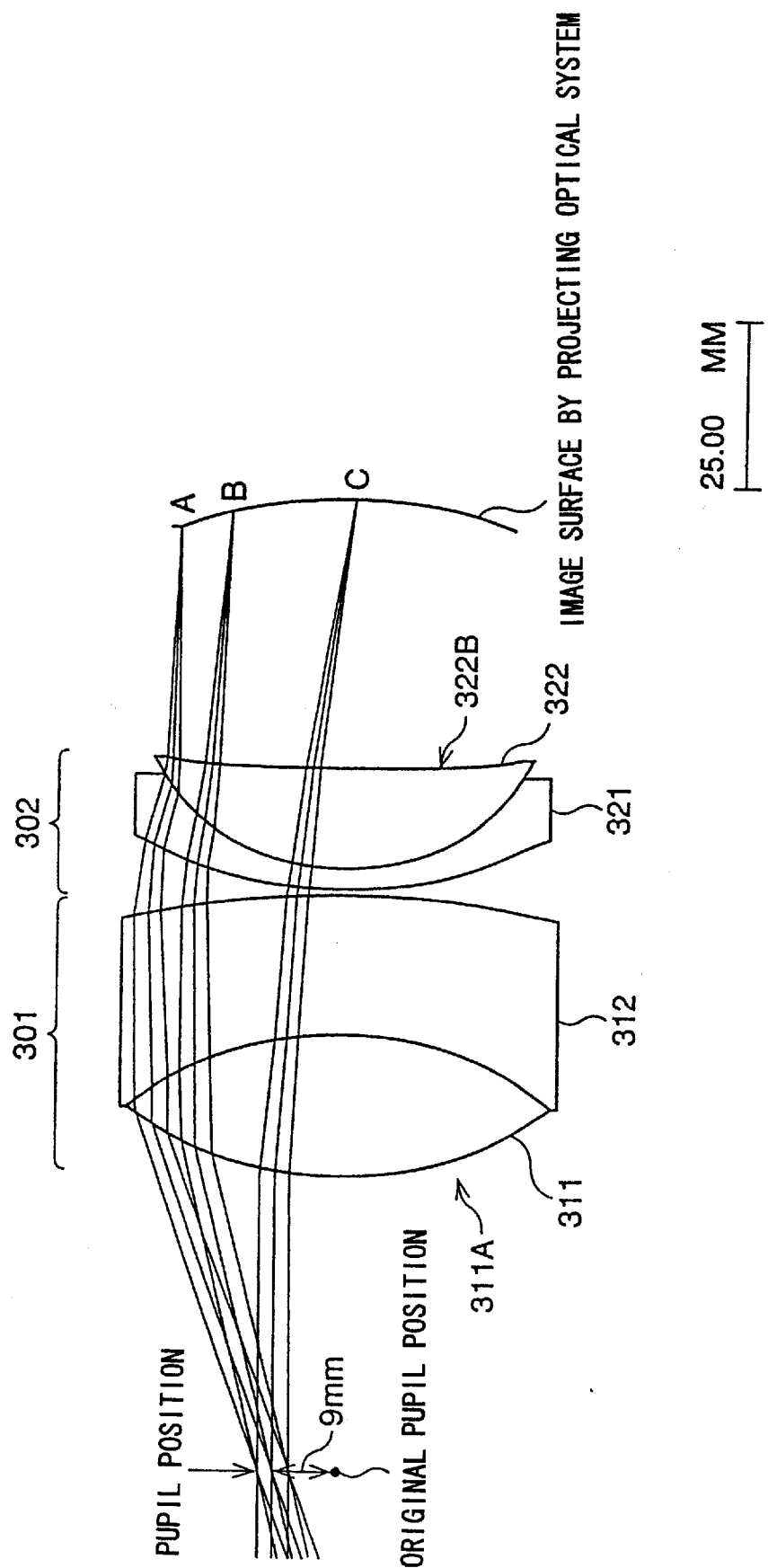

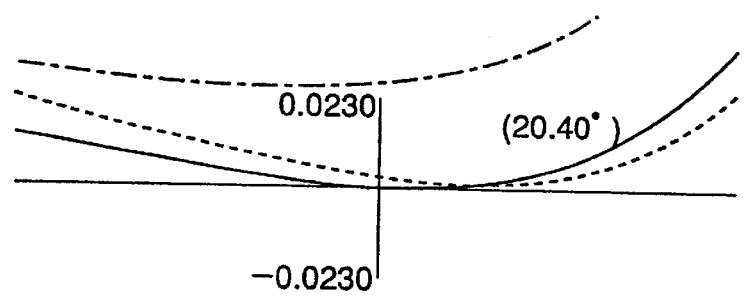
Fig. 132A
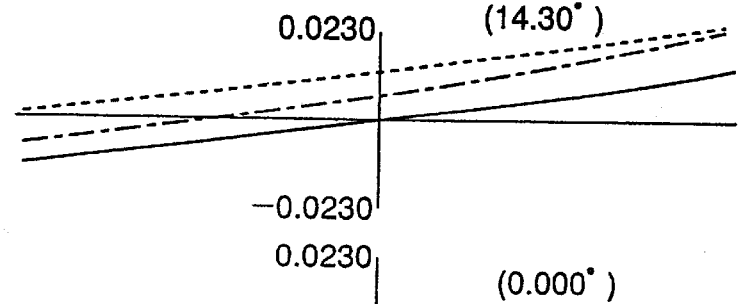
Fig. 132B
Fig. 132C
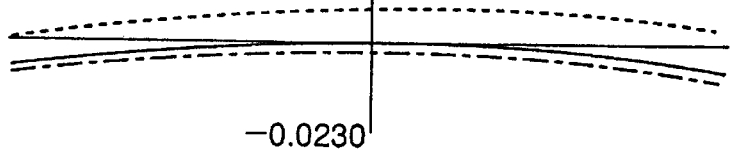
Fig. 132D
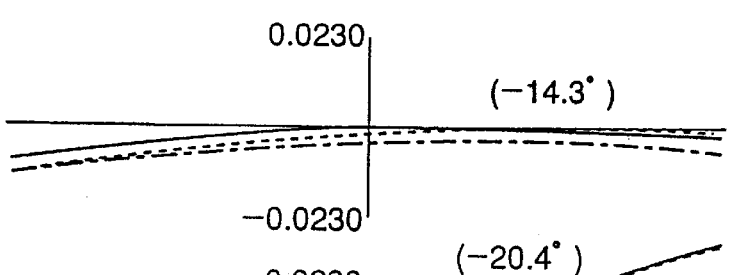
Fig. 132E
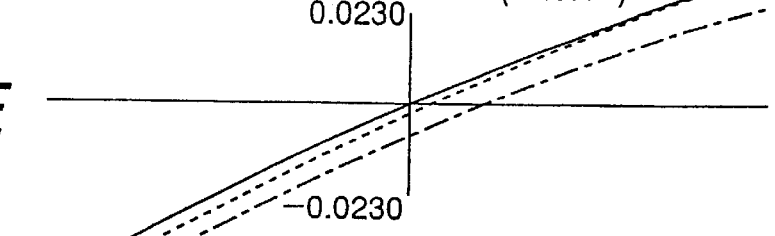

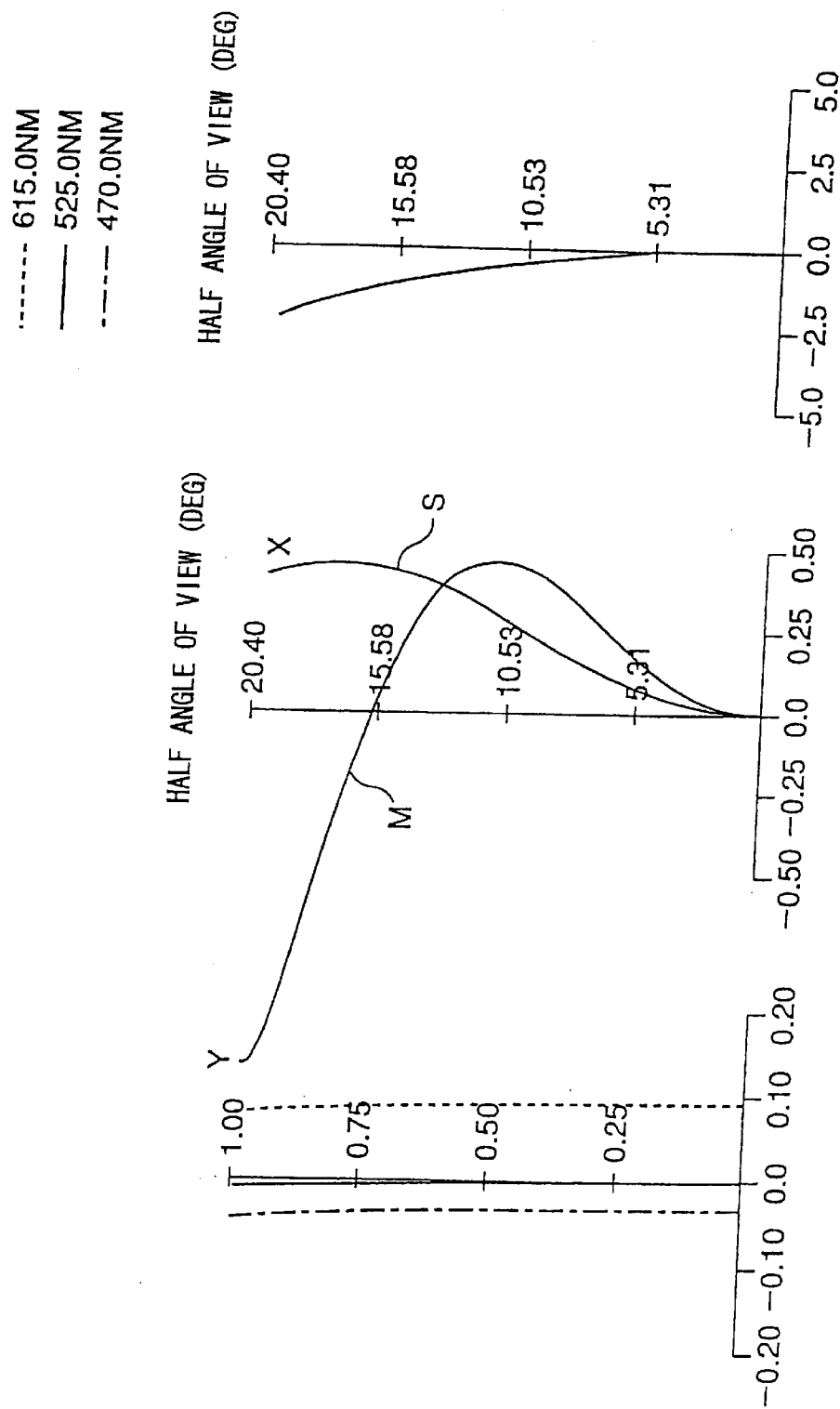

----- 615.0NM ——— 525.0NM ---- 470.0NM

------ 615.0NM ——— 525.0NM —·—· 470.0NM

7: DISPLAY APPARATUS

8: SYSTEM HOLDING MECHANISM

9: USER HOLDING MECHANISM

10: VIDEO AUDIO FORMING APPARATUS

11: ANGLE ADJUSTING MECHANISM CONTROLLER

13: LENS

14: DISPLAY PANEL

16: TRANSMITTANCE CONTROL MECHANISM

17: VTR

18: TV TUNER

19: COMPUTER

21: SECTOR

24: AMPLIFIER

25: SPEAKER

27: ANGLE ADJUSTING MECHANISM

28: LOW FREQUENCY VIBRATING MECHANISM

29: LOW PASS FILTER

*Fig. 152*

DISPLAY APPARATUS

TECHNICAL FIELD

The invention relates to a display apparatus and, more particularly, to a display apparatus for enabling the user to appreciate, for example, a virtual image with presence in a relaxed state.

BACKGROUND ART

Hitherto, as a display apparatus which can provide a large video image for allowing the user to feel presence, for example, there are a video projector, an HMD (Head Mount Display), and the like.

However, as shown in FIG. 145, since the video projector optically enlarges a video image and displays it on a screen, not only the video projector but also the screen is necessary to appreciate the video image. In this case, to display a large video image onto the screen, a certain distance is needed between the video projector and the screen. Therefore, if a room is narrow, it is difficult to display a large video image.

On the other hand, an HMD or HUD (Head Up Display) such that a video image to be displayed by a liquid crystal display or the like is enlarged by an optical system such as a lens or the like and a virtual image is formed and this virtual image is provided to the user has been put into practical use in recent years.

In a case where an object exists at a position near the lens than a focal distance, a virtual image is formed on the object side. The details of its forming principle have been disclosed in, for example, Toshifu Ogura, "The Introduction of Science of Lens (the first volume)", Asahi Sonorama Co., Ltd., Kazumi Murata, "Optics", Science Co., Ltd., or the like.

For example, as shown in FIG. 146, the HMD is constructed by including a lens for enlarging a video image and forming a virtual image and a display panel (for instance, liquid crystal display or the like) arranged at a position that is closer than a focal distance of the lens. The user attaches the HMD to a head portion and watches the video image displayed on the display panel through a lens, so that he can appreciate its virtual image. That is, the user can appreciate the large virtual image even if there is no wide space as in case of the video projector.

As shown in FIG. 147, since a width between human eyes (distance between the right and left eyes) is equal to about 56 to 75 mm, as a lens of the HMD, a small lens can be used so long as it can cover such a range. It is known that it is sufficient that the distance from the rotational center of the eyeball to the lens surface is equal to about 35 mm as an average in case of a person with glasses. Therefore, it is possible to construct such that when the HMD is attached to the head portion of the user, the lens is located near the user.

From the above explanation, the HMD can be constructed in a small size and, further, the virtual image is appreciated by using it, so that a large space is not necessary.

A principle such that it is sufficient that the distance from the rotational center of the eyeball to the lens surface is equal to about 35 mm as an average has been disclosed in, for instance, "Glasses Optics", Kyoritsu Publishing Co., Ltd., page 101, or the like (in this literature, it is assumed that a thickness of glasses lens is equal to 8 mm).

However, since the HMD is attached to the head portion and is used, there is a problem that the user feels its attaching sense and a weight.

Although there is a method of using the HMD without attaching it to the head portion, since a condition that the HMD is attached to the head portion and is used is set as a prerequisite, for the purpose of realization of a light weight or the like, a lens diameter is generally set to the necessary minimum size. In the case of using the HMD without attaching to the head portion, accordingly, as shown in FIG. 148, the eyeball is not always located at the front surface (near an optical axis) of the lens and, in many cases, a part of the virtual image is missing and cannot be seen.

Further, the HMD is usually designed so that when it is attached to the head portion, a pupil is located on the optical axis of the lens. A shape of lens is also designed so that when the pupil is located on the optical axis of the lens, aberration becomes the minimum as shown in FIG. 149A. Therefore, in a state where the HMD is used without attaching to the head portion and the pupil is not located on the optical axis of the lens as shown in FIG. 149B, the aberration increases, so that it is difficult to see a clear video image (virtual image).

On the other hand, for example, as shown in FIG. 150, since the HUD is set at a position that is slightly away from the user, a situation that the user feels an attaching sense or a weight as in case of the HMD does not occur.

In the HUD of FIG. 150, the video image displayed on the display panel is enlarged through a lens, the enlarged image is reflected by a half mirror, and the user looks at its reflected light, so that a virtual image is formed. Since the half mirror can transmit the external light, the user can also see an ambient background (situation) as light from the outside which transmits the half mirror together with the virtual image.

The HUD is not used to monitor the video image but is used to observe necessary information while performing some works such as driving of an automobile, control of an airplane, or the like. As mentioned above, therefore, the HUD has been designed so that the user can see an ambient situation, thereby enabling the user to confirm information by a virtual image while concentrating to the work so as not to cause a trouble in the work.

An angle of visibility of a virtual image which is formed by the HUD is set to a narrow angle shown in, for example, FIG. 150 so that the ambient situation can be clearly confirmed.

Therefore, in a case where a video image is appreciated by the HUD, the video image is very hard to see and is lacking in power.

Further, in the HUD, since the position of the virtual image from the user is fixed to about tens of meters ahead in case of the HUD for an automobile, the infinite point in case of the HUD for an airplane, or the like, the virtual image cannot be formed at a desired position of the user.

Since the user hardly moves the head portion during the operation of the automobile or the control of the airplane, in the HUD, the virtual image is formed so that it can be seen only from a predetermined position. It is, consequently, difficult for the user to see the virtual image in a relaxed state while moving the head portion to a certain extent.

Moreover, the HUD is designed such that it is installed at a position that is slightly away from the user (for example, an upper portion of a panel of an automobile, airplane, or the like) so as not to become an obstacle of the work such as operation of the automobile, control of the airplane, or the like as a prerequisite. That is, in order to perform some work by the human being, at least a space where an arm can enter is necessary and the HUD is installed so that such a space can be assured. Therefore, at least the space where the arm can enter is needed between the HUD and the user.

For example, a fact that a front forearm (distance from an arm chin rear edge to a finger tip point when an upper arm is naturally dropped downward and a palm is directed to the inside and the forearm is horizontally bent ahead) of an adult man is equal to 45.1 cm has been disclosed in Jiro Ohara, Ken Uchida, Yoshiyuki Ueno, and Kazutoshi Uchida, "The Human Body is Measured", Nihon shuppan Service Co., Ltd. According to this literature, a wider space is needed between the HUD and the user.

Besides the foregoing HMD and HUD, the virtual image can be also observed by, for example, a view finder or the like of a video camera as shown in FIG. 15l. In this case, however, it is necessary to grasp the video camera with the hand or the like and this causes the user to feel a troublesomeness. Even if the video camera is fixed by a tripod or the like, in the viewfinder, since the virtual image can be seen by only one eye, it is hard to obtain a video image with presence.

The invention is made in consideration of such a situation and enables the user to appreciate a virtual image with presence in a relaxed state.

DISCLOSURE OF INVENTION

A display apparatus according to claim 1 is characterized in that a video image providing apparatus comprises: display means for displaying a video image and an enlargement optical system for forming a virtual image by enlarging the video image displayed on the display means and for arranging the virtual image which is observed by the left and right eyes of the user at a same position on a space, and that the display apparatus further has fixing means for fixing the video image providing apparatus to a predetermined object other than the user.

A display apparatus according to claim 42 is characterized in that among a plurality of lenses constructing an enlargement optical system for forming a virtual image by enlarging a video image displayed on display means for displaying the video image, a refractive power of the lens arranged at a position that is the closest to the display means is larger than those of the other lenses and a refractive power of the lens arranged at a position that is the farthest from the display means is smaller than those of the other lenses.

In the display apparatus according to claim 1, the fixing means fixes the video image providing apparatus to a predetermined object other than the user.

In the display apparatus according to claim 42, among a plurality of lenses constructing the enlargement optical system, the refractive power of the lens arranged at the position that is the closest to the display means is larger than those of the other lenses and the refractive power of the lens arranged at the position that is the farthest from the display means is smaller than those of the other lenses.

BRIEF DESCRIPTION OF DRAWINGS

FIGS. 12A and 12B are cross sectional views of a top view, respectively, and a left side view showing the fifth constructional example of the display apparatus 7;

FIG. 20 is a perspective view showing a constructional example of an arm stand 81 in FIG. 19;

FIG. 24 is a diagram showing a spherical aberration (chromatic aberration), an astigmatism, and a distortion aberration of the ocular lens in FIG. 22;

FIG. 26 is an optical path diagram showing an optical path in the case where a pupil position is deviated in FIG. 22;

FIGS. 27A to 27E are diagrams showing lateral aberrations of the ocular lens in FIG. 22 in the case where the pupil position is deviated;

FIG. 28 is a diagram showing a spherical aberration (chromatic aberration), an astigmatism, and a distortion aberration of the ocular lens in FIG. 22;

FIGS. 32A to 32E are diagrams showing lateral aberrations of the ocular lens in FIG. 22;

FIGS. 33A to 33E are diagrams showing lateral aberrations of the ocular lens in FIG. 22 in the case where the pupil position is deviated;

FIG. 35 is a diagram showing a spherical aberration (chromatic aberration), an astigmatism, and a distortion aberration of the ocular lens in FIG. 34;

FIG. 37 is an optical path diagram showing an optical path in the case where the pupil position is deviated in FIG. 34;

FIG. 39 is a diagram showing a spherical aberration (chromatic aberration), an astigmatism, and a distortion aberration of the ocular lens in FIG. 34;

FIG. 42 is a diagram showing a spherical aberration (chromatic aberration), an astigmatism, and a distortion aberration of the ocular lens in FIG. 34;

FIGS. 43A to 43E are diagrams showing lateral aberrations of the ocular lens in FIG. 34;

FIGS. 49A to 49E are diagrams showing lateral aberrations of the ocular lens in FIG. 45 in the case where the pupil position is deviated;

FIG. 50 is a diagram showing a spherical aberration (chromatic aberration), an astigmatism, and a distortion aberration of the ocular lens in FIG. 45;

FIGS. 52A to 52E are diagrams showing lateral aberrations of the ocular lens in FIG. 45 in the case where the pupil position is deviated;

FIG. 53 is a diagram showing a spherical aberration (chromatic aberration), an astigmatism, and a distortion aberration of the ocular lens in FIG. 45;

FIGS. 55A to 55E are diagrams showing lateral aberrations of the ocular lens in FIG. 45 in the case where the pupil position is deviated;

FIG. 57 is a diagram showing a spherical aberration (chromatic aberration), an astigmatism, and a distortion aberration of the ocular lens in FIG. 56;

FIG. 61 is a diagram showing a spherical aberration (chromatic aberration), an astigmatism, and a distortion aberration of the ocular lens in FIG. 56;

FIG. 64 is a diagram showing a spherical aberration (chromatic aberration), an astigmatism, and a distortion aberration of the ocular lens in FIG. 56;

FIGS. 65A to 65E are diagrams showing lateral aberrations of the ocular lens in FIG. 56;

FIGS. 66A to 66E are diagrams showing lateral aberrations of the ocular lens in FIG. 56 in the case where the pupil position is deviated;

FIG. 79 is a diagram showing a spherical aberration (chromatic aberration), an astigmatism, and a distortion aberration of an ocular lens in FIG. 78;

FIGS. 80A to 80E are diagrams showing lateral aberrations of the ocular lens in FIG. 78;

FIG. 81 is an optical path diagram showing an optical path in the case where the pupil position is deviated in FIG. 78;

FIGS. 82A to 82E are diagrams showing lateral aberrations of the ocular lens in FIG. 78 in the case where the pupil position is deviated;

FIG. 83 is a diagram showing a constructional example in which parameters of the ocular lens in the fifth embodiment are changed;

FIG. 84 is a diagram showing a spherical aberration (chromatic aberration), an astigmatism, and a distortion aberration of the ocular lens in FIG. 83;

FIG. 89 is a diagram showing a spherical aberration (chromatic aberration), an astigmatism, and a distortion aberration of the ocular lens in FIG. 88;

FIG. 91 is an optical path diagram showing an optical path in the case where the pupil position is deviated in FIG. 88;

FIGS. 92A to 92E are diagrams showing lateral aberrations of the ocular lens in FIG. 88 in the case where the pupil position is deviated;

FIGS. 95A to 95E are diagrams showing lateral aberrations of the ocular lens in FIG. 93;

FIG. 99 is a diagram showing a spherical aberration (chromatic aberration), an astigmatism, and a distortion aberration of the ocular lens in FIG. 98;

FIGS. 100A to 100E are diagrams showing lateral aberrations of the ocular lens in FIG. 98;

FIG. 101 is an optical path diagram showing an optical path in the case where a pupil position is deviated in FIG. 98;

FIG. 106 is an optical path diagram showing an optical path in the case where the pupil position is deviated in FIG. 103;

FIGS. 107A to 107E are diagrams showing lateral aberrations of the ocular lens in FIG. 103 in the case where the pupil position is deviated;

FIG. 109 is a diagram showing a spherical aberration (chromatic aberration), an astigmatism, and a distortion aberration of an ocular lens in FIG. 108;

FIGS. 112A to 112E are diagrams showing lateral aberrations of the ocular lens in FIG. 108 in the case where the pupil position is deviated;

FIG. 113 is a diagram showing a constructional example in which parameters of the ocular lens in the seventh embodiment are changed;

FIG. 114 is a diagram showing a spherical aberration (chromatic aberration), an astigmatism, and a distortion aberration of the ocular lens in FIG. 113;

FIGS. 115A to 115E are diagrams showing lateral aberrations of the ocular lens in FIG. 113;

FIG. 116 is an optical path diagram showing an optical path in the case where the pupil position is deviated in FIG. 113;

FIGS. 117A to 117E are diagrams showing lateral aberrations of the ocular lens in FIG. 113 in the case where the pupil position is deviated;

FIG. 119 is a diagram showing a spherical aberration (chromatic aberration), an astigmatism, and a distortion aberration of the ocular lens in FIG. 118;

FIGS. 120A to 120E are diagrams showing lateral aberrations of the ocular lens in FIG. 118;

FIG. 121 is an optical path diagram showing an optical path in the case where the pupil position is deviated in FIG. 118;

FIGS. 122A to 122E are diagrams showing lateral aberrations of the ocular lens in FIG. 118 in the case where the pupil position is deviated;

FIG. 123 is a diagram showing a construction of the eighth embodiment constructing an enlargement optical system;

FIG. 124 is a diagram showing a spherical aberration (chromatic aberration), an astigmatism, and a distortion aberration of the ocular lens in FIG. 118;

FIGS. 125A to 125E are diagrams showing lateral aberrations of the ocular lens in FIG. 118;

FIG. 126 is an optical path diagram showing an optical path in the case where the pupil position is deviated in FIG. 118;

FIGS. 127A to 127E are diagrams showing lateral aberrations of the ocular lens in FIG. 118 in the case where the pupil position is deviated;

FIG. 128 is a diagram showing a constructional example in which parameters of the ocular lens in the eighth embodiment are changed;

FIG. 129 is a diagram showing a spherical aberration (chromatic aberration), an astigmatism, and a distortion aberration of the ocular lens in FIG. 128;

FIGS. 130A to 130E are diagrams showing lateral aberrations of the ocular lens in FIG. 128;

Figure 133:
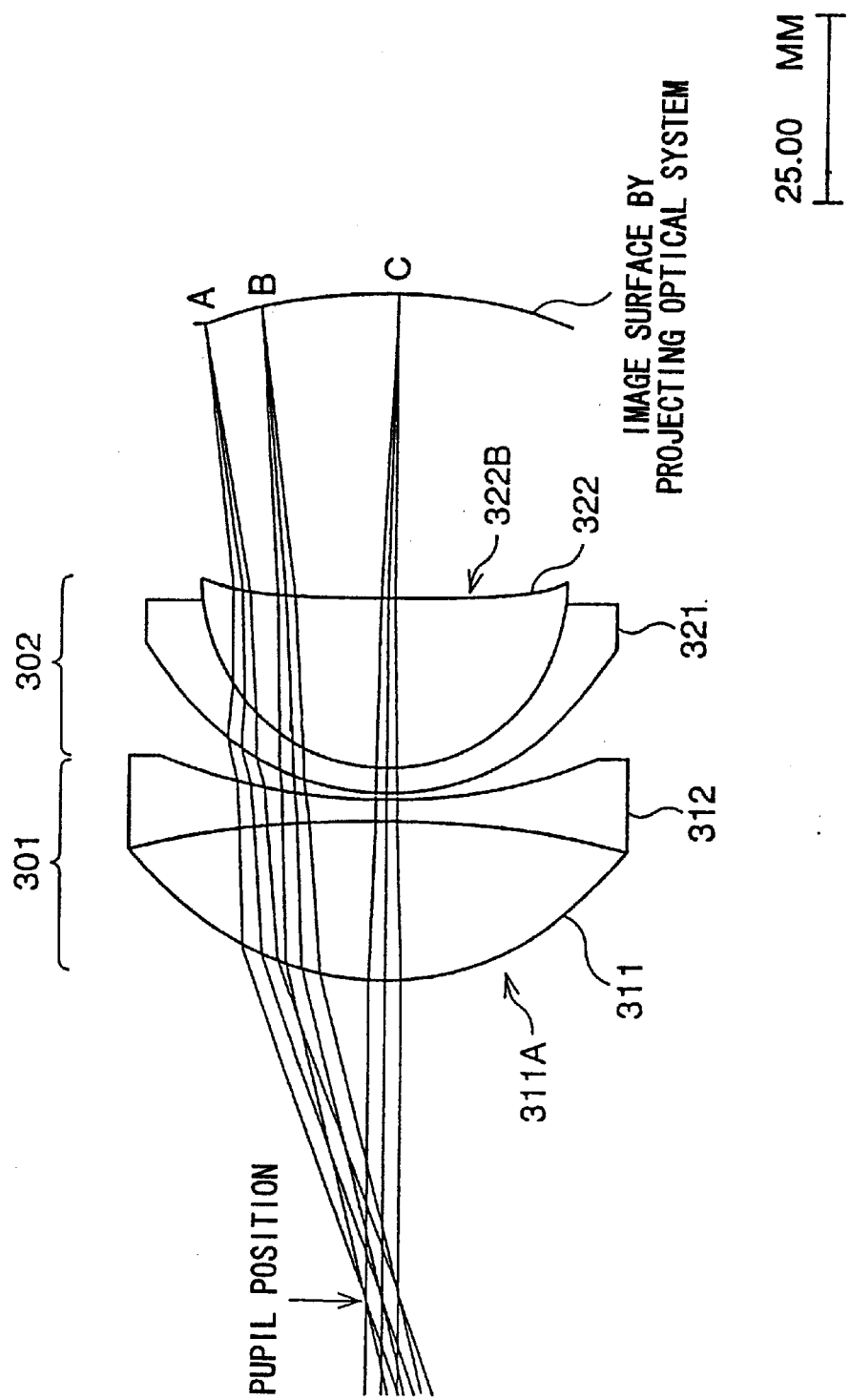
Figure 135A:
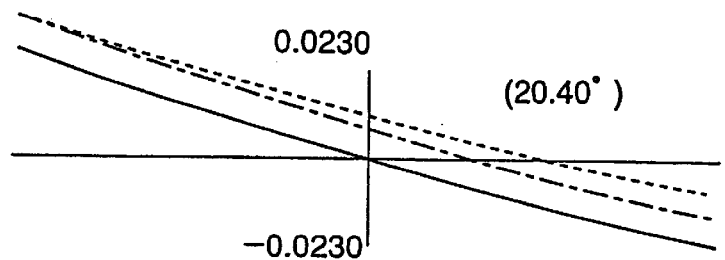
Figure 135B:
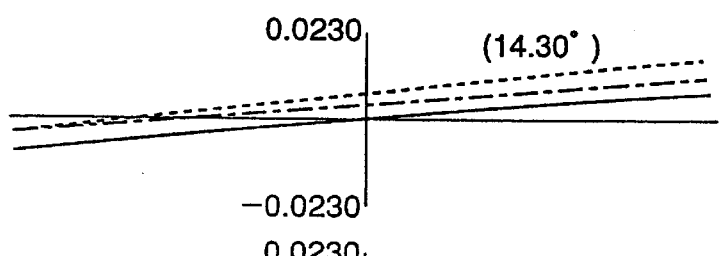
Figure 135C:
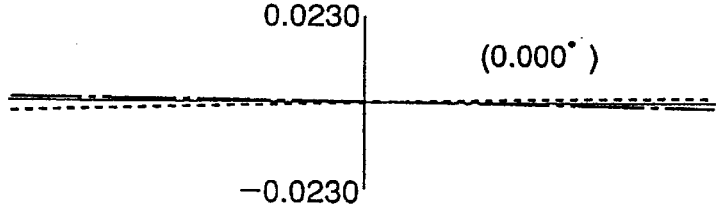
Figure 135D:
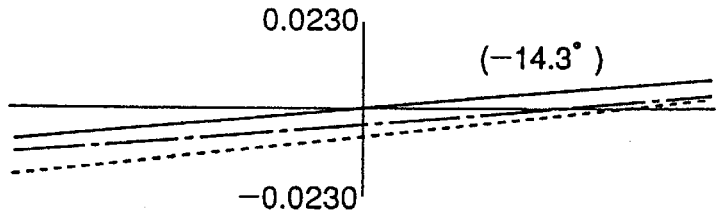
Figure 135E:
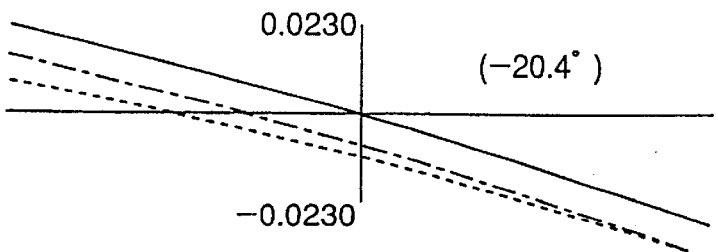
Figure 136:
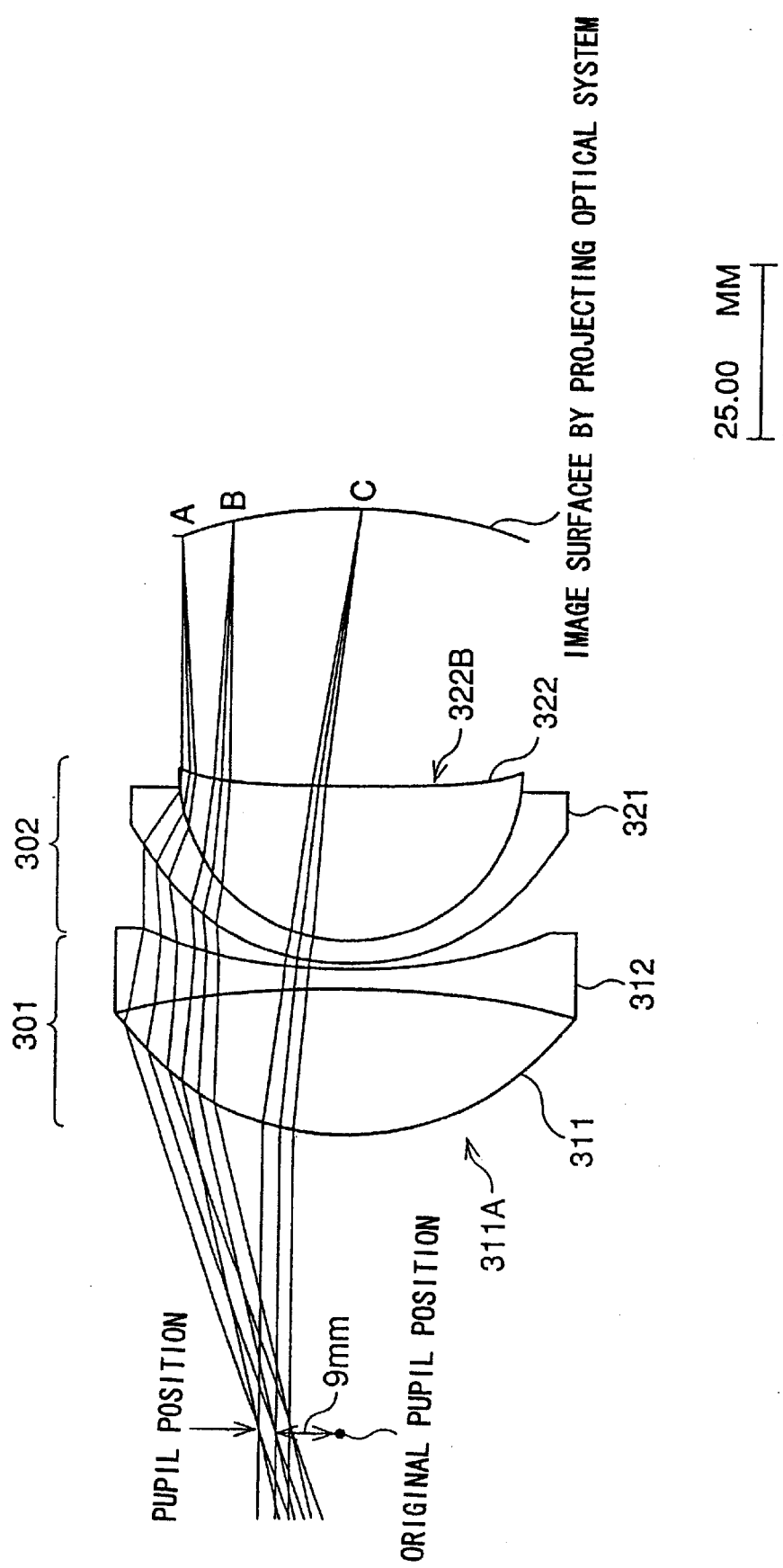
Figure 137A:
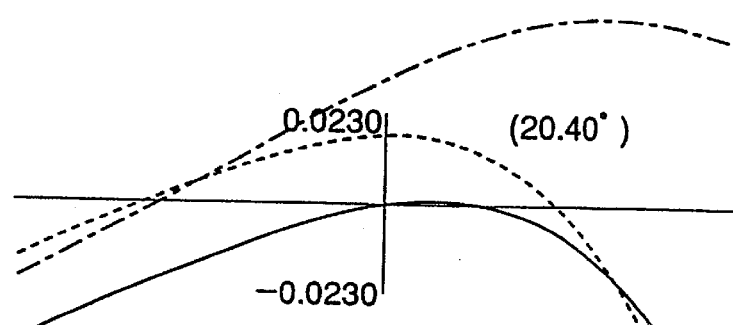
Figure 137B:
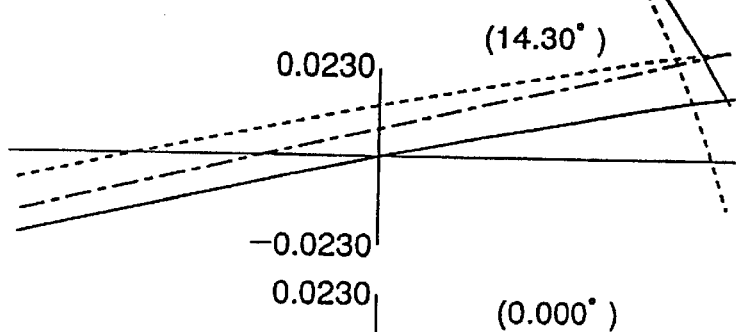
Figure 137C:
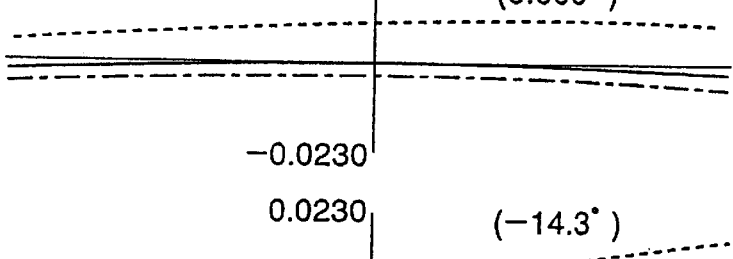
Figure 137D:
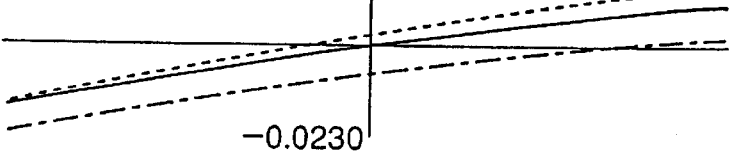
Figure 137E:
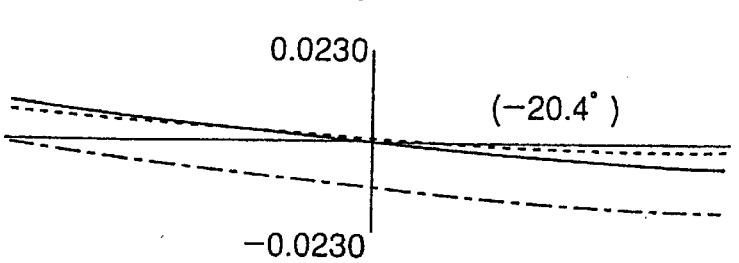
Figure 138:
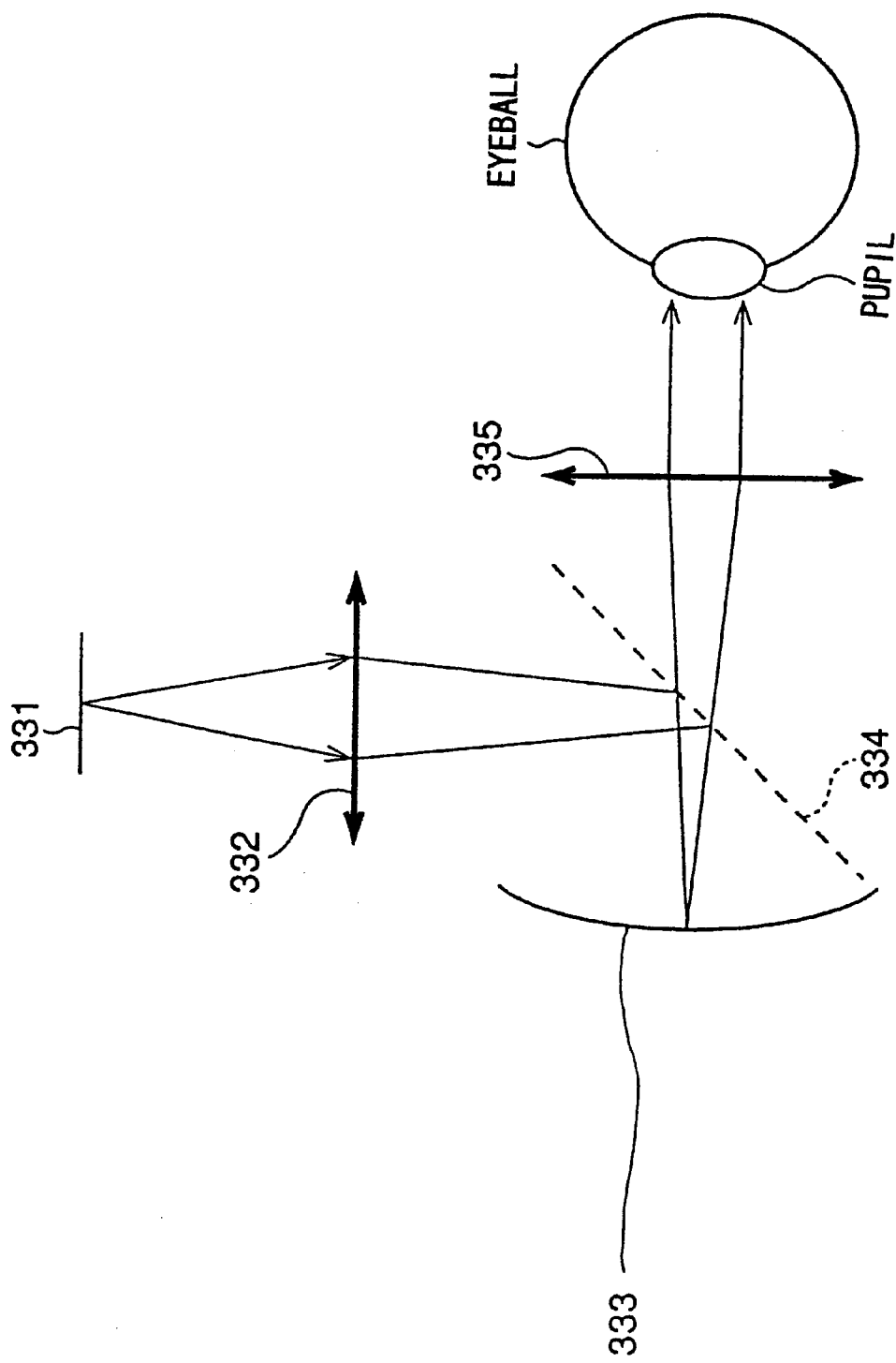
Figure 139:
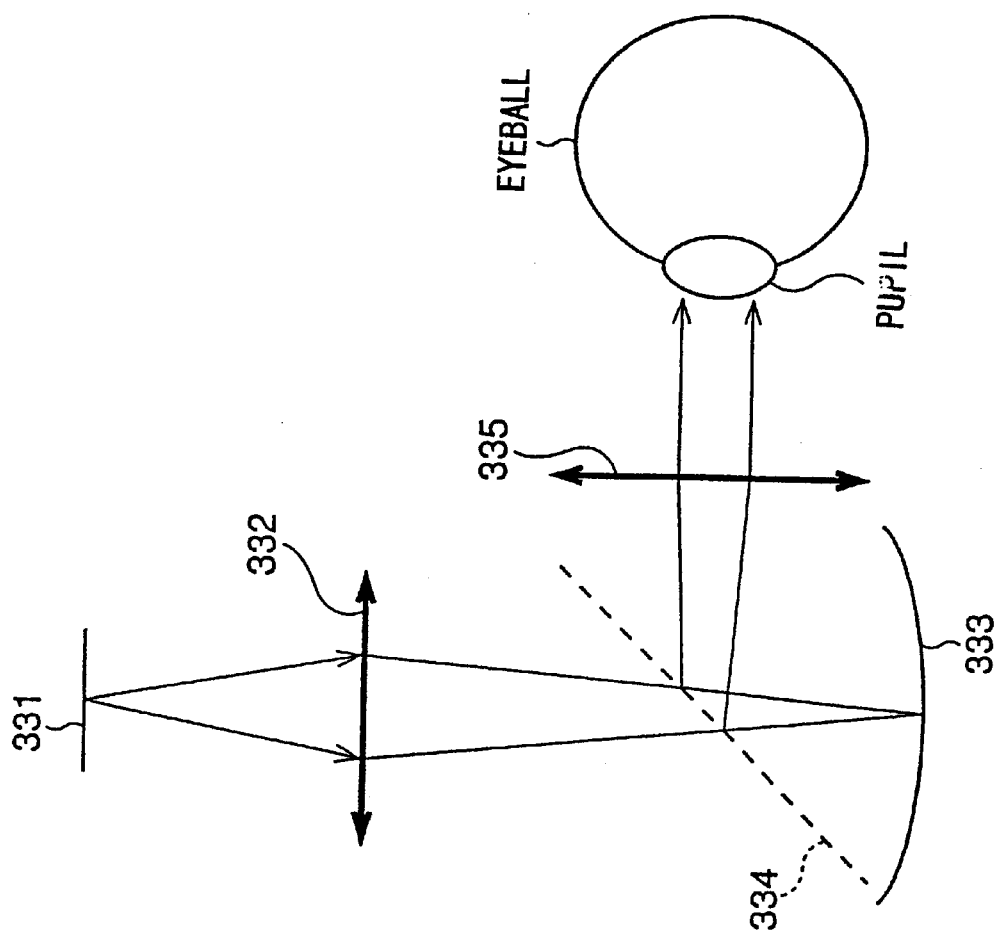
Figure 140:
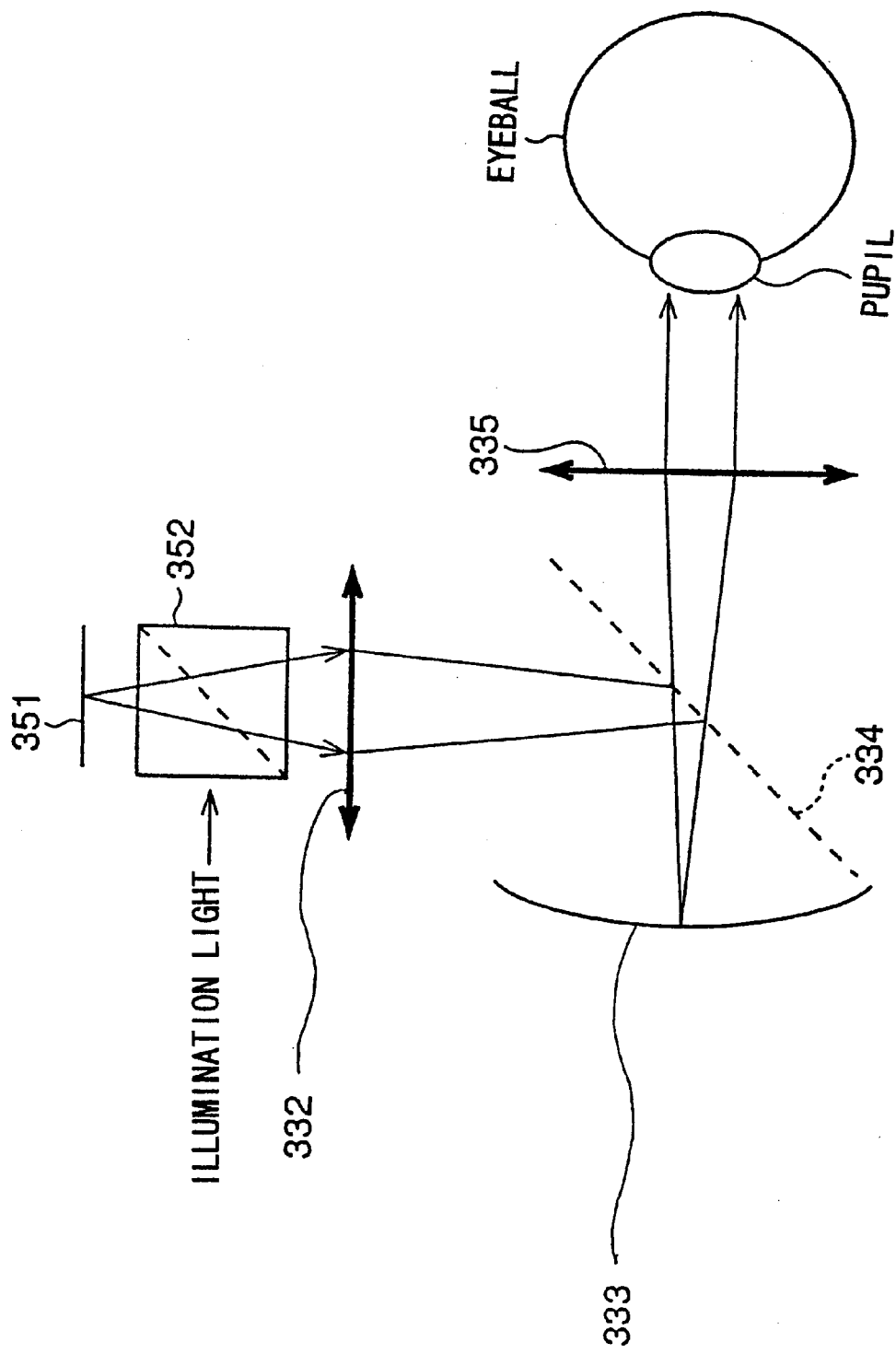
Figure 141:
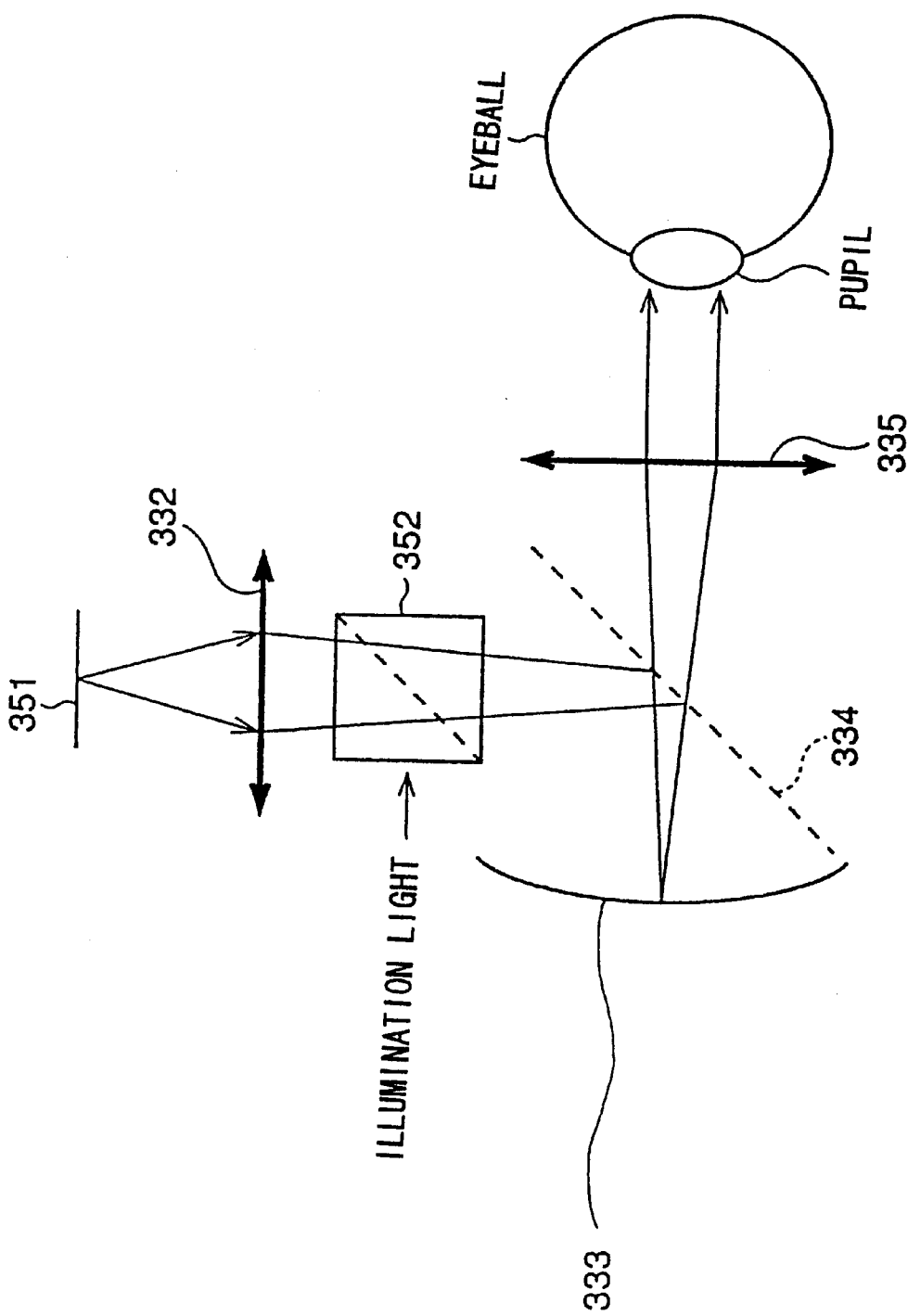
Figure 142:
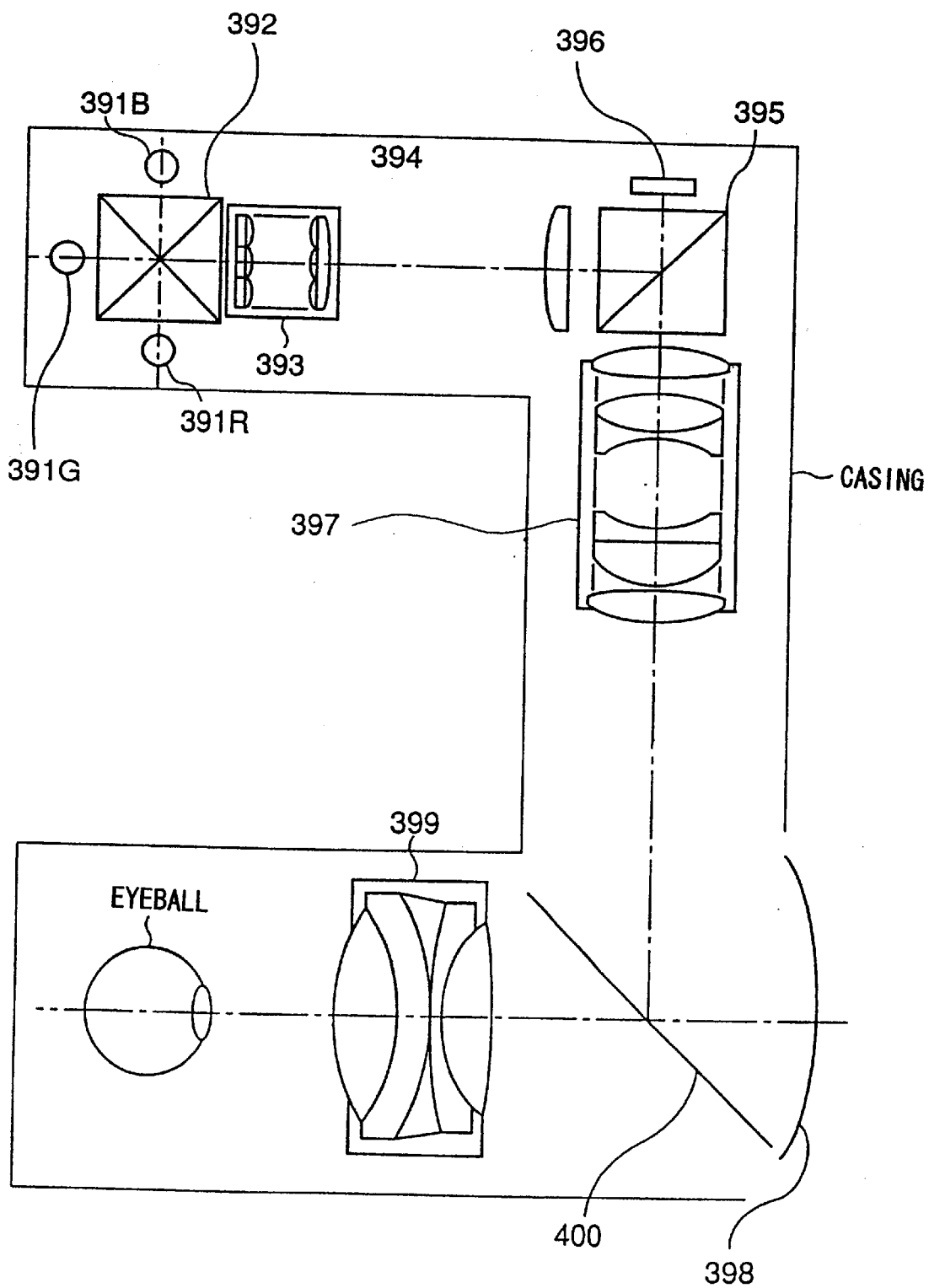
Figure 143:
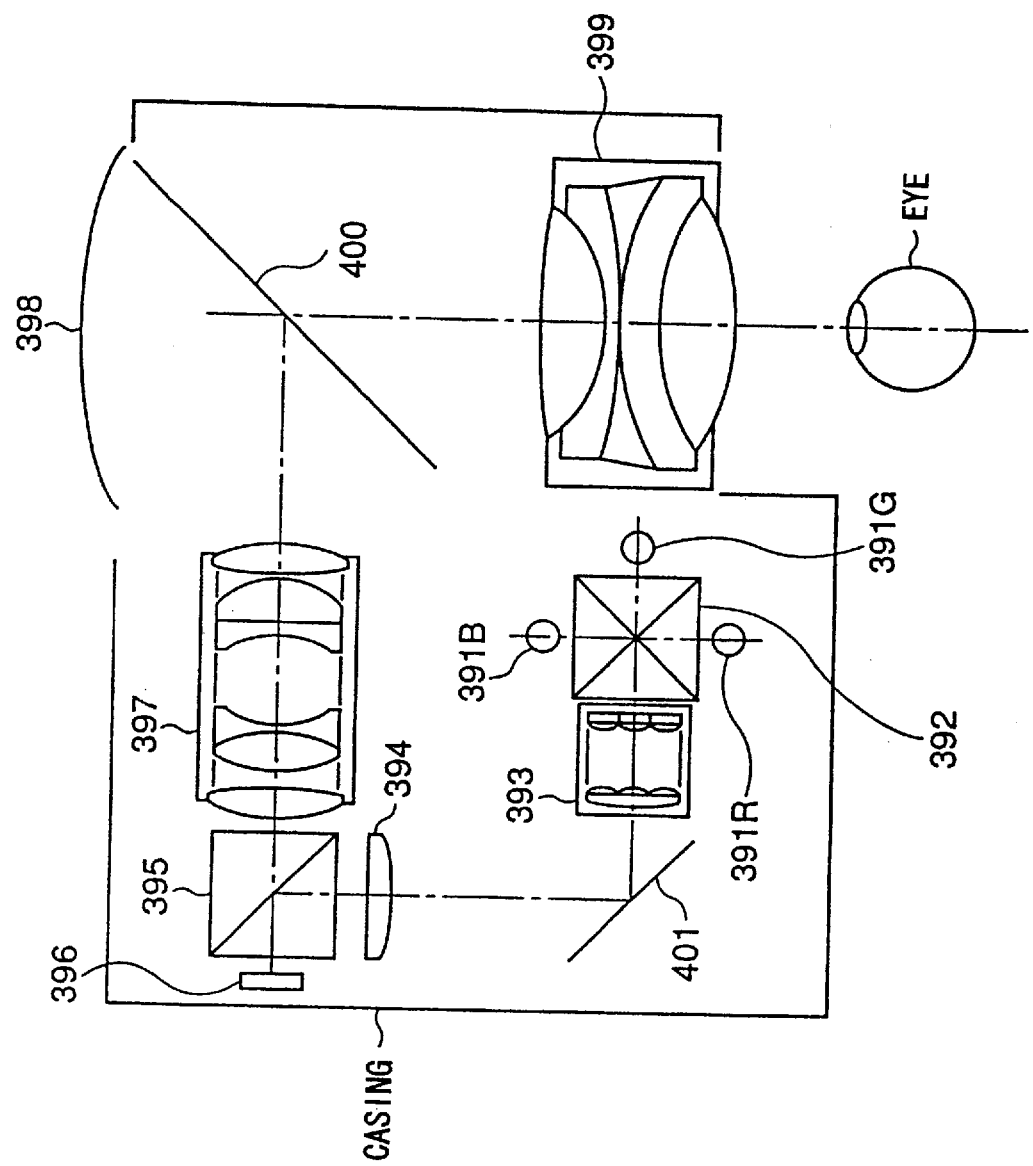
Figure 144:
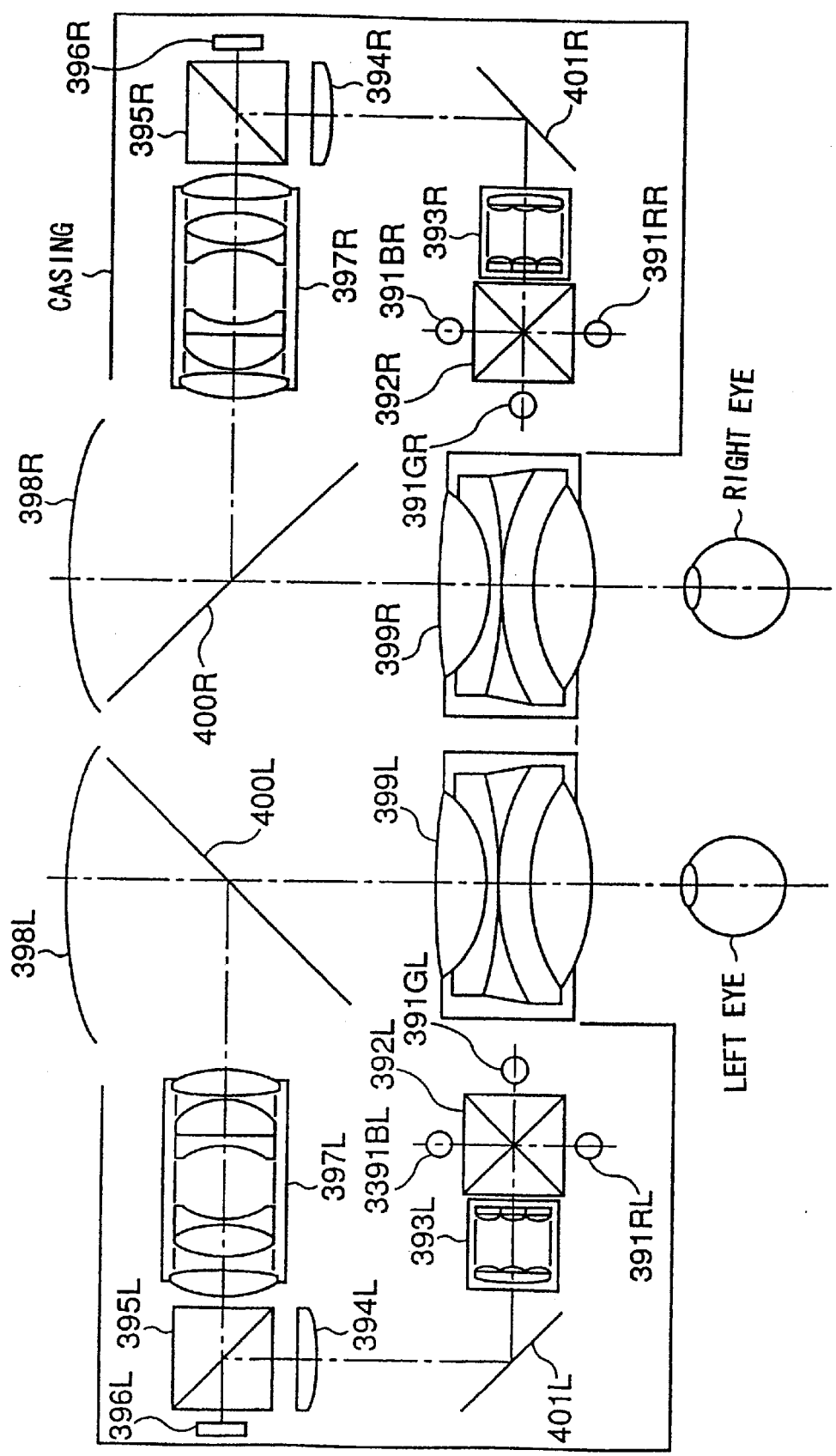
Figure 145:
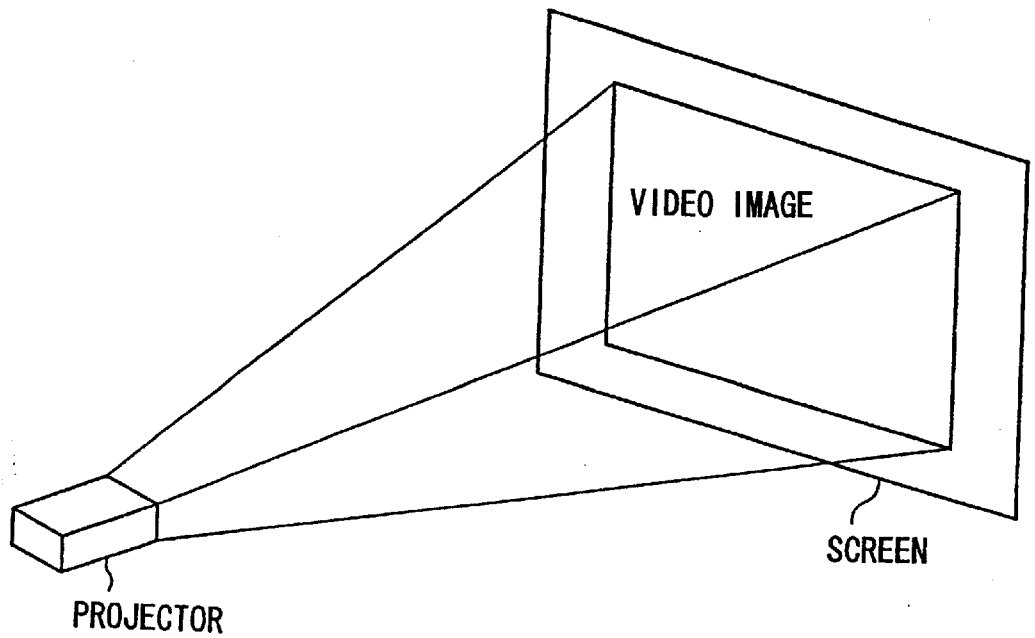
Figure 146:
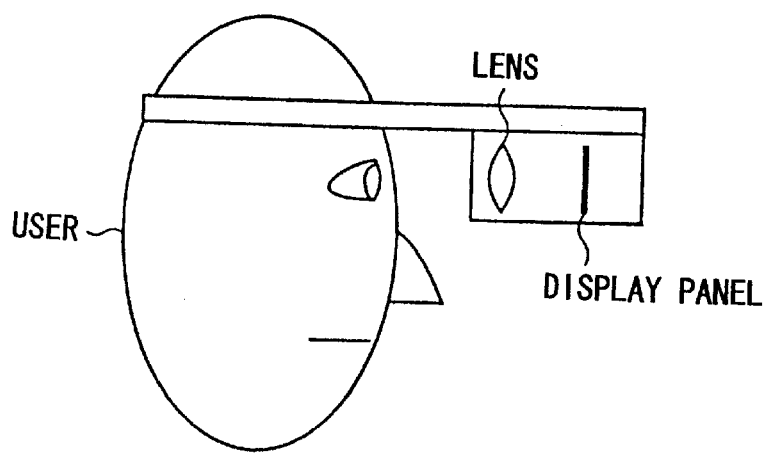
Figure 147:
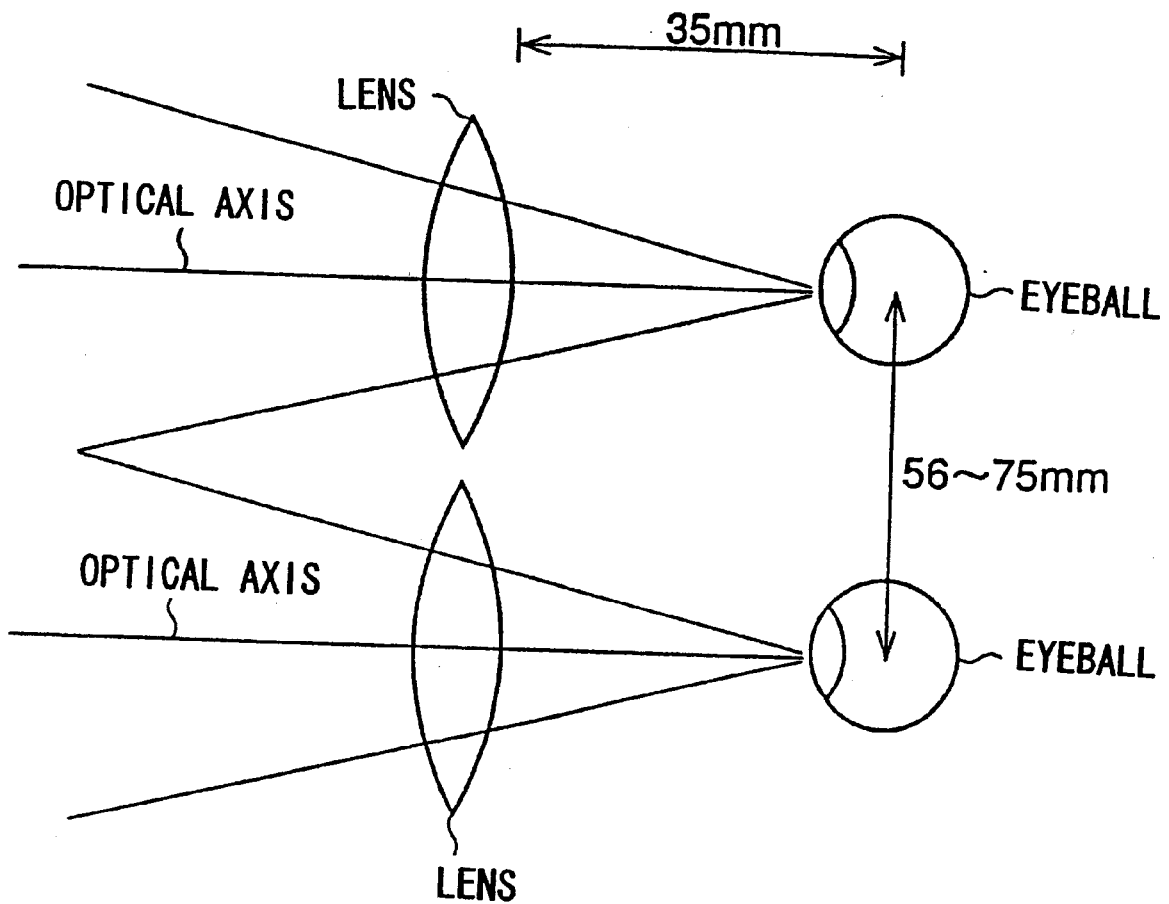
Figure 148:
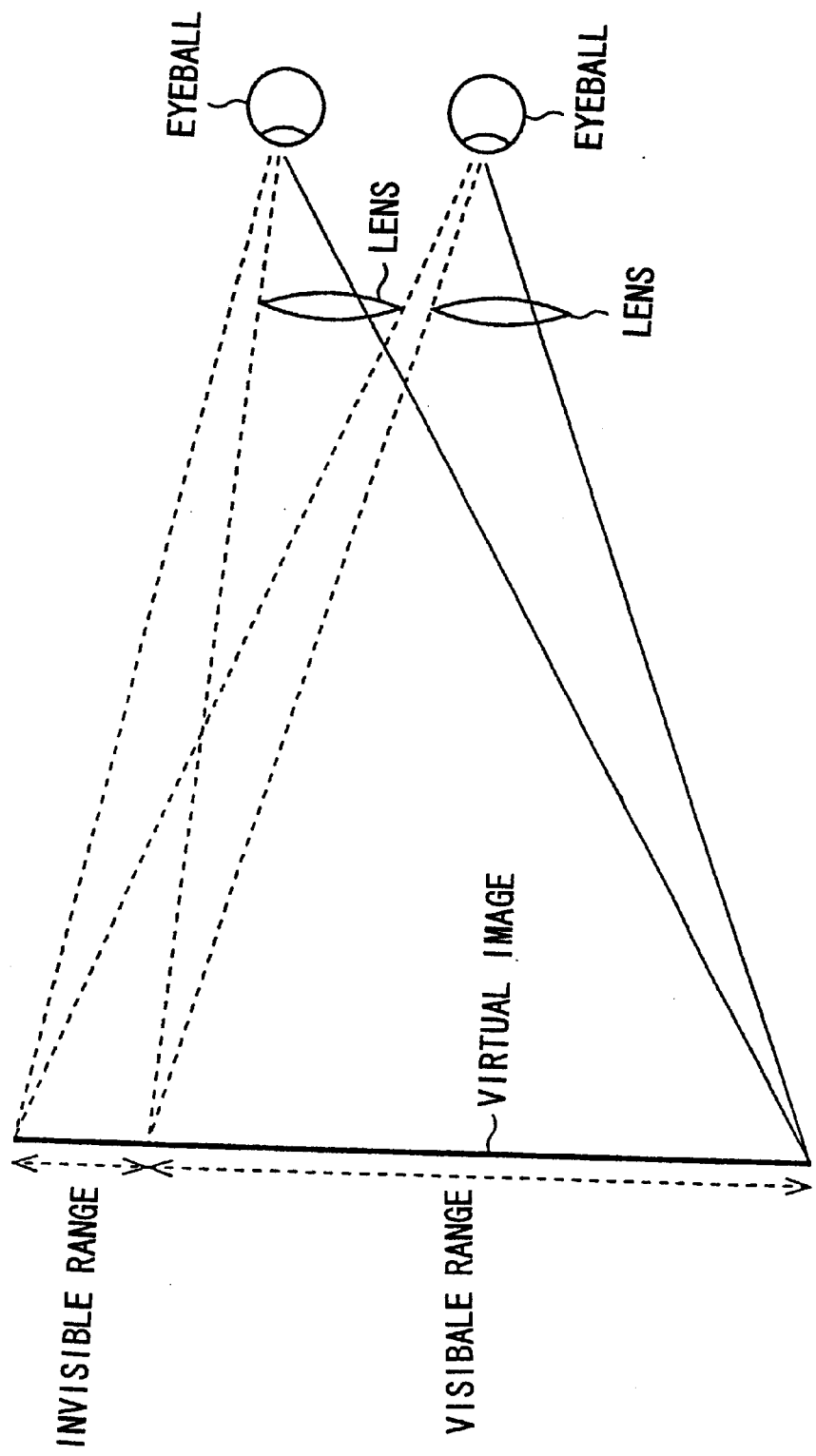
Figure 149A:
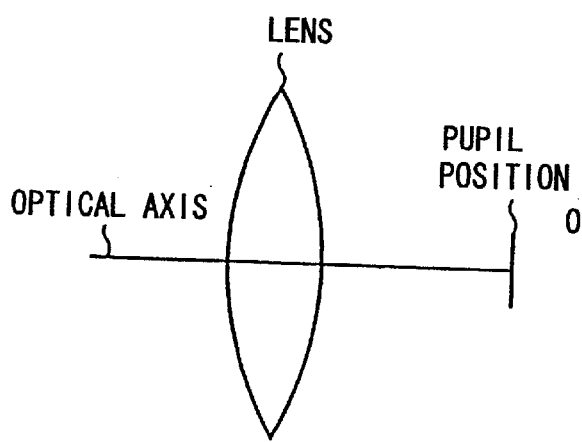
Figure 149B:
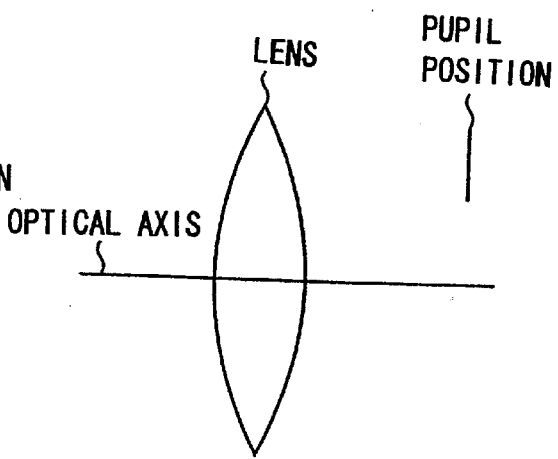
Figure 150:
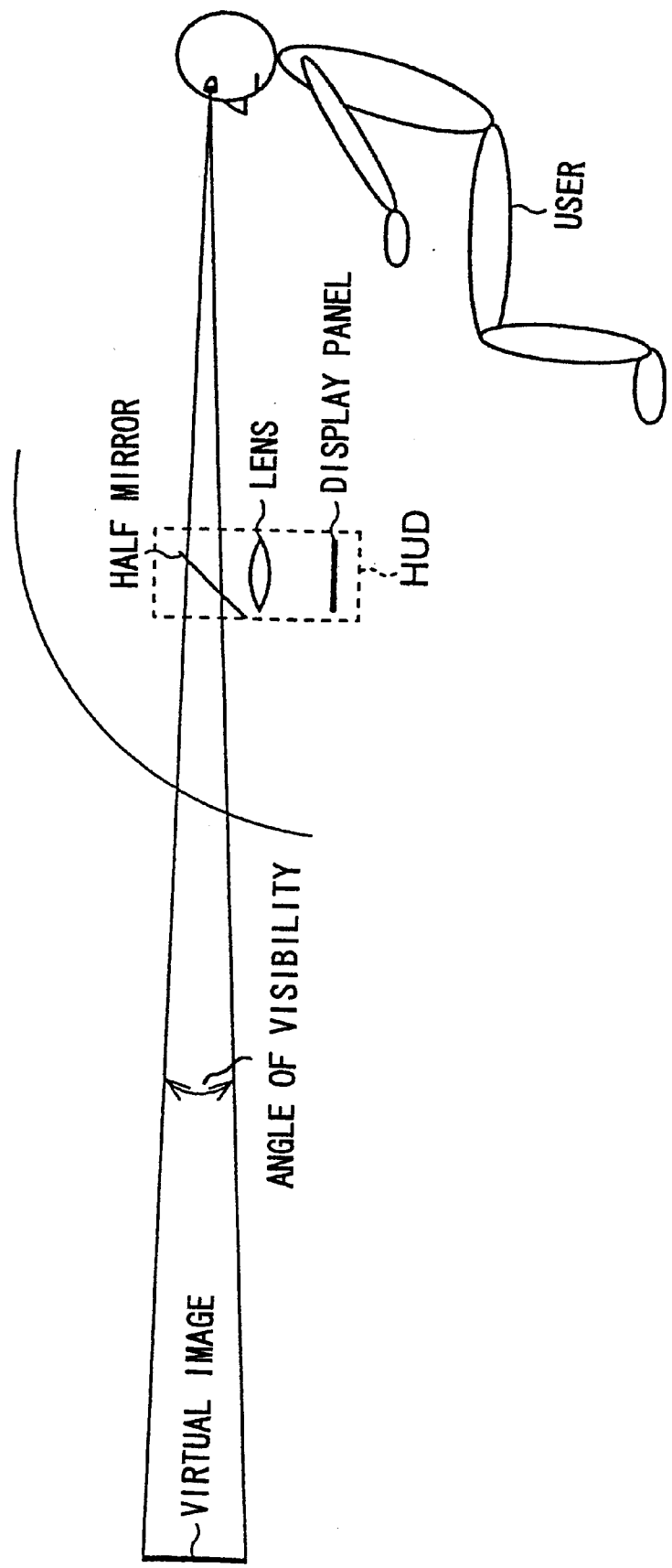
Figure 151:
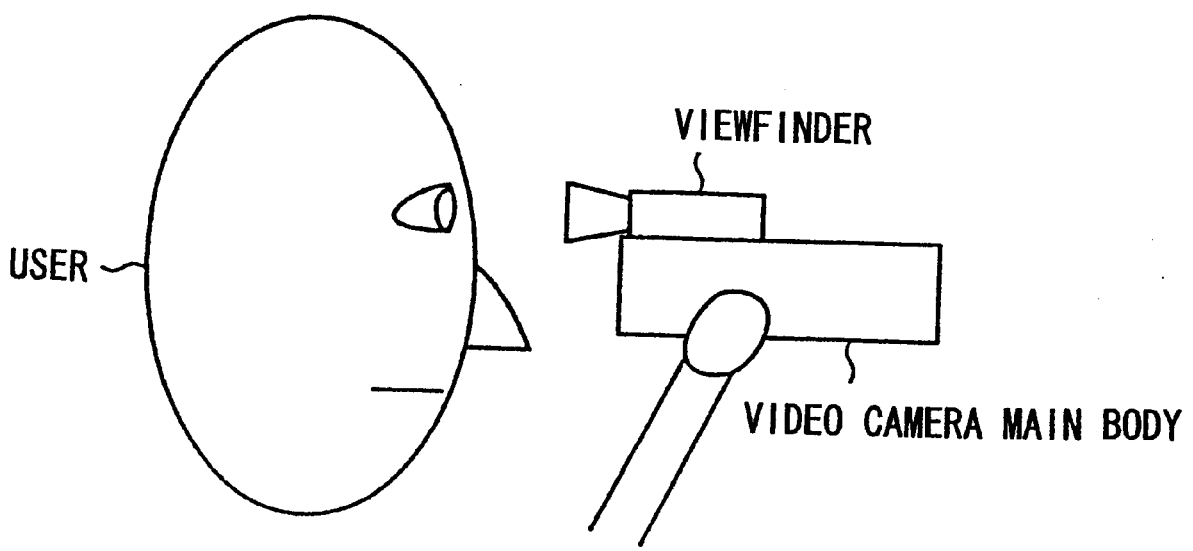

FIG. 131 is an optical path diagram showing an optical path in the case where the pupil position is deviated in FIG. 128;

FIGS. 132A to 132E are diagrams showing lateral aberrations of the ocular lens in FIG. 128 in the case where the pupil position is deviated;

FIG. 133 is a diagram showing another constructional example in which parameters of the ocular lens in the eighth embodiment are changed;

FIG. 134 is a diagram showing a spherical aberration (chromatic aberration), an astigmatism, and a distortion aberration of the ocular lens in FIG. 133;

FIGS. 135A to 135E are diagrams showing lateral aberrations of the ocular lens in FIG. 133;

FIG. 136 is an optical path diagram showing an optical path in the case where the pupil position is deviated in FIG. 133;

FIGS. 137A to 137E are diagrams showing lateral aberrations of the ocular lens in FIG. 133 in the case where the pupil position is deviated;

FIG. 138 is a diagram showing a 20th constructional example of the display apparatus 7;

FIG. 139 is a diagram showing a 21st constructional example of the display apparatus 7;

FIG. 140 is a diagram showing a 22nd constructional example of the display apparatus 7;

FIG. 141 is a diagram showing a 23rd constructional example of the display apparatus 7;

FIG. 142 is a diagram showing a 24th constructional example of the display apparatus 7;

FIG. 143 is a diagram showing a 25th constructional example of the display apparatus 7;

FIG. 144 is a diagram showing a 26th constructional example of the display apparatus 7;

FIG. 145 is a perspective view showing a construction of an example of a projector system for displaying an enlarged video image by a projector;

FIG. 146 is a diagram showing a construction of an example of an HMD system;

FIG. 147 is a diagram for explaining an eye width of a human being and a distance necessary between a lens and an eyeball;

FIG. 148 is a diagram for explaining a case where a part of a virtual image is missing and cannot be seen;

FIGS. 149A and 149B are diagrams depicting the lens of an HMD with the pupil located on the optical axis of the lens, and not located on the optical axis of the lens, respectively;

FIG. 150 is a diagram showing a construction of an example of an HUD system; and FIG. 151 is a diagram showing a construction of an example of a video camera.

FIG. 152 is a list matching the elements to respective reference numerals.

BEST MODE FOR CARRYING OUT THE INVENTION

Figure 1:
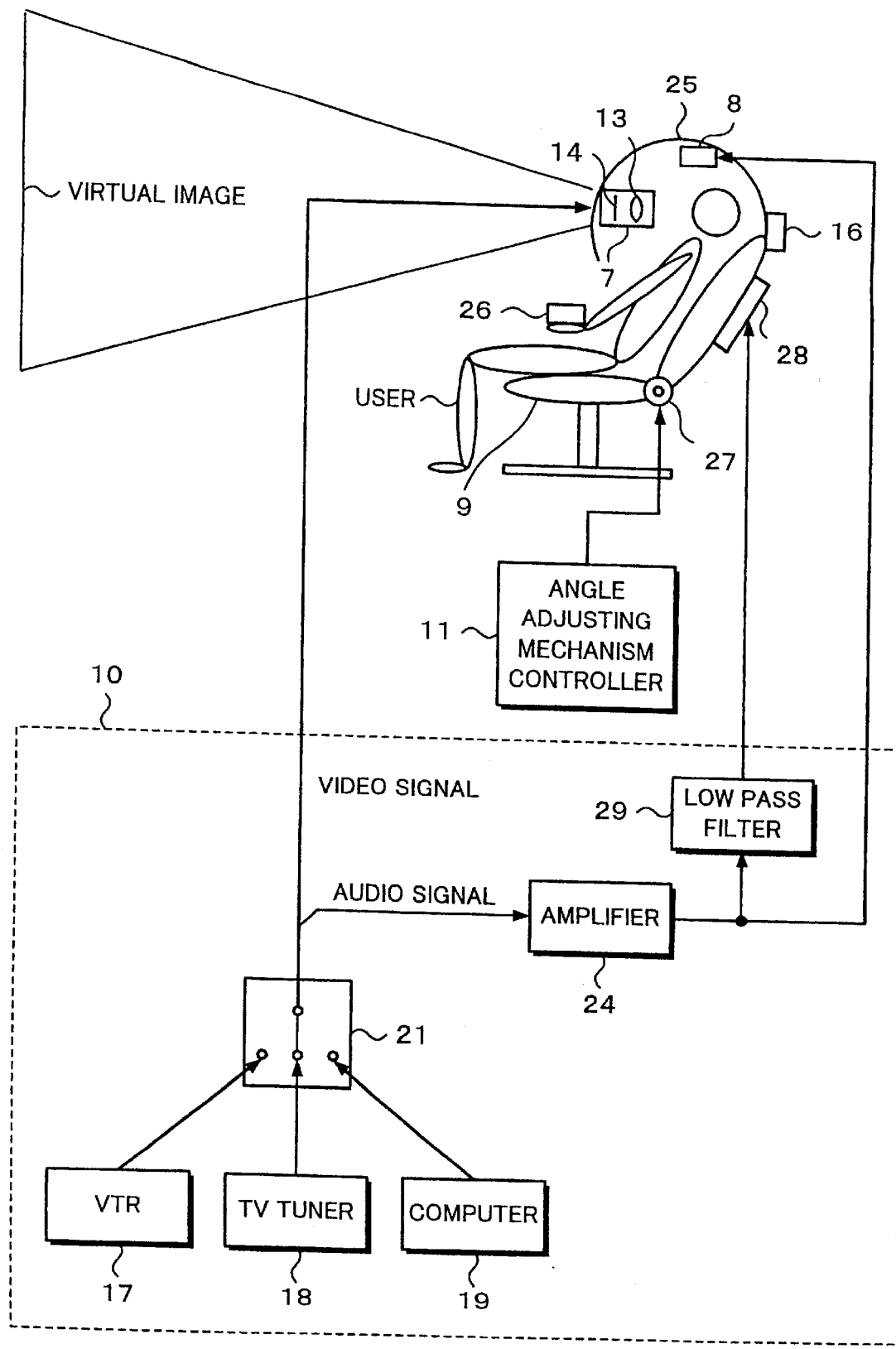
FIG. 1 is a block diagram showing a construction of the first embodiment of a virtual image providing system to which the invention is applied.

FIG. 1 shows a construction of the first embodiment of a virtual image providing system (system denotes a set in which a plurality of apparatuses are logically collected and it does not care whether the apparatuses in each construction exist in the same casing or not) to which the invention is applied. In the virtual image providing system, the user can appreciate a virtual image with presence in a relaxed state.

That is, a user holding mechanism 9 is, for example, a chair, sofa, or the like to hold the user in a seating state. The user sits down on it, so that he is held in a relaxed state.

A reclining angle adjusting mechanism 27 is provided in a connecting portion of a reclining portion and a seating portion of the user holding mechanism 9 and is controlled by an angle adjusting mechanism controller 11. The angle adjusting mechanism controller 11 operates in accordance with the operation of a remocon (remote controller) 26. Therefore, when the user operates the remote controller 26, the angle adjusting mechanism controller 11 controls the reclining angle adjusting mechanism 27 in accordance with the operation, so that the reclining angle adjusting mechanism 27 changes an angle of the reclining portion of the user holding mechanism 9.

As mentioned above, the user operates the remote controller, so that he can set the angle of the reclining portion of the user holding mechanism 9 to an own desired angle, thereby enabling the user to be in the most relaxed position by himself.

A low frequency vibrating mechanism 28 is provided in, for example, the reclining portion of the user holding mechanism 9, thereby allowing the low frequency vibrating mechanism 28 to vibrate in correspondence to an acoustic signal which is supplied through a low pass filter 29, which will be explained hereinlater. Thus, the user can feel the acoustic signal.

Further, in an upper portion of the reclining portion of the user holding mechanism 9, for example, a semi-spherical system holding mechanism 8 (fixing means) constructed so that when the user sits there, a head portion of the user is covered is fixed. A display apparatus 7 and a speaker 25 are provided in the system holding mechanism 8.

That is, the display apparatus 7 (video image providing apparatus) is fixed in the system holding mechanism 8 in a manner such that the user is located almost ahead (front surface) of the user in a state where he is held in the user holding mechanism 9. The user holding mechanism 9 can hold the user so that an interval between the head portion of the user and the display apparatus 7 lies within, for instance, 45 cm.

The display apparatus 7 has: a small display panel 14 (display means) which displays a video image supplied from a video audio forming apparatus 10 and is constructed by, for example, a liquid crystal display or the like; and a lens 13 serving as an enlargement optical system for forming a virtual image by enlarging the video image displayed on the display panel 14 and for arranging virtual images which are observed by the right and left eyes of the user at the same position on a space. Thus, a video image obtained by enlarging the video image that is supplied from the video audio forming apparatus 10 is provided to the user.

The speaker 25 is fixed in the system holding mechanism 8 in a manner such that in a state where the user is held by the user holding mechanism 9, for example, the user is located on almost of the upper, right, or left side (for example, near the ears) or the like of the user, thereby generating the acoustic signal (audio signal) supplied from the video audio forming apparatus 10. A sound volume can be controlled by the remote controller 26.

The system holding mechanism 8 is constructed by a device such as an ECD (Electrochromic Display) or the like in which a light transmittance is variable (hereinafter, properly referred to as a transmittance variable device) or the like or is constructed by assembling a liquid crystal shutter or the like into a transparent member, and has a transmittance control mechanism 16 for controlling the transmittance variable device, liquid crystal shutter, or the like. The transmittance control mechanism 16 controls the transmittance variable device, liquid crystal shutter, or the like in correspondence to the operation of the remote controller 26, thereby allowing an amount of light which enters from the outside to be changed for the system holding mechanism 8. Therefore, by operating the remote controller 26, the user changes the transmittance of the system holding mechanism 8, thereby enabling the user to see an external scene (situation) or preventing the external scene from entering the eyes.

The video audio forming apparatus 10 generates the video image which is displayed on the display apparatus 7 and the acoustic signal which is outputted from the speaker 25. That is, in the embodiment, the video audio forming apparatus 10 has a VTR (video tape recorder) 17, a TV (television) tuner 18, and a computer 19. In the VTR 17, a video signal and an audio signal recorded on a video tape are reproduced. In the TV tuner 18, a video signal and an acoustic signal of a predetermined television broadcasting are received. In the computer 19, a video signal and an acoustic signal are reproduced from a recording medium such as a CD-ROM (Compact Disc—Read Only Memory) or a video signal and an acoustic signal are received from a communication network such as an internet or the like.

The video signals and acoustic signals obtained by the VTR 17, TV tuner 18, and computer 19 are supplied to a selector 21. The selector 21 selects any one of outputs of the VTR 17, TV tuner 18, and computer 19 and generates in correspondence to the operation of the remote controller 26. The video signal selected by the selector 21 is supplied to the display apparatus 7. The acoustic signal is amplified by an amplifier 24 and is supplied to the speaker 25 and low pass filter 29. The low pass filter 29 extracts a low frequency component of the acoustic signal and supplies to the low frequency vibrating mechanism 28.

In the virtual image providing system constructed as mentioned above, for example, in a state where the user is held by the user holding mechanism 9, when the user operates the remote controller 26 and designates any one of the outputs of the VTR 17, TV tuner 18, and computer 19, the output (video signal and acoustic signal) is selected by the selector 21.

The video signal selected by the selector 21 is supplied to the display apparatus 7 and is displayed on the display panel 14. The video image displayed on the display panel 14 is enlarged by the lens 13 and a resultant virtual image is supplied to the user held by the user holding mechanism 9. In this manner, the user can observe the virtual image at a remote distance, so that he can feel a space (virtual image space) that is equivalent or wider than the actual space.

The user can appreciate the virtual image almost without feeling a fatigue in a state where he is held by the user holding mechanism 9 and a state where the display apparatus 7 is attached to the head portion or without holding it, namely, in a very relaxed state.

In this instance, as mentioned above, by operating the remote controller 26, the user can change a transmittance of the system holding mechanism 8 covering the head portion through the transmittance control mechanism 16. For example, when the transmittance is set to a low value, since most of the light from the outside is shut off, the user can immerse himself into the virtual image space. On the contrary, when the transmittance is set to a high value, the user can appreciate the virtual image while confirming the ambient situation. On the other hand, for example, in case of gradually reducing the transmittance, the user can feel a sense as if he was immersed into the virtual image space from the actual world.

The acoustic signal selected by the selector 21 is amplified by the amplifier 24 and is supplied to the speaker 25 and is generated. Further, only the low frequency component is extracted from the amplified acoustic signal by the low pass filter 29 and is supplied to the low frequency vibrating mechanism 28. Thus, the low frequency vibrating mechanism 28 vibrates in correspondence to the low frequency component of the acoustic signal which is generated from the speaker 25 and the user can feel the acoustic signal. That is, in this case, a powerful auditory environment can be provided to the user. A vibrating level can be controlled by the remote controller 26.

In the display apparatus 7, a video image (virtual image) in which a horizontal angle of visibility is equal to or larger than 15° is formed, so that the virtual image with presence (wide virtual image space) is provided.

Further, from a viewpoint of prevent a flickering of the video image, the video signal which is supplied to the display apparatus 7 is set a non-interlaced signal (progressive video image) (for example, a signal for a computer, a signal of what is called a clear vision, or the like).

That is, for example, in a television signal according to the NTSC (National Television System Committee) system or the like, since it is interlace scanned, the user feels a flickering due to the interlace. On the other hand, in a non-interlaced signal, the user does not feel such a flickering (in the case where the television signal according to the NTSC system is displayed on a television receiver having an aspect ratio of (4:3) or the like, it is known that it is necessary for the viewer to be away from the screen by a distance of about seven times as long as a height of display screen when a person having an eyesight of 1.0 watches a video image without feeling a flickering. In this case, however, the horizontal angle of visibility is equal to about 10° and it is difficult to see the video image with presence. On the other hand, in case of what is called a laterally wide television receiver or the like having an aspect ratio of (16:9), a horizontal angle of visibility of about 15° can be assured and the video image with presence can be obtained).

In case of constructing the display panel 14 by, for example, a CRT (Cathode Ray Tube) or the like for displaying a video image by scanning a beam, there is a problem as mentioned above. However, in case of constructing the display panel by a display having a memory to hold pixel values like a TFT (Thin Film Transistor) liquid crystal display or the like, an interlaced signal can be also used. In other words, in this case, since the pixel values are held in the memory, a flickering of the video image is hard to see. Therefore, any one of the interlaced signal and the non-interlaced signal can be used as a video signal.

According to the virtual image providing system in FIG. 1 as mentioned above, the user can appreciate the virtual image with presence in a very relaxed state.

The user holding mechanism 9, system holding mechanism 8, and display apparatus 7 are so-called integratedly constructed. Since the display apparatus 7 fixed by the system holding mechanism 8 is arranged at a position that is very close to the user held in the user holding mechanism 9 by 45 cm or less as mentioned above, not so a wide space is needed to install the whole system. That is, a wide virtual image space can be provided to the user without occupying a wide space.

Further, in case of arranging the display apparatus 7 at a position away from the user, the display apparatus 7 itself is conspicuous to the user's eyes and the presence of virtual image is lost. To prevent such a loss of the presence, there is also a method of using the lens 13 of a large size and enlarging the whole display apparatus 7 in size. However, this method results in an increase in costs and scale of the whole system. In case of arranging the display apparatus 7 at a position near the user, as mentioned above, it is possible to prevent that the presence of virtual image is missing and that the costs and scale of the system increase.

Figure 2:
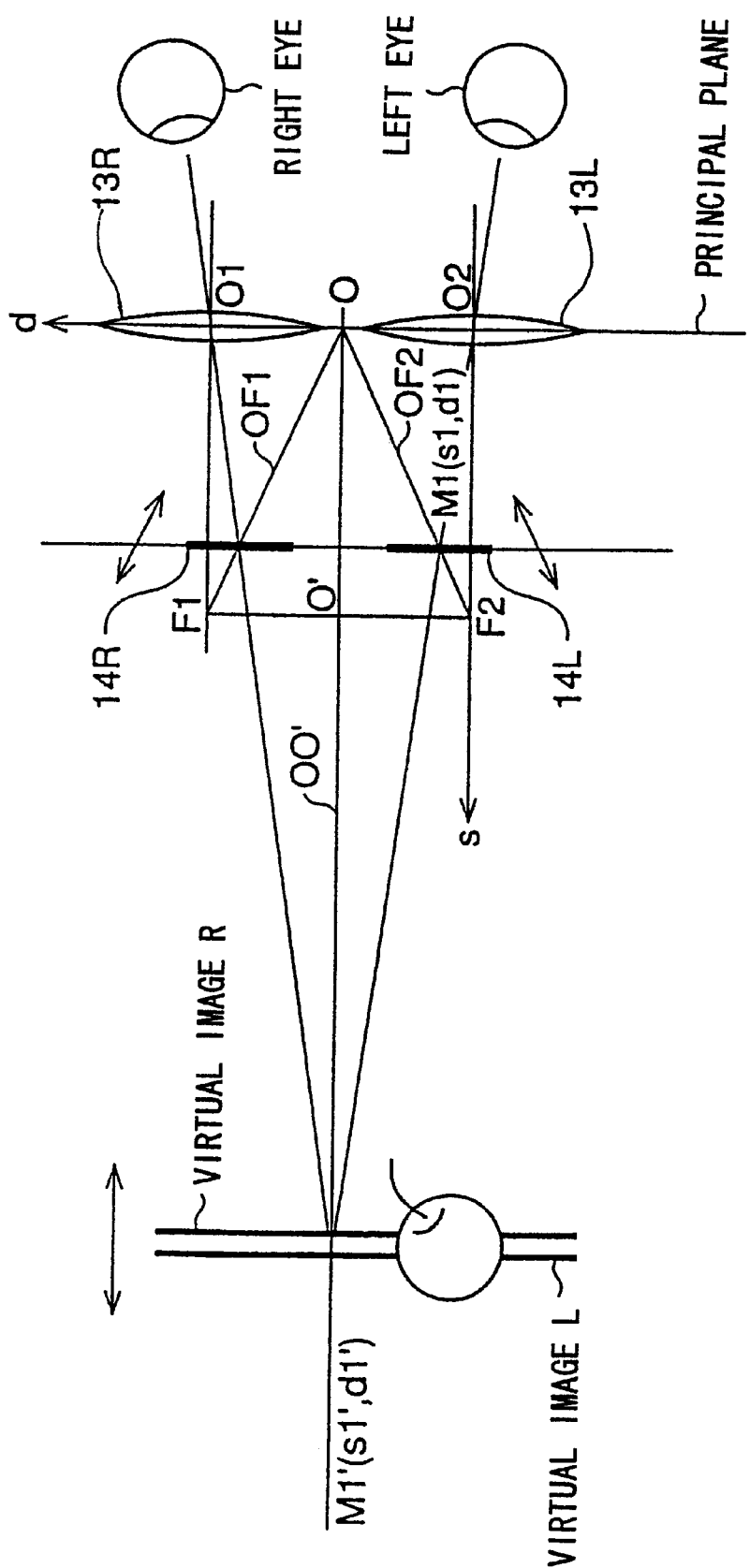
FIG. 2 is a cross sectional view of a top view showing a first constructional example of a display apparatus 7.

FIG. 2 shows a constructional example (first constructional example) of an optical system of the display apparatus 7 in FIG. 1. FIG. 2 illustrates the constructional example in case of seeing from the head side of the user held in the user holding mechanism 9.

In the embodiment of FIG. 2, as an enlargement optical system to form a virtual image by enlarging a video image, the display apparatus 7 has a lens 13L as (constructing) an optical system for the left eye and a lens 13R as an optical system for the right eye in which optical axes are different.

That is, the lens 13R or 13L is, for example, a convex lens having the same characteristics for providing a virtual image R or L which is obtained by enlarging a video image displayed on a display panel 14R or 14L to the right eye or left eye, respectively. Those lenses are arranged on the same plane. That is, the lenses 13R and 13L are arranged so that their principal planes coincide.

In FIG. 2, O1 or O2 denotes a principal point of the lens 13R or 13L and F1 or F2 indicates a focal point of the lens 13R or 13L. O indicates a middle point between the principal points O1 and O2.

The display panel 14R or 14L is arranged in a manner such that its center point (for example, in the case where the display panels 14R and 14L are rectangular, a cross point of diagonal lines of the rectangle, or the like) is located on a straight line OF1 or OF2 connecting the middle point O and focal point F1 or F2, respectively, and both of them are located on the same plane.

According to the display apparatus 7 constructed as mentioned above, the video image displayed on the display panel 14R or 14L is enlarged by the lens 13R or 13L and the light corresponding to the enlarged video image enters the right eye or left eye, so that the virtual image corresponding to the video image is observed by the right eye or left eye. That is, the virtual image R or L which is formed by the lens 13R or 13L is observed by the right eye or left eye, respectively.

According to the construction of FIG. 2, although the virtual image which is observed by the right eye or left eye is formed by the lens 13R or 13L as an individual optical system, those virtual images are arranged at the same position in a 3-dimensional space. That is, the virtual images which are observed by the right and left eyes of the user are arranged at the same position in the space.

This is because of the following reasons. That is, for example, it is now assumed that the direction from the principal point O2 to O1 is labelled as a d axis and the optical axial direction (direction from the principal point O2 to the focal point F2) of the lens 13L is labelled as an s axis. A center point of the display panel 14L is set to M1, coordinates on its sd plane assume (s1, d1), a center point of the virtual image L which is formed by the lens 13L is set to M1', and coordinates on the sd plane are set to (s1', d1'). Further, a middle point between the focal points F1 and F2 is set to O'.

In this case, as mentioned above, since the display panel 14R or 14L exists in the same plane and its center point exists on the straight line OF1 or OF2, the display panels 14R and 14L are located at an equal distance from the principal planes (these are also located in the same plane as mentioned above) of the lenses 13R and 13L. Therefore, since the virtual images R and L also exist in the same plane, if the center points of the virtual images R and L exist on a straight line OO' connecting the middle points O and O', the virtual images R and L exist at the same position.

Since the center point M1 (s1, d1) of the display panel 14L now exists on the straight line OF2, the following equation is satisfied.

$$d1 = L/2 - L \times s1/(2 \times f) \quad (1)$$

where, L denotes a distance between the principal points O1 and O2 and f indicates a focal distance of the lens 13L.

On the other hand, the following equation is satisfied by an image forming formula.

$$1/f = 1/s1 - 1/s1' \quad (2)$$

Since the principal point O2 and center points M1 and M1' exist on a straight line, the following equation is satisfied.

$$s1/s1' = d1/d1' \quad (3)$$

From the equations (1) to (3), the following equation is derived.

$$d1' = L/2 \quad (4)$$

From the equation (4), the center point M1' of the virtual image L exists on the straight line OO'.

The optical system constructed by the lens 13L and the optical system constructed by the lens 13R are symmetrical with respect to the straight line CO', so that the center point of the virtual image R also exists on the straight line OO'.

As mentioned above, since the virtual images R and L exist in the same plane and their center points exist on the straight line OO', the virtual images R and L exist at the same position.

The user, accordingly, can observe the virtual image in a state where a vergence of both eyes and an adjustment are matched, namely, in a relaxed state.

The display panels 14R and 14L are designed so that their center points are synchronously moved on the straight line OF1 or OF2 so as to be included in the same plane, so that the positions where the virtual images R and L are formed are also moved. The movement of the display panel 14R and 14L is performed by, for example, operating the remote controller 26 by a stepping motor or the like (not shown). The display panels 14R and 14L are moved in a range on the lens 13R side or 13L side rather than the focal point F1 or F2. As mentioned above, this is because in order to observe the virtual image of the object, it is necessary that the object exists at a position near the lens rather than the focal distance.

Figure 3A:
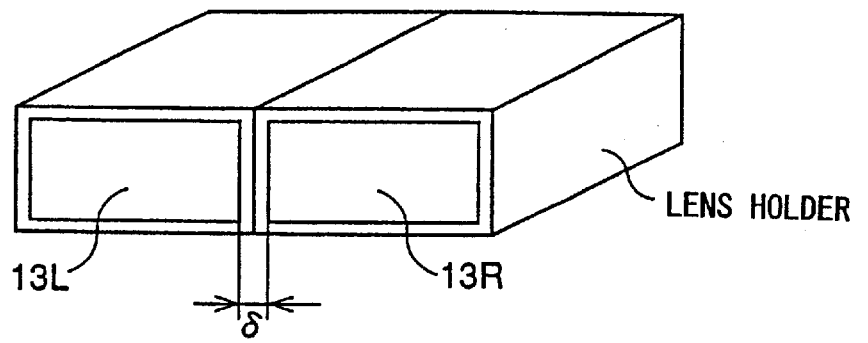
FIG. 3A is a perspective view showing a constructional example of lenses 13L and 13R in FIG. 2.

The lenses 13R and 13L are worked so that their outer shapes have rectangular shapes or the like and are enclosed in rectangular parallelepiped lens holders as shown in FIG. 3A. In FIG. 3A, a thickness δ of boundary portion between the lens holder on the right side in which the lens 13R is enclosed and the lens holder on the left side in which the lens 13L is enclosed is set to be equal to or less than at least a human pupil diameter (generally, it is known that it is equal to about 3 to 8 mm or about 2 to 7 mm), thereby preventing the boundary portion from being recognized by the user. That is, if the thickness 6 of boundary portion is set to the pupil diameter or less, the boundary portion is not formed as an image on the retina and becomes a blur state, so that the boundary portion can be made hard to be recognized by the user.

By adhering the lenses 13R and 13L by, for example, a transparent adhesive agent instead of enclosing into the lens holders as shown in FIG. 3A, the thickness of boundary can be made thin as much as possible.

Figure 3B:
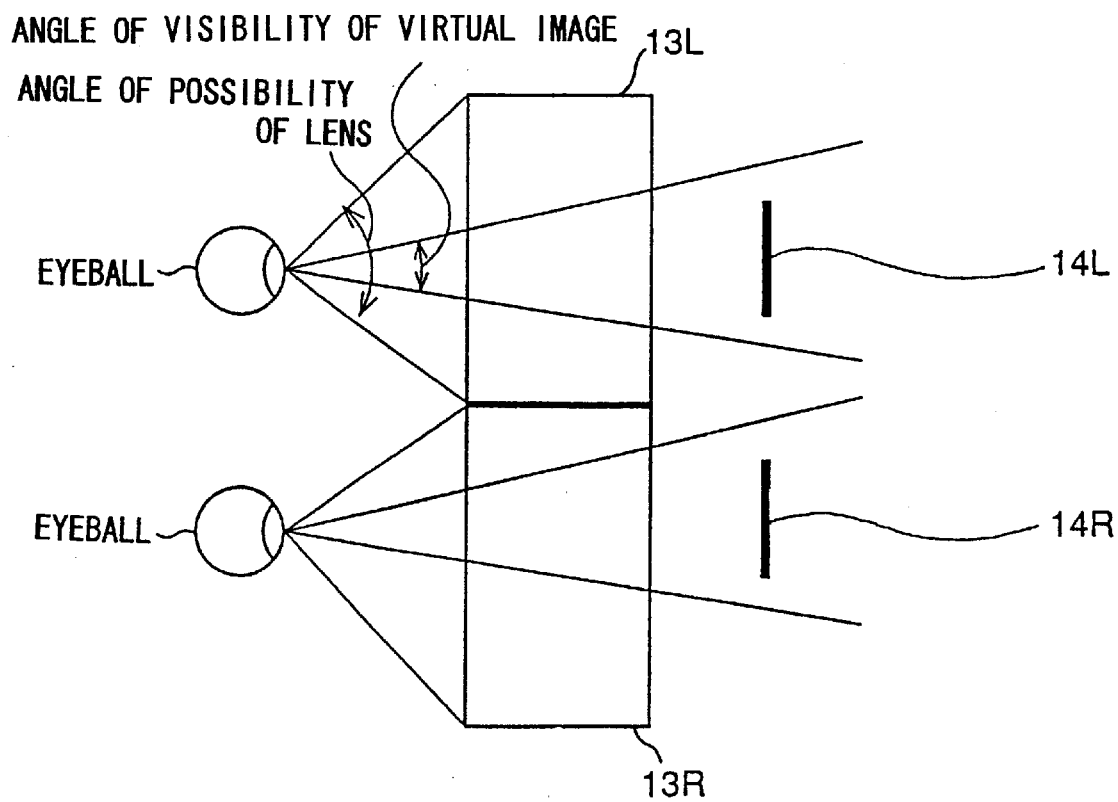
FIG. 3B is a diagram for explaining a horizontal angle of visibility of a virtual image viewed via the lens holder of FIG. 3A.

By thinning the thickness of boundary of the lenses 13R and 13L, as shown in FIG. 3B, a lens apparent angle can be sufficiently increased as compared with an angle of visibility of the virtual image (virtual image angle of visibility).

The lenses 13R and 13L are constructed so that the whole video image can be observed from any position so long as it lies within at least a range where the head portion (eyeball) of the user held in the user holding mechanism 9 can be easily moved.

That is, assuming that the horizontal angle of visibility of the virtual image assumes α, as shown in a top view diagram of FIG. 4A, a length L1 in the horizontal direction of the lenses 13R and 13L is set in a manner such that a range (hatched portion in FIG. 4A) (hereinafter, properly referred to as a horizontal direction eyeball position allowable range) obtained by excluding a triangle GHP1 from a range which is surrounded by straight lines connecting a point P1 which is a point on the straight line that is parallel with an optical axis passing the boundary between the lenses 13R and 13L and in which an angle formed by the straight lines connecting such a point and the right and left edges of the lenses 13R and 13L is equal to a and the right and left edges of the lens 13R or 13L includes at least a range where the eyeball moves due to the movement of the user.

A side GH of the triangle GHP1 is a portion that is parallel with the principal plane of the lens 13 and its length is equal to, for example, an average distance between the pupils of the right and left eyes of the user.

On the other hand, assuming that the vertical angle of visibility is set to a, as shown in a side elevational view (left side view) of FIG. 4B, a length L2 in the vertical direction of the lenses 13R and 13L is set in a manner such that a range (hatched portion in FIG. 4B) (hereinafter, properly referred to as a vertical direction eyeball position allowable range) surrounded by straight lines connecting a point P2 which is a point on the optical axis of the lens 13L (or 13R) and in which an angle formed by the straight lines connecting such a point and the upper and lower edges of the lens 13L is equal to β and the upper and lower edges of the lens 13L includes at least a range where the eyeball moves due to the movement of the user.

So long as the eyeballs of the user lie within a range that is common to both of the horizontal direction eyeball position allowable range and the vertical direction eyeball position allowable range, even if the user moves the head portion in the state where he is held by the user holding mechanism 9, he can observe the whole virtual image. Thus, for example, even if the user unconsciously moves the head portion, a situation such that a part of the virtual image or the whole virtual image cannot be seen due to such a movement does not occur.

Figure 4A:
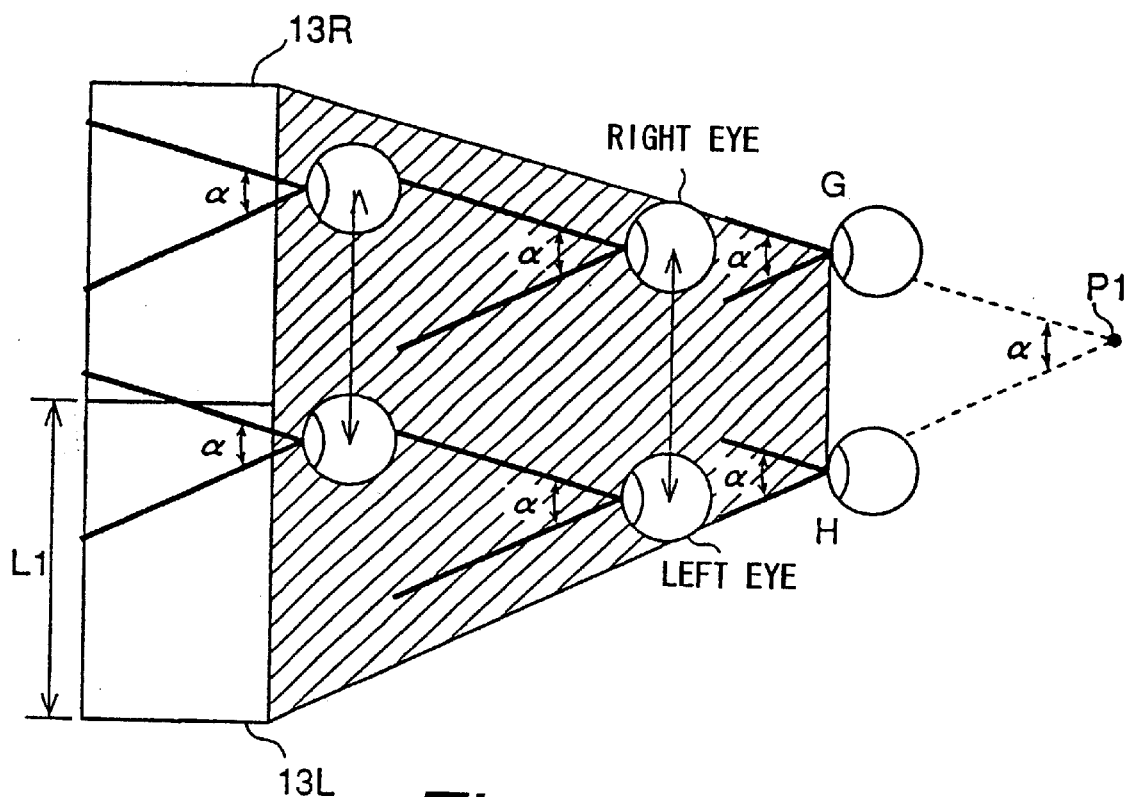
FIGS. 4A and 4B are diagrams for explaining a horizontal angle of visibility and a vertical angle of visibility respectively, of a virtual image.
Figure 4B:
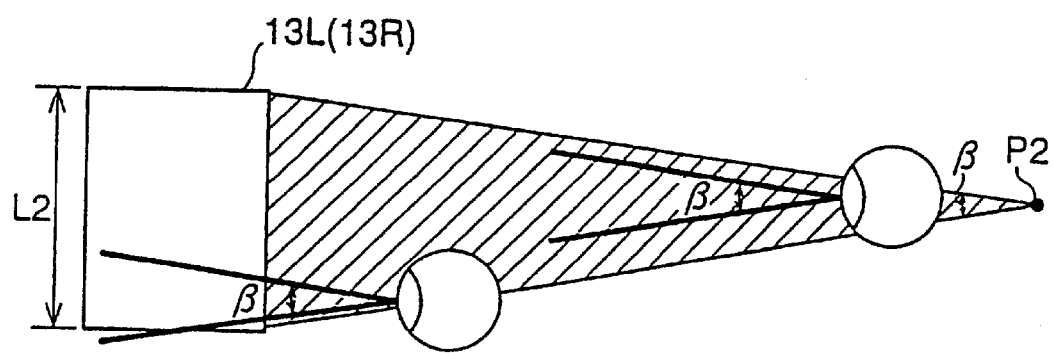

In FIG. 4A, even if the virtual image to be observed by the right eye or left eye is formed not by the lens 13R or 13L but by the other lens 13L or 13R by the movement of the head portion by the user, the user can appreciate the whole virtual image.

In principle, as the length L1 in the horizontal direction and the length L2 in the vertical direction of the lenses 13R and 13L are longer, the hatched range increases more. That is, when the user moves the head portion, the range where the whole virtual image can be appreciated is widened more. However, this results in an enlargement in size of the system. It is, therefore, desirable to decide L1 and L2 by keeping a good balance between the scale of the system and the range necessary to appreciate the whole virtual image (for example, about 100 mm or the like).

Further, the lenses 13R and 13L don't need to have a shape which is symmetrical with respect to the optical axis. That is, the lenses 13R and 13L can be constructed so that the right half and the left half have asymmetrical shapes or the like.

If the right and left eyes of the user are located within the hatched range (hereinafter, properly referred to as a whole visible range) in FIG. 4, the whole virtual image can be appreciated as mentioned above. However, if the aberration largely fluctuates depending on the position, although a clear virtual image can be obtained in a small aberration portion, a blur virtual image is derived in a large aberration portion.

In the display apparatus 7, by constructing the lens 13 (13R and 13L) by a plurality of lenses as shown in FIG. 5, the aberration in the whole visible range and its fluctuation amount are reduced.

That is, in FIG. 5, the lens arranged at a position that is the closest to the display panel 14 has a larger refractive power than those of the other lenses. The lens arranged at a position that is the farthest from the display panel 14, namely, in FIG. 5, the lens arranged at a position that is the closest to the user has a smaller refractive power than those of the other lenses.

By constructing the lens 13 by a plurality of lenses, since the light can be refracted by each of the plurality of lenses, a load per lens can be lightened. Thus, the aberration of the whole lens 13 can be decreased. Moreover, by arranging the lens of a large refractive power on the display panel 14 side, the lens of a small refractive power can be arranged on the user side. In this case, since the power (refractive power) of the lens on the user side, namely, eyeball side is small, even if the pupil is not located on the optical axis of the lens 13, a locus of the light beam hardly changes.

Figure 5A:
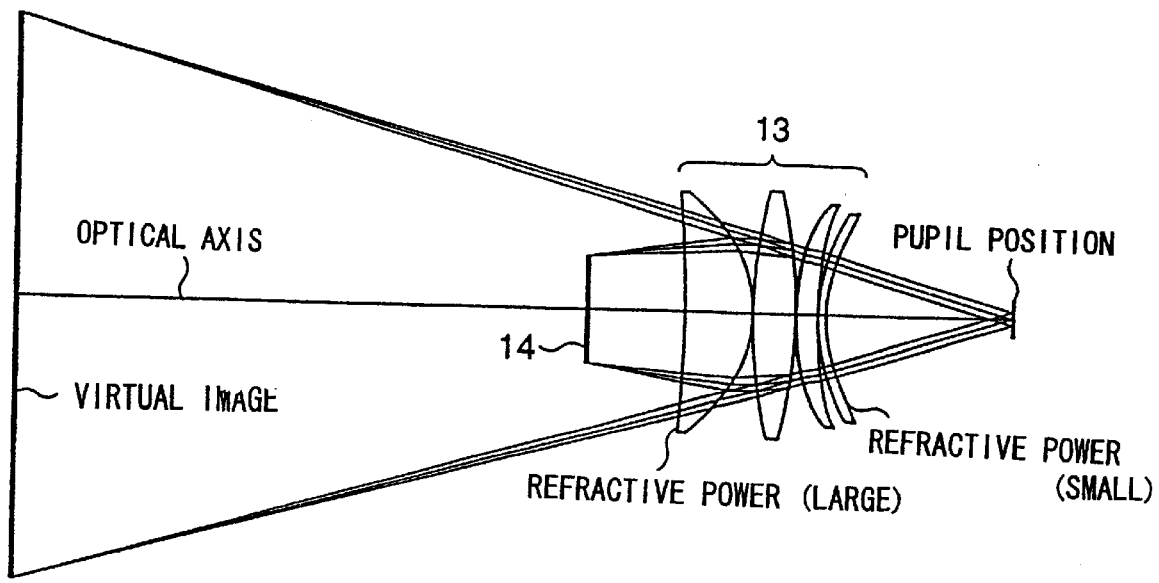
FIGS. 5A and 5B are cross sectional views showing a constructional example of the lenses 13L and 13R in FIG. 2 where the pupil is, and is not, located on the optical axis, respectively.
Figure 5B:
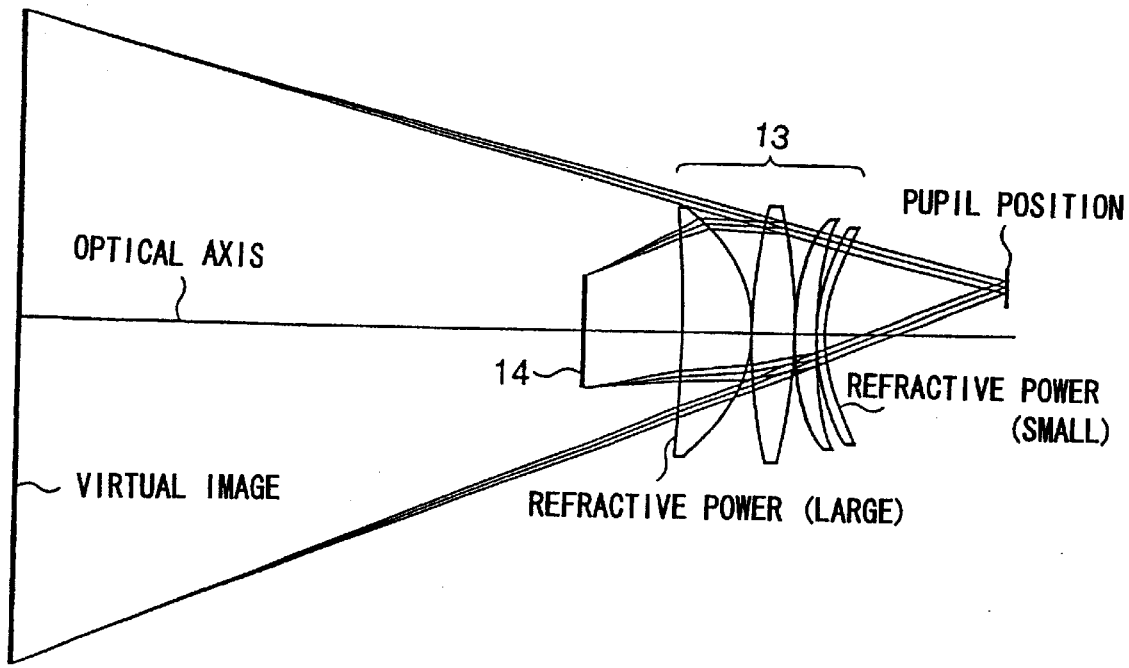

That is, FIG. 5A shows a left side elevational view (or top view) in the case where the pupil is located on the optical axis. FIG. 5B shows a left side elevational view in the case where the pupil is not located on the optical axis. However, the loci (optical paths) of both of the light beams hardly change and the light beams are almost converged on the virtual image surface. Even if the pupil position is deviated, the virtual image with less aberration can be observed.

In case of constructing the lens 13 by a plurality of lenses as shown in FIG. 5, if a lens having a negative power and in which dispersion of wavelength is larger than those of the other lenses is included among them, a chromatic aberration can be corrected.

In FIG. 5, although the lens 13 is constructed by four lenses, parameters of those four lenses can be set to, for example, the following values.

That is, now assuming that the four lenses are called the first, second, third, and fourth lenses from the display panel 14 side, radii of curvature (mm) of the display surface of the display panel, the surface of the first lens on the display panel 14 side, the surface on its pupil side, the surface of the second lens on the display panel 14 side, the surface on its pupil side, the surface of the third lens on the display panel 14 side, the surface on its pupil side, the surface of the fourth lens on the display panel 14 side, and the surface on its pupil side are set to, for example, $\infty$, −273.2355, −43.0090, 156.9532, −158.9318, 71.8083, 121.5689, 65.9055, and 61.6620, respectively.

A distance (distance on the optical axis) from the display surface of the display panel 14 to the surface of the first lens on the display panel 14 side, a distance from the surface of the first lens on the display panel 14 side to the surface on the pupil side, a distance from the surface of the first lens on the pupil side to the surface of the second lens on the display panel 14 side, a distance from the surface of the second lens on the display panel 14 side to the surface on the pupil side, a distance from the surface of the second lens on the pupil side to the surface of the third lens on the display panel 14 side, a distance from the surface of the third lens to the surface on the display 14 side to the surface on the pupil side, a distance from the surface of the third lens on the pupil side to the surface of the fourth lens on the display panel 14 side, a distance from the surface of the fourth lens on the display panel 14 side to the surface on the pupil side, and a distance from the surface of the fourth lens on the pupil side to the pupil are set to, for example, 27.0, 18.7626, 0, 11.7904, 0, 6.2371, 0, 2.4340, and 50, respectively.

The display panel 14 (14R and 14L) can be constructed by, for example, a self light emitting type device for displaying a video image by a light emitting device which emits light on a pixel unit basis, a transmission light control type device for displaying a video image by controlling the transmission of the light, a reflection light control type device for displaying a video image by controlling the reflection of the light, or the like.

Figure 6:
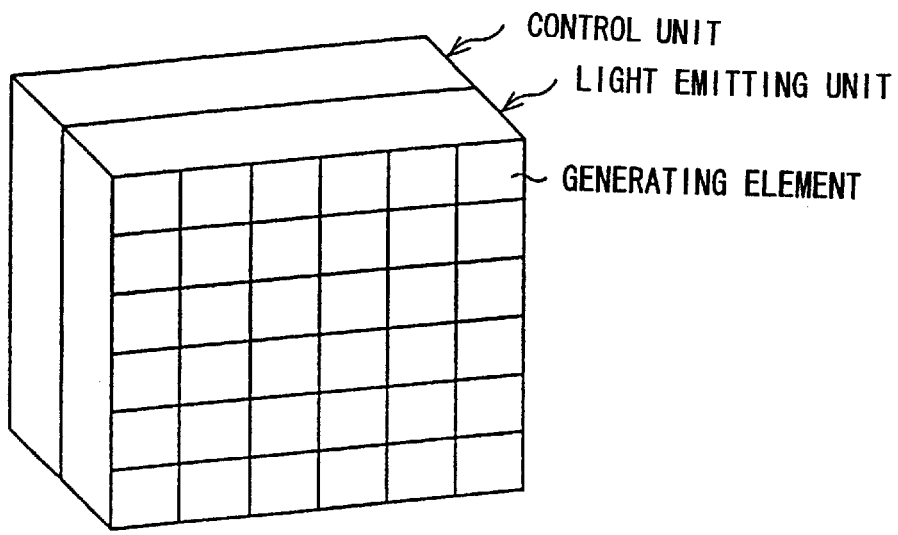
FIG. 6 is a perspective view showing a constructional example of a self light emitting type device.

FIG. 6 shows a constructional example of the self light emitting type device.

The self light emitting type device is constructed by a light emitting unit comprising a number of light emitting elements corresponding to pixels and a control unit for controlling the light emission of each light emitting element. Since the self light emitting type device has a simple construction and a light weight and a self light emission is performed, dependency on the angle of visibility is small. Thus, in case of constructing the display panel 14 by the self light emitting type device, the weight of system can be reduced. Further, even in case of seeing the video image from the oblique direction, a clear video image can be observed. As a self light emitting type device, for instance, there is a CRT or the like.

Figure 7:
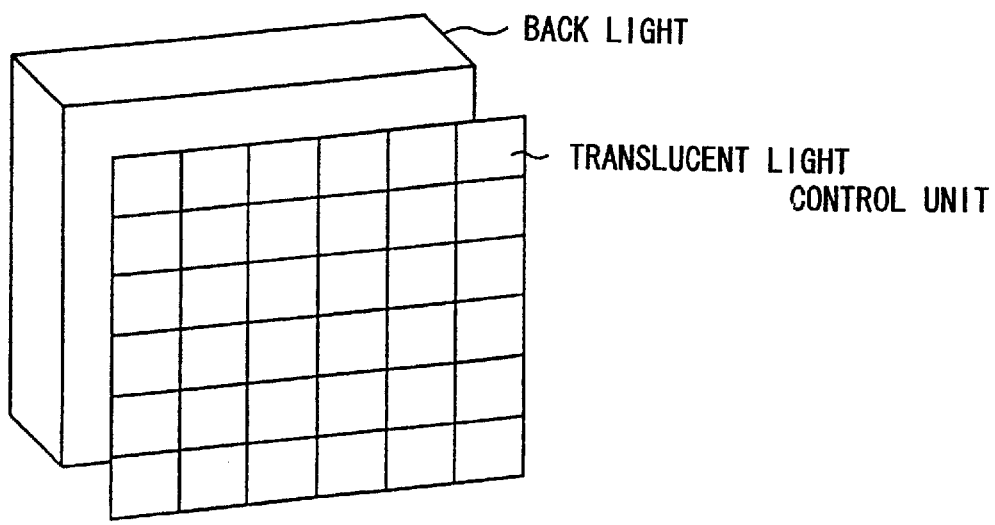
FIG. 7 is a perspective view showing a constructional example of a transmission light control type device.

FIG. 7 shows a constructional example of the transmission light control type device.

The transmission light control type device is constructed by a backlight for emitting light and a transmission light control unit for controlling the transmission of the light from the backlight on a pixel unit basis. According to the transmission light control type device, by adjusting an amount of light emitted by the backlight, a necessary brightness can be easily obtained. On the other hand, according to the foregoing self light emitting type device, it is necessary to adjust the light amount of each light emitting element. Further, in the self light emitting type device, there is a limitation of the light emission amount depending on the device itself. In the transmission light control type device, however, since the backlight is what is called a mere illumination, backlights of various light emission amounts exist. Therefore, by merely exchanging the backlight, a video image of a desired brightness can be displayed.

The transmission light control type device is suitable for a case of constructing the display panel 14 in a relatively flat shape.

As a transmission light control type device, for example, there are a liquid crystal display and the like.

Figure 8:
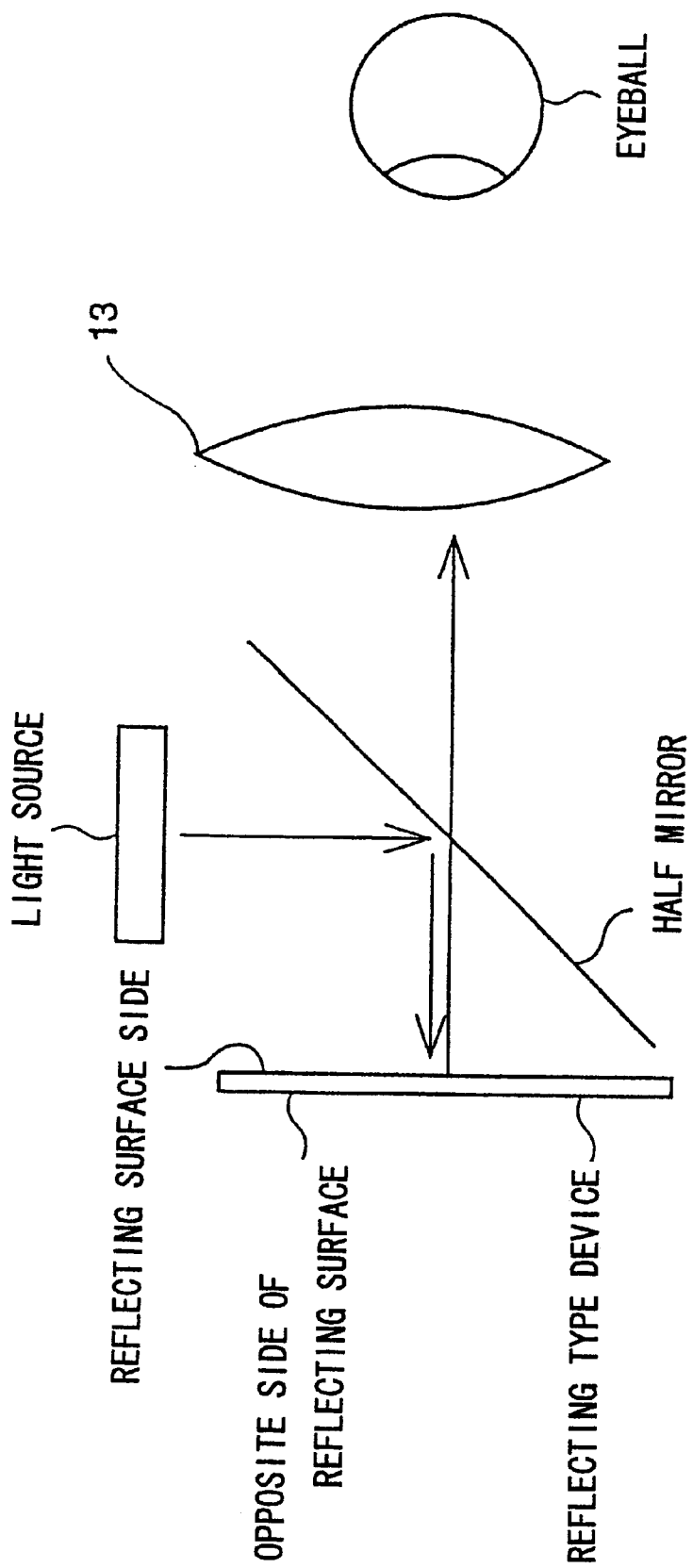
FIG. 8 is a cross sectional view showing a constructional example of a reflection light control device.

FIG. 8 shows a constructional example of the display panel 14 in case of using the reflection light control type device.

In this case, light is emitted from the light source and is reflected by a half mirror and enters a reflecting type device. The reflecting type device is constructed by arranging a number of elements corresponding to the pixels in a plane shape and a reflectance of each element is controlled in correspondence to the video signal. Therefore, the light entering the reflecting type device is reflected by each element at the reflectance corresponding to the video signal. The video image as reflection light transmits the half mirror and enters the eyeballs of the user through the lens 13. Thus, the virtual image is observed by the eyeballs of the user.

In the reflection light control type device, therefore, an effect that is equivalent to the effect such that the video image is optically displayed in the reflecting type device is obtained.

In the foregoing transmission light control type device (FIG. 7), a control mechanism to control the transmittance fundamentally needs to be provided at the boundary of each pixel of the transmission light control unit. The transmittance slightly deteriorates due to such a mechanism. Therefore, when the number of pixels is increased, an area ratio of the control mechanism increases and the whole transmittance deteriorates. Therefore, to obtain a predetermined light amount, it is necessary to also increase the light amount of the backlight in association with an increase in number of pixels. On the other hand, in the reflection light control type device (FIG. 8), since a control mechanism to control the reflectance of the reflecting type device can be provided on the side opposite to the reflecting surface, the number of pixels can be easily increased.

When the display apparatus 7 is constructed so that the display panels 14R and 14L are located in front of the user as shown in FIG. 2, even if the system holding mechanism 8 (FIG. 1) transmits the light, a field of view is obstructed by the display panels 14R and 14L. Therefore, an external situation (scene) corresponding to the obstructed range of the field of view cannot be confirmed.

Figure 9:
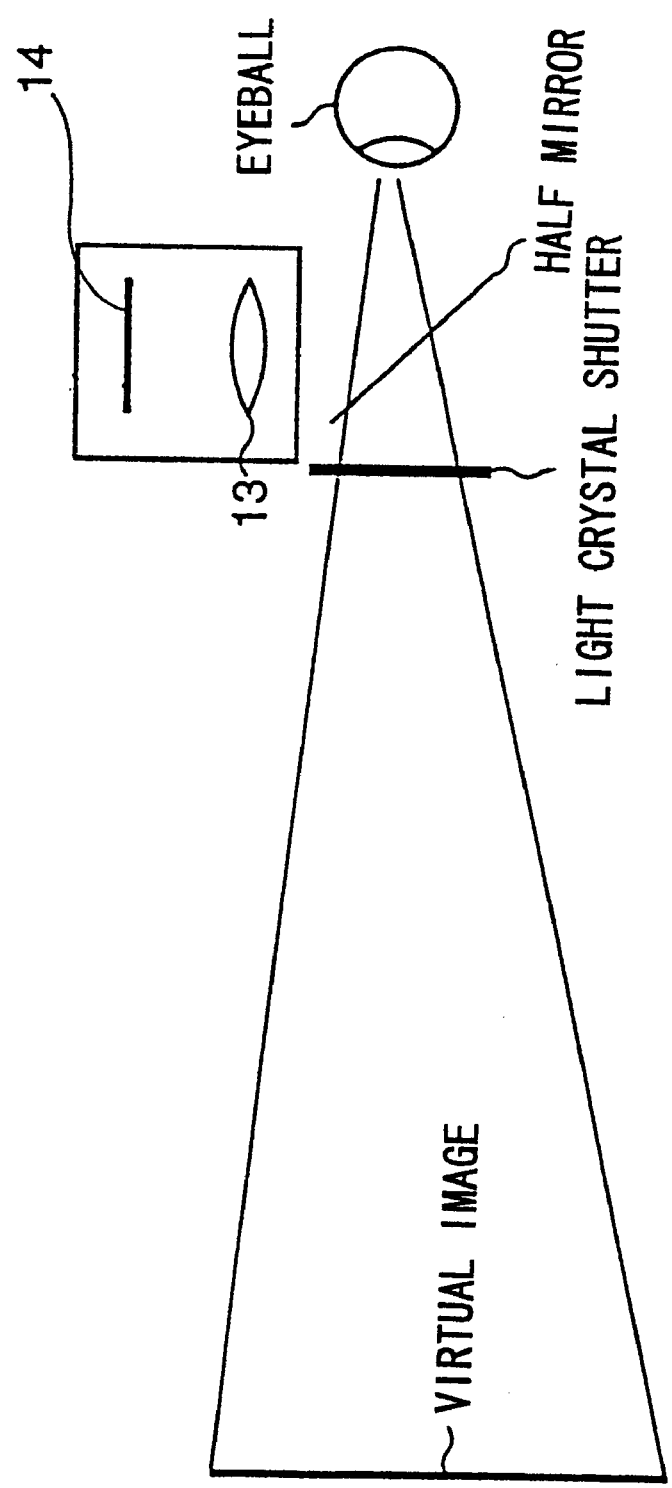
FIG. 9 is a cross sectional view of a left side diagram showing a second constructional example of the display apparatus 7.

To prevent the field of view of the user from being obstructed, therefore, the display apparatus 7 can be constructed as shown in, for example, FIG. 9.

That is, FIG. 9 shows a second constructional example of the display apparatus 7.

In this case, the lens 13 and display panel 14 are not arranged in front of the user but is arranged in the upper portion (direction over the head of the user) so as not to obstruct the field of view. The video image displayed on the display panel 14 is enlarged by the lens 13 and the light serving as an enlarged video image enters the half mirror. The light from the lens 13 is reflected by the half mirror and the reflected light enters the eyeballs of the user. Thus, the virtual image is observed by the eyeballs of the user.

In the embodiment of FIG. 9, a liquid crystal shutter is provided on the side of the half mirror opposite to the side which faces the user, thereby allowing the light from the outside to enter the half mirror through the liquid crystal shutter. Further, the light transmits the half mirror and enters the eyeballs of the user. Thus, the user can observe (confirm) the situation (scene) of the front side of himself in a state where it is overlaid to the virtual image.

The liquid crystal shutter changes an amount of light which transmits therein in correspondence to the operation of the remote controller 26 (FIG. 1). Thus, the user can observe the virtual image with a good balance of brightness and the external scene.

In this case, since the external situation can be confirmed in a state in which it is overlaid to the virtual image, the user can appreciate the virtual image in a relaxed state (without feeling an anxiety due to a fact that he cannot see the outside).

In the above description, the enlargement optical system such that the virtual image is formed by enlarging the video image displayed on the display panel 14 and the virtual images to be observed by the right and left eyes of the user are arranged at the same position in the space has been constructed by using the lens 13 as a convex lens. However, the enlargement optical system can be also constructed by using other lens such as a concave surface mirror or the like besides the convex lens.

Figure 10:
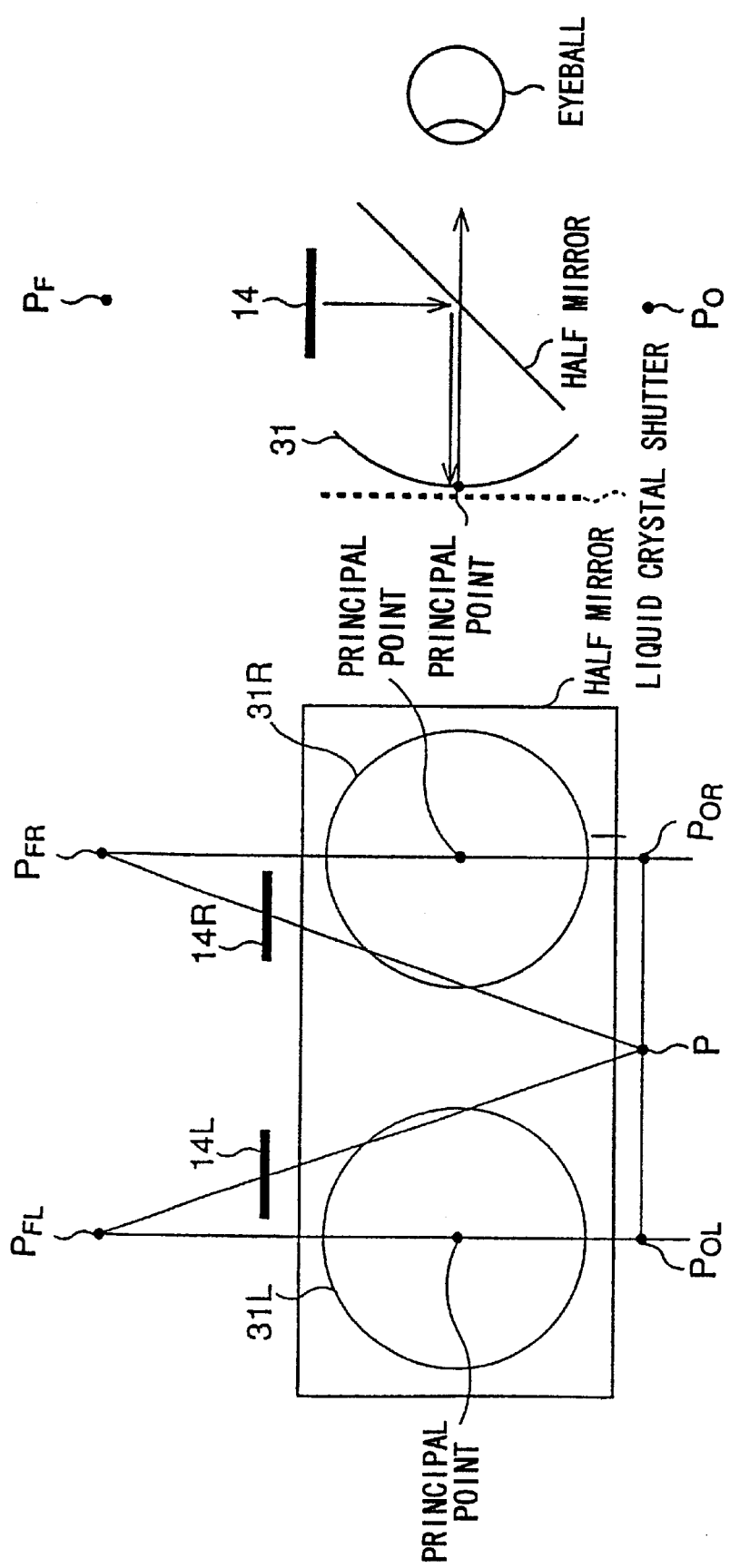
FIGS. 10A and 10B are front view and cross sectional views, respectively, showing a third constructional example of the display apparatus 7.

FIG. 10 shows a constructional example (third constructional example) in case of using a concave surface mirror 31 (31L and 31R) as an enlargement optical system of the display apparatus 7. FIG. 10A shows a front view when the display apparatus 7 is seen from the user side (surface side which faces the user at the time of using). FIG. 10B shows a cross sectional view of its side surface (for example, side surface on the left side when it is seen from the surface side which faces the user at the time of using).

In the embodiment, a half mirror is arranged so as to face the user upon using and, further, the concave surface mirror 31 (31L and 31R) is arranged on the rear side. The display panel 14 (14L and 14R) is arranged in the upper portion (therefore, direction over the head of the user) of the half mirror.

In the display apparatus 7 constructed as mentioned above, the video image displayed on the display panel 14 is reflected by the half mirror and enters the concave surface mirror 31. In the concave surface mirror 31, the video image from the half mirror is enlarged by being reflected. The enlarged video image transmits the half mirror and enters the eyeballs of the user. Thus, the virtual image is observed (perceived) by the eyeballs of the user. The virtual images which are observed by the right and left eyes of the user are arranged at the same position in the space in a manner similar to the case of FIG. 2.

A point (half mirror reflection equivalent position) that is equivalent to the principal point or focal point of the concave surface mirror 31R is formed on a straight line which exists in the plane perpendicular to the half mirror and which is perpendicular to an optical axis of the concave mirror surface 31R. The point which is equivalent to the principal point or focal point is referred to as $P_{FR}$ or $P_{OR}$. Similarly, with regard to the concave surface mirror 31L as well, a point which is formed by the half mirror and is equivalent to the principal point or focal point is expressed as $P_{FL}$ or $P_{OL}$. A middle point between the points $P_{OR}$ and $P_{OL}$ which is equivalent to the principal point is shown by P.

In this case, each of the display panels 14R and 14L synchronously moves so that the center point is located on a straight line connecting the points $P_{FR}$ and P or a straight line connecting the points $P_{FL}$ and P and is included in the same plane, so that the position where the virtual image is formed moves. The movement of the display panels 14R and 14L is performed by, for example, a stepping motor (not shown) by operating the remote controller 26. Each of the display panels 14R and 14L moves in a range on the half mirror side rather than the point $P_{FR}$ or $P_{FL}$ that is equivalent to the focal point, thereby enabling the user to observe the virtual image.

In case of constructing the enlargement optical system by the concave surface mirror as mentioned above, since the concave surface mirror can be relatively easily made thinner than the lens, the weight of system can be reduced.

In the case where the concave surface mirror 31 is formed by the half mirror and, further, as shown in FIG. 10B, the liquid crystal shutter or the like which can change the light transmission is provided behind the concave surface mirror 31, the light from the outside can be allowed to enter the eyeballs of the user through the liquid crystal shutter, concave surface mirror 31, and half mirror. Further, in this case, the amount of light which enters the eyeballs can be adjusted by controlling the liquid crystal shutter. In this case, therefore, in a manner similar to the case in FIG. 9, the user can observe the situation in front of himself in a state where it is overlaid to the virtual image and, further, can observe the virtual image with a good balance of brightness and the external scene.

In the above example, the enlargement optical system has been constructed by the optical system (lens 13L or concave surface mirror 31L) for the left eye and the optical system (lens 13R or concave surface mirror 31R) for the right eye which have the different optical axes. However, the enlargement optical system can be also constructed by only an optical system with one optical axis.

Figure 11:
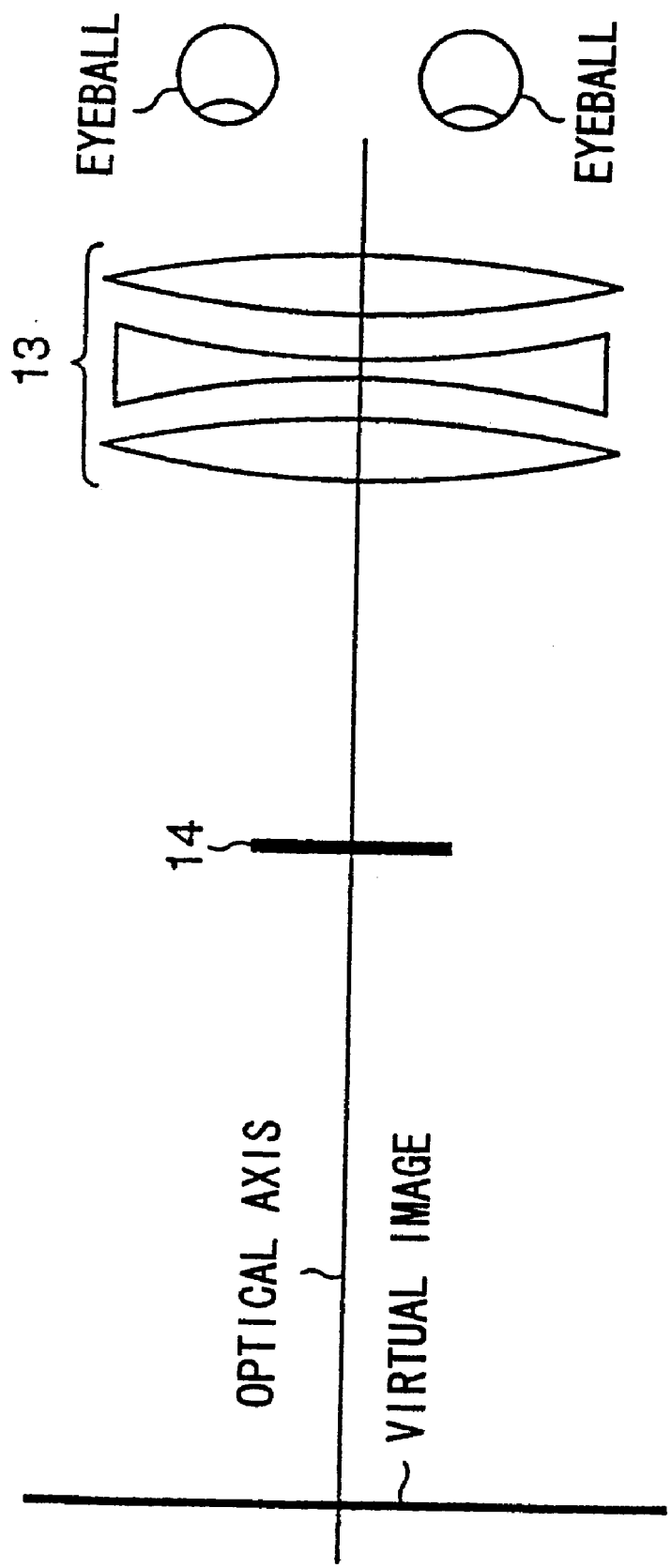
FIG. 11 is a cross sectional view of a top view showing the fourth constructional example of the display apparatus 7.

That is, FIG. 11 is a top view showing a constructional example (fourth constructional example) of the display apparatus 7 in case of constructing the enlargement optical system by one convex lens.

In this case, the lens 13 has a diameter larger than that of, for instance, the lens 13R (or 13L) shown in FIG. 2 and (the center of) one display panel 14 is arranged at a position which exists on its optical axis and is nearer than the focal distance.

In the display apparatus 7 constructed as mentioned above, the video image displayed on the display panel 14 is enlarged by the lens 13. The enlarged image enters the eyeballs of the user. Thus, the virtual image is observed (perceived) in the eyeballs of the user.

FIG. 12 shows a constructional example (fifth constructional example) of the display apparatus 7 in case of constructing the enlargement optical system by one concave surface mirror. FIG. 12A shows a cross sectional view of its top view. FIG. 12B shows a cross sectional view of its side view.

In this case, the concave surface mirror 31 has a diameter larger than that of, for instance, the concave surface mirror 31R (or 31L) shown in FIG. 10 and a half mirror is arranged on the reflecting surface side. The display panel 14 is arranged in the upper portion of the half mirror. In a manner similar to the case described in FIG. 10, its arranging position is set to the half mirror side rather than the point that is equivalent to the focal point of the concave surface mirror 31 which is formed by the half mirror.

In the display apparatus 7 constructed as mentioned above, the video image displayed on the display panel 14 is reflected by 90° by the half mirror and enters the concave surface mirror 31. In the concave surface mirror 31, the video image from the half mirror is enlarged by being reflected. The enlarged video image transmits the half mirror and enters the eyeballs of the user. Thus, a virtual image is observed in the eyeballs of the user.

As shown in FIGS. 11 and 12, in case of constructing the enlargement optical system by only the optical system of one optical axis, since one virtual image is observed by the right and left eyes, a vergence of both eyes and its adjustment perfectly coincide. Thus, the user can appreciate the virtual image almost without feeling a fatigue (even in case of constructing the enlargement optical system by the optical system (lens 13L and concave surface mirror 31L) for the left eye and the optical system (lens 13R or concave surface mirror 31R) for the right eye which have different optical axes, in the embodiment, as described in FIG. 2, since the virtual images which are observed by the right and left eyes of the user are arranged at the same position in the space, the user can appreciate the virtual image almost without feeling a fatigue).

Since the lens 13 or concave surface mirror 31 in the embodiment of FIG. 11 or 12 has a large diameter, even if the user slightly moves the head portion, the whole virtual image can be appreciated without missing the virtual image.

As compared with the case of constructing the enlargement optical system by only the optical system of one optical axis, however, by constructing the enlargement optical system by the optical system of two optical axes, namely, by the optical systems for the right and left eyes, a size and an aberration per lens or concave surface mirror can be set to a small value.

Figure 13:
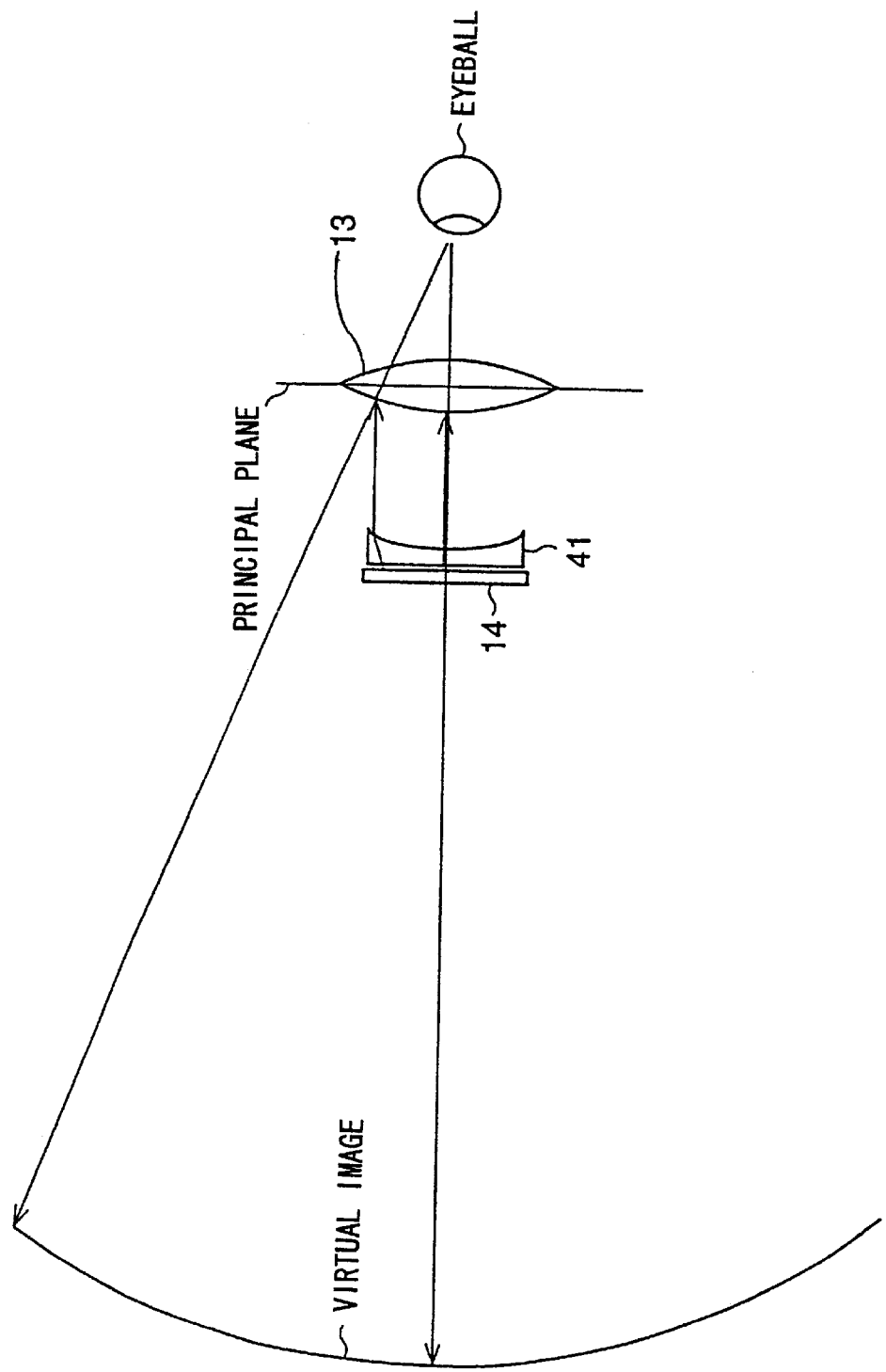
FIG. 13 is a cross sectional view of a left side view showing the sixth constructional example of the display apparatus 7.

Subsequently, FIG. 13 is a cross sectional view of the left side view showing further another constructional example (sixth constructional example) of the display apparatus 7. In the embodiment, the display apparatus 7 is constructed in a manner similar to the case in FIG. 2 except that a cylindrical lens 41 (curving means) is newly provided between the lens 13 and display panel 14 as an optical part constructing the enlargement optical system.

In the embodiment of FIG. 13, since the surface of the cylindrical lens 41 which faces the lens 13 is dented in a cylindroid, its center portion is thin and its upper and lower portions are thick. In this case, as compared with an optical distance from a position near the center (near the center in the vertical direction, here) of the display panel 14 to the principal plane of the lens 13, an optical distance from its periphery (upper and lower portions of the display panel 14, here) to the principal plane is shorter.

Figure 14:
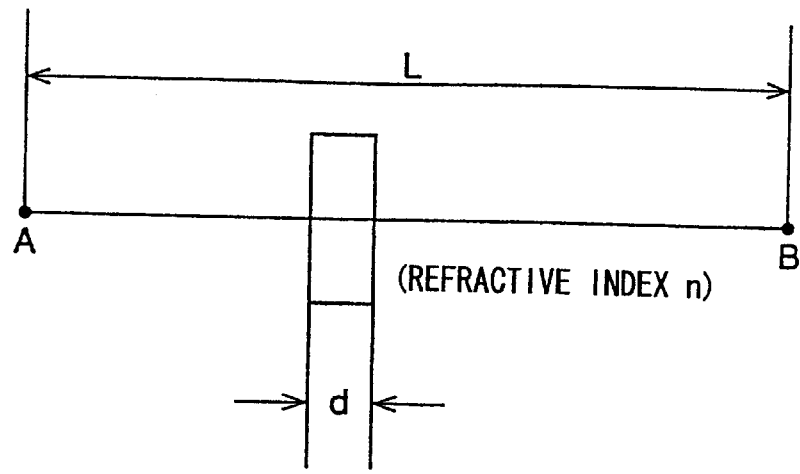
FIG. 14 is a diagram for explaining a function of a cylindrical lens 41 in FIG. 13.

That is, as shown in FIG. 14, when an object having a refractive index of n and a thickness of d is put between points A and B in which an optical distance in the air is equal to L, an optical distance (distance as an air conversion value) between the points A and B through the object is generally equal to $L-d\times(n-1)/n$ and is usually shorter as compared with the case (L) where no object is interposed.

In this case, therefore, the surface on which the virtual image formed by the lens 13 is arranged is curved in the upper/lower direction (vertical direction) in which the upper and lower portions are closer to the user side rather than a portion near the center as shown in FIG. 13.

In this case, the user can be made feel as if he was surrounded by the virtual image, so that a virtual image with larger presence can be provided.

In the embodiment of FIG. 13, although the virtual image in which the upper and lower portions are curved can be obtained, by rotating the cylindrical lens 41 by 90° from the position in case of FIG. 13 and arranging, a virtual image in which the right and left sides are curved (virtual image which is curved in the horizontal direction) can be obtained.

By using, for example, a lens which is dented like a sphere (plano-concave lens) as a lens 41 instead of a lens which is dented in a cylindroid (cylindrical lens), a virtual image such that it is surrounded from the upper, lower, right, and left directions can be provided. Further, by forming the lens which is used as a lens 41 into a desired shape, a virtual image which is curved in such a desired shape can be obtained.

In the embodiment of FIG. 13, although the video image is enlarged by the convex lens (lens 13), the concave surface mirror can be also used to enlarge the video image.

In FIG. 2 or the like, for example, the lens 13L for the left eye and the lens 13R for the right eye are provided as enlargement optical systems, two display panels 14L and 14R are provided, the video image of the display panel 14L is enlarged by the lens 13L, and the video image of the display panel 14R is enlarged by the lens 13R, respectively. However, it is also possible to construct in a manner such that the number of display panels to display video images is set to one and the video image which is displayed by the display panel is separately allowed to enter the optical system for the left eye and the optical system for the right eye, thereby providing a virtual image to the user.

Figure 15:
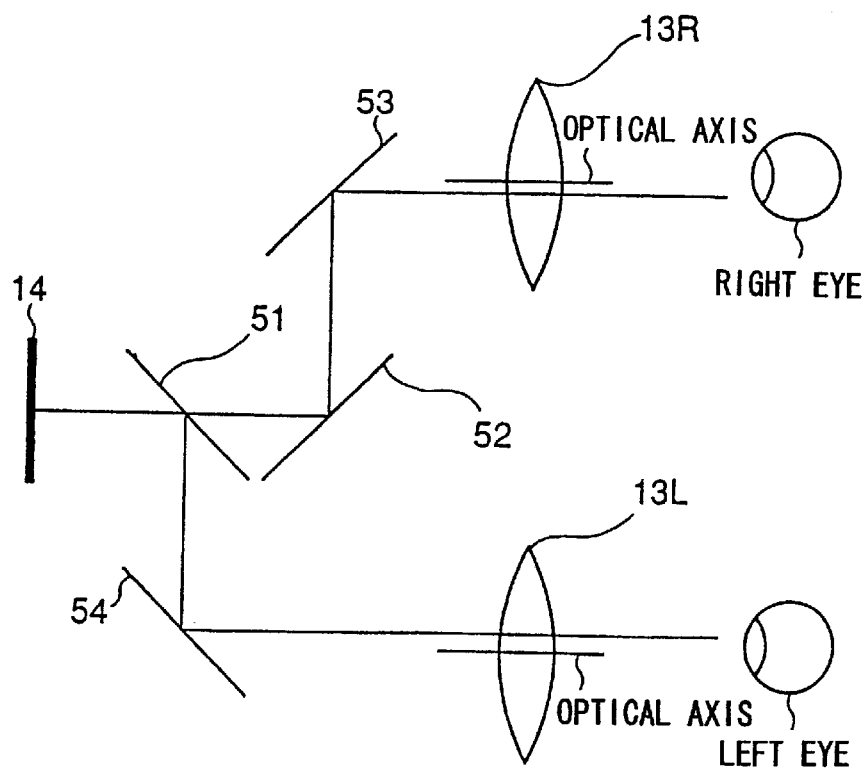
FIG. 15 is a cross sectional view of a top view showing the seventh constructional example of the display apparatus 7.

FIG. 15 is a top view showing a constructional example (seventh constructional example) of such a display apparatus 7.

The display panel 14 is arranged on the center line of the positions where the right and left eyes of the user are arranged at the time of using. A video image which is displayed by the display panel 14 enters a half mirror 51. The half mirror 51 (entering means) transmits a part of the video image on the display panel 14 and bends the remaining portion of the video image by 90° and reflects, thereby allowing the video image which is displayed by the display panel 14 to individually enter the optical system for the left eye and the optical system for the right eye.

That is, the video image transmitting the half mirror 51 enters a mirror 52, by which it is reflected by 90° and enters a mirror 53. In the mirror 53, the video image from the mirror 52 is reflected by 90° and enters the lens 13R. The lens 13R enlarges the video image from the mirror 53 and allows the video image to enter the right eye.

On the other hand, the video image reflected by the half mirror 51 is reflected by 90° by a mirror 54 and enters the lens 13L. The lens 13L enlarges the video image from the mirror 54 and allows the video image to enter the left eye.

As mentioned above, the virtual image in which the video image displayed on one display panel 14 is enlarged by the lens 13L or 13R is respectively observed by the left eye or right eye of the user.

In FIG. 15, although the convex lenses (lens 13L and 13R) have been used as enlargement optical systems, a concave surface mirror can be also used as an enlargement optical system.

Figure 16B:
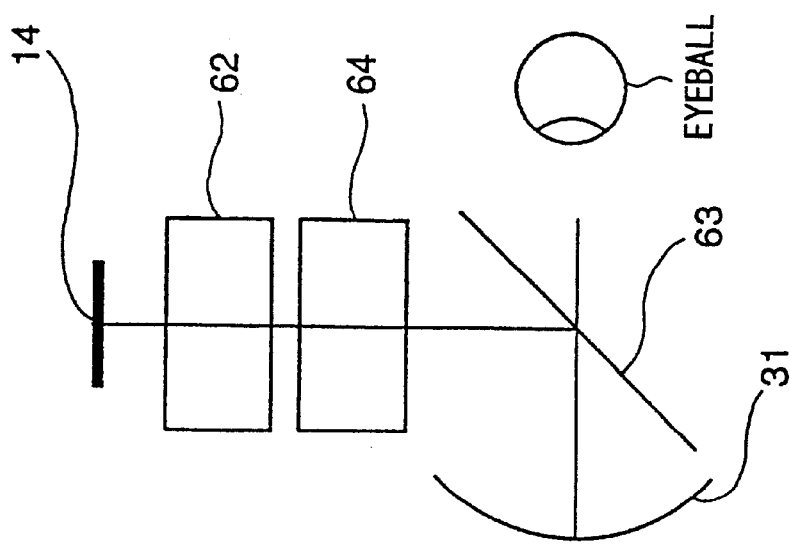
FIGS. 16A and 16B are cross sectional views of a top view and a left side view, respectively, showing the eighth constructional example of the display apparatus 7.
Figure 16A:
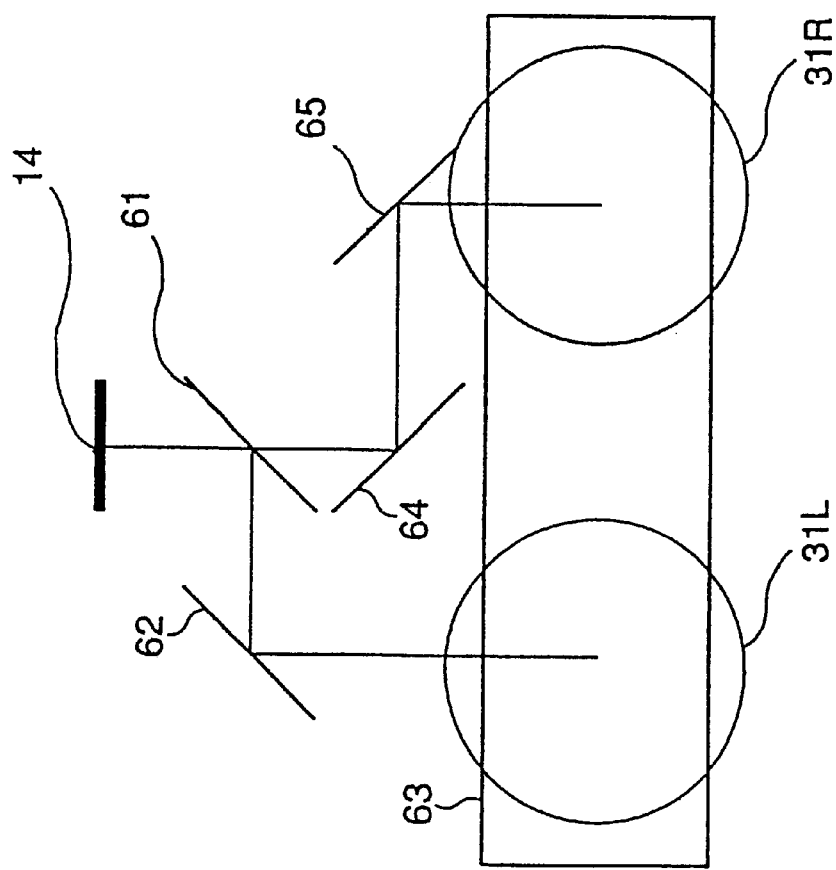

That is, FIG. 16 shows a constructional example (eighth constructional example) of the display apparatus 7 in case of using the concave surface mirror. FIG. 16A shows a front view of the display apparatus 7. FIG. 16B shows a side elevational view of the left side view.

In this case, a video image which is displayed by the display panel 14 arranged in the direction over the head of the user enters a half mirror 61. The half mirror 61 (entering means) transmits a part of the video image on the display panel 14 and reflects the remaining portion of the video image by 90°, thereby allowing the video image which is displayed by the display panel 14 to individually enter the optical system for the left eye and the optical system for the right eye.

That is, the video image transmitting the half mirror 61 enters a mirror 64, by which it is reflected by 90° and enters a mirror 65. In the mirror 65, the video image from the mirror 64 is reflected by 90° and enters a half mirror 63. In the half mirror 63, the video image from the mirror 65 is reflected by 90° and enters the concave surface mirror 31R. In the concave surface mirror 31R, the video image entering there is enlarged. The enlarged video image transmits the half mirror 63 and enters the right eye.

On the other hand, the video image reflected by the half mirror 61 is reflected by 90° by a mirror 62 and enters the half mirror 63. In the half mirror 63, the video image from the mirror 62 is reflected by 90° and enters the concave surface mirror 31L. In the concave surface mirror 31L, the video image entering there is enlarged. The enlarged video image transmits the half mirror 63 and enters the left eye.

As mentioned above, in the left eye or right eye of the user, the virtual image in which the video image displayed on one display panel 14 is enlarged by the concave surface mirror 31L or 31R is observed, respectively.

In case of constructing the display apparatus 7 by one display panel 14 as mentioned above, as compared with the case of using two display panels 14R and 14L, the system can be constructed with low costs. Further, in case of using the two display panels 14R and 14L, there can be a rare case where a difference between picture qualities of images which are observed by the right and left eyes occurs due to a variation in their characteristics. However, in case of constructing the display apparatus 7 by one display panel 14, such a picture quality difference does not occur. Thus, the user does not feel a fatigue which is caused because of the presence of the difference between the picture qualities of the images which are observed by the right and left eyes.

Figure 17:
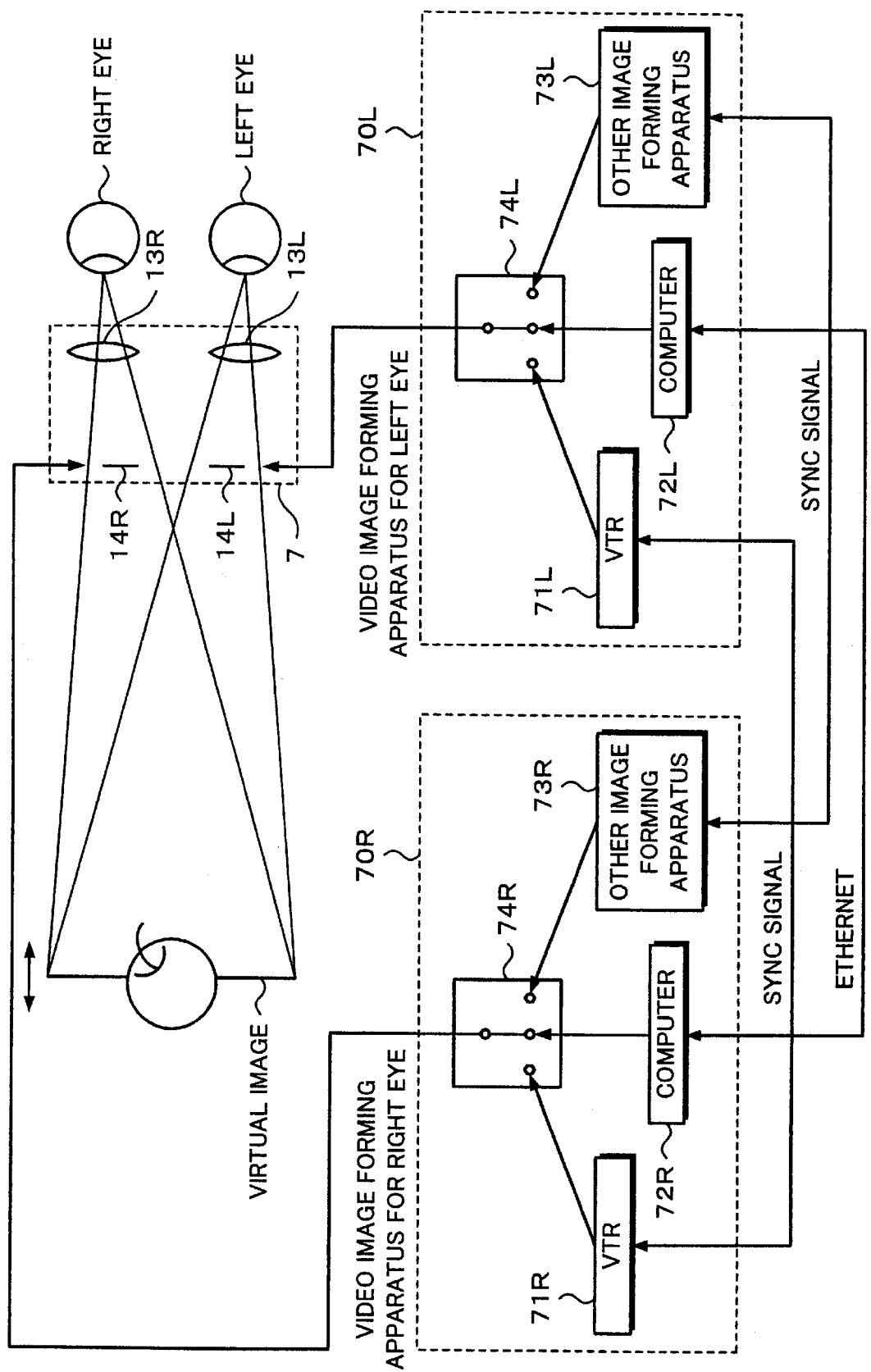
FIG. 17 is a block diagram showing a construction of the second embodiment of a virtual image providing system (stereoscopic image display system) to which the invention is applied.

FIG. 17 shows a construction of the second embodiment of a virtual image providing system to which the invention is applied. The virtual image providing system is constructed in a manner similar to the case in FIG. 1 except that a video image forming apparatus 70R for the right eye and a video image forming apparatus 70L for the left eye are provided in place of the video audio forming apparatus 10 (in FIG. 17, however, a part (for example, the user holding mechanism 9, portions regarding the processes of the acoustic signal, and the like) is not shown in FIG. 17).

That is, in FIG. 1, a two-dimensional (plane) virtual image has been provided by allowing the virtual image with respect to the video image which is generated by one video audio forming apparatus 10 to be observed by both of the right and left eyes of the user. However, in the embodiment of FIG. 17, a stereoscopic virtual image is provided by allowing a virtual image with regard to a video image which is generated by the video image forming apparatus 70R for the right eye or the video image forming apparatus 70L for the left eye to be observed by the right eye or left eye of the user, respectively.

Specifically speaking, in a VTR 71R or 71L, a video tape on which a stereoscopic video image using a binocular parallax has been recorded is reproduced. The video image for the right eye or the video image for the left eye is outputted to a selector 74R or 74L, respectively. In the VTR 71R and 71L, sync signals can be mutually transmitted and received, so that the video image for the right eye or the video image for the left eye is generated from each VTR in a synchronized state, respectively.

In a computer 72R or 72L, a video image for the right eye or left eye by computer graphics for providing a stereoscopic video image using the binocular parallax is formed and outputted to the selector 74R or 74L, respectively. The computer 72R and 72L are connected by a predetermined communication line such as a line of Ethernet or the like, so that the video image for the right eye and the video image for the left eye are outputted from the computers in a synchronized state, respectively.

Even in another image forming apparatus 73R or 73L, a video image for the right eye or left eye constructing a stereoscopic video image using the binocular parallax is formed and is outputted to the selector 74R or 74L in a synchronized state.

In the selector 74R, an output of any one of the VTR 71R, computer 72R, and other image forming apparatus 73R is selected. The selected output, namely, the video image for the right eye is supplied to the display panel 14R. The selector 74L is synchronized with the selector 74R, selects the output corresponding to the one of the VTR 71L, computer 72L, and other image forming apparatus 73L which was selected by the selector 74, and supplies the selected output, namely, the video image for the left eye to the display panel 14L.

The display of the display panel 14R or 14L is enlarged by the lens 13R or 13L and enters the right eye or left eye of the user. Thus, in the right eye or left eye of the user, a virtual image obtained by enlarging the video image for the right eye or left eye is observed, respectively, so that a stereoscopic video image using the binocular parallax is provided to the user.

In this case, the left eye or right eye of the user is directed toward each virtual image for the right eye or left eye. Further, its focusing control is also executed so as to be matched with the virtual image for the right eye or left eye. Therefore, the user can observe the stereoscopic video image almost without feeling a fatigue.

Figure 18:
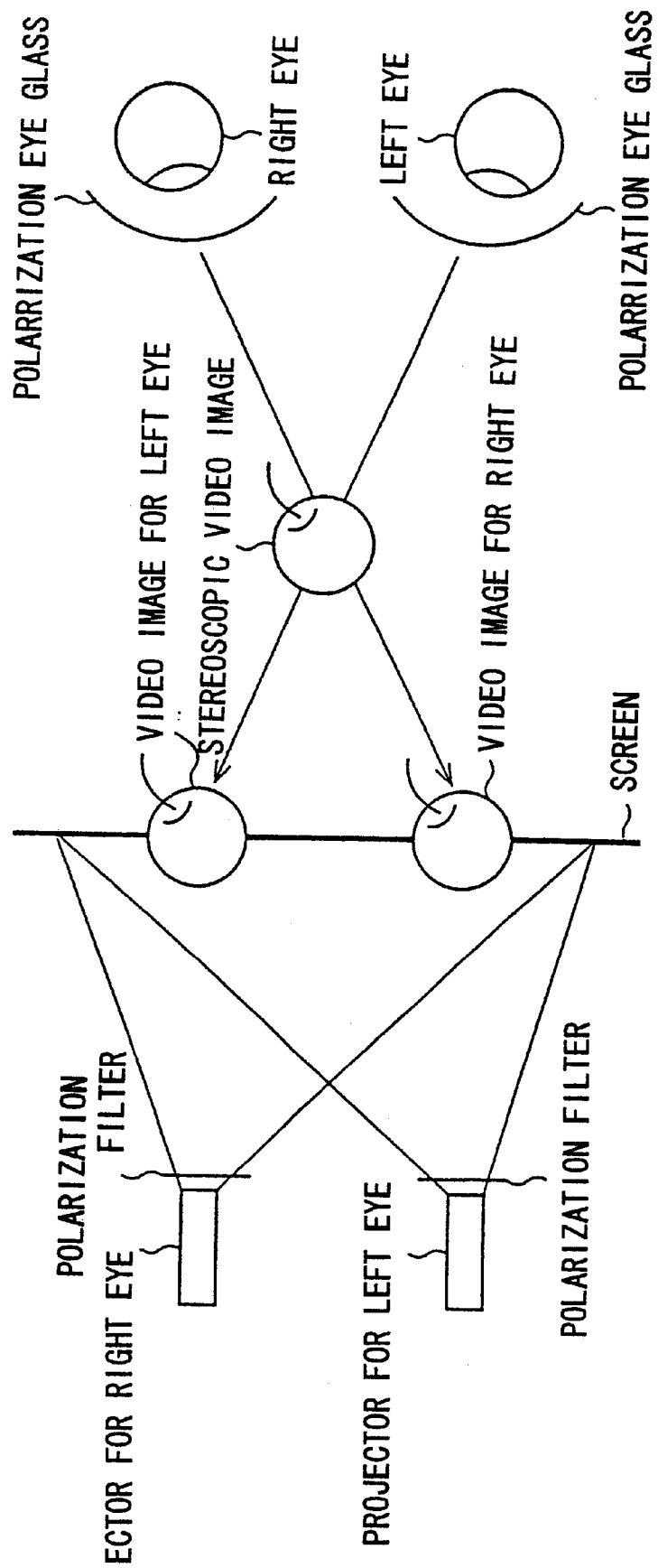
FIG. 18 is a diagram showing a system for displaying a stereoscopic video image by a projector.

In other words, as a conventional system for appreciating a stereoscopic video image, for example, as shown in FIG. 18, there is a system such that polarizing filters of different polarizing directions are installed to two projectors and the light of each projector is irradiated to the screen through the polarizing filter, thereby displaying a video image for the right eye (right-eye video image) and a video image for the left eye (left-eye video image).

According to this system, the user observes the video image for the right eye or the video-image for the left eye by the right eye or left eye through the polarizing glasses corresponding to each of the polarizing filters installed to the two projectors, so that a stereoscopic video image which is floating from the screen toward the user side is provided.

In this case, therefore, although the right eye or left eye of the user is directed toward the video image for the right eye or left eye, the focusing control is performed so as to be matched with the video image on the screen instead of a stereoscopic video image. Since the focusing control is not performed to the stereoscopic video image position, the user feels a large fatigue in order to appreciate a stereoscopic video image.

On the other hand, in case of FIG. 17, the left eye or right eye of the user is directed toward the virtual image for the right eye or left eye and the focusing control is also performed so as to be matched with the virtual image which is at present seen. Therefore, the user can observe a stereoscopic video image almost without feeling a fatigue.

In the embodiment of FIG. 17, although the lenses 13R and 13L as convex lenses have been used as enlargement optical systems, a stereoscopic video image can be also provided even by using a concave surface mirror in a manner similar to the case in FIG. 17.

Figure 19:
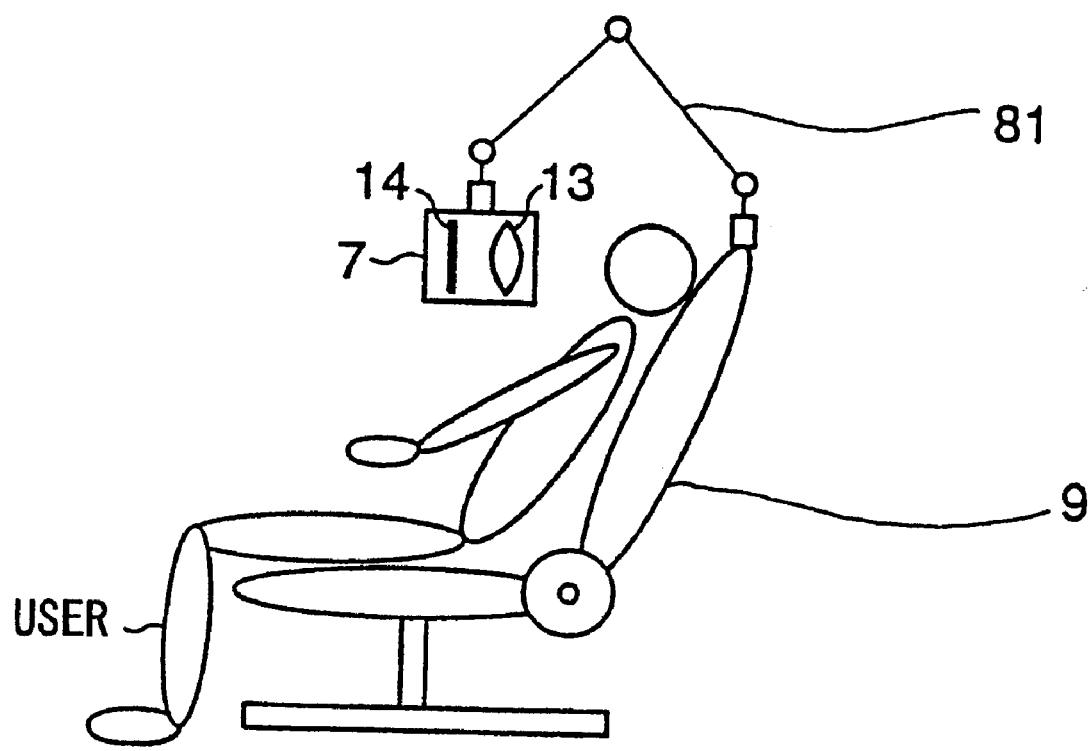
FIG. 19 is a block diagram showing a constructional example of the third embodiment of a virtual image providing system to which the invention is applied.

In the embodiment of FIG. 1, although the display apparatus 7 has been fixed in the semispherical system holding mechanism 8 fixed in the user holding mechanism 9, for example, the display apparatus 7 can be also fixed to the other end of an arm stand 81 in which one end is fixed to the user holding mechanism 9 as shown in FIG. 19.

As shown in FIG. 20, cylindroid hinge portions are provided in several portions of the arm stand 81. Each hinge portion is rotatable around its center axis (straight line passing through the center of two cylindroid bottom surfaces) as a center.

In this case, therefore, the user moves the display apparatus 7 to a desired position and can appreciate a virtual image.

Although not particularly mentioned in the above description, in FIG. 1, for example, the system holding mechanism 8 can rotate upward around a portion connected to the user holding mechanism 9 as a center. In this case, the user can easily seat himself onto the user holding mechanism 9.

In the above case, the user holding mechanism 9 has been set to a chair, sofa, or the like. However, for example, the user holding mechanism 9 can be also replaced to other devices such as a bed in which the user can relax or the like.

Figure 21A:
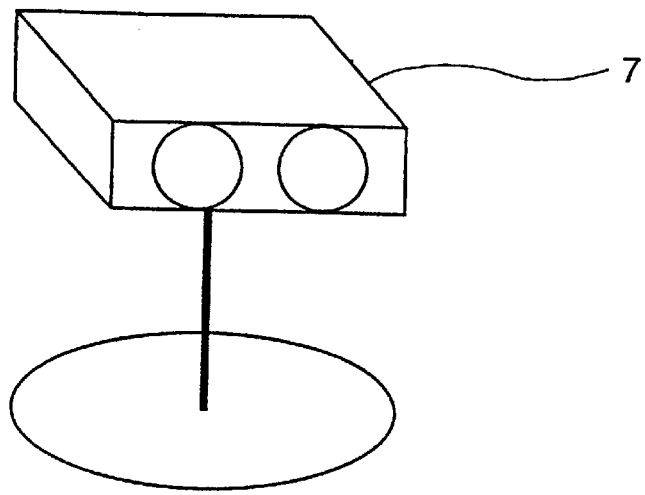
FIGS. 21A and 21B are diagrams depicting various methods of detachably affixing the display apparatus 7.
Figure 21B:
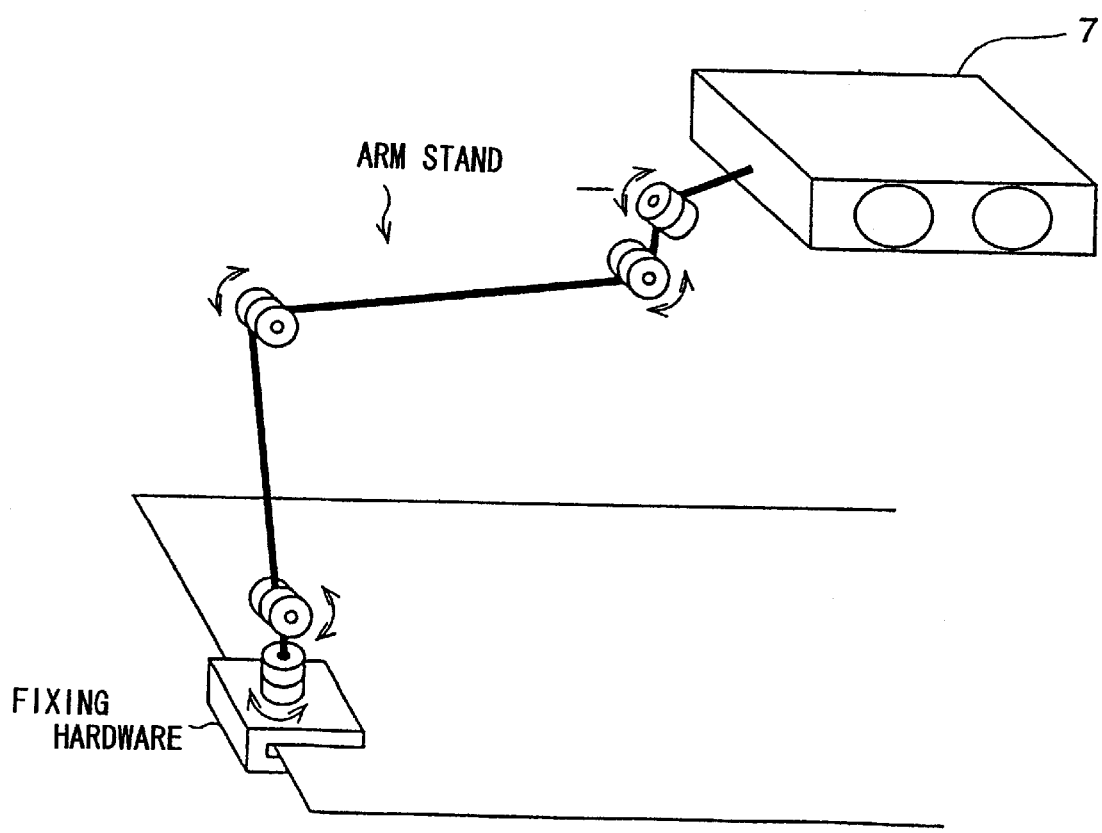

Further, in the above case, although the display apparatus 7 has been fixed to the user holding mechanism 9, the display apparatus 7 can be also detachably attached to the user holding mechanism 9. In this case, the removed display apparatus 7 can be fixed to a rod-shaped stand and be used as shown in, for example, FIG. 21A or the display apparatus 7 can be fixed to the other end of an arm stand in which one end is fixed to a desk or the like by a fixing hardware or the like and can be used as shown in FIG. 21B.

The user holding mechanism 9 can be vibrated or inclined, for example, in the upper, lower, right, and left directions and in the front and rear directions in an interlocking relation with the virtual image to be appreciated by the user. For example, in case of moving the user holding mechanism 9 in an interlocking relation with a sky video image, a sense as if the user actually was in an airplane can be given to the user.

In the case where the display apparatus 7 is fixed to an object other than the user, for example, when the user moves, a relative positional relation between the pupil of the user and the ocular lenses serving as lenses 13L and 13R constructing the enlargement optical systems changes. Therefore, it is necessary to keep an interval (eye relief) in a manner such that even if the user moves in the optical axial direction to a certain degree, the pupil of the user does not come into contact with the ocular lens. On the other hand, since there is a case where the user of a low eyesight uses the display apparatus 7 with the glasses held, it is also necessary to construct such that even if the user with the glasses moves in the optical axial direction to a certain degree, the glasses do not come into contact with the ocular lens. In consideration of the user with glasses as well, it is necessary to set the interval between the pupil of the user and the ocular lens, namely, eye relief to a further long value.

When the user moves in the direction perpendicular to the optical axis, although the pupil position of the user is deviated from the optical axis, it is desirable to use the ocular lens having high performance of a large allowance amount of the deviation of the pupil position such that a video image (virtual image) of high resolution can be provided even in such a state.

Further, hitherto, as display panels 14L and 14R, the number of pixels in the lateral×vertical directions are generally equal to about 640×480 (VGA). However, in recent years, a display having the number of pixels such as 1024× 768 (XGA), 1600×1200 (UXGA), 1920×1080 (HDTV), or the like is becoming a general display because of a demand for realization of high picture quality or the like. In association with it, as an ocular lens as well, a lens having higher resolution and a wide angle of view is necessary.

However, a request to make a length of eye relief long and a request to increase the allowance amount of the deviation of the pupil position are contradictory requests. Further, those requests and a request to raise the resolution and a request to widen the angle of view are also contradictory requests.

If the focal distance of (the whole system of) the ocular lens is made long, even in case of the same construction, the eye relief can be made long and, further, the allowance amount of the deviation of the pupil position can be enlarged.

However, in the case where the size of video image is constant, since the angle of view is inversely proportional to the focal distance, if the focal distance of the ocular lens is made long, the angle of view is narrowed and the presence is missing.

Although the angle of view can be increased by reducing the focal distance of the ocular lens, in this case, the eye relief becomes short and the allowance amount of the deviation of the pupil position is also decreased. Further, when the angle of view is increased, an astigmatism, an image surface distortion, a distortion aberration, a magnification chromatic aberration, or the like increases and it is difficult to assure adequate resolution.

Figure 22:
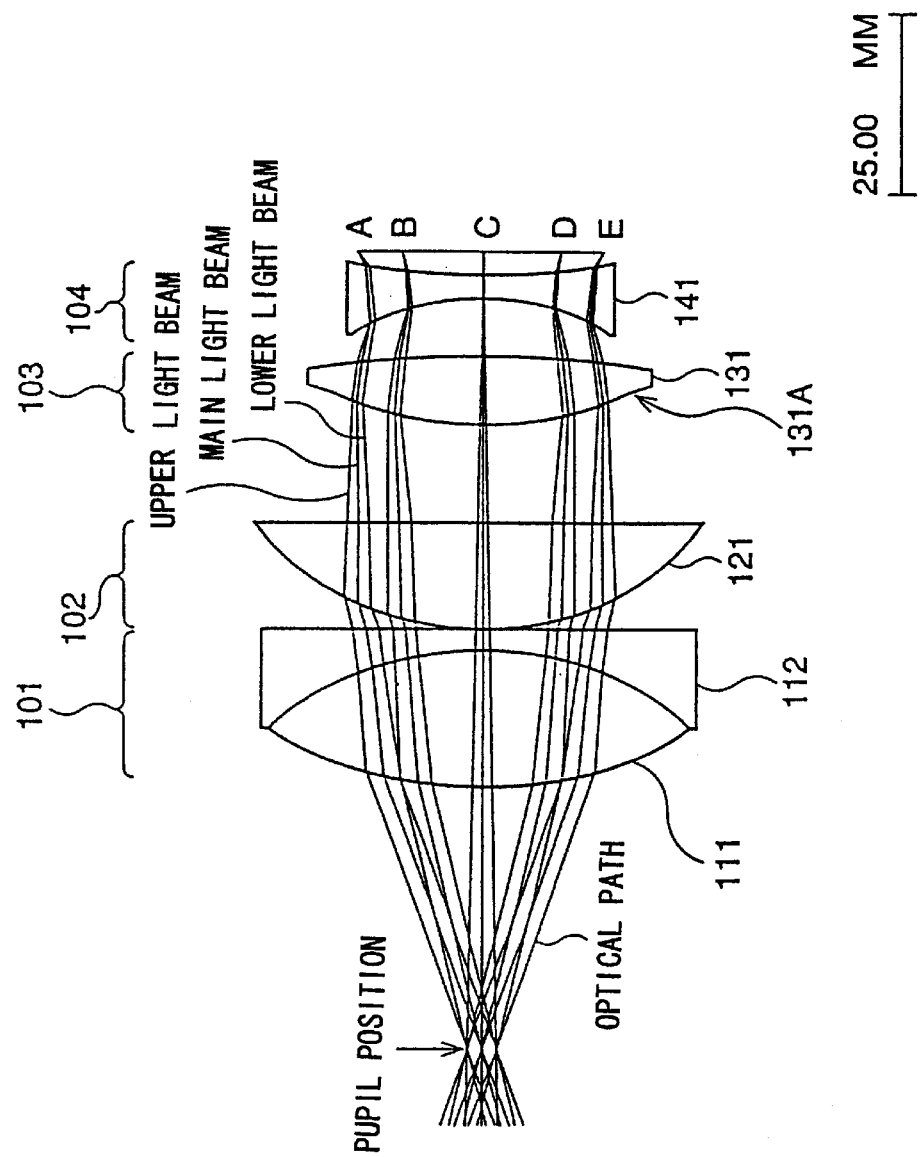
FIG. 22 is a diagram showing a constructional example of the first embodiment of an ocular lens constructing an enlargement optical system.

FIG. 22, accordingly, shows a constructional example of the first embodiment of the ocular lenses which are used as lenses 13L and 13R constructing the enlargement optical systems.

As mentioned above, a request to make the eye relief of the ocular lens long and a request to increase the allowance amount for the deviation amount of the pupil position are contradictory requests. It is, therefore, necessary to set the eye relief and the allowance amount of the deviation of the pupil position to values which can be practically permitted in consideration of the balance between them.

In the ocular lens of the first embodiment in FIG. 22 (the same shall also similarly apply to ocular lenses in embodiments, which will be explained hereinlater), the eye relief is set to, for example, 35 mm (millimeters) or more and the allowance amount of the deviation of the pupil position is set to, for example, ±9 mm. Further, the angle of view is set so that the horizontal angle of view (total angle) of 35° or more and the diagonal field angle (total angle) of 40° or more can be assured.

For example, in binoculars or the like, the eye relief is generally set to about 20 mm. However, the eye relief is set to 35 mm or more here in a manner such that in the case where the ocular lens is used in the display apparatus 7 fixed to an object other than the user as mentioned above, even if the user with glasses moves to a certain degree in the optical axial direction, the glasses do not come into contact with the ocular lens.

Since the horizontal angle of view where the user feels presence is usually equal to 30° or more, the horizontal angle of view is set to 35°.

In FIG. 22, the ocular lens is made up of a (5 elements in 4 groups) lens. That is, the ocular lens (optical system) is constructed by sequentially arranging a first lens group 101, a second lens group 102, a third lens group 103, and a fourth lens group 104 in accordance with this order from the pupil side. In FIG. 22, for example, a screen to which an image for forming a virtual image is projected, a display panel to display the video image for forming the virtual image, or the like is disposed on the right side of the fourth lens group 104. By seeing the image from the left side of the first lens group 101, the virtual image can be observed.

The first lens group 101 (first lens group) is constructed by joining a lens 111 as a positive lens and a lens 112 as a negative lens. The lens 111 is arranged on the pupil side and the lens 112 is arranged on the side (screen side) opposite to the pupil, respectively.

The second lens group 102 (second lens group) is constructed by a lens 121 as a positive lens. Further, a shape coefficient of the second lens group 102 has a value larger than 0.5. That is, now assuming that a radius of curvature of the surface on the pupil side of the second lens group 102 is set to r4 and a radius of curvature of the surface on the side (screen side) opposite to the pupil side is set to r5, respectively, a shape coefficient $sf_2$ of the second lens group 102 is expressed by the following equation.

$$sf_2=(r5+r4)/(r5-r4) \tag{5}$$

The second lens group 102 is constructed so that the shape coefficient $sf_2$ satisfies the following relational expression.

$$0.5<sf_2 \tag{6}$$

Figure 23:
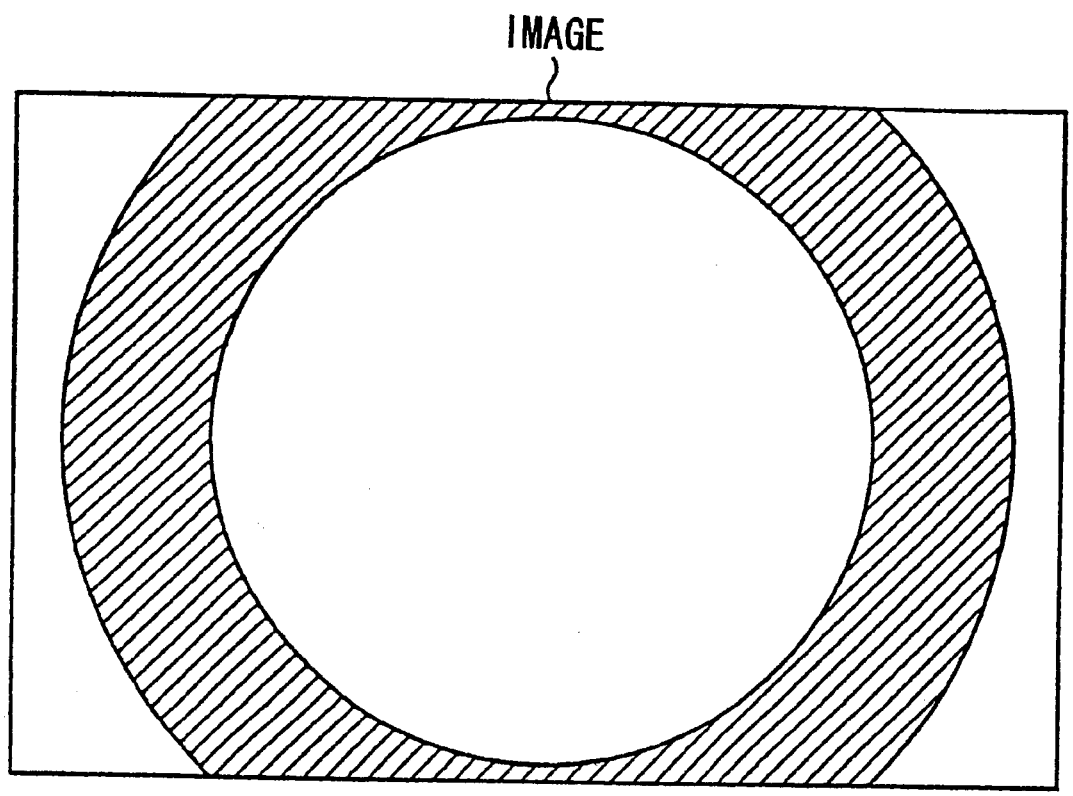
FIG. 23 is a diagram showing an intermediate region between the center and the edge of a virtual image.
Figure 25A:
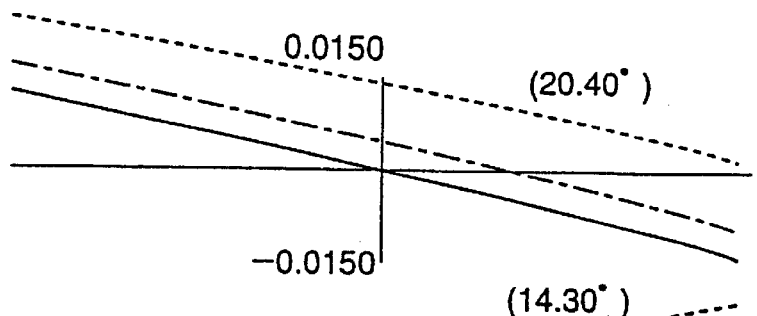
FIGS. 25A to 25E are diagrams showing the lateral aberrations of the ocular lens in FIG. 22.
Figure 25B:
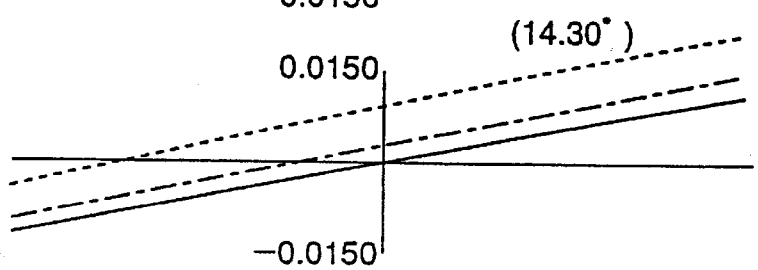
Figure 25C:
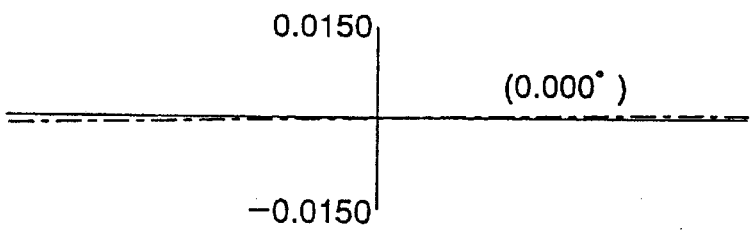
Figure 25D:
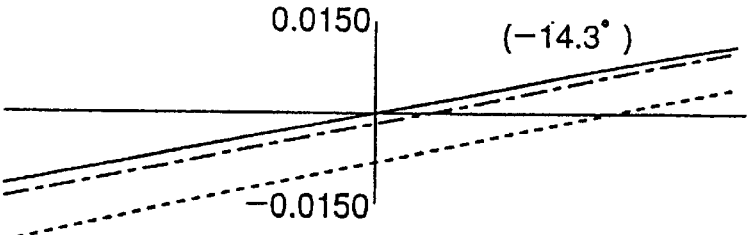
Figure 25E:
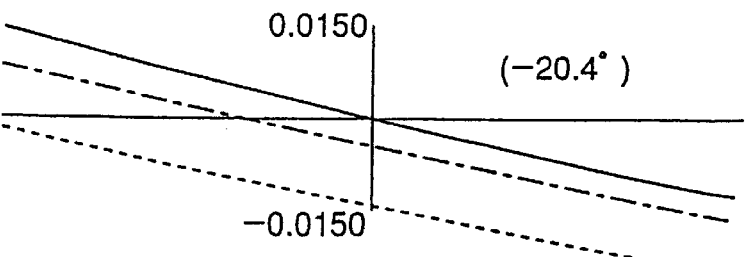
Figure 29A:
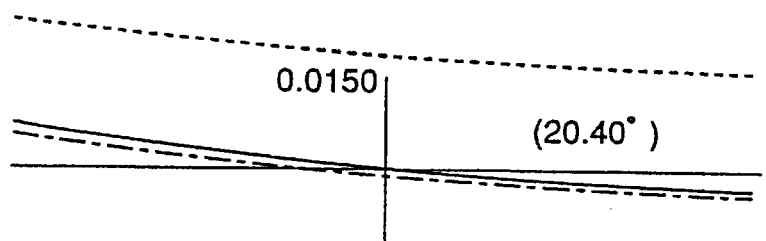
FIGS. 29A to 29E are diagrams showing lateral aberrations of the ocular lens in FIG. 22.
Figure 29B:
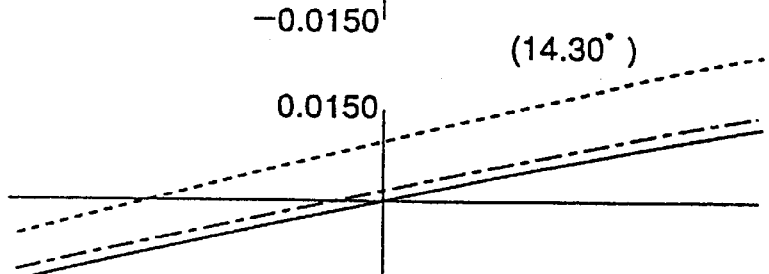
Figure 29C:
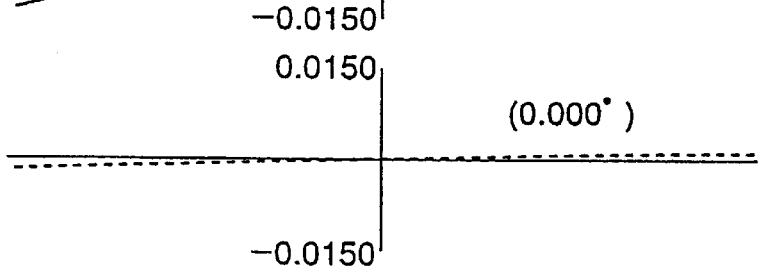
Figure 29D:
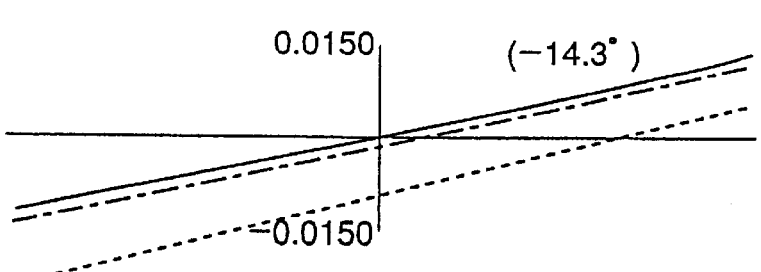
Figure 29E:
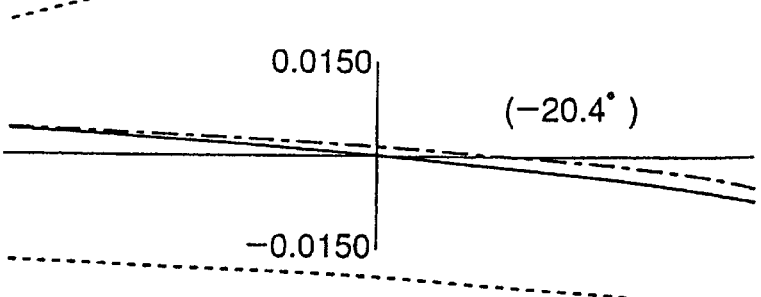
Figure 30A:
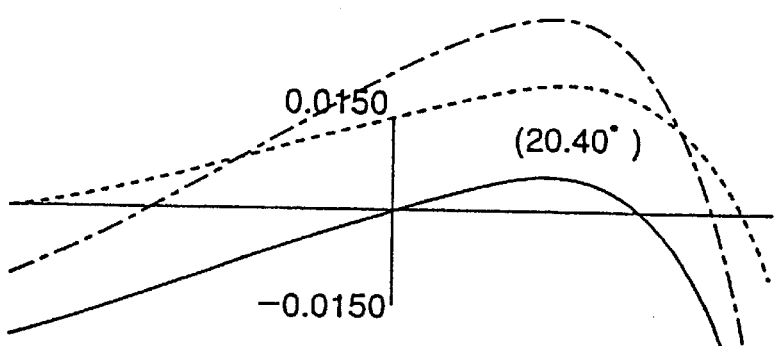
FIGS. 30A to 30E are diagrams showing lateral aberrations of the ocular lens in FIG. 22 in the case where the pupil position is deviated.
Figure 30B:
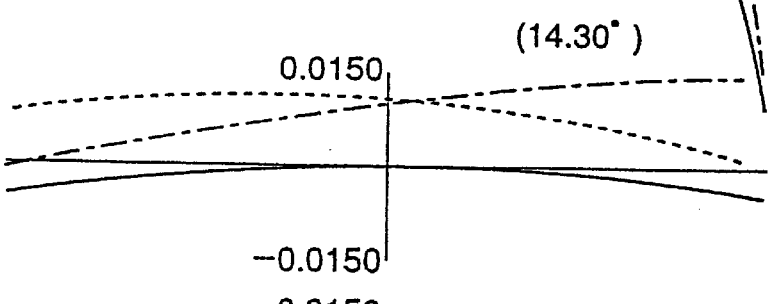
Figure 30C:
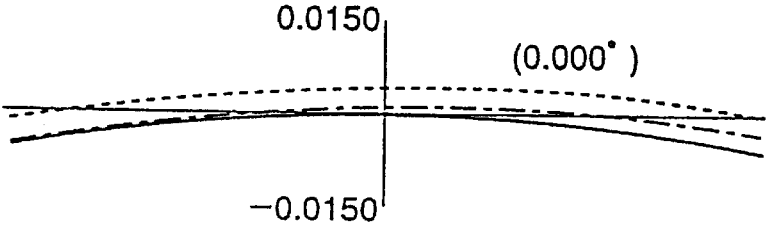
Figure 30D:
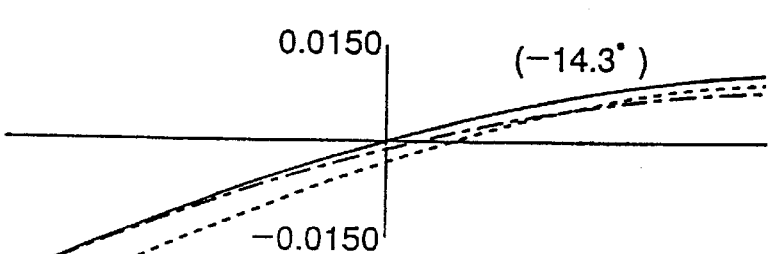
Figure 30E:
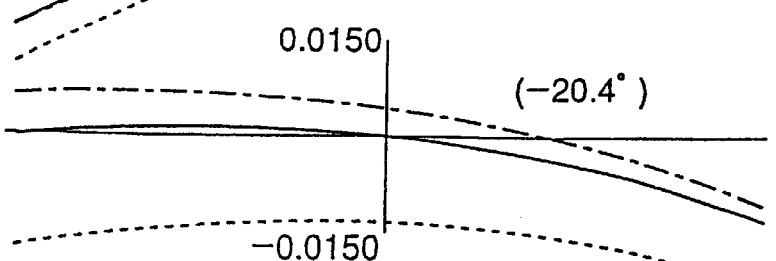

The reason why the shape coefficient of the second lens group 102 is set to the value larger than 0.5 is because if it is equal to a value of 0.5 or less, an astigmatism is large and resolution in an intermediate region between the center and the edge of a virtual image which is observed through the ocular lens as shown in a hatched region in FIG. 23 deteriorates due to a drop of resolution of the ocular lens.

It is desirable to set the shape coefficient of the second lens group 102 to a value larger than 0.5 and it is not a situation that it cannot be set to a value of 0.5 or less.

The third lens group 103 (third lens group) is also constructed by a lens 131 as a positive lens.

The fourth lens group 104 (fourth lens group) is constructed by a lens 141 as a negative lens.

Among the foregoing first to fourth lens groups 101 to 104, in FIG. 22, only a surface 131A on the pupil side of the lens 131 constructing the third lens group 103 is set to an aspherical surface. Further, in this case, now assuming that a quartic aspherical coefficient of the surface 131A on the pupil side of the third lens group 103 is set to $a_{31}$ and the focal distance of the whole system of the ocular lens is set to f and a predetermined coefficient is set to $k_{31}$, respectively, the coefficient $k_{31}$ is set so as to satisfy the following relational expression.

$$-1.3<k_3<0.6$$

where, $$a_{31}=(k_{31}/f)^3 \tag{7}$$

This is because when the coefficient $k_{31}$ is equal to or less than −1.3, an image surface in the hatched intermediate region in FIG. 23 (image surface in the meridional direction) is excessively bent in the positive direction, and when the pupil is moved, a coma aberration increases in the peripheral (edge) portion of the picture plane of the video image, and the resolution eventually deteriorates. On the other hand, this is because when the coefficient $k_{31}$ is equal to or larger than 0.6, the image surface of the peripheral portion of the picture plane of the video image is excessively bent in the negative direction and the resolution deteriorates.

The quartic aspherical coefficient of the lens defines a sag amount of the aspherical surface of the lens together with a sextic aspherical coefficient. Now, assuming that the sag amount is equal to Z and the quartic or sextic aspherical coefficient is labeled as a or b, respectively, the sag amount Z is expressed by the following equation.

$$Z=ch^2/(1+(1-(1+K)c^2h^2)^{1/2})+ah^4+bh^6 \tag{8}$$

where, c denotes a curvature at a vertex of the surface, h indicates a height from the optical axis, and K shows a conical coefficient, respectively. It is now assumed that K=0.

It is not limited to a condition such that the coefficient $k_{31}$ cannot be set to a value out of the range shown in the relational expression (7). However, in case of setting it to a value out of the range of the relational expression (7), the performance of the ocular lens is lower than the following performance.

That is, in the first embodiment of the ocular lens shown in FIG. 22 (the same shall also similarly apply in embodiments of ocular lenses, which will be explained hereinlater), three optical paths are collected as one set and five sets of optical paths A to E are shown. However, for example, now considering the three optical paths on the optical axis, these three optical paths sequentially show the upper light beam, main light beam, and lower light beam in accordance with the order from the top, respectively.

In the case where the pupil exists on the optical axis, a range when a difference between the lateral aberrations of the upper light beam and the lower light beam on the image surface is equal to or larger than 2 minutes 50 seconds (=0.0472°) is set to a range where the resolution of the ocular lens deteriorates.

That is, when the video image (virtual image) is observed through the ocular lens, it is desirable that the pixels of the observation video image can be distinguished. In this case, it is required that each light beam such as upper light beam, lower light beam, or the like which passes through the ocular lens forms an image with an aberration of 1 to 2 pixels or less. On the other hand, it is now assumed that, for example, a virtual image of a video image of high resolution such as 1600×1200 pixels (lateral×vertical) or the like is observed. Now, assuming that the horizontal angle of visibility is equal to or larger than 30°, for instance, 35°, a case where the difference between the lateral aberrations of the upper and lower light beams is equal to 2 minutes 50 seconds for the horizontal angle of visibility of 35° corresponds to the presence of resolution of 1/741 for the horizontal angle of view of 35°. This resolution becomes resolution corresponding to about two pixels in the video image constructed by 1600×1200 pixels.

Therefore, in the case where the video image constructed by 1600×1200 pixels is observed while keeping the horizontal angle of view of 35°, if two pixels cannot be distinguished, this state denotes that the resolution deteriorates.

A construction when the pupil exists on the optical axis is as mentioned above. However, in the case where the pupil does not exist on the optical axis (however, the case where the pupil exists in a range of ±9 mm from the optical axis as an allowance amount of the deviation of the pupil mentioned above), with respect to a falling-down of the image surface, a state when the difference between the lateral aberrations of the upper and lower light beams on the image surface is equal to or larger than 4 minutes denotes the range where the resolution deteriorates. As for the coma aberration, a state when at least one of the difference between the lateral aberrations of the upper light beam and the main light beam and the difference between the lateral aberrations of the lower light beam and the main light beam is equal to or larger than 4 minutes indicates the resolution deteriorating range.

When the coefficient $k_{31}$ is out of the range of the relational expression (7), the resolution deteriorates because of the meaning as mentioned above. Conditions regarding the aspherical coefficient, which will be explained hereinlater, are also set so as not to deteriorate the resolution in view of the meaning as mentioned above.

The conditions have been set here such that in the case where the video image constructed by 1600×1200 pixels is observed while keeping the horizontal angle of visibility of 35°, two pixels can be distinguished even in the worst case. However, more preferably, the conditions can be set so that one or less pixel can be distinguished. It is sufficient to set the difference between the lateral aberrations between the upper light beam and the lower light beam to one minute 20 seconds (0.022°) or less.

In the case where the coefficient $k_{31}$ is set to a value, for example, −0.800 in the intermediate range of the range shown in the relational expression (7), if each parameter of the ocular lens in FIG. 22 is set so that the shape coefficient $sf_2$ of the second lens group 102 satisfies the relational expression (6), for example, the following equations are obtained.

$$r0=\infty\; d0=35.000000$$

$$r1=50.24994\; d1=19.437488\; nd1=1.578294\; vd1=62.6745$$

$$r2=-41.86735\; d2=3.000000\; nd2=1.750353\; vd2=32.8672$$

$$r3=392.33990\; d3=0.100000$$

$$r4=38.58461\; d4=14.577210\; nd4=1.487000\; vd4=70.4000$$

$$r5=578.24030\; d5=14.098421$$

$$r6=38.98957\; d6=9.615117\; nd6=1.600080\; vd6=61.3702$$

$$r7=-138.62195\; d7=8.369858$$

$$r8=-31.64800\; d8=3.000000\; nd8=1.755000\; vd8=27.6000$$

$$r9=78.58062$$

$$a_{31}=-0.522192\times10^{-5}$$

$$b_{31}=-0.715067\times10^{-8}$$

$$f=46.112 \hspace{3em} (9)$$

where, r0 to r9 denote radii of curvature (mm) in the pupil surface, the surface on the pupil side of the lens 111, the surface on the screen side of the lens 111 (surface on the pupil side of the lens 112), the surface on the screen side of the lens 112, the surface on the pupil side of the lens 121, the surface on the screen side of the lens 121, the surface on the pupil side of the lens 131, the surface on the screen side of the lens 131, the surface on the pupil side of the lens 141, and the surface on the screen side of the lens 141, respectively. d0 denotes a distance (eye relief) (mm) from the pupil to the ocular lens, namely, to the lens 111 of the first lens group 101. d1 to d8 indicate a thickness of the lens 111, a thickness of the lens 112, an air gap between the lenses 112 and 121, a thickness of the lens 121, an air gap between the lenses 121 and 131, a thickness of the lens 131, an air gap between the lenses 131 and 141, and a thickness (mm) of the lens 141, respectively. Further, nd1, nd2, nd4, nd6, or nd8 denotes a refractive index in a d line of a nitride material of each of the lenses 111, 112, 121, 131, and 141, respectively. vd1, vd2, vd4, vd6, or vd8 denotes an Abbe number in the d line of the nitride material of each of the lens 111, 112, 121, 131, or 141, respectively. $a_{31}$ or $b_{31}$ denotes the quartic or sextic aspherical coefficient of the surface 131A on the pupil side of the third lens group 103 as an aspherical surface. f denotes the focal distance of the ocular lens in the light having a wavelength of 525 nm (nanometers).

In this case, the shape coefficient $sf_2$ of the second lens group 102 is equal to 1.143 and satisfies the relational expression (6).

FIG. 22 shows an optical path diagram which is drawn when the pupil exists on the optical axis in the case where each parameter of the ocular lens is set as shown in the equations (9). A spherical aberration, an astigmatism, and a distortion aberration in this case are as shown in FIG. 24 and the lateral aberrations on the image surface are as shown in FIG. 25.

In FIG. 24, as for the spherical aberration, the spherical aberrations of three kinds of light whose wavelengths are equal to 615 nm, 525 nm, and 470 nm are shown (therefore, by seeing the spherical aberration with respect to the light of each wavelength, it expresses the vertical chromatic aberration). FIG. 25 also shows the lateral aberrations with respect to three kinds of light whose wavelengths are equal to 615 nm, 525 nm, and 470 nm. In FIG. 25, the lateral aberration in only the meridional direction is shown. In FIG. 25, further, although five lateral aberrations of FIGS. 25A to 25E are shown, they are the lateral aberrations at the points A to E in FIG. 22. An observation angle of visibility as a diagonal angle is set to 40.8° (±20.4°). The points A to E in FIG. 22 are the points corresponding to the angles of visibility of 20.4°, 14.3°, 0° (on the optical axis), −14.3°, and −20.4°, respectively. Since the pupil diameter is generally equal to about 2 to 7 mm or about 3 to 8 mm, it is set to 4 mm as an almost intermediate value of them here.

The above point shall also similarly apply to spherical aberrations, astigmatisms, distortion aberrations, and lateral aberrations, which will be explained hereinlater.

FIG. 26 shows an optical path diagram which is drawn when the pupil is deviated from the optical axis by only 9 mm in the case where each parameter of the ocular lens is set as shown in the equations (9). Further, FIG. 27 shows lateral aberrations on the image surface in this case.

Subsequently, in the case where the coefficient $k_{31}$ is set to −1.3 as a lower limit value in the range shown in the relational expression (7), if each parameter of the ocular lens in FIG. 22 is set so that the shape coefficient $sf_2$ of the second lens group 102 satisfies the relational expression (6), for example, they are as follows.

$$r0=\infty\; d0=35.000000$$

$$r1=44.98305\; d1=21.788580\; nd1=1.551875\; vd1=64.4815$$

$$r2=-40.62049\; d2=3.000000\; nd2=1.751778\; vd2=31.0426$$

$$r3=-525.70221\; d3=7.145805$$

$$r4=36.37975\; d4=16.861732\; nd4=1.530210\; vd4=66.1883$$

$$r5=-260.49181\; d5=9.028761$$

$$r6=56.89054\; d6=4.448242\; nd6=1.487000\; vd6=70.4000$$

$$r7=-105.10564\; d7=5.392555$$

$$r8=-32.15009\; d8=4.186553\; nd8=1.755000\; vd8=27.6000$$

$$r9=64.84861$$

$$a_{31}=-0.224076\times10^{-4}$$

$b_{31}=0.101992\times10^{-7}$ $$f=46.112 \qquad (10)$$

In this case, the shape coefficient $sf_2$ of the second lens group 102 is equal to 0.755 and satisfies the relational expression (6).

In the case where each parameter of the ocular lens is set as shown in the equations (10), when the pupil exists on the optical axis, a spherical aberration, an astigmatism, and a distortion aberration are as shown in FIG. 28. Lateral aberrations on the image surface are as shown in FIG. 29.

FIG. 30 shows lateral aberrations on the image surface when the pupil is deviated from the optical axis by only 9 mm in the case where each parameter of the ocular lens is set as shown in the equations (10).

Subsequently, in the case where the coefficient $k_{31}$ is set to 0.6 as an upper limit value in the range shown in the relational expression (7), if each parameter of the ocular lens in FIG. 22 is set so that the shape coefficient $sf_2$ of the second lens group 102 satisfies the relational expression (6), for example, they are as follows.

$r0=\infty \ d0=35.000000$ $r1=50.05161 \ d1=19.201337 \ nd1=1.556786 \ vd1=64.1245$ $r2=-42.93164 \ d2=3.000000 \ nd2=1.750946 \ vd2=32.0814$ $r3=3414.53698 \ r3=0.100000$ $r4=38.22049 \ r4=20.261766 \ nr4=1.487000 \ vr4=70.4000$ $r5=-836.90401 \ r5=13.906944$ $r6=29.70857 \ r6=6.730841 \ nr6=1.591505 \ vr6=61.8656$ $r7=183.26213 \ r7=6.224333$ $r8=-30.65892 \ r8=3.00000 \ nr8=1.755000 \ vr8=27.6000$ $r9=91.55184$ $a_{31}=0.220299\times10^{-5}$ $b_{31}=-0.245065\times10^{-7}$ $$f=46.112 \qquad (11)$$

In this case, the shape coefficient $sf_2$ of the second lens group 102 is equal to 0.913 and satisfies the relational expression (6).

Figures 31A, 31B, 31C:
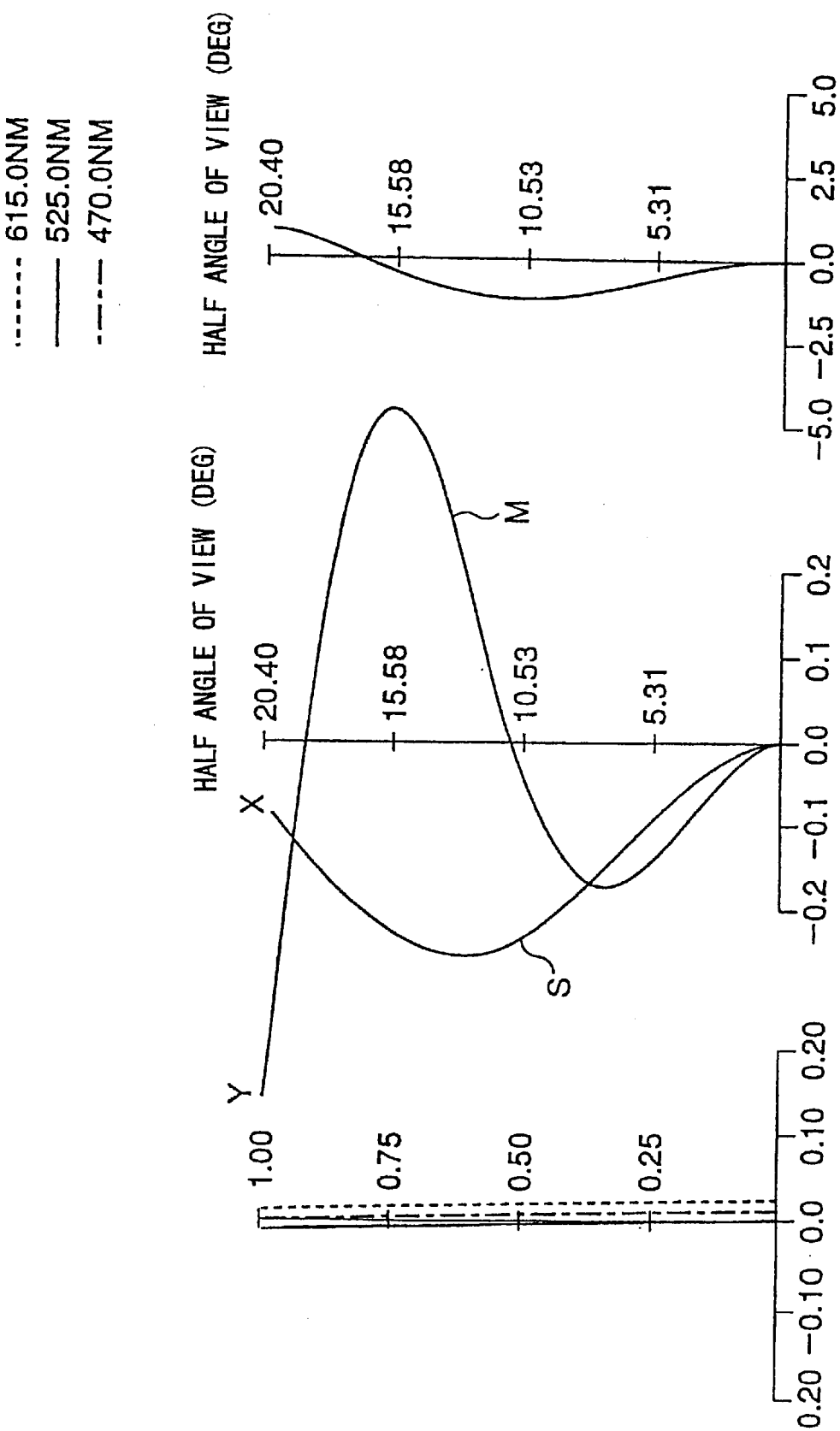
FIG. 31 is a diagram showing a spherical aberration (chromatic aberration), an astigmatism, and a distortion aberration of the ocular lens in FIG. 22.

In the case where each parameter of the ocular lens is set as shown in the equations (11), when the pupil exists on the optical axis, a spherical aberration, an astigmatism, and a distortion aberration are as shown in FIG. 31. Lateral aberrations on the image surface are as shown in FIG. 32.

FIG. 33 shows lateral aberrations on the image surface when the pupil is deviated from the optical axis by only 9 mm in the case where each parameter of the ocular lens is set as shown in the equations (11).

Figure 34:
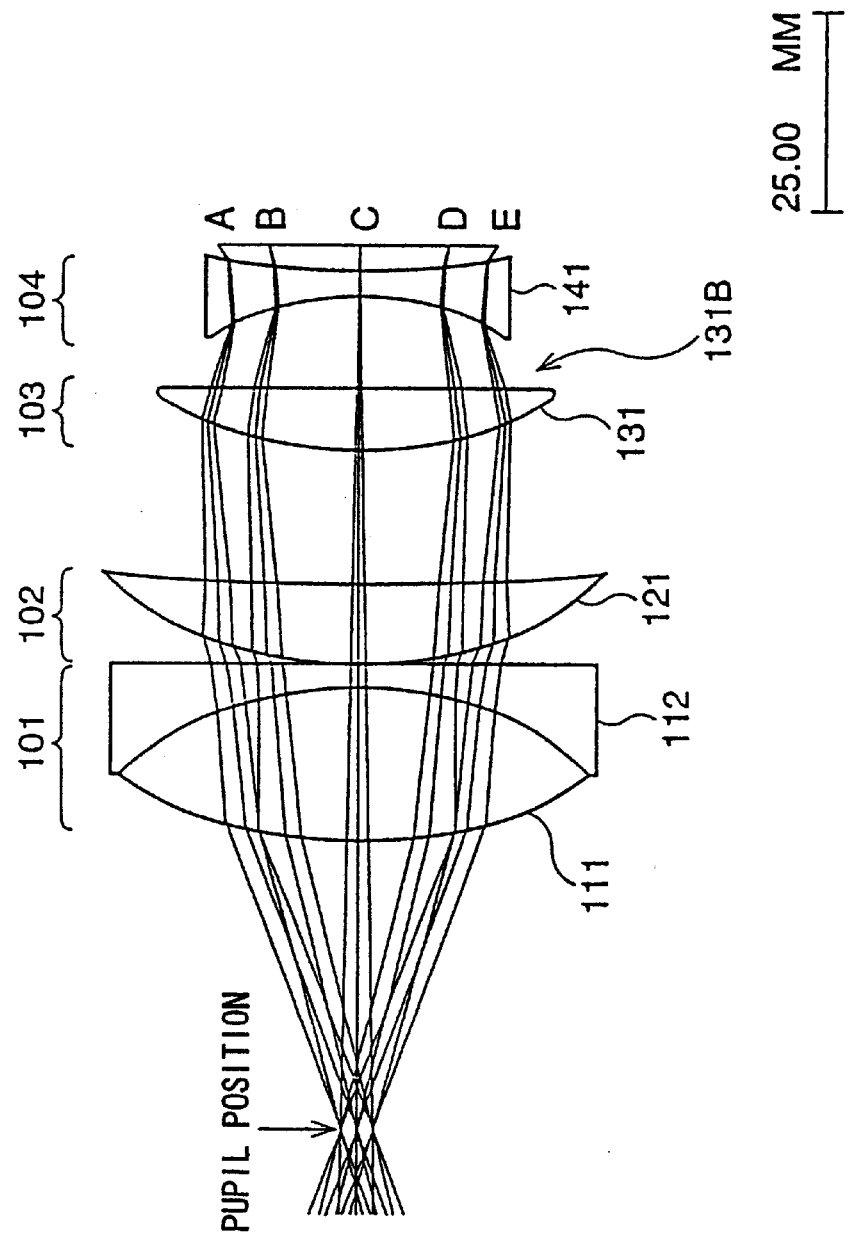
FIG. 34 is a diagram showing a constructional example of the second embodiment of an ocular lens constructing an enlargement optical system.
Figure 36A:
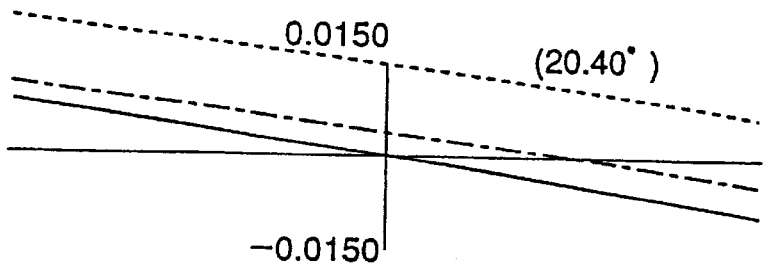
FIGS. 36A to 36E are diagrams showing lateral aberrations of the ocular lens in FIG. 34.
Figure 36B:
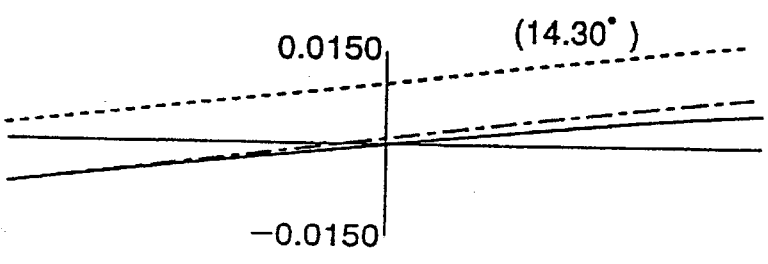
Figure 36C:
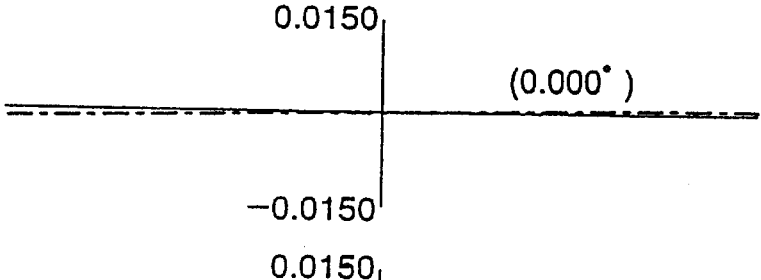
Figure 36D:
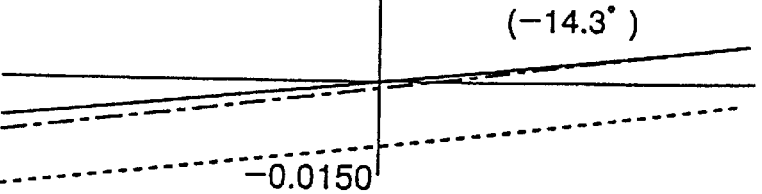
Figure 36E:
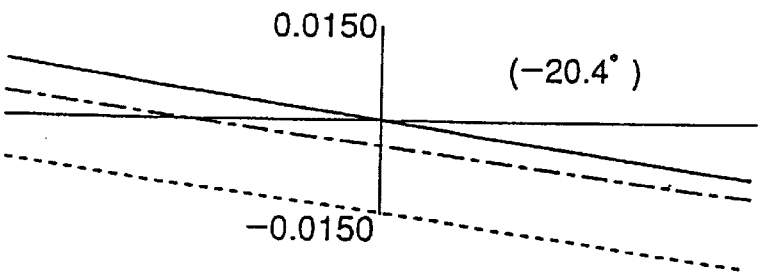
Figure 38A:
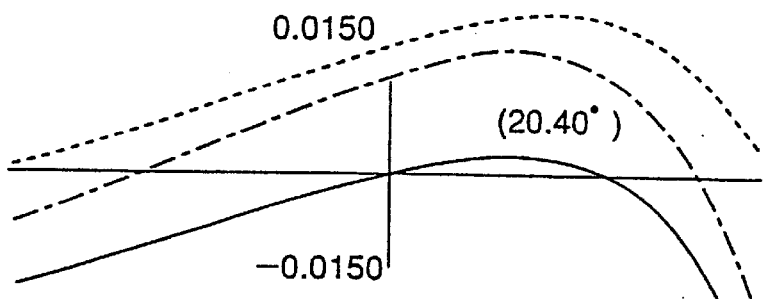
FIGS. 38A to 38E are diagrams showing lateral aberrations of the ocular lens in FIG. 34 in the case where the pupil position is deviated.
Figure 38B:
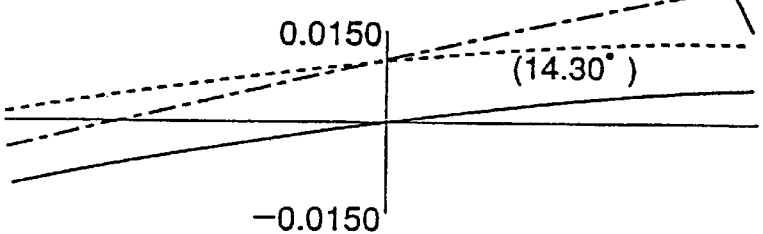
Figure 38C:
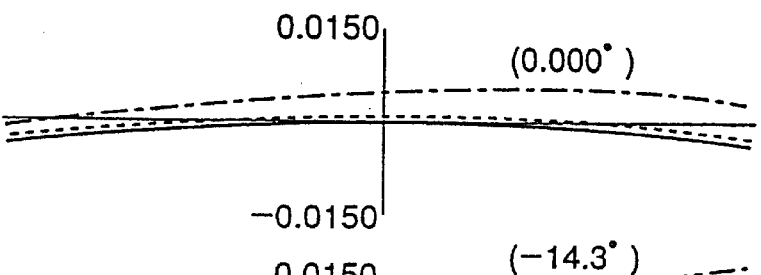
Figure 38D:
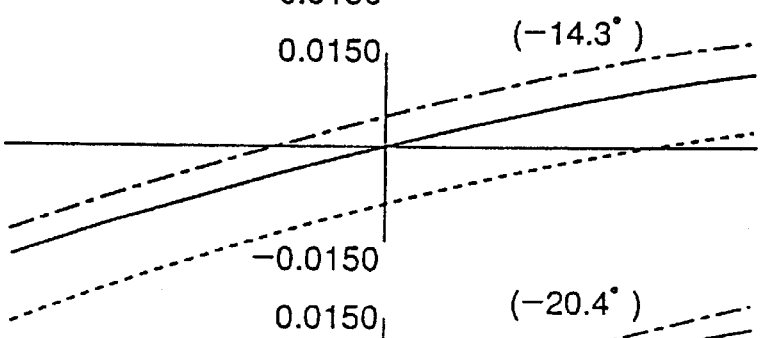
Figure 38E:
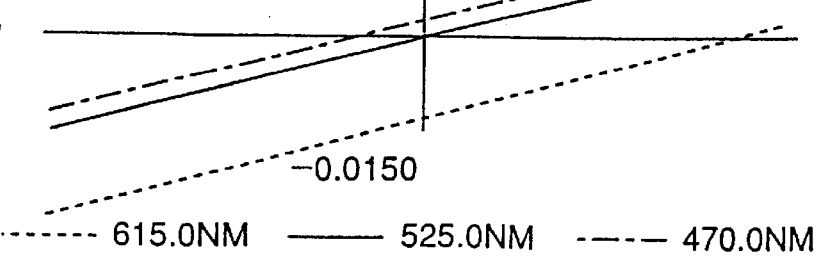
Figure 40A:
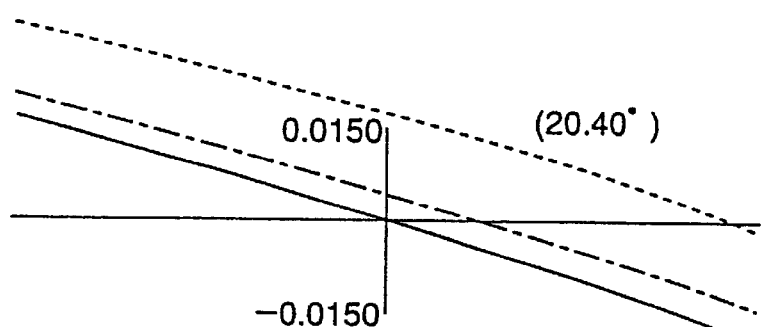
FIGS. 40A to 40E are diagrams showing lateral aberrations of the ocular lens in FIG. 34.
Figure 40B:
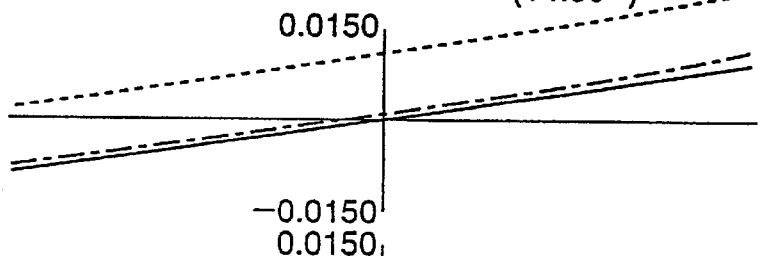
Figure 40C:
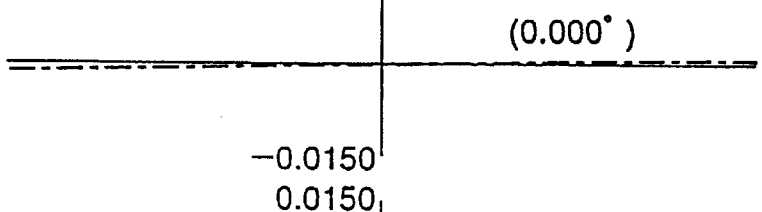
Figure 40D:
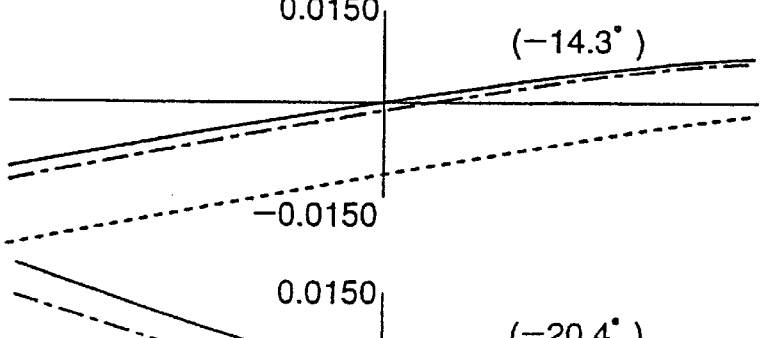
Figure 40E:
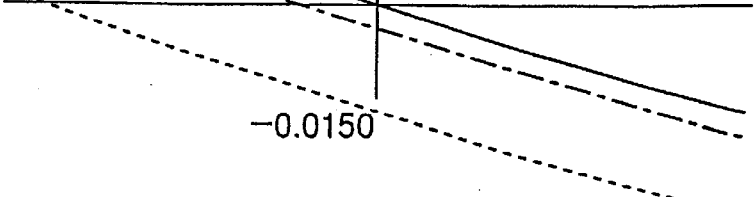
Figure 41A:
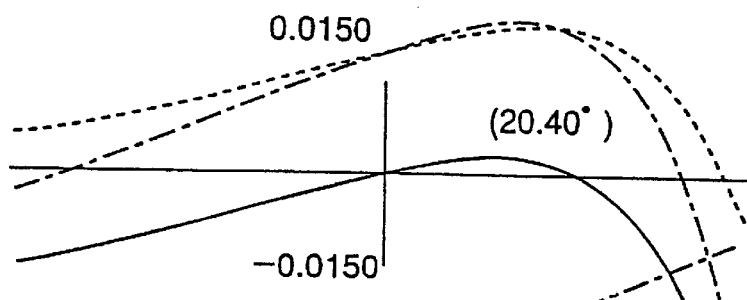
FIGS. 41A to 41E are diagrams showing lateral aberrations of the ocular lens in FIG. 34 in the case where the pupil position is deviated.
Figure 41B:
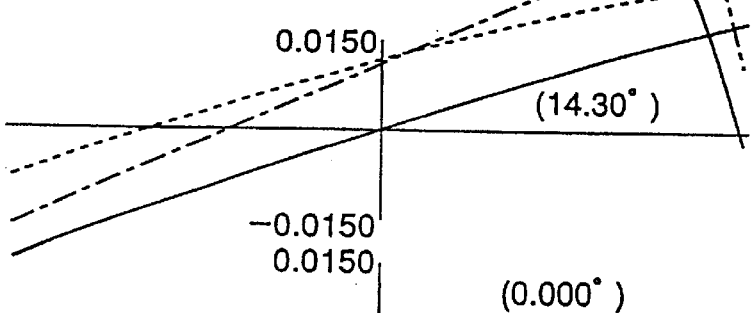
Figure 41C:
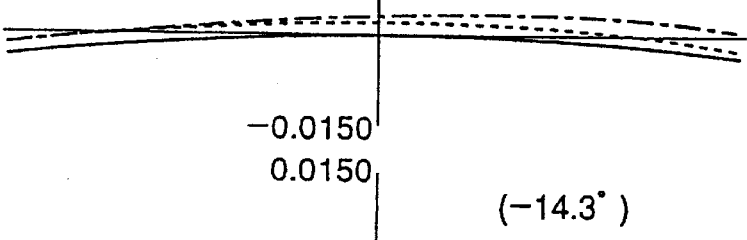
Figure 41D:
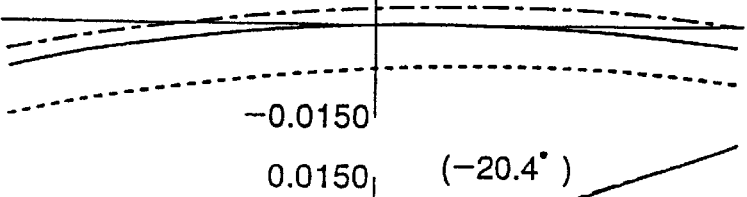
Figure 41E:
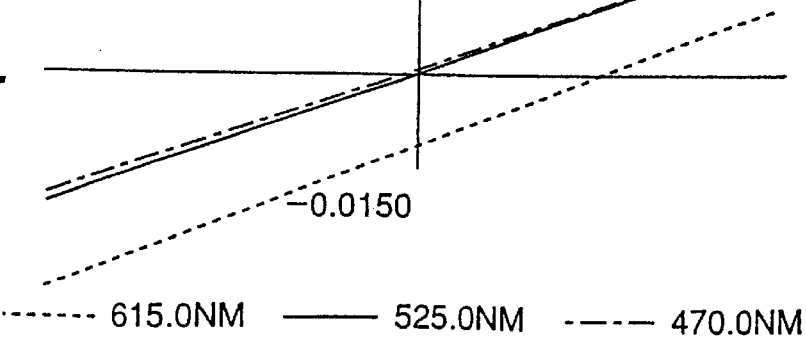
Figure 44A:
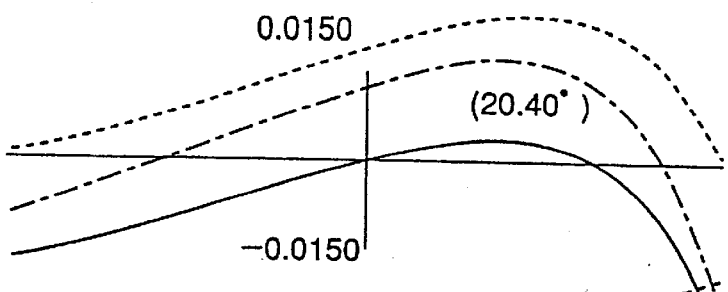
FIGS. 44A to 44E are diagrams showing lateral aberrations of the ocular lens in FIG. 34 in the case where the pupil position is deviated.
Figure 44B:
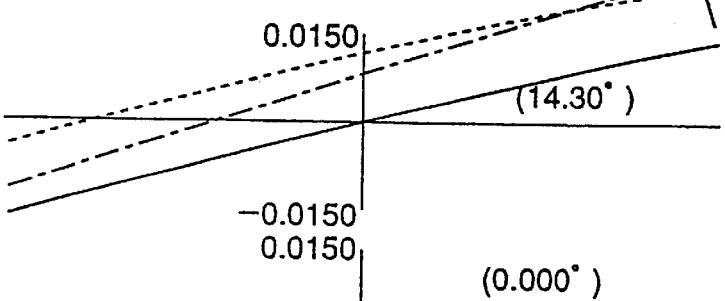
Figure 44C:
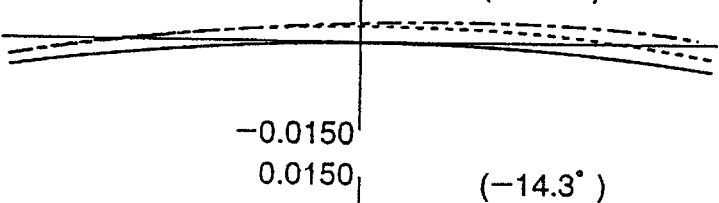
Figure 44D:
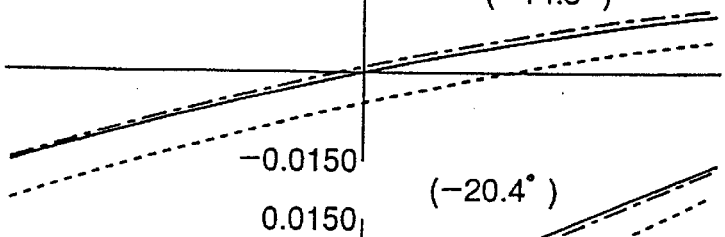
Figure 44E:
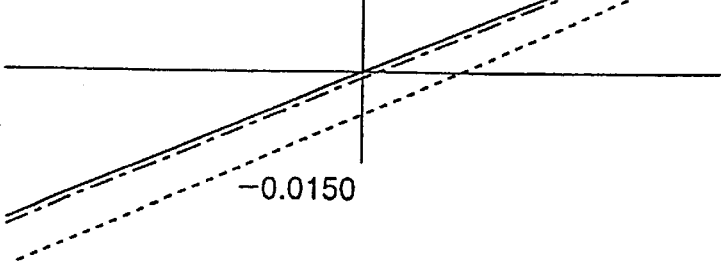

Subsequently, FIG. 34 shows a constructional example of the second embodiment of the ocular lens which is used as lenses 13L and 13R constructing the enlargement optical systems. In the diagram, portions corresponding to those in case of FIG. 22 are designated by the same reference numerals. That is, the ocular lens is constructed fundamentally in a manner similar to the case of FIG. 22.

Even in the second embodiment, therefore, the ocular lens is constructed by the (5 elements in 4 groups) lens. That is, the ocular lens is constructed by sequentially arranging the first lens group 101, second lens group 102, third lens group 103, and fourth lens group 104 in accordance with this order from the pupil side. The first lens group 101 is constructed by joining the lens 111 as a positive lens and the lens 112 as a negative lens. The second lens group 102 is constructed by the lens 121 as a positive lens. Further, to prevent the deterioration of the resolution, the shape coefficient $sf_2$ of the second lens group 102 is also set to a value such as to satisfy the relational expression (6), namely, a value larger than 0.5.

The third lens group 103 is constructed by the lens 131 as a positive lens. The fourth lens group 104 is constructed by the lens 141 as a negative lens.

In the second embodiment, however, among the above first to fourth lens groups 101 to 104, only the surface 131B on the screen side of the lens 131 constructing the third lens group 103 is an aspherical surface. Further, in this case, now assuming that the quartic aspherical coefficient of the surface 131B on the screen side of the third lens group 103 is set to $a_{32}$ and a predetermined coefficient is set to $k_{32}$, respectively, the coefficient $k_{32}$ is set so as to satisfy the following relational expression.

$$-0.9<k_{32}<1.4 \text{ where, } a_{32}=(k_{32}/f)^3 \qquad (12)$$

This is because when the coefficient $k_{32}$ is equal to or less than $-0.9$, an image surface in the peripheral portion of the picture plane of the video image is excessively bent in the negative direction and the resolution deteriorates. On the other hand, this is because when the coefficient $k_{32}$ is equal to or larger than 1.4, the image surface in the peripheral portion of the picture plane of the video image is excessively bent in the positive direction and the resolution also deteriorates when the pupil is moved.

Subsequently, in the case where the coefficient $k_{32}$ is set to, for example, 1.000 as a value in the intermediate range of the range shown in the relational expression (12), if each parameter of the ocular lens in FIG. 34 is set so that the shape coefficient $sf_2$ of the second lens group 102 satisfies the relational expression (6), for example, they are as follows.

$r0=\infty \ d0=35.000000$ $r1=49.57582 \ d1=18.673001 \ nd1=1.573581 \ vd1=62.9774$ $r2=-45.49569 \ d2=3.000000 \ nd2=1.751542 \ vd2=31.3301$ $r3=239.93171 \ d3=0.100000$ $r4=43.29904 \ d4=10.852289 \ nd4=1.598668 \ vd4=61.4503$ $r5=192.70107 \ d5=17.389232$ $r6=34.67545 \ d6=9.794774 \ nd6=1.620000 \ vd6=60.3000$ $r7=-197.44785 \ d7=9.494566$ $r8=-32.76053 \ d8=3.000000 \ nd8=1.755000 \ vd8=27.6000$ $r9=82.51277$ $a_{32}=0.101990\times10^{-4}$ $b_{32}=-0.956666\times10^{-8}$ $$f=46.121 \qquad (13)$$

where, $b_{32}$ denotes a sextic aspherical coefficient of the surface 131B on the screen side of the third lens group 103 as an aspherical surface.

In this case, the shape coefficient $sf_2$ of the second lens group 102 is equal to 1.580 and satisfies the relational expression (6).

In the case where each parameter of the ocular lens is set as shown in the equations (13), when the pupil exists on the optical axis, an optical path diagram as shown in FIG. 34 is drawn. In this case, a spherical aberration, an astigmatism, and a distortion aberration are as shown in FIG. 35. Lateral aberrations on the image surface are as shown in FIG. 36.

FIG. 37 shows an optical path diagram which is drawn when the pupil is deviated from the optical axis by only 9 mm in the case where each parameter of the ocular lens is set as shown in the equations (13). Further, FIG. 38 shows lateral aberrations on the image surface in this case.

Subsequently, in the case where the coefficient $k_{32}$ is set to −0.9 as a lower limit value in the range shown in the relational expression (12), if each parameter of the ocular lens in FIG. 34 is set so that the shape coefficient $sf_2$ of the second lens group 102 satisfies the relational expression (6), for example, they are as follows.

$r0=\infty\ d0=35.000000$ $r1=47.66856\ d1=21.334572\ nd1=1.555536\ \upsilon d1=64.2144$ $r2=-43.66090\ d2=3.000000\ nd2=1.751888\ \upsilon d2=30.9106$ $r3=7046.41554\ d3=0.100000$ $r4=35.63434\ d4=25.000000\ nd4=1.487000\ \upsilon d4=70.4000$ $r5=-881.17596\ d5=7.125332$ $r6=27.02964\ d6=5.467799\ nd6=1.487000\ \upsilon d6=70.4000$ $r7=60.81379\ d7=8.495934$ $r8=-25.69600\ d8=3.000000\ nd8=1.755000\ \upsilon d8=27.6000$ $r9=300.82749$ $a_{32}=-0.743508\times 10^{-5}$ $b_{32}=0.677046\times 10^{-7}$ $f=46.112$ \hfill (14)

In this case, the shape coefficient $sf_2$ of the second lens group 102 is equal to 0.922 and satisfies the relational expression (6).

In the case where each parameter of the ocular lens is set as shown in the equations (14), when the pupil exists on the optical axis, a spherical aberration, an astigmatism, and a distortion aberration are as shown in FIG. 39. Lateral aberrations on the image surface are as shown in FIG. 40.

FIG. 41 shows lateral aberrations on the image surface when the pupil is deviated from the optical axis by only 9 mm in the case where each parameter of the ocular lens is set as shown in the equations (14).

Subsequently, in the case where the coefficient $k_{32}$ is set to 1.4 as an upper limit value in the range shown in the relational expression (12), if each parameter of the ocular lens in FIG. 34 is set so that the shape coefficient $sf_2$ of the second lens group 102 satisfies the relational expression (6), for example, they are as follows.

$a_{32}=0.279861\times 10^{-4}$ $b_{32}=-0.339646\times 10^{-7}$ $f=46.112$ $r0=\infty\ d0=35.000000$ $r1=50.34425\ d1=16.590908\ nd1=1.590853\ \upsilon d1=61.9042$ $r2=-55.68133\ d2=3.000000\ nd2=1.752327\ \upsilon d2=30.3944$ $r3=224.40520\ d3=0.100000$ $r4=41.99334\ d4=8.854807\ nd4=1.620000\ \upsilon d4=60.3000$ $r5=101.12743\ d5=21.032002$ $r6=27.60385\ d6=13.502596\ nd6=1.533368\ \upsilon d6=65.9251$ $r7=-65.96967\ d7=5.164372$ $r8=-39.17709\ d8=3.000000\ nd8=1.755000\ \upsilon d8=27.6000$ $r9=51.70521$ \hfill (15)

In this case, the shape coefficient $sf_2$ of the second lens group 102 is equal to 2.420 and satisfies the relational expression (6).

In the case where each parameter of the ocular lens is set as shown in the equations (15), when the pupil exists on the optical axis, a spherical aberration, an astigmatism, and a distortion aberration are as shown in FIG. 42. Lateral aberrations on the image surface are as shown in FIG. 43.

Figure 45:
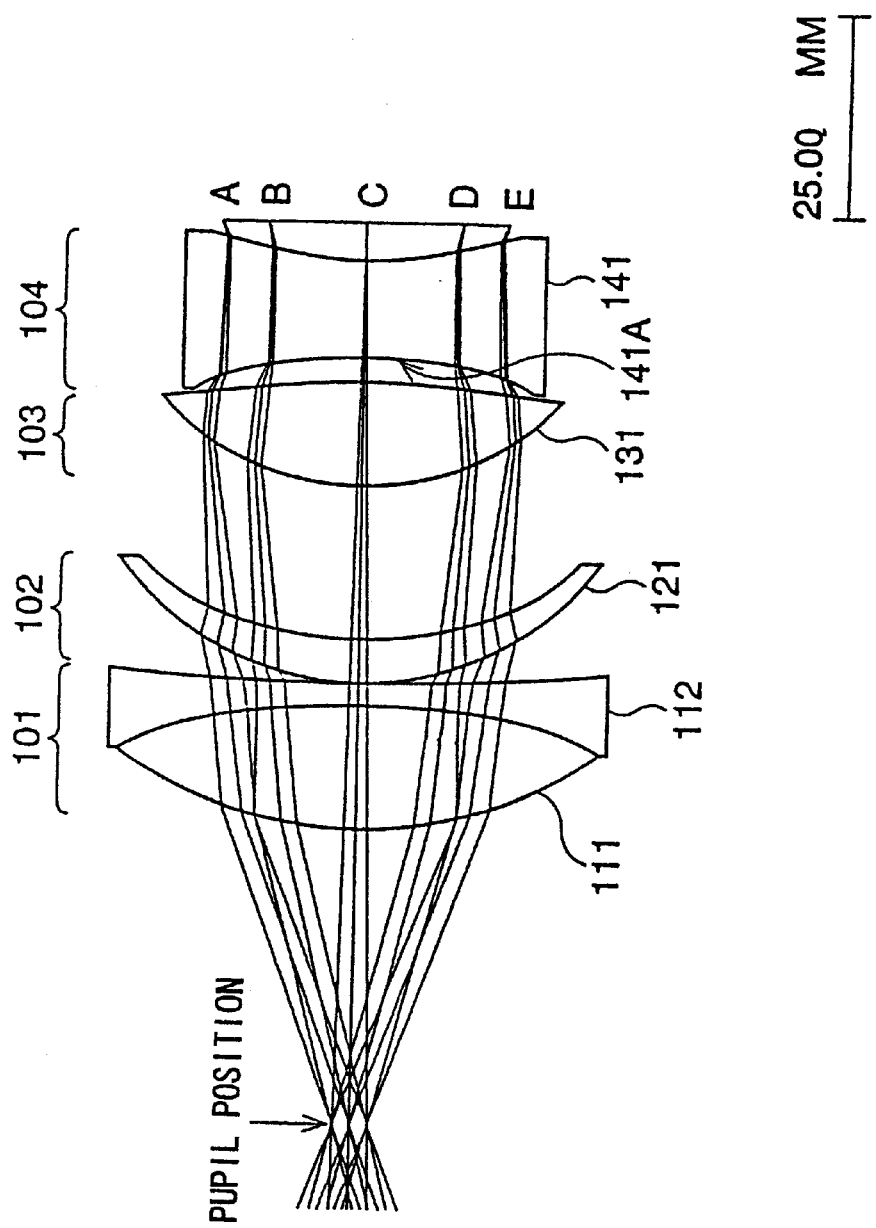
FIG. 45 is a diagram showing a constructional example of the third embodiment of an ocular lens constructing an enlargement optical system.

FIG. 45 shows a constructional example of the third embodiment of an ocular lens which is used as lenses 13L and 13R constructing the enlargement optical systems. In the diagram, portions corresponding to those in case of FIG. 22 are designated by the same reference numerals. That is, the ocular lens is constructed fundamentally in a manner similar to the case of FIG. 22.

Even in the third embodiment, therefore, the ocular lens is constructed by the (5 elements in 4 groups) lens. That is, the ocular lens is constructed by sequentially arranging the first lens group 101, second lens group 102, third lens group 103, and fourth lens group 104 in accordance with this order from the pupil side. The first lens group 101 is constructed by joining the lens 111 as a positive lens and the lens 112 as a negative lens. The second lens group 102 is constructed by the lens 121 as a positive lens. Further, to prevent the deterioration of the resolution, the shape coefficient $sf_2$ of the second lens group 102 is also set to a value such as to satisfy the relational expression (6), namely, a value larger than 0.5.

The third lens group 103 is constructed by the lens 131 as a positive lens. The fourth lens group 104 is constructed by the lens 141 as a negative lens.

In the third embodiment, however, among the above first to fourth lens groups 101 to 104, only the surface 141A on the pupil side of the lens 141 constructing the fourth lens group 104 is an aspherical surface. Further, in this case, now assuming that the quartic aspherical coefficient of the surface 141A on the pupil side of the fourth lens group 104 is set to $a_{41}$ and a predetermined coefficient is set to $k_{41}$, respectively, the coefficient $k_{41}$ is set so as to satisfy the following relational expression.

$-1.9 < k_{41} < -1.1$ where, $a_{41}=(k_{41}/f)^3$ \hfill (16)

This is because when the coefficient $k_{41}$ is equal to or less than −1.9, an image surface in the hatched intermediate region shown in FIG. 23 is excessively bent in the negative direction and the resolution deteriorates. On the other hand, this is because when the coefficient $k_{41}$ is equal to or larger than −1.1, the image surface in the peripheral portion of the picture plane of the video image falls down in the positive direction and the resolution deteriorates when the pupil is moved.

Subsequently, in the case where the coefficient $k_{41}$ is set to, for example, −1.500 as a value in the intermediate range of the range shown in the relational expression (16), if each parameter of the ocular lens in FIG. 45 is set so that the shape coefficient $sf_2$ of the second lens group 102 satisfies the relational expression (6), for example, they are as follows.

$r0=\infty \, d0=35.000000$ $r1=46.95438 \, d1=15.243933 \, nd1=1.624863 \, vd1=59.3331$ $r2=-81.59796 \, d2=3.000000 \, nd2=1.755000 \, vd2=27.6000$ $r3=262.88850 \, d3=0.100000$ $r4=35.32537 \, d4=5.265233 \, nd4=1.634506 \, vd4=57.5452$ $r5=42.57455 \, d5=18.825720$ $r6=29.86996 \, d6=13.203455 \, nd6=1.543031 \, vd6=65.1511$ $r7=-118.63999 \, d7=2.892257$ $r8=-251.38234 \, d8=11.893973 \, nd8=1.755000 \, vd8=27.6000$ $r9=40.33824$ $a_{41}=-0.344216\times 10^{-4}$ $b_{41}=0.373255\times 10^{-7}$ $f=46.112$ (17)

where, $b_{41}$ denotes a sextic aspherical coefficient of the surface 141A on the pupil side of the fourth lens group 104 as an aspherical surface.

In this case, the shape coefficient $sf_2$ of the second lens group 102 is equal to 10.746 and satisfies the relational expression (6).

Figures 46A, 46B, 46C:
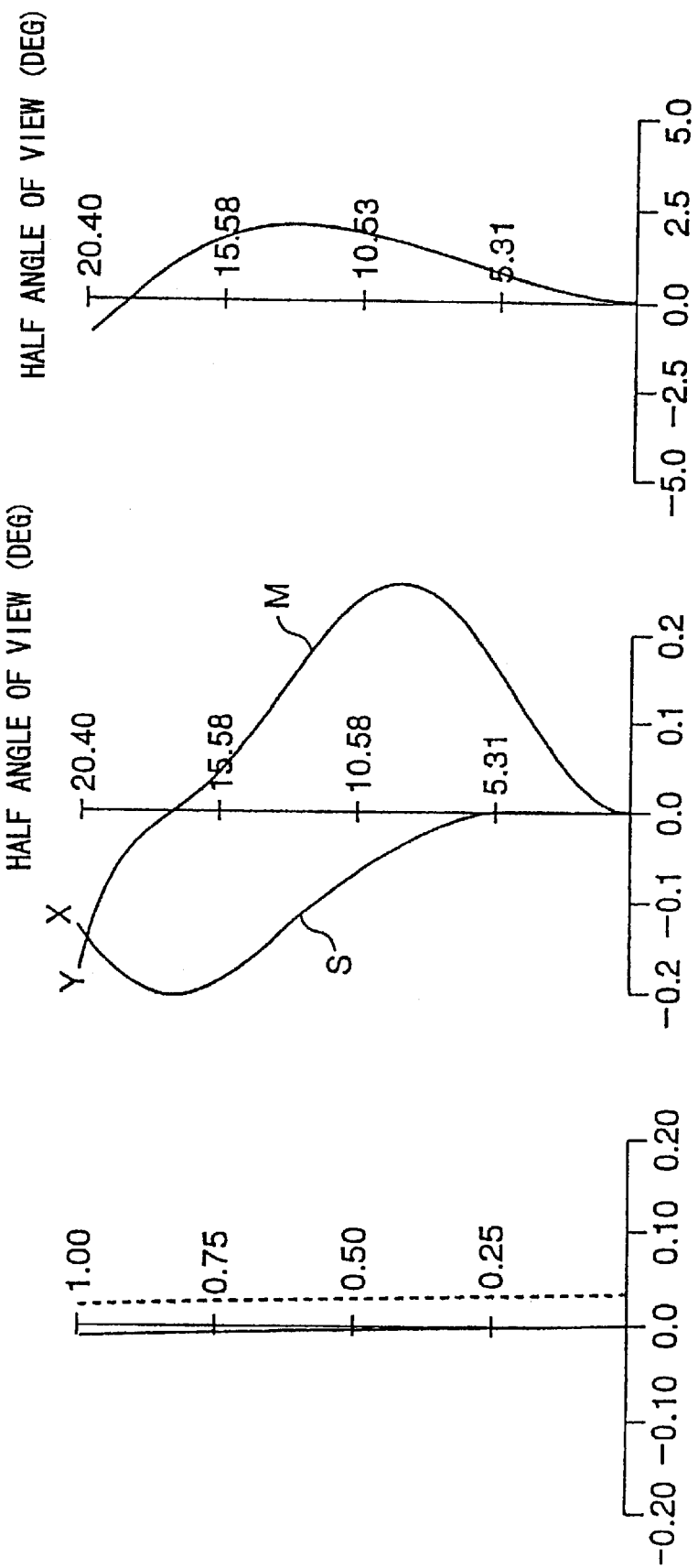
FIG. 46 is a diagram showing a spherical aberration (chromatic aberration), an astigmatism, and a distortion aberration of the ocular lens in FIG. 45.
Figure 47A:
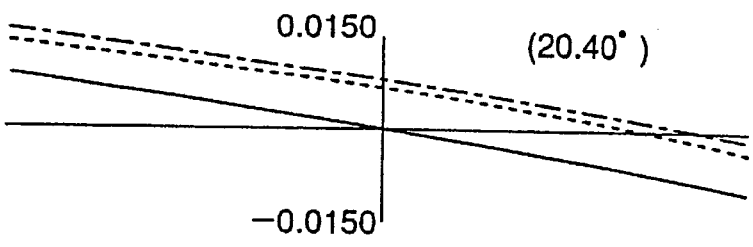
FIGS. 47A to 47E are diagrams showing lateral aberrations of the ocular lens in FIG. 45.
Figure 47B:
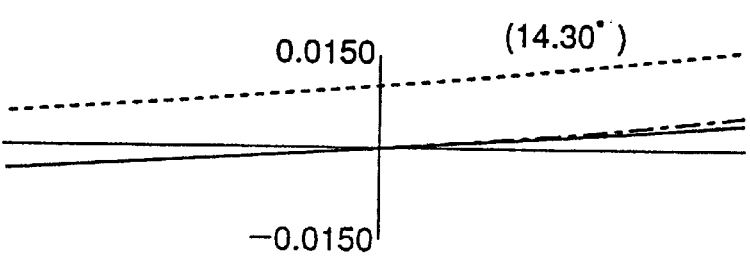
Figure 47C:
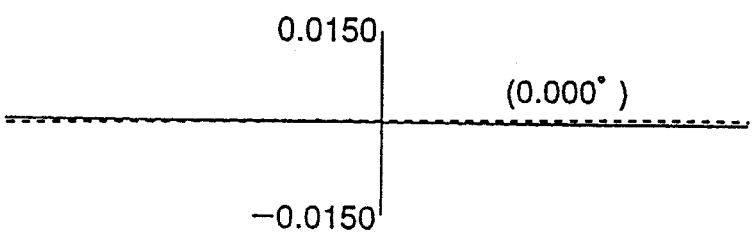
Figure 47D:
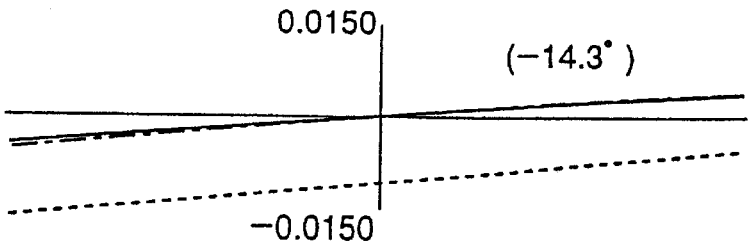
Figure 47E:
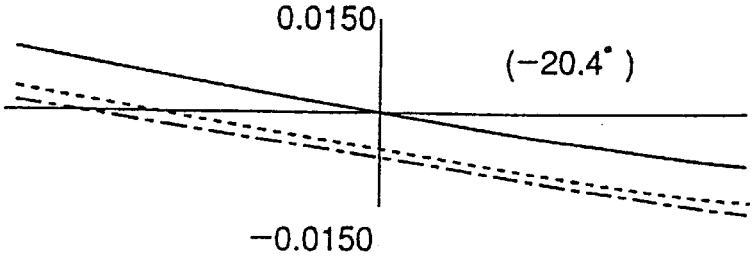

In the case where each parameter of the ocular lens is set as shown in the equations (17), when the pupil exists on the optical axis, an optical path diagram as shown in FIG. 45 is drawn. In this case, a spherical aberration, an astigmatism, and a distortion aberration are as shown in FIG. 46. Lateral aberrations on the image surface are as shown in FIG. 47.

Figure 48:
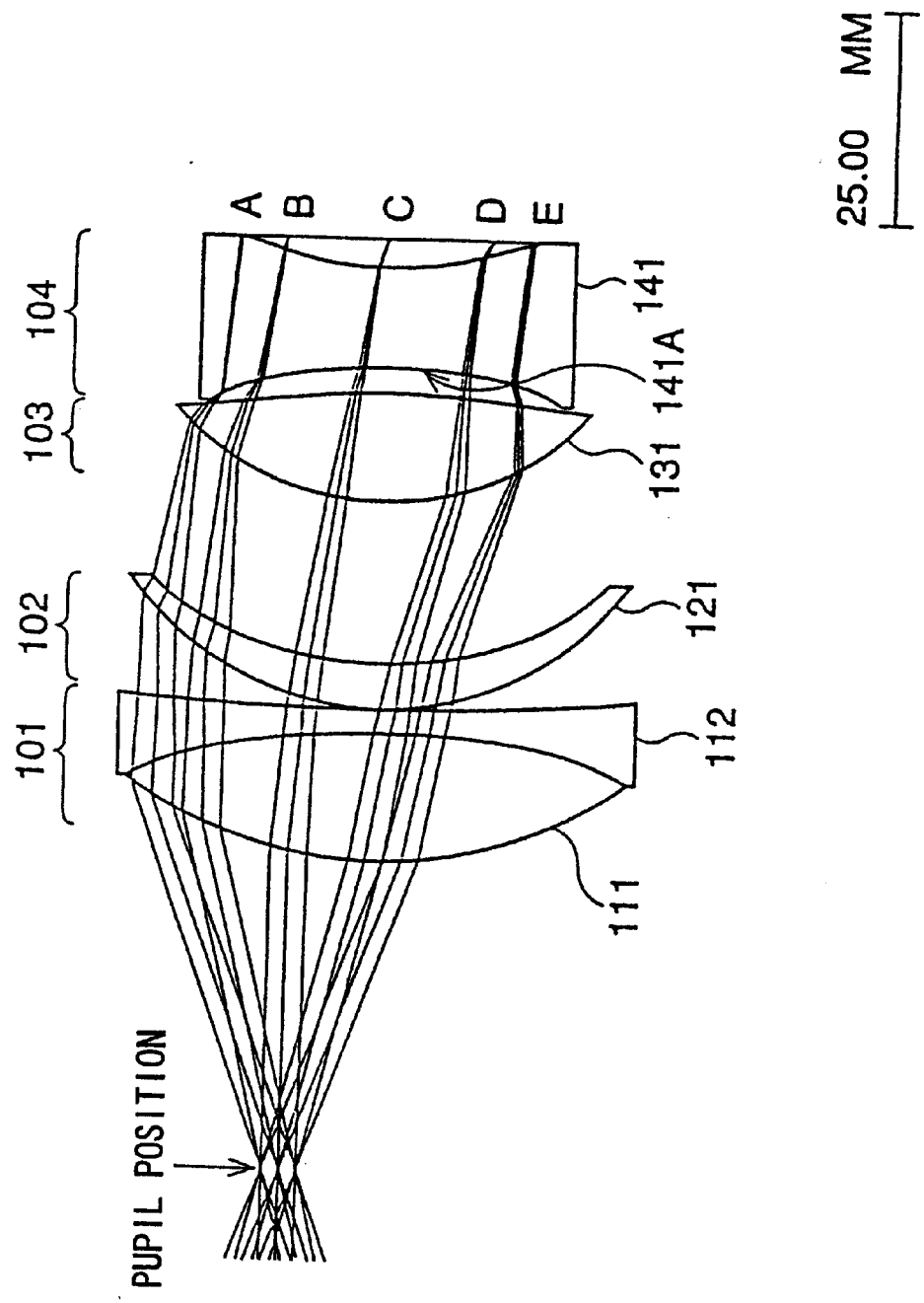
FIG. 48 is an optical path diagram showing an optical path in the case where the pupil position is deviated in FIG. 45.
Figure 51A:
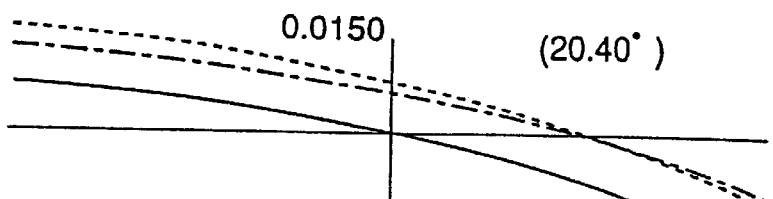
FIGS. 51A to 51E are diagrams showing lateral aberrations of the ocular lens in FIG. 45.
Figure 51B:
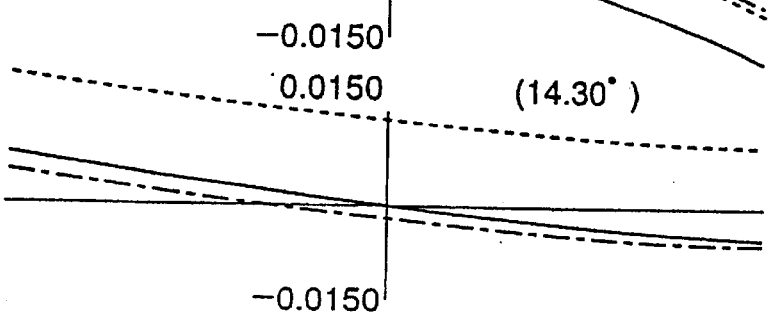
Figure 51C:
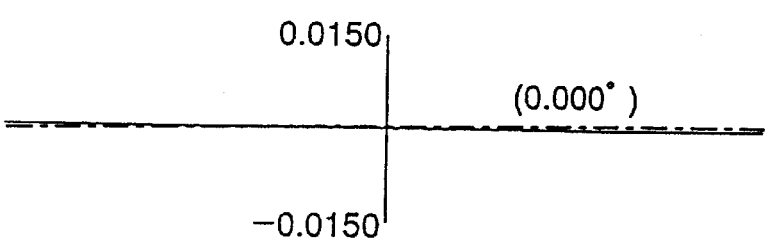
Figure 51D:
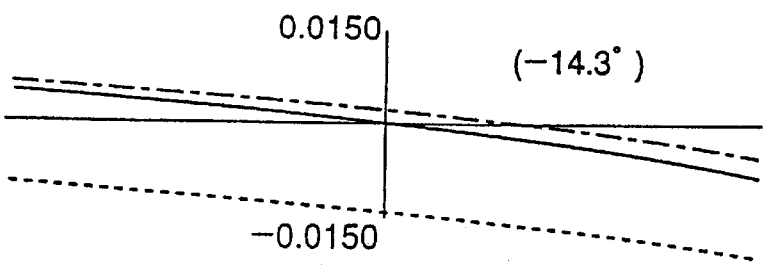
Figure 51E:
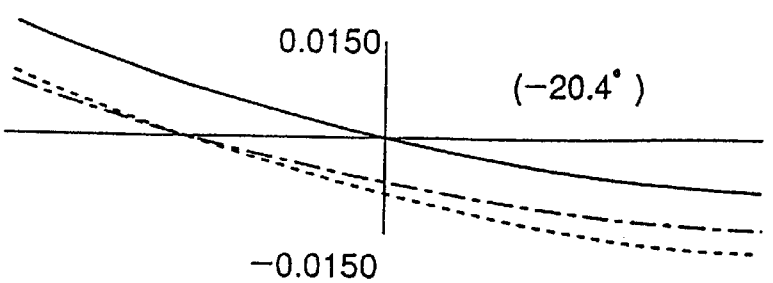
Figure 54A:
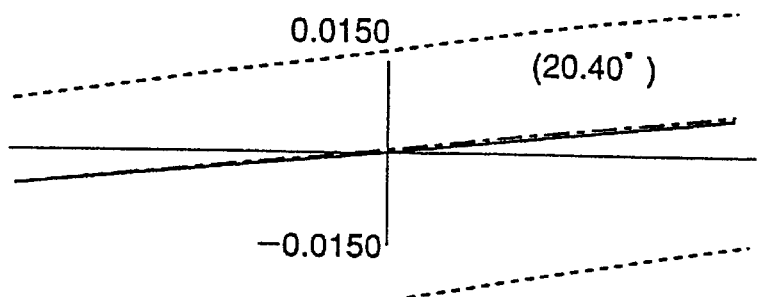
FIGS. 54A to 54E are diagrams showing lateral aberrations of the ocular lens in FIG. 45.
Figure 54B:
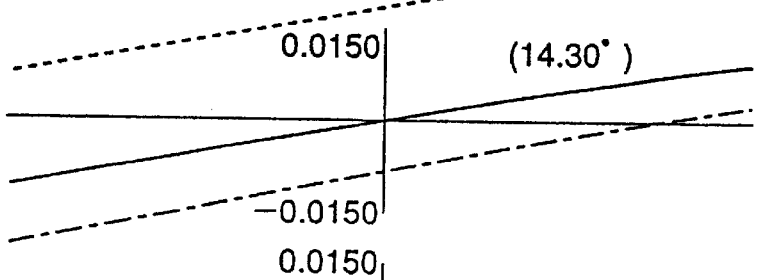
Figure 54C:
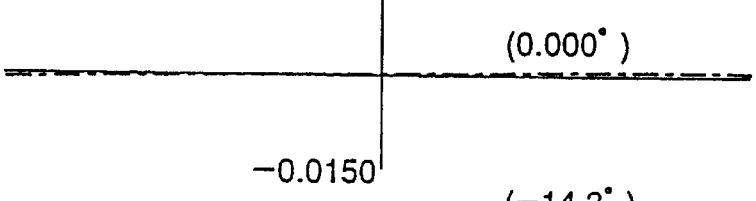
Figure 54D:
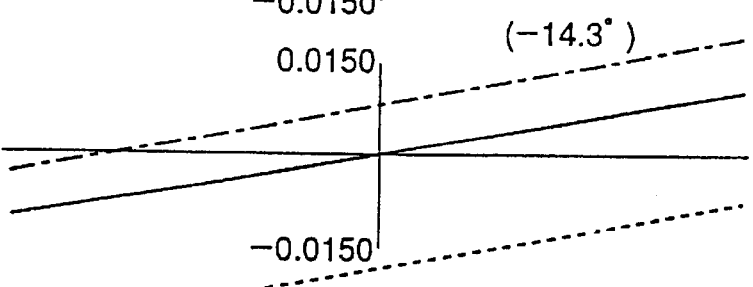
Figure 54E:
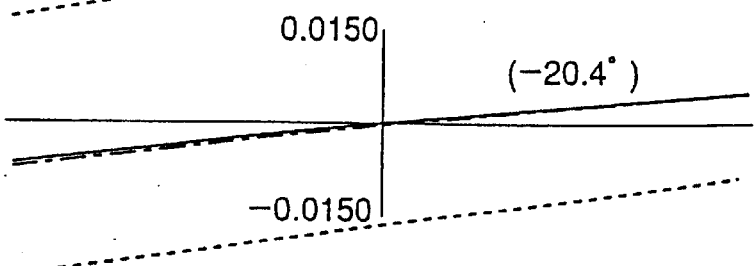

FIG. 48 shows an optical path diagram which is drawn when the pupil is deviated from the optical axis by only 9 mm in the case where each parameter of the ocular lens is set as shown in the equations (17). Further, FIG. 49 shows lateral aberrations on the image surface in this case.

Subsequently, in the case where the coefficient $k_{41}$ is set to −1.9 as a lower limit value in the range shown in the relational expression (16), if each parameter of the ocular lens in FIG. 45 is set so that the shape coefficient $sf_2$ of the second lens group 102 satisfies the relational expression (6), for example, they are as follows.

$r0=\infty \, d0=35.000000$ $r1=51.43608 \, d1=20.175768 \, nd=1.620000 \, vd1=60.3000$ $r2=-48.86497 \, d2=3.000000 \, nd2=1.755000 \, vd2=27.6000$ $r3=2852.31240 \, d3=0.100000$ $r4=29.02626 \, d4=6.819791 \, nd4=1.563701 \, vd4=63.6389$ $r5=31.02646 \, d5=14.886732$ $r6=29.14243 \, d6=11.868992 \, nd6=1.620000 \, vd6=60.3000$ $r7=293.64092 \, d7=8.338791$ $r8=-266.79528 \, d8=5.960953 \, nd8=1.664663 \, vd8=32.4763$ $r9=51.30455$ $a_{41}=-0.699328\times 10^{-4}$ $b_{41}=0.953879\times 10^{-7}$ $f=46.114$ (18)

In this case, the shape coefficient $sf_2$ of the second lens group 102 is equal to 30.023 and satisfies the relational expression (6).

In the case where each parameter of the ocular lens is set as shown in the equations (18), when the pupil exists on the optical axis, a spherical aberration, an astigmatism, and a distortion aberration are as shown in FIG. 50. Lateral aberrations on the image surface are as shown in FIG. 51.

FIG. 52 shows lateral differences on the image surface when the pupil is deviated from the optical axis by only 9 mm in the case where each parameter of the ocular lens is set as shown in the equations (18).

Subsequently, in the case where the coefficient $k_{41}$ is set to −1.1 as an upper limit value in the range shown in the relational expression (16), if each parameter of the ocular lens in FIG. 45 is set so that the shape coefficient $sf_2$ of the second lens group 102 satisfies the relational expression (6), for example, they are as follows.

$r0=\infty \, d0=35.000000$ $r1=42.73929 \, d1=16.486633 \, nd1=1.653513 \, vd1=54.4529$ $r2=-90.08130 \, d2=3.000000 \, nd2=1.755000 \, vd2=27.6000$ $r3=102.53971 \, d3=0.100000$ $r4=44.79904 \, d4=6.635084 \, nd4=1.620000 \, vd4=60.3000$ $r5=90.04515 \, d5=16.723563$ $r6=34.62602 \, d6=7.621149 \, nd6=1.487000 \, vd6=70.4000$ $r7=180.67253 \, d7=1.334160$ $r8=74.08869 \, d8=17.786101 \, nd8=1.755000 \, vd8=27.6000$ $r9=34.28271$ $a_{41}=-0.135749\times 10^{-4}$ $b_{41}=-0.106893\times 10^{-7}$ $f=46.112$ (19)

In this case, the shape coefficient $sf_2$ of the second lens group 102 is equal to 2.980 and satisfies the relational expression (6).

In the case where each parameter of the ocular lens is set as shown in the equations (19), when the pupil exists on the optical axis, a spherical aberration, an astigmatism, and a distortion aberration are as shown in FIG. 53. Lateral aberrations on the image surface are as shown in FIG. 54.

FIG. 55 shows lateral differences on the image surface when the pupil is deviated from the optical axis by only 9 mm in the case where each parameter of the ocular lens is set as shown in the equations (19).

Figure 56:
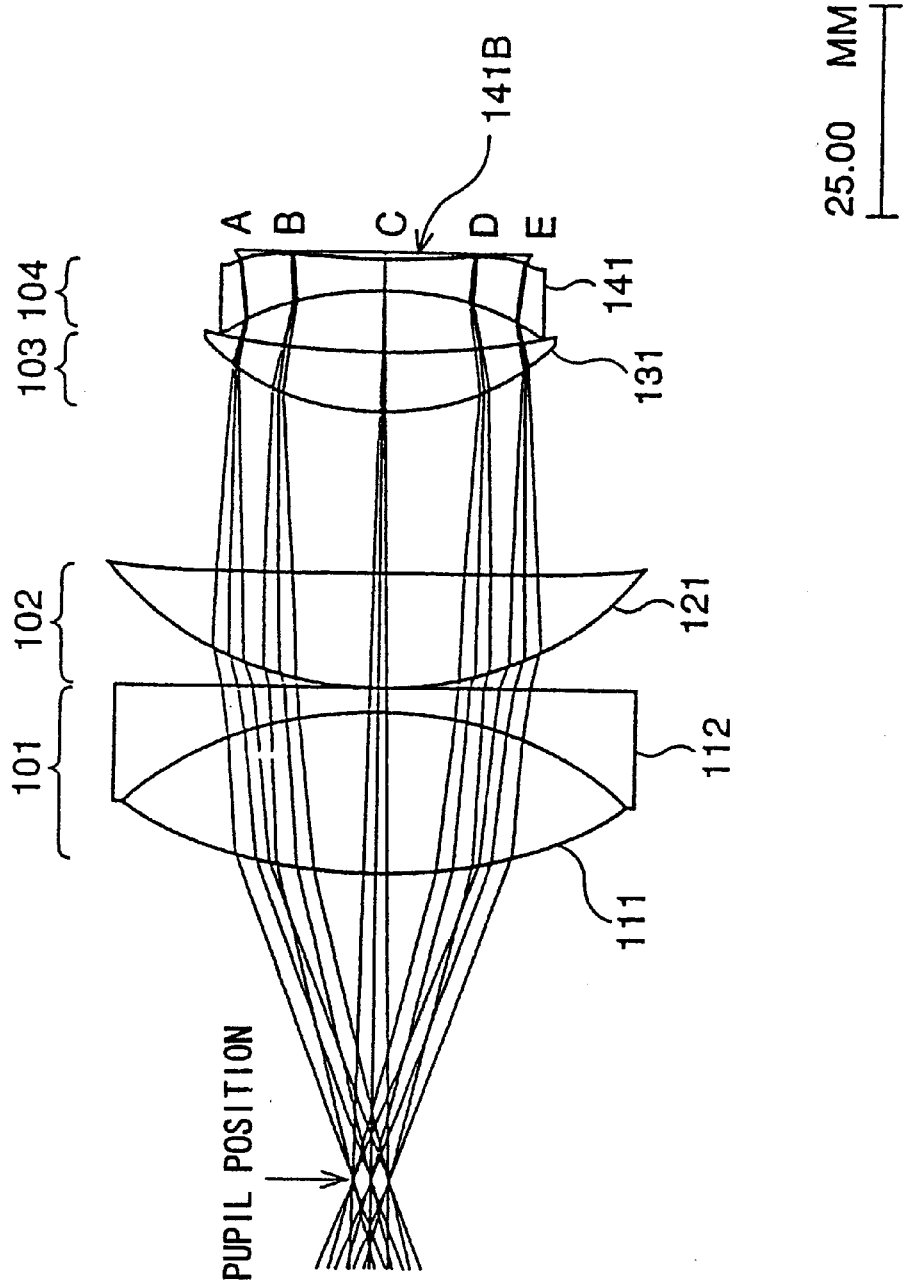
FIG. 56 is a diagram showing a constructional example of the fourth embodiment of an ocular lens constructing an enlargement optical system.
Figure 58A:
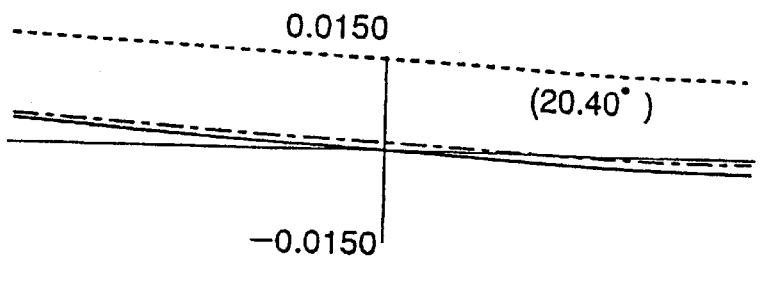
FIGS. 58A to 58E are diagrams showing lateral aberrations of the ocular lens in FIG. 56.
Figure 58B:
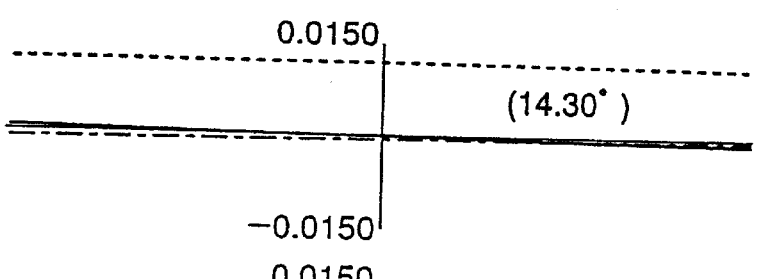
Figure 58C:
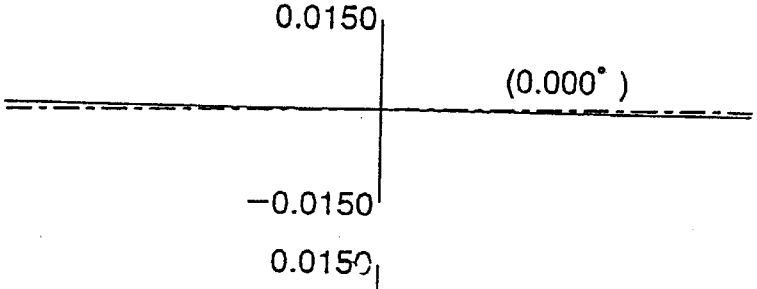
Figure 58D:
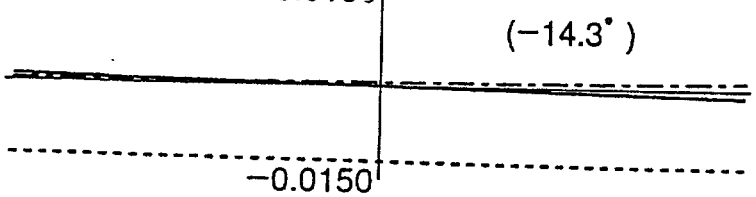
Figure 58E:
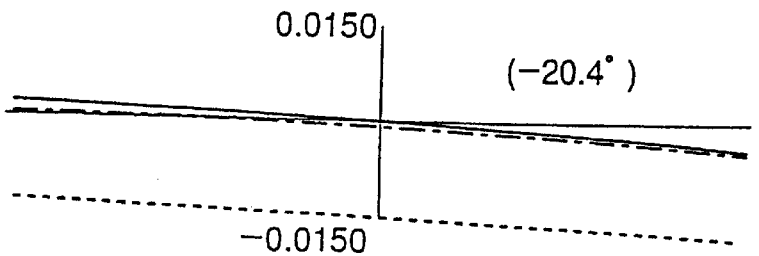

Subsequently, FIG. 56 shows a constructional example of the fourth embodiment of an ocular lens which is used as lenses 13L and 13R constructing the enlargement optical systems. In the diagram, portions corresponding to those in case of FIG. 22 are designated by the same reference numerals. That is, the ocular lens is constructed fundamentally in a manner similar to the case of FIG. 22.

Even in the fourth embodiment, therefore, the ocular lens is constructed by the (5 elements in 4 groups) lens. That is, the ocular lens is constructed by sequentially arranging the first lens group 101, second lens group 102, third lens group 103, and fourth lens group 104 in accordance with this order from the pupil side. The first lens group 101 is constructed by joining the lens 111 as a positive lens and the lens 112 as a negative lens. The second lens group 102 is constructed by the lens 121 as a positive lens. Further, to prevent the deterioration of the resolution, the shape coefficient $sf_2$ of the second lens group 102 is set to a value such as to satisfy the relational expression (6), namely, a value larger than 0.5.

The third lens group 103 is constructed by the lens 131 as a positive lens. The fourth lens group 104 is constructed by the lens 141 as a negative lens.

In the fourth embodiment, however, among the above first to fourth lens groups 101 to 104, only the surface 141B on the screen side of the lens 141 constructing the fourth lens group 104 is an aspherical surface. Further, in this case, now assuming that the quartic aspherical coefficient of the surface 141B on the screen side of the fourth lens group 104 is set to $a_{42}$ and a predetermined coefficient is set to $k_{42}$, respectively, the coefficient $k_{42}$ is set so as to satisfy the following relational expression.

$$-1.8 < k_{42} < 2.0 \text{ where, } a_{42} = (k_{42}/f)^3 \tag{20}$$

This is because if the coefficient $k_{42}$ is equal to or less than $-1.8$, a coma aberration increases in the peripheral portion of the picture plane of the video image when the pupil is moved and the resolution deteriorates. Further, in this case, this is because the distortion aberration also increases in the negative direction. On the other hand, this is also because when the coefficient $k_{42}$ is equal to or larger than 2.0, an image surface is excessively bent in the negative direction in the hatched intermediate region shown in FIG. 23, the image surface is excessively bent in the positive direction in the peripheral portion, and the resolution deteriorates. Further, this is because the distortion aberration also increases in the positive direction.

Subsequently, in the case where the coefficient $k_{42}$ is set to 1.700 as a value in the intermediate range of the range shown in the relational expression (20), if each parameter of the ocular lens in FIG. 56 is set so that the shape coefficient $sf_2$ of the second lens group 102 satisfies the relational expression (6), for example, they are as follows.

$r0=\infty d0=35.000000$ $r1=57.33885 \ d1=18.369087 \ nd1=1.627197 \ vd1=53.4628$ $r2=-39.79919 \ d2=3.000000 \ nd2=1.752596 \ vd2=30.0865$ $r3=370.26370 \ d3=0.100000$ $r4=37.88815 \ d4=14.933140 \ nd4=1.487000 \ vd4=70.4000$ $r5=632.70628 \ d5=19.132328$ $r6=27.34086 \ d6=7.538561 \ nd6=1.620000 \ vd6=60.3000$ $r7=87.43207 \ d7=7.581556$ $r8=-29.49375 \ d8=3.000000 \ nd8=1.755000 \ vd8=27.6000$ $r9=327.65071$ $a_{42}=0.501077 \times 10^{-4}$ $b_{42}=-0.173207 \times 10^6$ $f=46.112 \tag{21}$ where, $b_{42}$ denotes a sextic aspherical coefficient of the surface 141B on the screen side of the fourth lens group 104 as an aspherical surface.

In this case, the shape coefficient $sf_2$ of the second lens group 102 is equal to 1.127 and satisfies the relational expression (6).

In the case where each parameter of the ocular lens is set as shown in the equations (21), when the pupil exists on the optical axis, an optical path diagram as shown in FIG. 56 is drawn. In this case, a spherical aberration, an astigmatism, and a distortion aberration are as shown in FIG. 57. Lateral aberrations on the image surface are as shown in FIG. 58.

Figure 59:
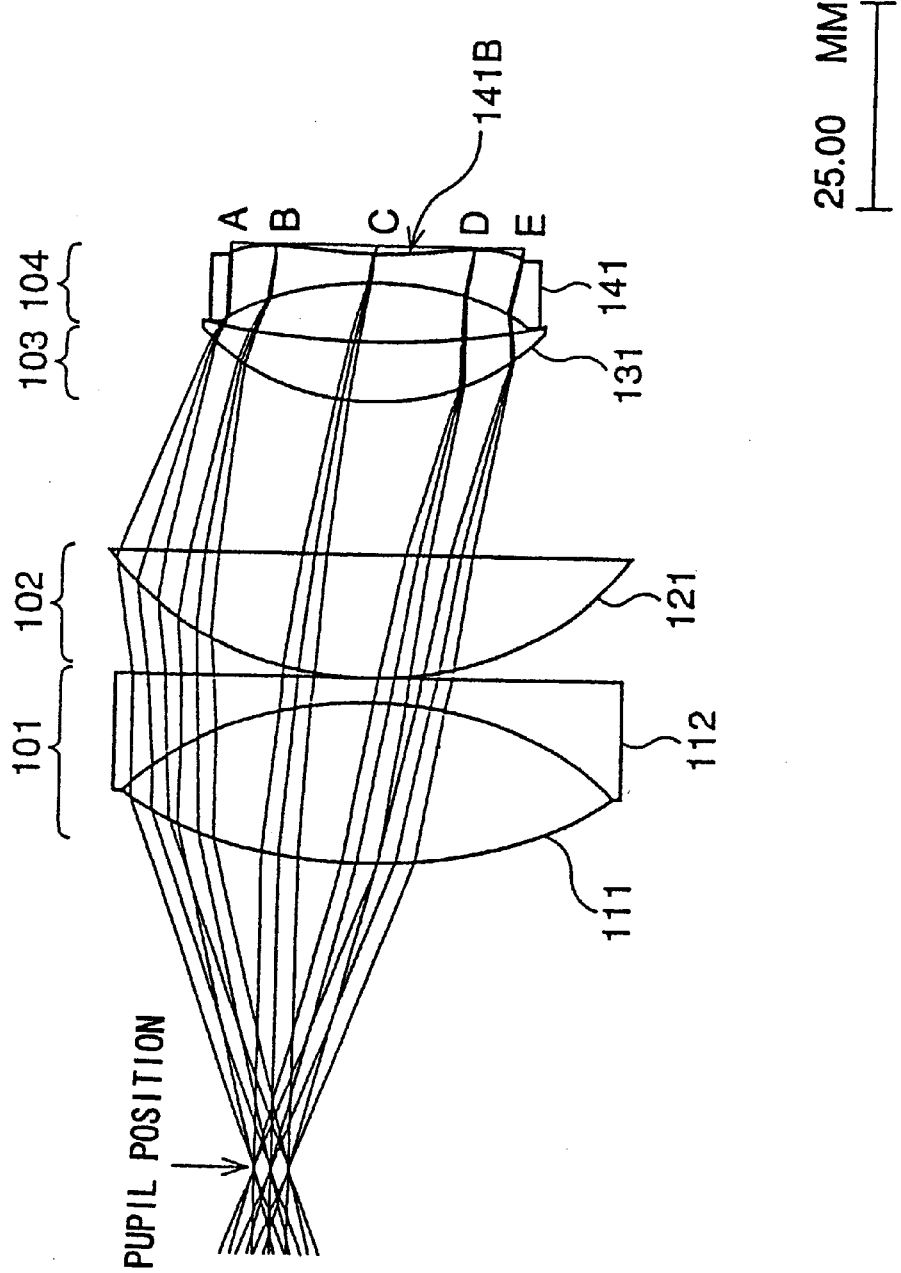
FIG. 59 is an optical path diagram showing an optical path in the case where the pupil position is deviated in FIG. 56.
Figure 60A:
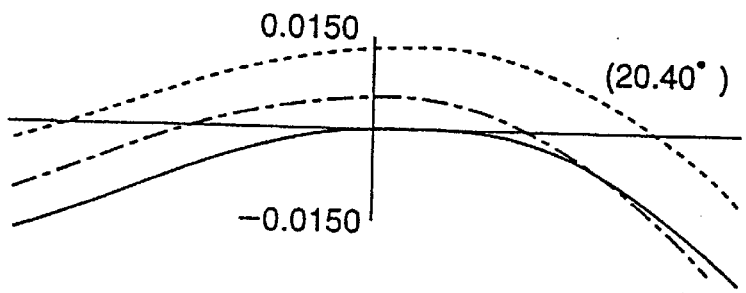
FIGS. 60A to 60E are diagrams showing lateral aberrations of the ocular lens in FIG. 56 in the case where the pupil position is deviated.
Figure 60B:
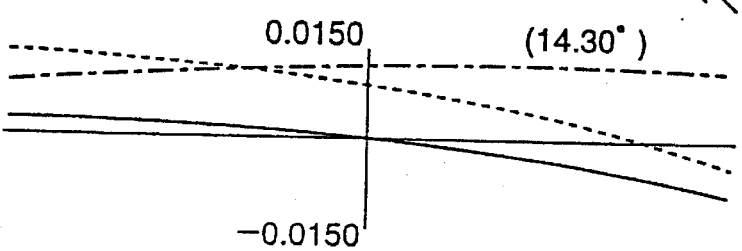
Figure 60C:
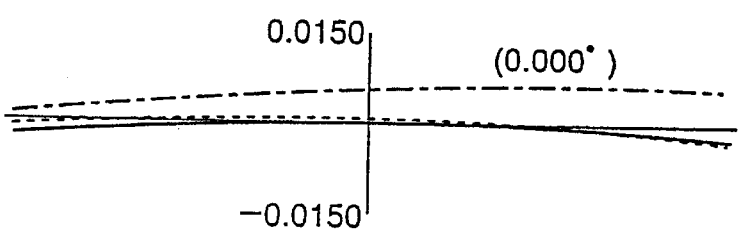
Figure 60D:
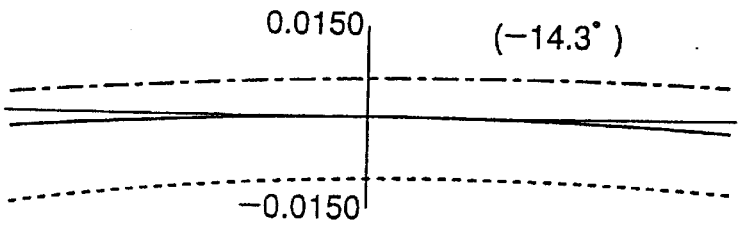
Figure 60E:
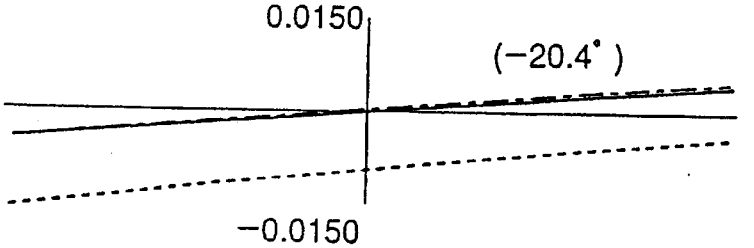
Figure 62A:
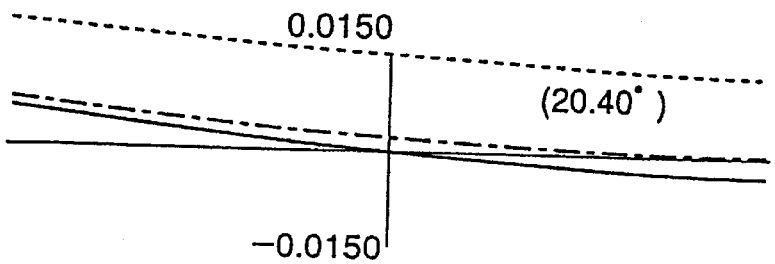
FIGS. 62A to 62E are diagrams showing lateral aberrations of the ocular lens in FIG. 56.
Figure 62B:
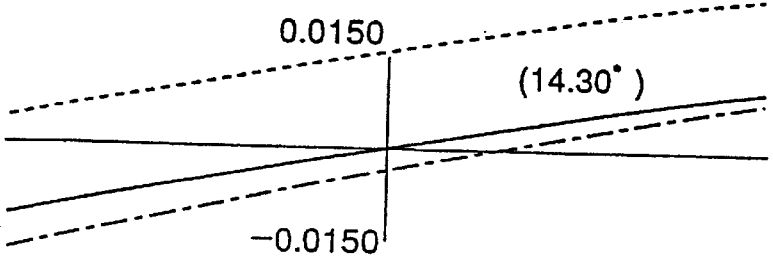
Figure 62C:
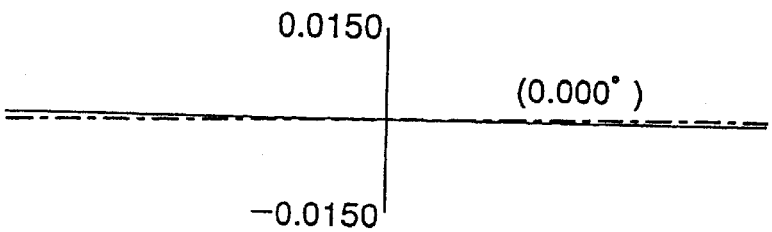
Figure 62D:
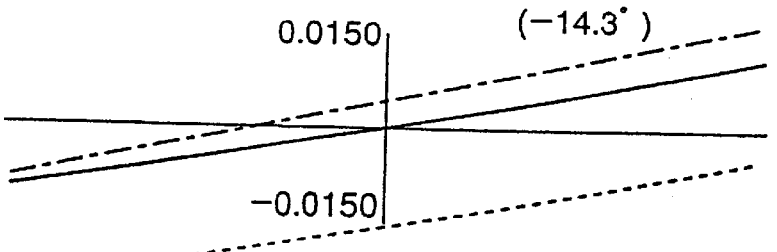
Figure 62E:
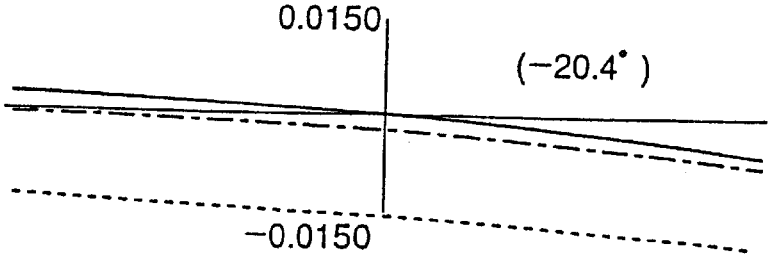
Figure 63A:
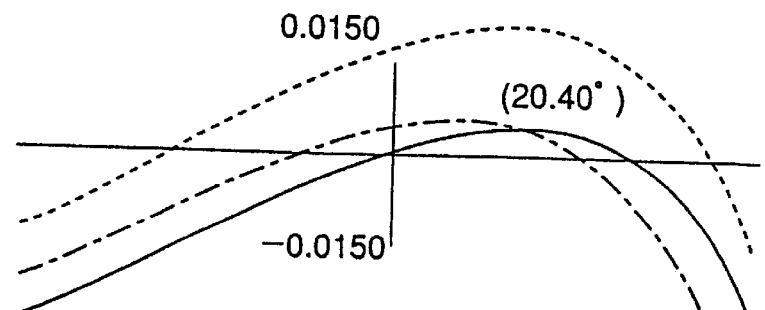
FIGS. 63A to 63E are diagrams showing lateral aberrations of the ocular lens in FIG. 56 in the case where the pupil position is deviated.
Figure 63B:
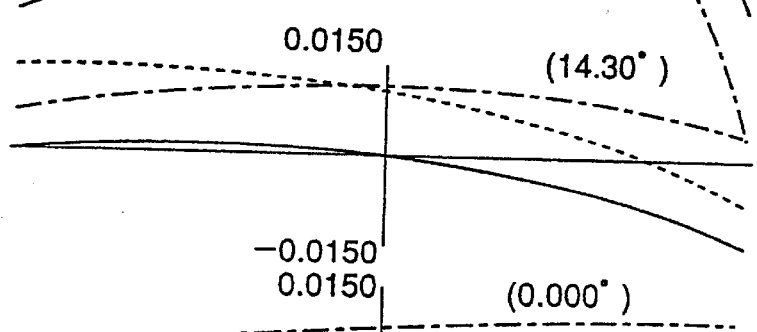
Figure 63C:
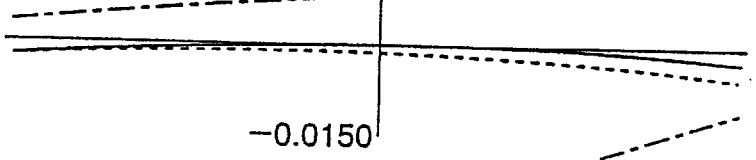
Figure 63D:
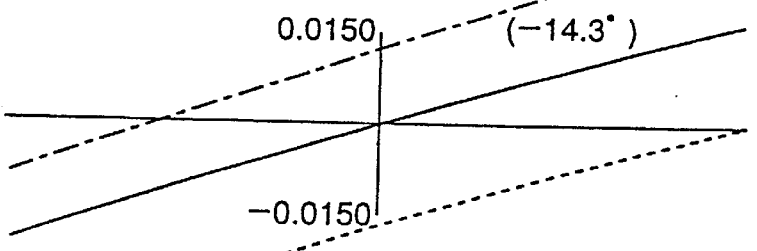
Figure 63E:
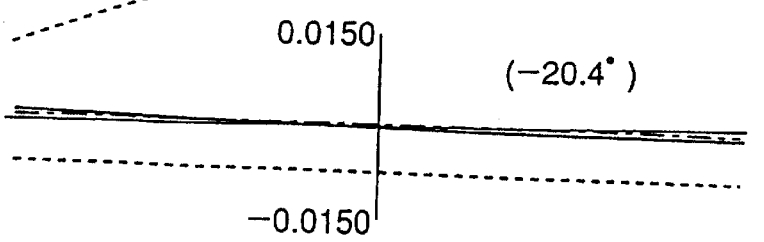

FIG. 59 shows an optical path diagram which is drawn when the pupil is deviated from the optical axis by only 9 mm in the case where each parameter of the ocular lens is set as shown in the equations (21). Further, FIG. 60 shows lateral aberrations on the image surface in this case.

Subsequently, in the case where the coefficient $k_{42}$ is set to $-1.8$ as a lower limit value in the range shown in the relational expression (20), if each parameter of the ocular lens in FIG. 56 is set so that the shape coefficient $sf_2$ of the second lens group 102 satisfies the relational expression (6), for example, they are as follows.

$r0=\infty d0=35.000000$ $r1=63.74873 \ d1=16.817964 \ nd1=1.648512 \ vd1=49.6557$ $r2=-41.34616 \ d2=3.000000 \ nd2=1.755000 \ vd2=27.6000$ $r3=540.21774 \ d3=0.100000$ $r4=37.57345 \ d4=13.547257 \ nd4=1.487000 \ vd4=70.4000$ $r5=209.85729 \ d5=21.708479$ $r6=26.83056 \ d6=8.662030 \ nd6=1.620000 \ vd6=60.3000$ $r7=130.40070 \ d7=7.164270$ $r8=-30.19076 \ d8=3.000000 \ nd8=1.755000 \ vd8=27.6000$ $r9=32.73832$ $a_{42}=-0.594804 \times 10^{-4}$ $b_{42}=-0.600080 \times 10^{-8}$ $f=46.112 \tag{22}$ In this case, the shape coefficient $sf_2$ of the second lens group 102 is equal to 1.436 and satisfies the relational expression (6).

In the case where each parameter of the ocular lens is set as shown in the equations (22), when the pupil exists on the optical axis, a spherical aberration, an astigmatism, and a distortion aberration are as shown in FIG. 61. Lateral aberrations on the image surface are as shown in FIG. 62.

FIG. 63 shows lateral aberrations on the image surface when the pupil is deviated from the optical axis by only 9 mm in the case where each parameter of the ocular lens is set as shown in the equations (22). Subsequently, in the case where the coefficient $k_{42}$ is set to 2.0 as an upper limit value in the range shown in the relational expression (20), if each parameter of the ocular lens in FIG. 56 is set so that the shape coefficient $sf_2$ of the second lens group 102 satisfies the relational expression (6), for example, they are as follows.

$r0=\infty \ d0=35.000000$ $r1=57.12941 \ d1=16.680182 \ nd1=1.614935 \ \nu d1=54.1070$ $r2=-46.27543 \ d2=3.000000 \ nd2=1.753322 \ \nu d2=29.2884$ $r3=308.46978 \ d3=0.100000$ $r4=38.05458 \ d4=13.868119 \ nd4=1.487000 \ \nu d4=70.4000$ $r5=293.50877 \ d5=20.101568$ $r6=28.03696 \ d6=8.406043 \ nd6=1.675762 \ \nu d6=51.4159$ $r7=125.69552 \ d7=6.342776$ $r8=-36.16103 \ d8=3.000000 \ nd8=1.755000 \ \nu d8=27.6000$ $r9=29279.63461$ $a_{42}=0.815921\times10^{-4}$ $b_{42}=-0.213534\times10^{-6}$ $f=46.112$ (23)

In this case, the shape coefficient $sf_2$ of the second lens group 102 is equal to 1.298 and satisfies the relational expression (6).

In the case where each parameter of the ocular lens is set as shown in the equations (23), when the pupil exists on the optical axis, a spherical aberration, an astigmatism, and a distortion aberration are as shown in FIG. 64. Lateral aberrations on the image surface are as shown in FIG. 65.

FIG. 66 shows lateral aberrations on the image surface when the pupil is deviated from the optical axis by only 9 mm in the case where each parameter of the ocular lens is set as shown in the equations (23).

According to the construction as described above, high resolution and a long eye relief are obtained over angles of view of 40° or more as a diagonal angle, and the ocular lens which has high resolution even if the pupil position is slightly deviated from the optical axis can be provided.

As will be obviously understood from the equations (9) to (11), (13) to (15), (17) to (19), and (21) to (23), a value of 0.75f or more is assured as an eye relief.

The display apparatus 7 for forming a virtual image of a video image by the ocular lens described above and providing will now be described.

Figure 67:
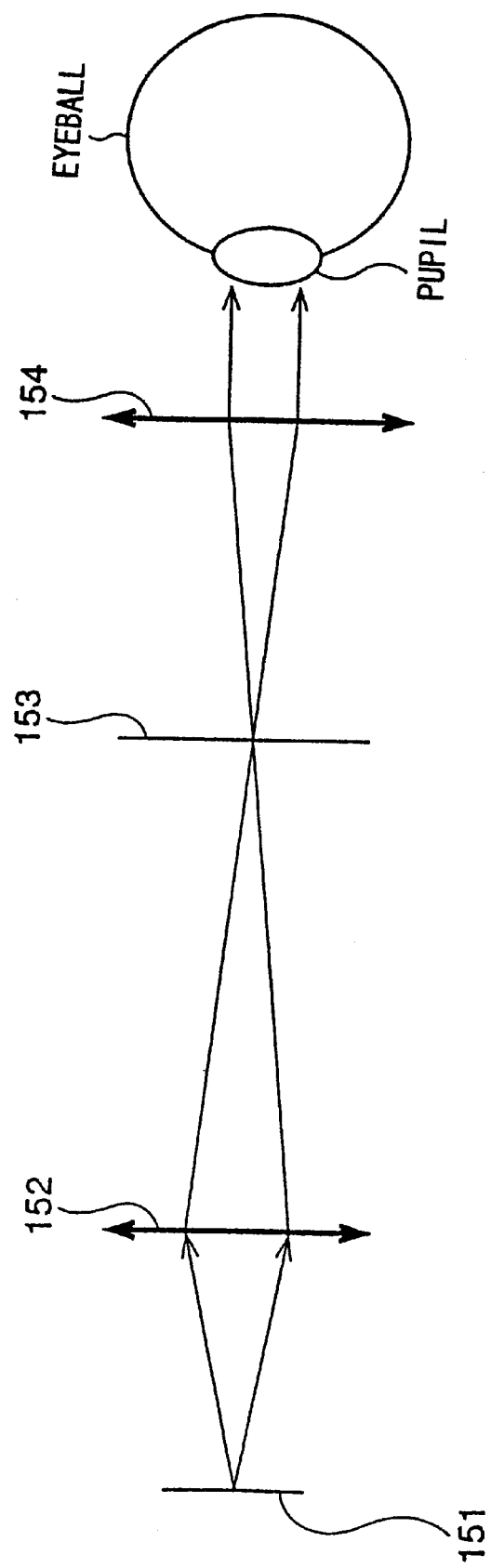
FIG. 67 is a diagram showing a ninth constructional example of the display apparatus 7.

FIG. 67 shows a ninth constructional example of the display apparatus 7.

A display element (image display element) 151 is a display device of a self light emitting type or transmitting type (self light emitting type device or transmitting light control type device) and displays a video image to be provided for the user.

That is, the display element 151 is a display device constructed as described in FIGS. 6 or 7. The video image displayed there is projected onto a translucent screen 153 through a projecting lens 152. The video image projected onto the translucent screen 153 passes through an ocular lens 154 constructed as shown in FIGS. 22, 34, 45, or 56, so that it enters the eyeballs of the user. Thus, a virtual image of the video image displayed on the display element 151 is observed in the eyeballs of the user.

In the above construction, the projecting lens 152, translucent screen 153, and ocular lens 154 construct an enlargement optical system.

Figure 68:
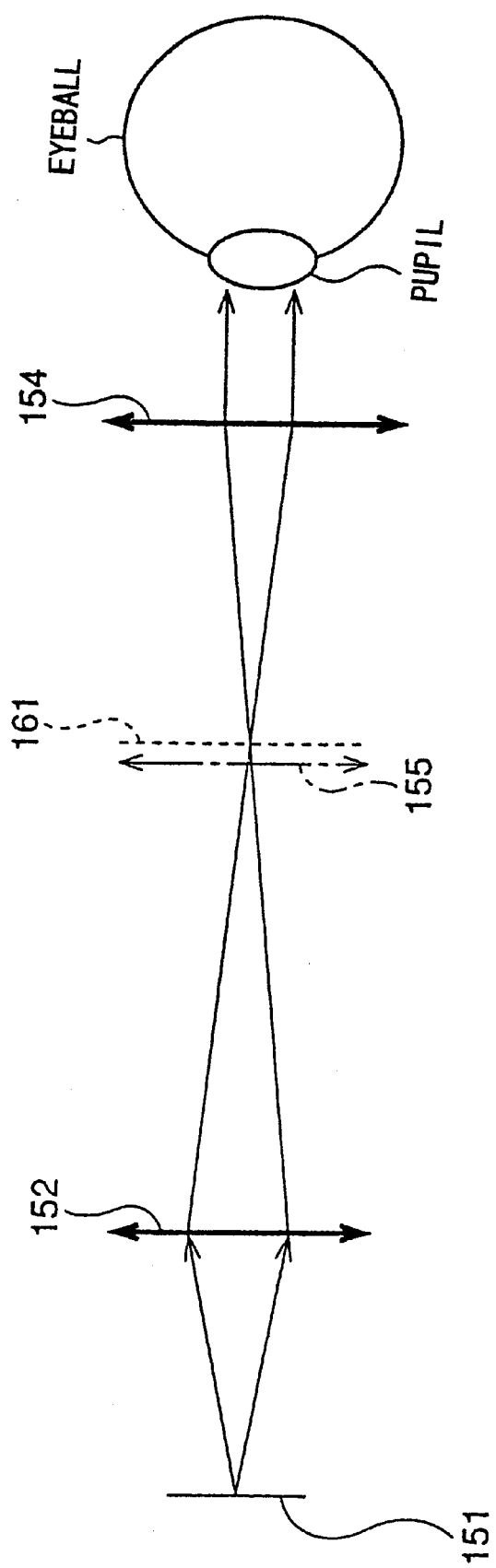
FIG. 68 is a diagram showing a tenth constructional example of the display apparatus 7.

FIG. 68 shows a tenth constructional example of the display apparatus 7. In the diagram, portions corresponding to those in case of FIG. 67 are designated by the same reference numerals. That is, the display apparatus 7 is constructed in a manner similar to the case of FIG. 67 except that the translucent screen 153 is not provided.

In the display apparatus 7 in FIG. 68, a video image displayed on the display element 151 passes through the projecting lens 152, so that an aerial image 161 of the video image is formed at a position where, for example, the translucent screen 153 is installed in FIG. 67. The aerial image 161 passes through the ocular lens 154 and enters the eyeballs of the user, so that the virtual image of the video image displayed in the display element 151 is observed by the eyeballs of the user. In this case, as shown by an alternate long and short dash line in FIG. 68, a field lens 155 can be arranged near the aerial image 161. In this case, a peripheral light amount of the image seen through the ocular lens 154 can be increased.

Figure 69:
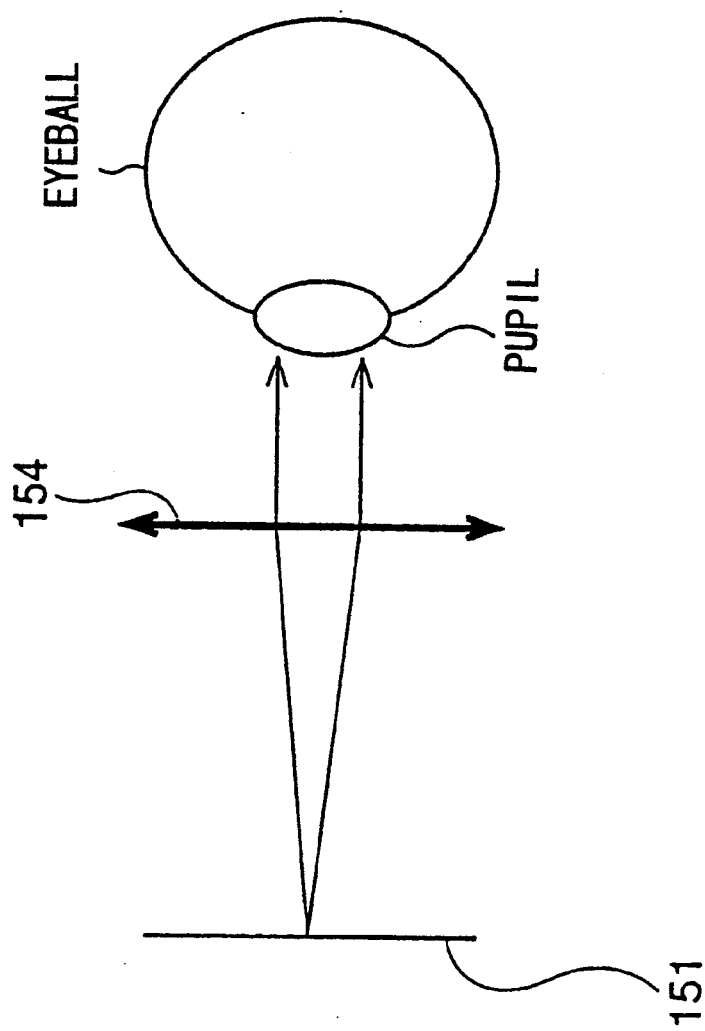
FIG. 69 is a diagram showing a 11th constructional example of the display apparatus 7.

FIG. 69 shows an eleventh constructional example of the display apparatus 7. In the diagram, portions corresponding to those in the case of FIG. 67 are designated by the same reference numerals. That is, the display apparatus 7 is constructed in a manner similar to the case of FIG. 67 except that the projecting lens 152 and translucent screen 153 are not provided.

In the display apparatus 7, since the video image displayed on the display element 151 directly passes through the ocular lens 154, it enters the eyeballs of the user, so that the virtual image of the video image displayed in the display element 151 is observed by the eyeballs of the user.

When the display region of the display element 151 is large, as shown in FIG. 69, merely by seeing the video image displayed by the display element 151 through only the ocular lens 154 without enlarging by the projecting lens 152, the angle of view can be widened and the eye relief can be made long. When the display region of the display element 151 is small, if the focal distance of the ocular lens 154 is short, although the angle of view is widened, the eye relief becomes short. On the other hand, when the focal distance of the ocular lens 154 is long, although the eye relief is long, the angle of view is narrowed. When the display region of the display element 151 is small, therefore, as shown in FIG. 67, it is sufficient that the video image on the display element 151 is enlarged onto the translucent screen 153 by the projecting lens 152 and the enlarged video image is seen through the ocular lens 154. In this case, the angle of view can be widened and the eye relief can be made long.

Figure 70:
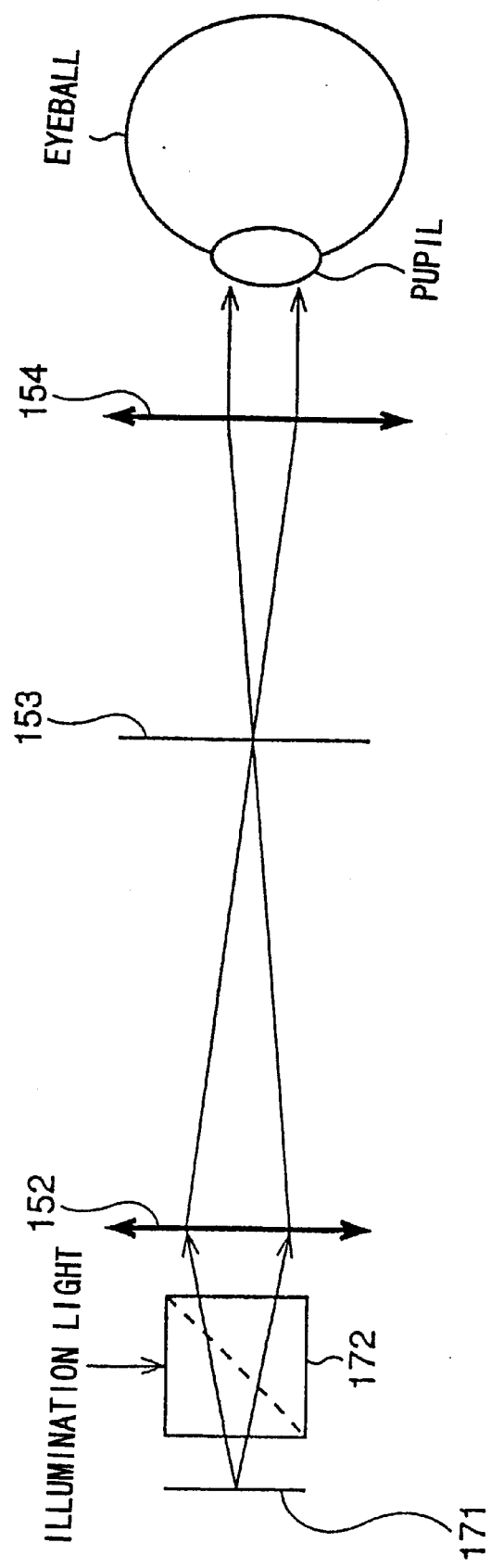
FIG. 70 is a diagram showing a 12th constructional example of the display apparatus 7.

FIG. 70 shows a twelfth constructional example of the display apparatus 7. In the diagram, portions corresponding to those in the case of FIG. 67 are designated by the same reference numerals. That is, the display apparatus 7 is constructed in a manner similar to the case of FIG. 67 except that a display element 171 and a PBS (polarization beam splitter) 172 are provided in place of the display element 151.

Light as illumination light emitted from a light source (not shown) is reflected by 90° in the PBS 172 and enters the display element (image display element) 171. As described in FIG. 8, in the display element 171, the light entering there is reflected by a reflecting type display device (reflecting light control type device), thereby displaying a video image to be provided to the user.

The video image as reflection light in the display element 171 transmits the PBS 172 and enters the projecting lens 152. A virtual image is subsequently observed by the eyeballs of the user in a manner similar to the case of FIG. 67.

In FIG. 70 as well, since the video image displayed on the display element 171 is enlarged by the projecting lens 152, even if a display region of the display element 171 is small, the angle of view can be widened and the eye relief can be made long.

A half mirror or another device for dividing the light can be also provided in place of the PBS 172.

Figure 71:
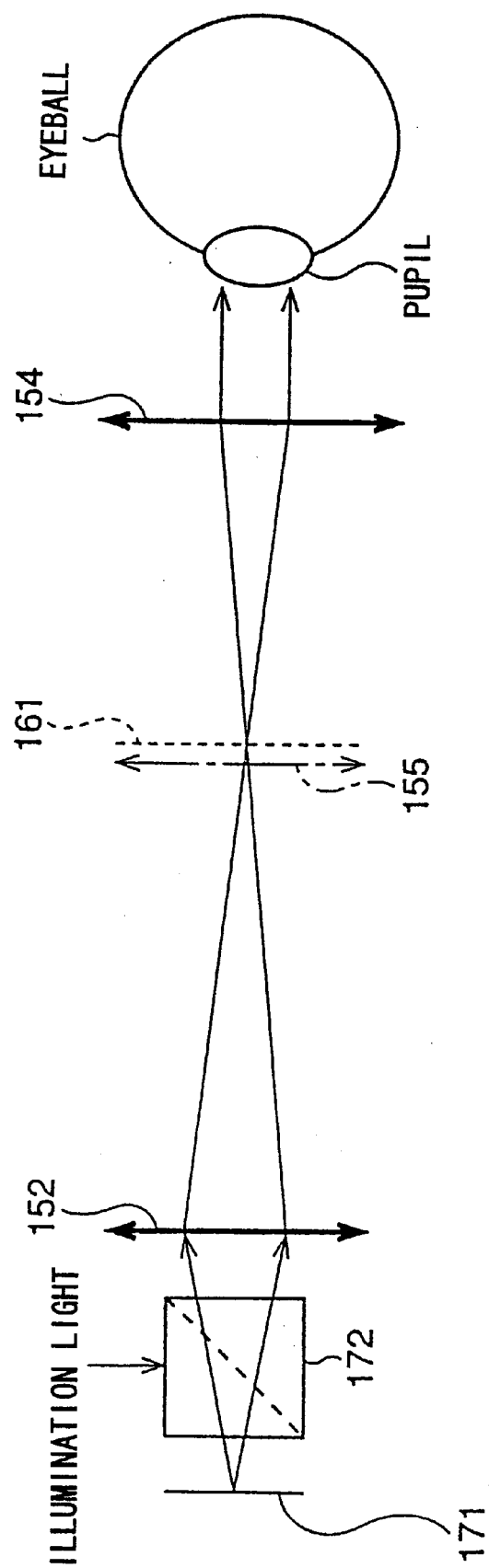
FIG. 71 is a diagram showing a 13th constructional example of the display apparatus 7.

FIG. 71 shows a thirteenth constructional example of the display apparatus 7. In the diagram, portions corresponding to those in the case of FIGS. 68 or 70 are designated by the same reference numerals. That is, the display apparatus 7 is constructed in a manner similar to the case of FIG. 68 except that the display element 171 and PBS 172 are provided in place of the display element 151.

In the display apparatus 7, light as illumination light emitted from a light source (not shown) is reflected by 90° by the PBS 172 and enters the display element 171. In the display element 171, the light entering there is reflected and a video image as reflection light transmits the PBS 172 and enters the projecting lens 152. In a manner similar to the case of FIG. 68, subsequently, a virtual image is observed in the eyeballs of the user. In this case as well, by arranging the field lens 155, a peripheral light amount of the image can be increased in a manner similar to the case of FIG. 47.

Figure 72:
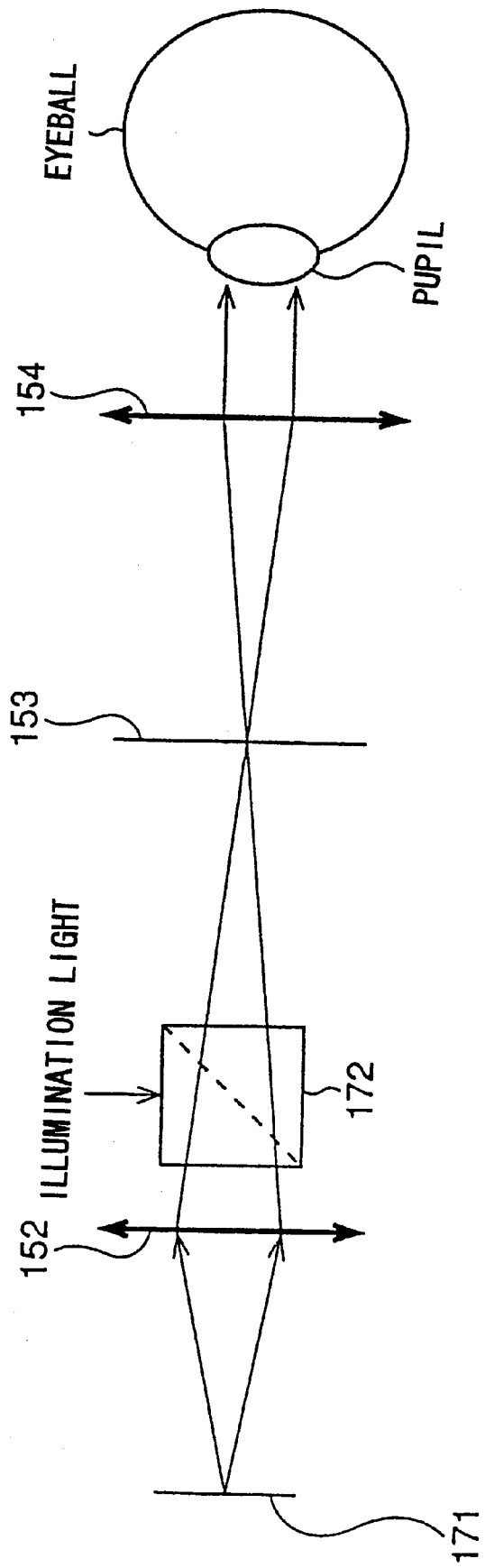
FIG. 72 is a diagram showing a 14th constructional example of the display apparatus 7.

FIG. 72 shows a fourteenth constructional example of the display apparatus 7. In the diagram, portions corresponding to those in the case of FIG. 70 are designated by the same reference numerals. That is, the display apparatus 7 is constructed in a manner similar to the case of FIG. 70 except that the PBS 172 is provided between the projecting lens 152 and ocular lens 154 instead of a position between the display element 151 and projecting lens 152.

In this case, light as illumination light emitted from a light source (not shown) is reflected by 90° in the PBS 172 and enters the display element 171 through the projecting lens 152. In the display element 171, the light entering there is reflected and a video image as a reflection light transmits the projecting lens 152 and PBS 172 and is enlargedly projected onto the translucent screen 153. In a manner similar to the case of FIG. 70, subsequently, a virtual image is observed in the eyeballs of the user.

By a similar principle, in FIG. 71, the PBS 172 can be also provided between the projecting lens 152 and ocular lens 154 instead of a position between the display element 151 and projecting lens 152.

Figure 73:
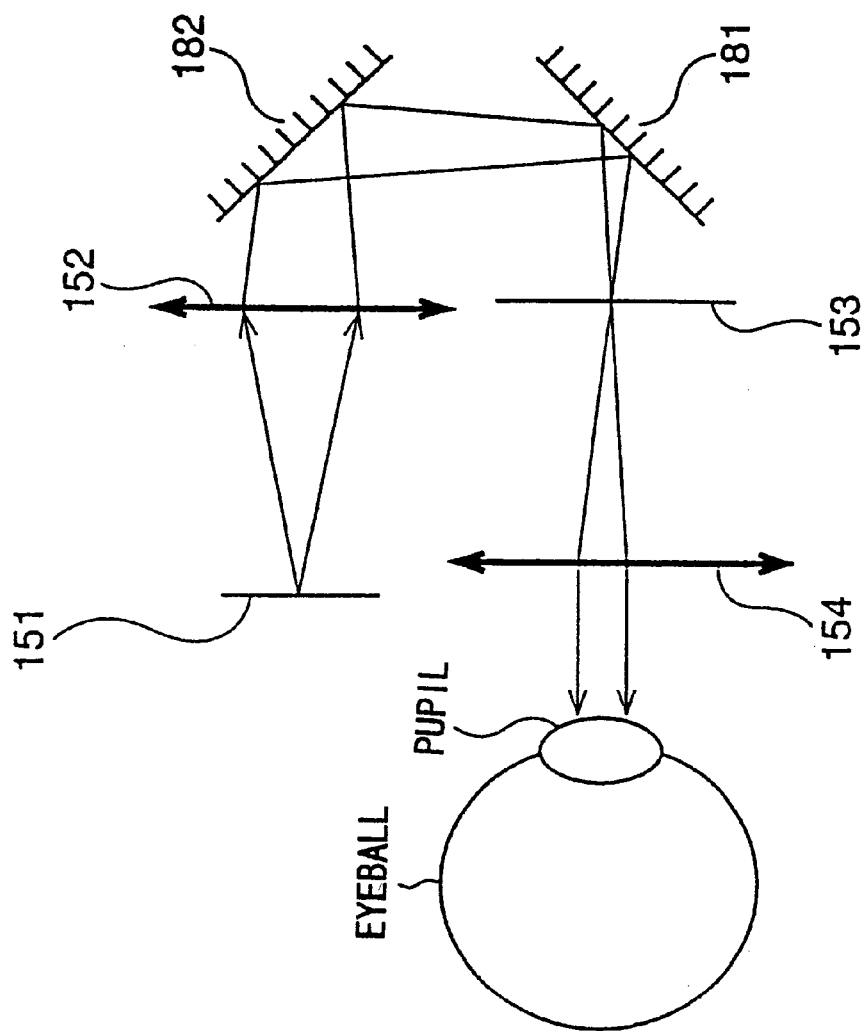
FIG. 73 is a diagram showing a 15th constructional example of the display apparatus 7.

FIG. 73 shows a fifteenth constructional example of the display apparatus 7. In the diagram, portions corresponding to those in the case of FIG. 67 are designated by the same reference numerals.

In this case, light as a video image displayed in the display element 151 enters a mirror 182 through the projecting lens 152. In the mirror 182, the light from the projecting lens 152 is reflected by 90° and is emitted to a mirror 181. In the mirror 181, a reflection light from the mirror 182 is further reflected by 90° and the reflected light is projected onto the translucent screen 153. The video image projected on the translucent screen 153 passes through the ocular lens 154 and enters the eyeballs of the user. Thus, a virtual image of the video image displayed in the display element 151 is observed by the eyeballs of the user.

Figure 74:
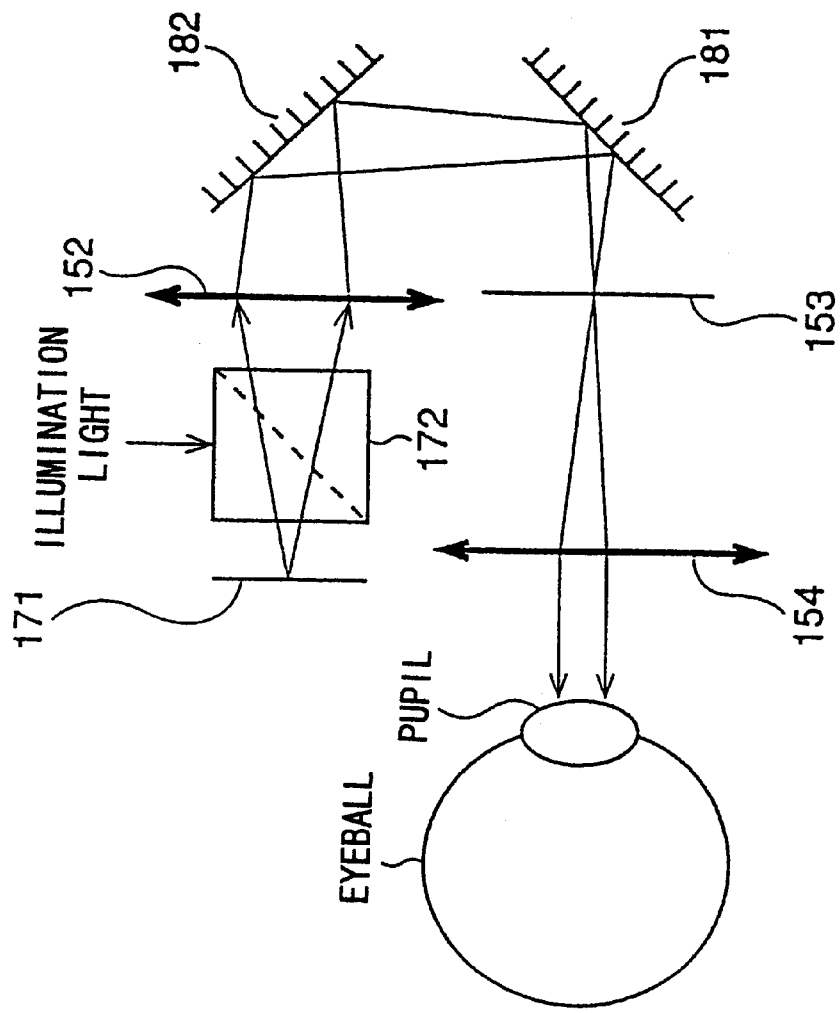
FIG. 74 is a diagram showing a 16th constructional example of the display apparatus 7.

FIG. 74 shows a sixteenth constructional example of the display apparatus 7. In the diagram, portions corresponding to those in the case of FIGS. 70 or 73 are designated by the same reference numerals.

In this case, light as illumination light emitted from a light source (not shown) is reflected by 90° in the PBS 172. In the display element 171, the light entering there is reflected, thereby forming a video image to be provided to the user. A reflection light as a video image transmits the PBS 172 and projecting lens 152 and enters the mirror 182. In a manner similar to the case of FIG. 73, subsequently, a virtual image is observed in the eyeballs of the user.

That is, in FIGS. 67 to 51, the display element 151 or 171, projecting lens 152, and ocular lens 154 have been arranged in a straight line. However, as shown in FIGS. 73 or 74, the display apparatus 7 can be also constructed so as to bend the optical path by inserting the mirrors 181 and 182 in the halfway. In this case, the apparatus can be miniaturized.

Figure 75:
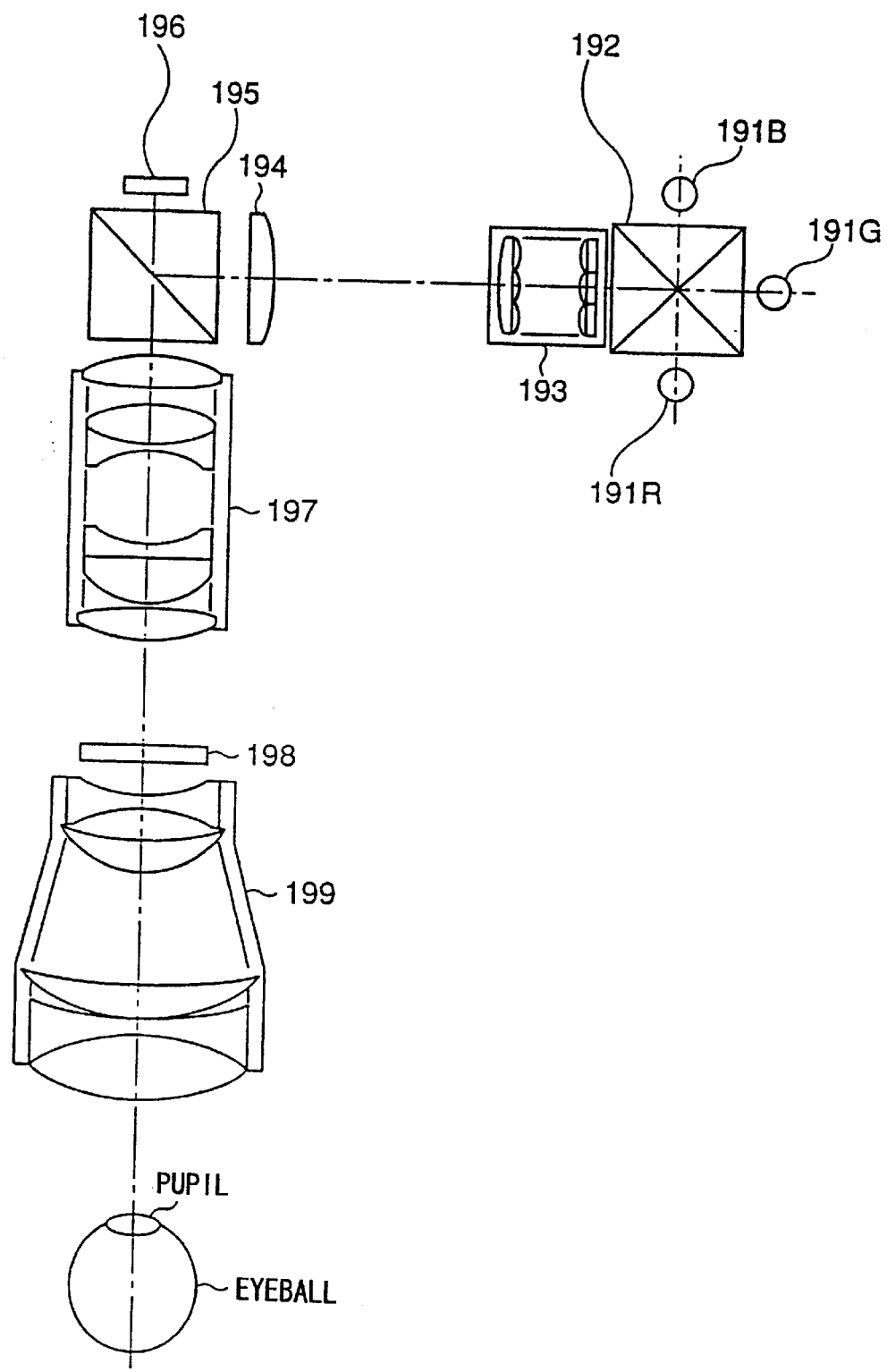
FIG. 75 is a diagram showing a 17th constructional example of the display apparatus 7.

FIG. 75 shows a seventeenth constructional example of the display apparatus 7.

In light emitting diodes 191R, 191G, and 191B, light of red, green, and blue is emitted as illumination light, respectively. The light enters a PBS 195 through a dichroic prism 192, a fly eye lens 193, and a field lens 194, respectively. In the PBS 195, the light from the field lens 194 is reflected by 90° and its reflected light enters a reflecting type video display panel 196 as a reflecting type display device. In the reflecting type video display panel 196, by reflecting the light entering there, a video image to be provided to the user is formed. The reflected light as a video image is enlargedly projected to a translucent screen 198 through the PBS 195 and a projecting lens 197. The enlarged and projected image enters the eyeballs of the user through an ocular lens 199 constructed as shown in FIGS. 22, 34, 45, or 56. Thus, a virtual image of the video image displayed on the reflecting type video display panel 196 is observed by the eyeballs of the user.

In this case, since the light of red, green, and blue is irradiated as illumination light to the reflecting type video display panel 196, a color virtual image can be provided by what is called a field sequential system.

Figure 76:
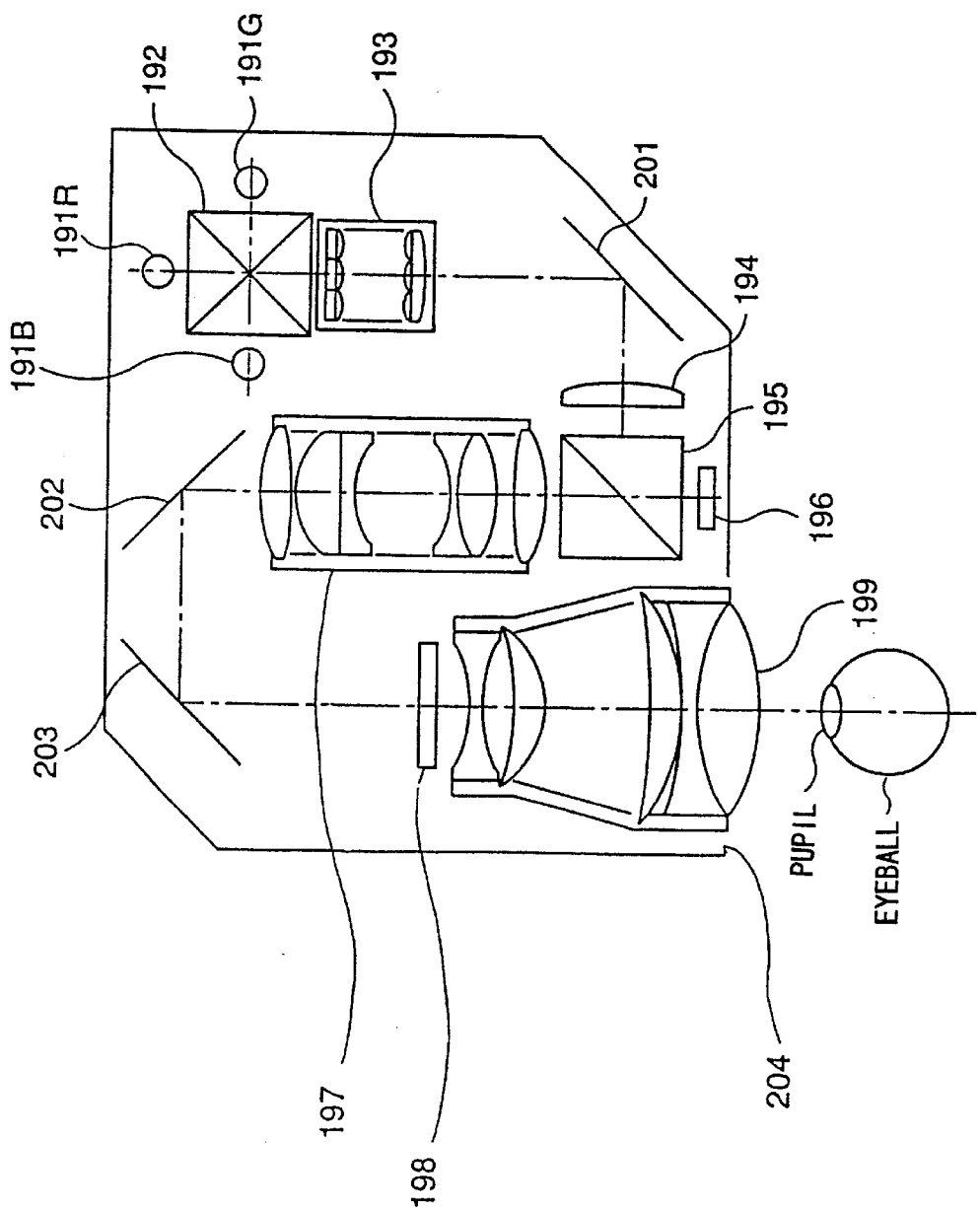
FIG. 76 is a diagram showing a 18th constructional example of the display apparatus 7.

FIG. 76 shows an eighteenth constructional example of the display apparatus 7. In the diagram, portions corresponding to those in the case of FIG. 75 are designated by the same reference numerals. That is, the display apparatus 7 is constructed in a manner similar to the case of FIG. 75 except that a mirror 201 is provided between the fly eye lens 193 and field lens 194, mirrors 202 and 203 are provided between the projecting lens 197 and translucent screen 198, and further, a whole apparatus is fixed in a casing 204.

In the embodiment, light as illumination light from the fly eye lens 193 is reflected by 90° by the mirror 201 and enters the PBS 195 through the field lens 194. In the PBS 195, the light from the field lens 194 is reflected by 90° and its reflected light enters the reflecting type video display panel 196. In the reflecting type video display panel 196, the light entering there is reflected by 180°, thereby forming a video image to be provided to the user. The reflected light as a video image enters the mirror 202 through the PBS 195 and projecting lens 197. In the mirror 202, the light from the projecting lens 197 is reflected by 90° and its reflected light enters the mirror 203. In the mirror 203, the reflected light from the mirror 202 is further reflected by 90°. Thus, the image enlarged by the projecting lens 197 is projected onto the translucent screen 198. In a manner similar to the case of FIG. 75, a virtual image of the video image displayed on the reflecting type video display panel 196 is observed by the eyeballs of the user.

As mentioned above, by bending the optical path by the mirrors 201 to 203, the apparatus can be miniaturized.

Figure 77:
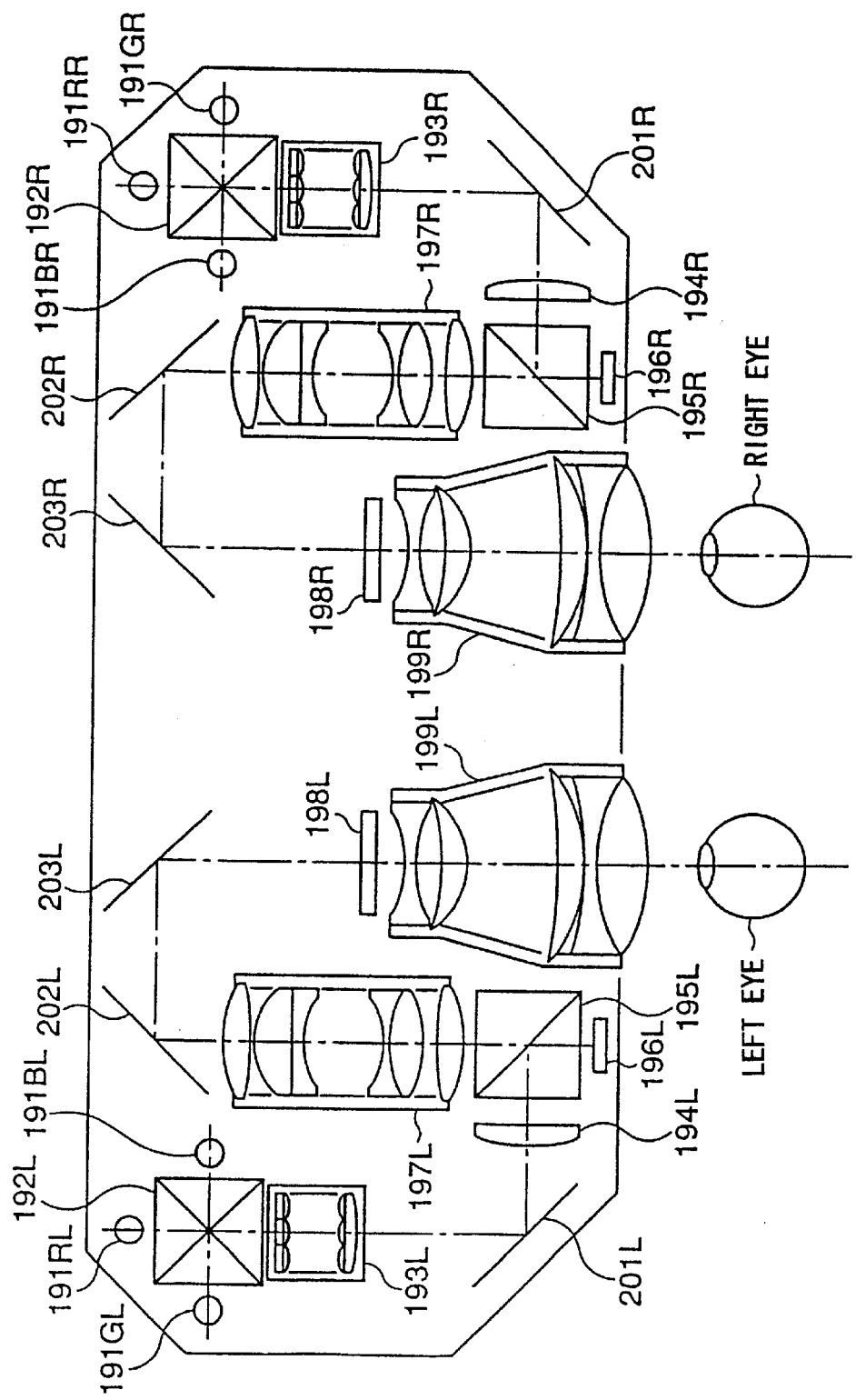
FIG. 77 is a diagram showing a 19th constructional example of the display apparatus 7.

FIG. 77 shows a nineteenth constructional example of the display apparatus 7.

In the embodiment, two sets of display apparatuses 7 shown in FIG. 76 are provided, thereby enabling virtual images which are formed to be observed by the left eye and right eye, respectively.

That is, in FIG. 77, light emitting diodes 191RL, 191GL, and 191BL, a dichroic prism 192L, a fly eye lens 193L, a field lens 194L, a PBS 195L, a reflecting type video display panel 196L, a projecting lens 197L, a translucent screen 198L, an ocular lens 199L, and mirrors 201L to 203L are constructed in a manner similar to the light emitting diodes 191R, 191G, and 191B, dichroic prism 192, fly eye lens 193, field lens 194, PBS 195, reflecting type video display panel 196, projecting lens 197, translucent screen 198, ocular lens 199, and mirrors 201 to 203 in FIG. 76, respectively, thereby enabling a virtual image to be provided to the left eye of the user. In FIG. 77, light emitting diodes 191RR, 191GR, and 191BR, a dichroic prism 192R, a fly eye lens 193R, a field lens 194R, a PBS 195R, a reflecting type video display panel 196R, a projecting lens 197R, a translucent screen 198R, an ocular lens 199R, and mirrors 201R to 203R are also constructed in a manner similar to the light emitting diodes 191R, 191G, and 191B, dichroic prism 192, fly eye lens 193, field lens 194, PBS 195, reflecting type video display panel 196, projecting lens 197, translucent screen 198, ocular lens 199, and mirrors 201 to 203 in FIG. 76, respectively, thereby enabling a virtual image to be provided to the right eye of the user.

In this case, therefore, the user can observe the virtual images by the right and left eyes.

The arranging positions of the mirrors 201 to 203 in FIG. 76 and the mirrors 201L to 203L and 201R to 203R in FIG. 77 are not limited to the positions shown in FIGS. 76 and 77. That is, in the embodiment of FIGS. 76 or 77, the mirrors are arranged so as to bend the optical path in the direction which is parallel with the drawing. However, as another arrangement, for example, the mirrors can be also arranged so as to bend the optical path in the direction perpendicular to the drawing.

As mentioned above, according to the display apparatus 7 using the ocular lens constructed as shown in FIGS. 22, 34, 45, or 56, a video image of high resolution and a wide angle of view can be provided. In the case where such a display apparatus 7 is fixed to an object other than the user, for example, even if the pupil of the user is deviated from the optical axis because of the movement of the user, a video image (virtual image) of high resolution can be provided. In the ocular lens shown in FIGS. 22, 34, 45, or 56, since the eye relief can be made long, it is also possible to cope with a case where the user moves in the optical axial direction.

In the above case, among the first to fourth lens groups 101 to 104, only one surface of the third lens group 103 or fourth lens group 104 has been formed as an aspherical surface. However, two or more surfaces of the third lens group 103 or fourth lens group 104 can be also formed so as to have aspherical surfaces. Although the surfaces of the first lens group 101 and second lens group 102 can be formed by aspherical surfaces, by forming the surface of the third lens group 103 or fourth lens group 104 by an aspherical surface, an astigmatism and a coma aberration can be reduced.

Further, although the quartic aspherical coefficient of the lens has been limited in the above case, as another method, for example, even by limiting the sextic aspherical coefficient of the lens, performance similar to that in case of limiting the quartic aspherical coefficient of the lens can be derived.

In the case where none of the surfaces in the third lens group 103 or fourth lens group 104 is formed by the aspherical surface, the astigmatism, distortion aberration, and the like increase. It is difficult to realize the eye relief of 0.75f or more by setting the diagonal angle of view to 40° or more while keeping the resolution as mentioned above.

In the display apparatus 7, as a screen which is used in the case where a video image is projected onto the screen by a projection optical system such as a projecting lens or the like and its projector is observed through the ocular lens, for example, there is a reflecting type besides the translucent type shown in FIG. 67 or the like. In case of using the reflecting type screen, it is necessary to irradiate the light from the projection optical system to the reflecting type screen and to allow the reflection light reflected by 180° there to enter the ocular lens. In this case, since the optical path from the projection optical system to the screen and the optical path from the screen to the ocular lens overlap, in general, one of the optical paths is bent by a half mirror or the like, thereby making the optical path between the half mirror and the projection optical system and the optical path between the half mirror and the ocular lens different.

In this case, since the half mirror is arranged in the optical path between the ocular lens and the screen, a space for installation is needed in such an interval. It is, therefore, necessary to set a slightly long distance as a distance between the ocular lens and the screen. However, a request to make the distance between the ocular lens and the screen (distance on the optical axis) long and a request to make the eye relief long are also contradictory requests.

In this case, in order to prevent an enlargement in size of the whole apparatus by the installation of the half mirror, for instance, it is necessary to shorten the length of ocular lens. To shorten the length of ocular lens, it is necessary to reduce the number of lenses constructing the ocular lens. However, it is extremely difficult to realize high resolution by a small number of lenses.

Specifically speaking, in the ocular lens disclosed in, for example, U.S. Pat. No. 2,637,245 or the like, the angle of view (apparent field of view) is equal to about 42° and the eye relief is equal to about 1.376f, so that a high eye point is obtained. However, the distance between the ocular lens and the screen is short to be about 0.243f. Further, it is difficult to cope with the standard of UXGA or HDTV.

Figure 78:
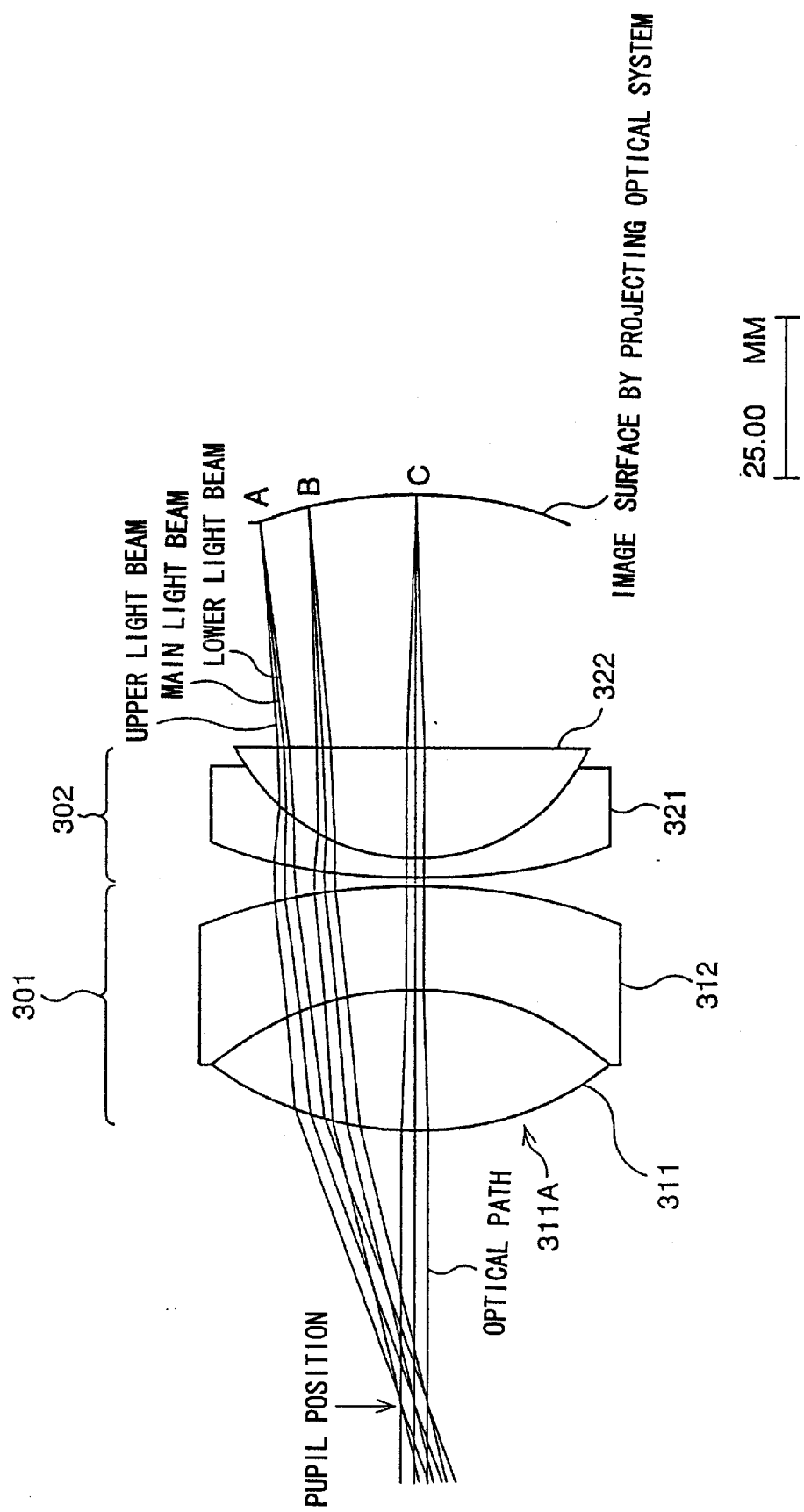
FIG. 78 is a diagram showing a constructional example of the fifth embodiment constructing an enlargement optical system.
Figure 85A:
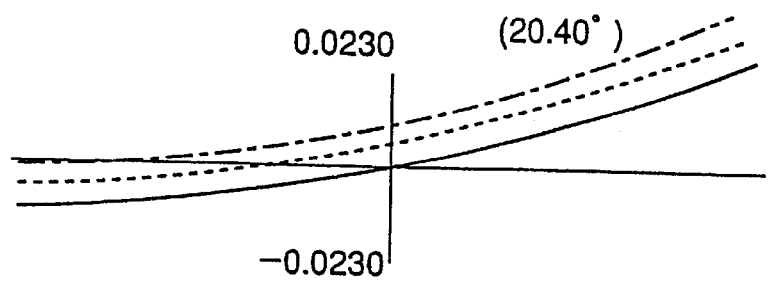
FIGS. 85A to 85E are diagrams showing lateral aberrations of the ocular lens in FIG. 83.
Figure 85B:
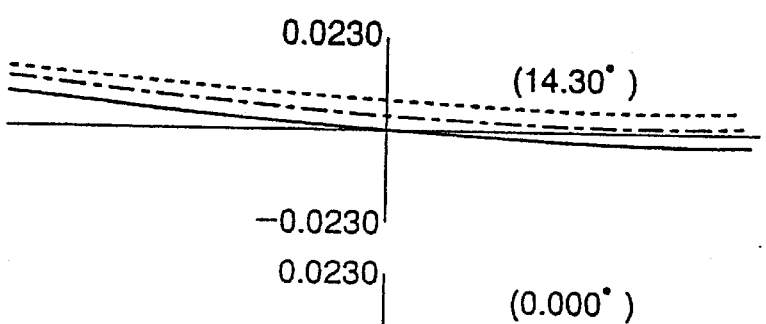
Figure 85C:
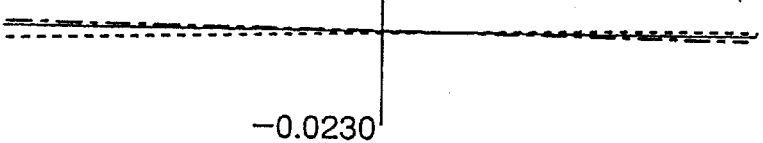
Figure 85D:
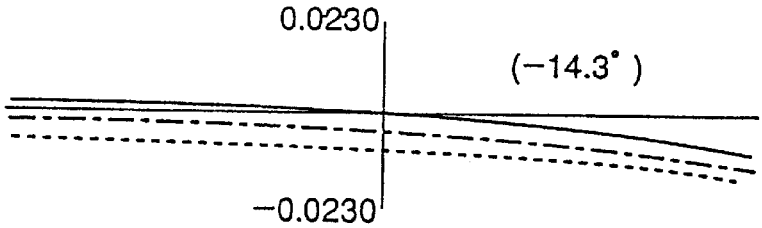
Figure 85E:
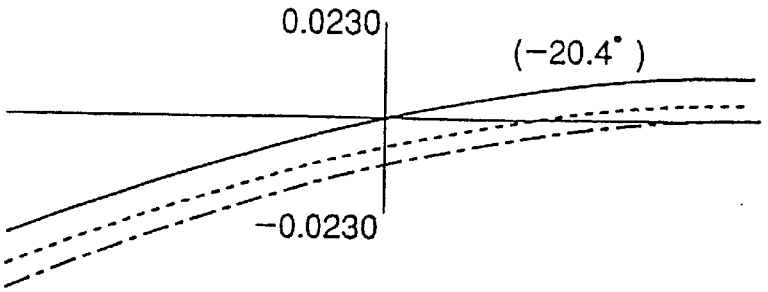

FIG. 78 shows a constructional example of the fifth embodiment of an ocular lens which is used as lenses 13L and 13R constructing the enlargement optical systems.

In the embodiment (the same shall also similarly apply in ocular lenses of the other embodiments, which will be explained hereinlater), the eye relief is set to, for instance, 40 mm and an allowance amount of the deviation of the pupil position is set to ±9 mm. Further, the angle of view is set so that the horizontal angle of view (total angle) of 35° or more and the diagonal angle of view (total angle) of 40° or more can be assured.

In the ocular lens of the fifth embodiment of FIG. 78 (the same shall also similarly apply in the ocular lenses in the other embodiments, which will be explained hereinlater), a back focus (distance between the ocular lens and the image which is formed on the screen or the like) is set to a value similar to the eye relief. That is, the back focus is set so that about 40 mm similar to the foregoing eye relief can be assured.

Further, the ocular lens of the fifth embodiment of FIG. 78 (the same shall also similarly apply in the ocular lenses in the other embodiments, which will be explained hereinlater) is constructed by a (4 elements in 2 groups) lens for the purpose of miniaturization of the apparatus. In the case where the number of lenses constructing the ocular lens is reduced as mentioned above, it is difficult to realize both of what is called an achromatism and a flatness of the image surface of the ocular lens. Therefore, for example, priority is given to the achromatism here. In case of giving the priority to the achromatism as mentioned above, since a refractive index, a variance value, and the like of the lenses which are used for constructing the ocular lens are limited, it is difficult to flatten the image surface by reducing the image surface curve. That is, when the priority is given to the achromatism in the ocular lens having a small number of elements, it generally cannot avoid that the image surface becomes a curved surface.

When the image projected onto the screen or the like by, for example, a projection optical system with less aberration is observed by the ocular lens having a curved image surface, in a peripheral region (edge portion) of the curved surface away from the optical axis, the image becomes blur and the resolution deteriorates. Therefore, it is now assumed that in the projection optical system, an image of the curved image surface which coincides with the image surface of the ocular lens is formed. Thus, even in the peripheral region of the picture plane, the image does not become blur and a video image of high resolution can be observed. As a method of allowing the projection optical system to form an image of the curved image surface, for example, there is a method whereby the screen to which the projection optical system projects an image is formed in such a curved shape or the like.

If a blur of the image in the peripheral region of the picture plane is permitted, there is no need to allow the projection optical system to form an image of the curved image surface.

In FIG. 78, the ocular lens is constructed by a (4 elements in 2 groups) lens as mentioned above. That is, the ocular lens is constructed by sequentially arranging a first lens group 301 and a second lens group 302 in accordance with the order from the pupil side. In FIG. 78, a screen to which the image formed by the projection optical system is projected or the like is disposed on the right side of the second lens group 302. By seeing the image from the left side (pupil side) of the first lens group 301, its virtual image can be observed.

The first lens group 301 (first lens group) is constructed by sequentially joining a lens 311 as a positive lens and a lens 312 as a negative lens in accordance with the order seen from the pupil side. That is, the lens 311 is arranged on the pupil side and the lens 312 is arranged on the side (screen side) opposite to the pupil, respectively.

The second lens group 302 (second lens group) is constructed by sequentially joining a lens 321 as a negative lens and a lens 322 as a positive lens in accordance with the order seen from the pupil side. That is, the lens 321 is arranged on the pupil side and the lens 322 is arranged on the screen side, respectively.

In the foregoing first lens group 301 or second lens group 302, only a surface 311A on the pupil side of the lens 311 constructing the first lens group 301 is formed by an aspherical surface. Further in this case, now assuming that a quartic aspherical coefficient of the surface 311A on the pupil side of the first lens group 301 is labeled as $a_{11}$ and the focal distance of the whole system of the ocular lens is set to f and a predetermined coefficient is set to $k_{11}$, respectively, the coefficient $k_{11}$ is set so as to satisfy the following relational expression.

$$-0.9 < k_{11} < -0.5 \text{ where, } a_{11} = (k_{11}/f)^3 \quad (24)$$

This is because if the coefficient $k_{11}$ is equal to −0.9 or less, when the pupil moves from the optical axis, the image surface of the peripheral region of the picture plane of the video image (edge portion of the picture plane) on the side opposite to the moving direction falls down in the negative direction and the resolution deteriorates. On the other hand, this is also because if the coefficient $k_{11}$ is equal to −0.5 or more, when the pupil moves from the optical axis, the image surface in the moving direction falls down in the positive direction and the resolution deteriorates. A state where the image surface is excessively bent in the positive or negative direction denotes that a curve showing an average image surface which is derived from an astigmatism curve in the sagittal direction (S direction) and an astigmatism curve in the meridional direction (M direction) is excessively inclined in the positive or negative direction.

It is not limited to a situation such that the relational expression (24) (the same shall also similarly apply to the other conditional expressions, which will be explained hereinlater) certainly satisfies the condition. However, when the condition of the relational expression (24) is not satisfied, the resolution of the ocular lens deteriorates in terms of the meaning as described in the first embodiment of the ocular lens.

Subsequently, in the case where only the surface 311A on the pupil side of the lens 311 in the first lens group 301 is formed by the aspherical surface and the coefficient $k_{11}$ is set to −0.7 as a value within the intermediate range of the range shown in the relational expression (24), each parameter of the ocular lens is, for instance, as shown below.

$r0 = \infty \ d0 = 40.000000$ $r1 = 50.07380 \ d1 = 21.596783 \ nd1 = 1.540033 \ \upsilon d1 = 65.3863$ $r2 = -45.97502 \ d2 = 16.930953 \ nd2 = 1.744445 \ \upsilon d2 = 43.5917$ $r3 = -82.60234 \ d3 = 1.000000$ $r4 = 90.60758 \ d4 = 3.000000 \ nd4 = 1.746911 \ \upsilon d4 = 38.3455$ $r5 = 30.31965 \ d5 = 17.472265 \ nd5 = 1.487000 \ \upsilon d5 = 70.4000$ $r6 = -7038.46034 \ d6 = 40.000000$ $r7 = -75.00000$ $a_{11} = -0.970425 \times 10^{-6}$ $b_{11} = -0.134184 \times 10^{-9}$ $f = 70.704 \quad (25)$ where, in the equations (25) and subsequent equations, r0 to r7 denote the radii of curvature (mm) in the pupil surface, the surface on the pupil side of the lens 311, the surface on the screen side of the lens 311 (surface on the pupil side of the lens 312), the surface on the pupil side of the lens 312, the surface on the pupil side of the lens 321, the surface on the screen side of the lens 321 (surface on the pupil side of the lens 322), the surface on the screen side of the lens 322, and the image surface of the image which is formed on the screen or the like by the projection optical system, respectively. d0 denotes the distance (eye relief) (mm) from the pupil to the ocular lens, namely, to the lens 311 of the first lens group 301. d1 to d6 indicate the thickness of the lens 311, the thickness of the lens 312, the air gap between the lenses 312 and 321, the thickness of the lens 321, the thickness of the lens 322, and the distance (back focus) (mm) from the lens 322 to the image which is formed on the screen or the like, respectively. Further, nd1, nd2, nd4, or nd5 denotes the refractive index in a d line of a nitride material of each of the lenses 311, 312, 321, and 322, respectively. $\upsilon d1$, $\upsilon d2$, $\upsilon d4$, or $\upsilon d5$ denotes the Abbe number in the d line of the nitride material of each of the lens 311, 312, 321, or 322, respectively. $a_{11}$ or $b_{11}$ denotes the quartic or sextic aspherical coefficient of the surface 311A on the pupil side of the first lens group 301 (surface on the pupil side of the lens 311) as an aspherical surface, respectively. f denotes the focal distance of the ocular lens in the light having a wavelength of 525 nm (nanometers).

When each parameter of the ocular lens is set as shown by the equations (25), shapes of the lenses 311, 312, 321, and 322 are as shown in FIG. 78. Further, when the pupil exists on the optical axis, an optical path diagram as shown in FIG. 78 is drawn. A spherical aberration, an astigmatism, and a distortion aberration in this case are as shown in FIG. 79 and lateral aberrations on the image surface are as shown in FIG. 80.

FIG. 81 shows an optical path diagram which is drawn when the pupil is deviated from the optical axis by only 9 mm in the case where each parameter of the ocular lens is set as shown in the equations (25). Further, FIG. 82 shows lateral aberrations on the image surface in this case.

In optical path diagrams shown below including FIG. 78, the optical paths D and E among the five optical paths A to E described in the first embodiment of the ocular lens are omitted in the diagrams.

Subsequently, in the case where only the surface 311A on the pupil side of the lens 311 in the first lens group 301 is formed by the aspherical surface and the coefficient $k_{11}$ is set to −0.9 as a lower limit value within the range shown in the relational expression (24), each parameter of the ocular lens is, for instance, as shown below.

$r0=\infty\ d0=40.000000$ $r1=46.78293\ d1=25.517040\ nd1=1.487000\ \upsilon d1=70.4000$ $r2=-36.86474\ d2=11.080586\ nd2=1.698553\ \upsilon d2=47.7991$ $r3=-57.08138\ d3=1.000000$ $r4=160.01023\ d4=3.206065\ nd4=1.745732\ \upsilon d4=40.6829$ $r5=32.53695\ d5=19.196310\ nd5=1.487000\ \upsilon d5=70.4000$ $r6=-251.08445\ d6=39.999999$ $r7=-75.00000$ $a_{11}=-0.206251\times 10^{-5}$ $b_{11}=-0.162838\times 10^{-9}$ $f=70.704$ \hfill (26)

When each parameter of the ocular lens is set as shown by the equations (26), shapes of the lenses 311, 312, 321, and 322 are as shown in FIG. 83. Further, when the pupil exists on the optical axis, an optical path diagram as shown in FIG. 83 is drawn. A spherical aberration, an astigmatism, and a distortion aberration in this case are as shown in FIG. 84 and lateral aberrations on the image surface are as shown in FIG. 85.

Figure 86:
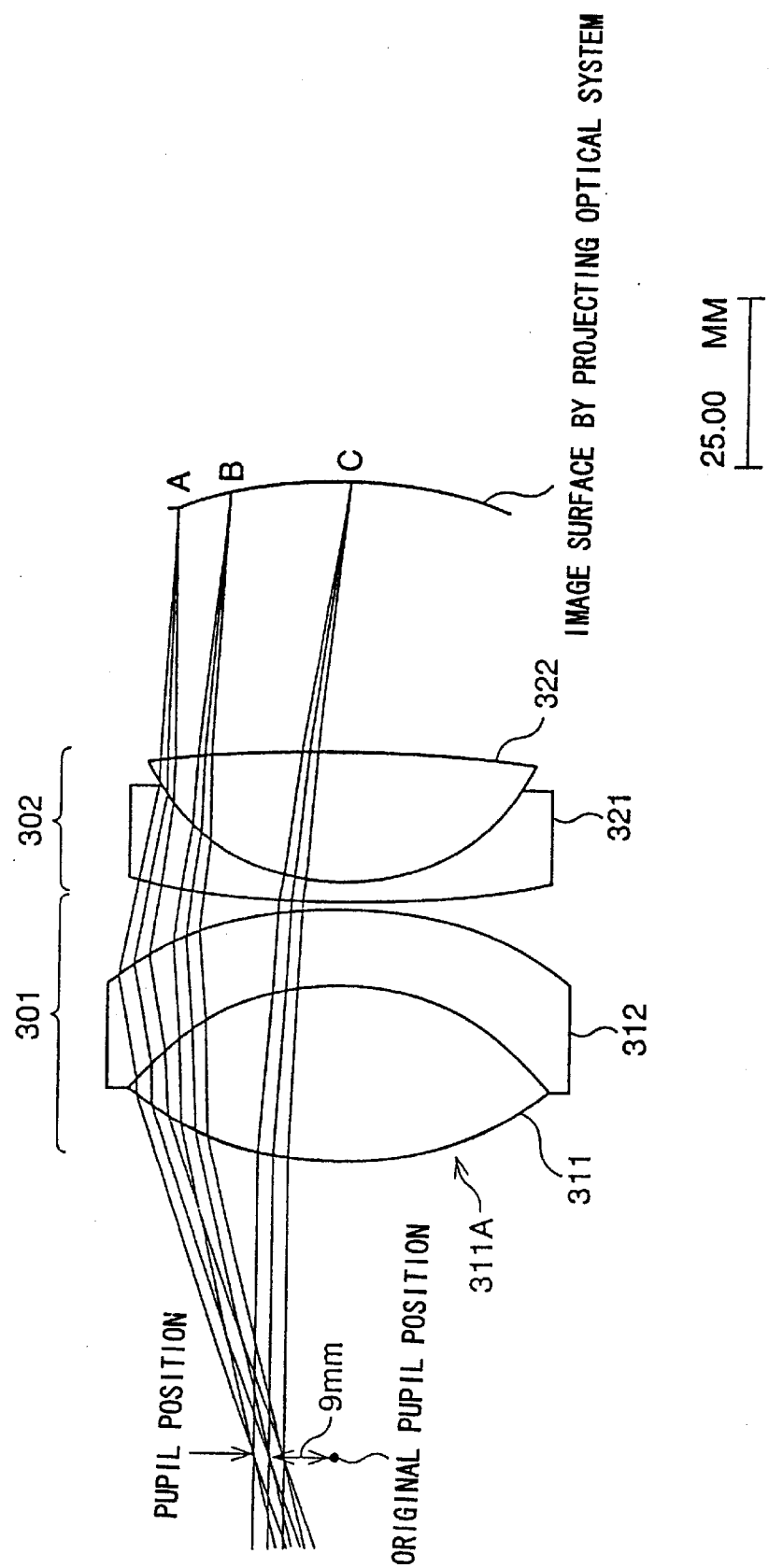
FIG. 86 is an optical path diagram showing an optical path in the case where a pupil position is deviated in FIG. 83.
Figure 87A:
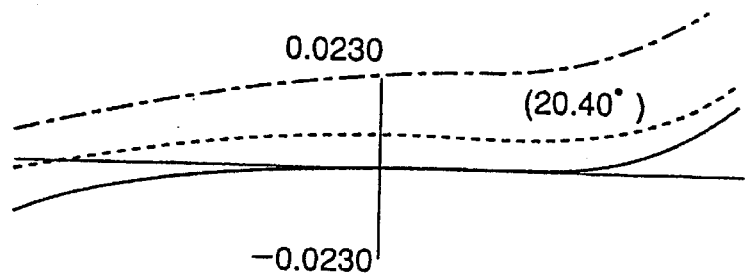
FIGS. 87A to 87E are diagrams showing lateral aberrations of the ocular lens in FIG. 83 in the case where the pupil position is deviated.
Figure 87B:
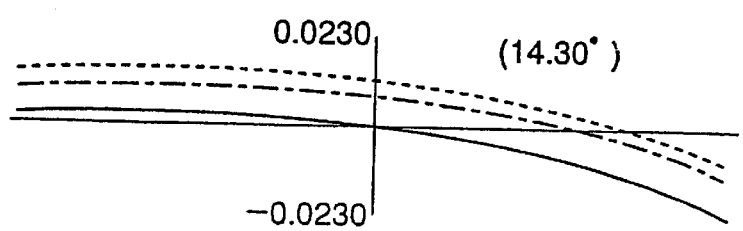
Figure 87C:
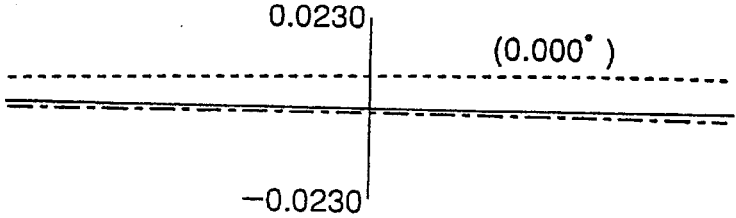
Figure 87D:
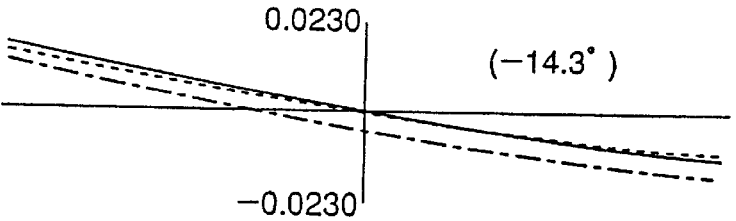
Figure 87E:
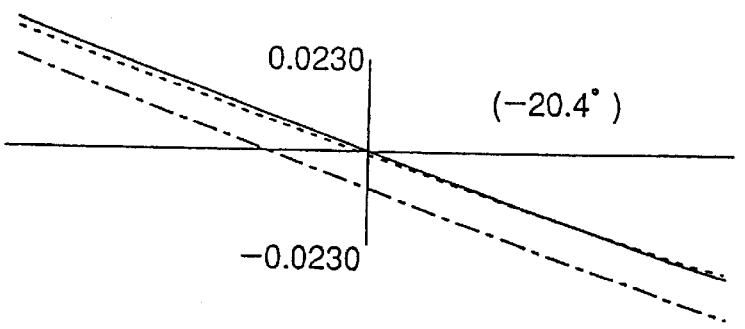

FIG. 86 shows an optical path diagram which is drawn when the pupil is deviated from the optical axis by only 9 mm in the case where each parameter of the ocular lens is set as shown in the equations (26). Further, FIG. 87 shows lateral aberrations on the image surface in this case.

Subsequently, in the case where only the surface 311A on the pupil side of the lens 311 in the first lens group 301 is formed by the aspherical surface and the coefficient $k_{11}$ is set to −0.5 as an upper limit value within the range shown in the relational expression (24), each parameter of the ocular lens is, for instance, as shown below.

$r0=\infty\ d0=40.000000$ $r1=56.36241\ d1=19.832046\ nd1=1.610052\ \upsilon d1=60.8210$ $r2=-48.36727\ d2=18.528516\ nd2=1.744406\ \upsilon d2=43.6864$ $r3=-128.12790\ d3=1.000000$ $r4=80.08954\ d4=3.000000\ nd4=1.747707\ \upsilon d4=36.9175$ $r5=30.32276\ d5=17.639439\ nd5=1.487000\ \upsilon d5=70.4000$ $r6=-812.28344\ d6=40.000000$ $r7=-75.00000$ $a_{11}=-0.353654\times 10^{-6}$ $b_{11}=-0.350604\times 10^{-11}$ $f=70.704$ \hfill (27)

Figure 88:
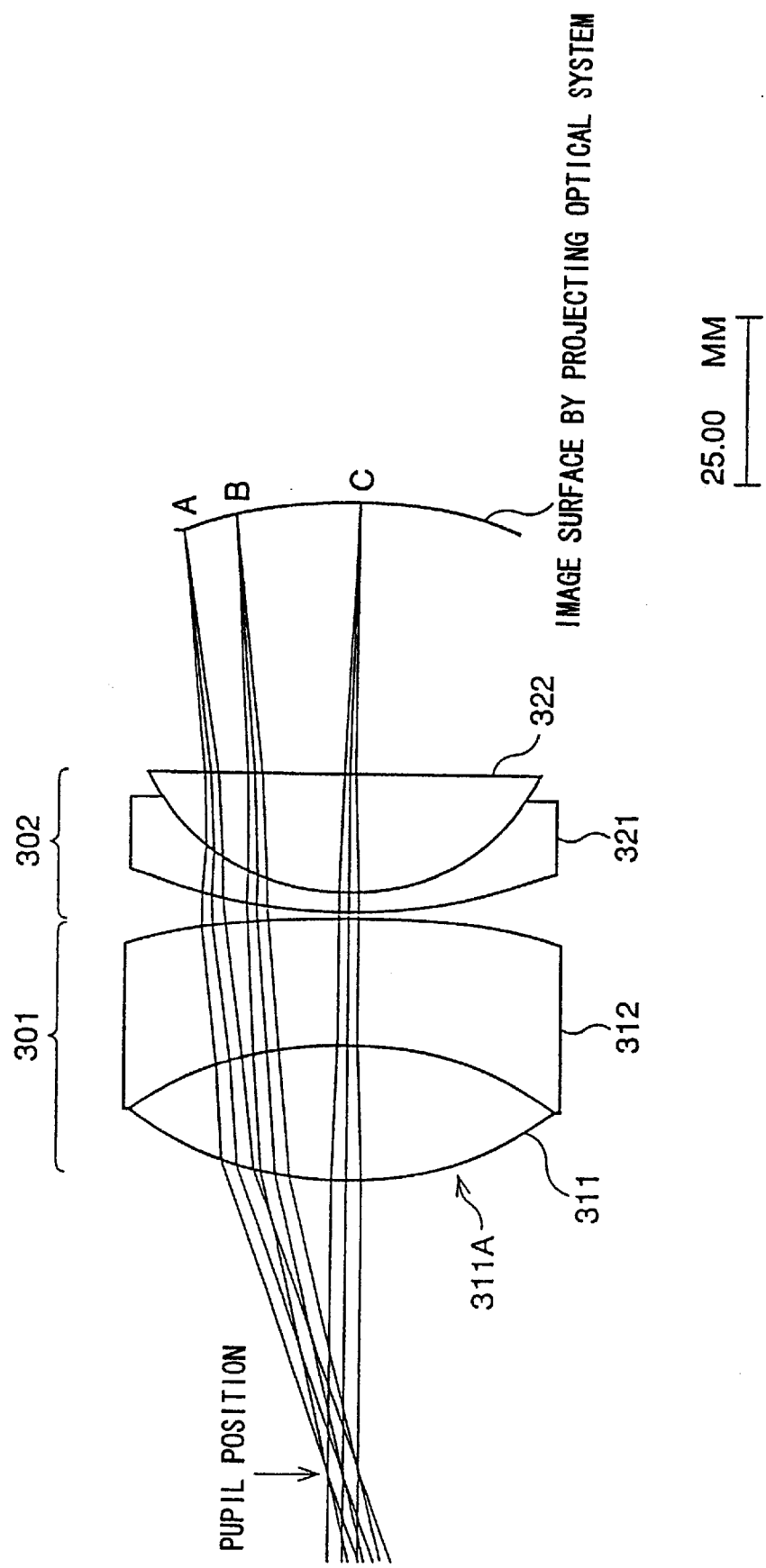
FIG. 88 is a diagram showing another constructional example in which parameters of the ocular lens in the fifth embodiment are changed.
Figure 90A:
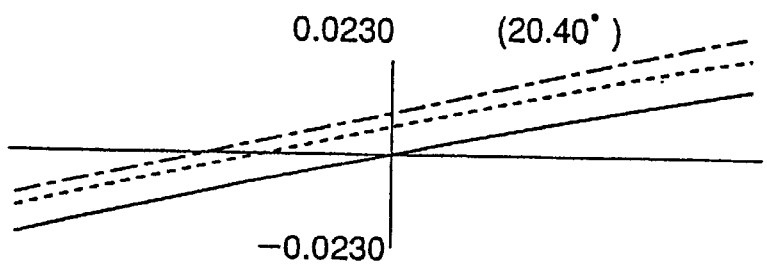
FIGS. 90A to 90E are diagrams showing lateral aberrations of the ocular lens in FIG. 88.
Figure 90B:
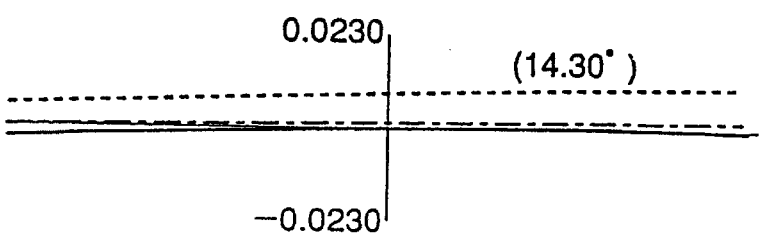
Figure 90C:
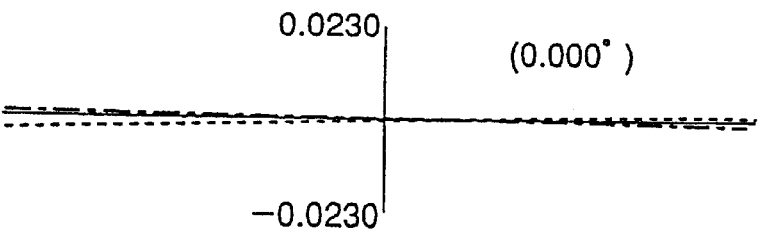
Figure 90D:
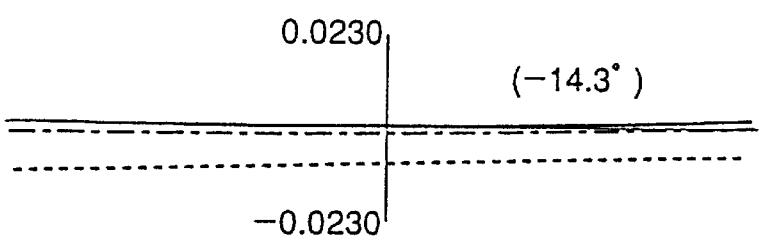
Figure 90E:
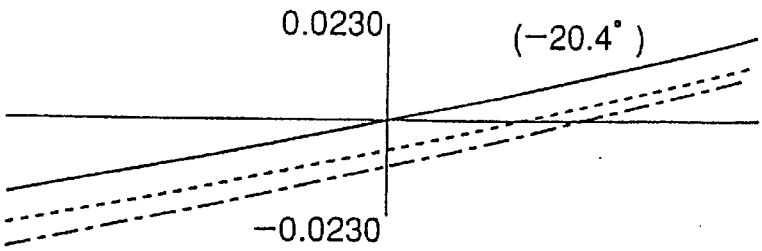

When each parameter of the ocular lens is set as shown by the equations (27), shapes of the lenses 311, 312, 321, and 322 are as shown in FIG. 88. Further, when the pupil exists on the optical axis, an optical path diagram as shown in FIG. 88 is drawn. A spherical aberration, an astigmatism, and a distortion aberration in this case are as shown in FIG. 89 and lateral aberrations on the image surface are as shown in FIG. 90.

FIG. 91 shows an optical path diagram which is drawn when the pupil is deviated from the optical axis by only 9 mm in the case where each parameter of the ocular lens is set as shown in the equations (27). Further, FIG. 92 shows lateral aberrations on the image surface in this case.

Figure 93:
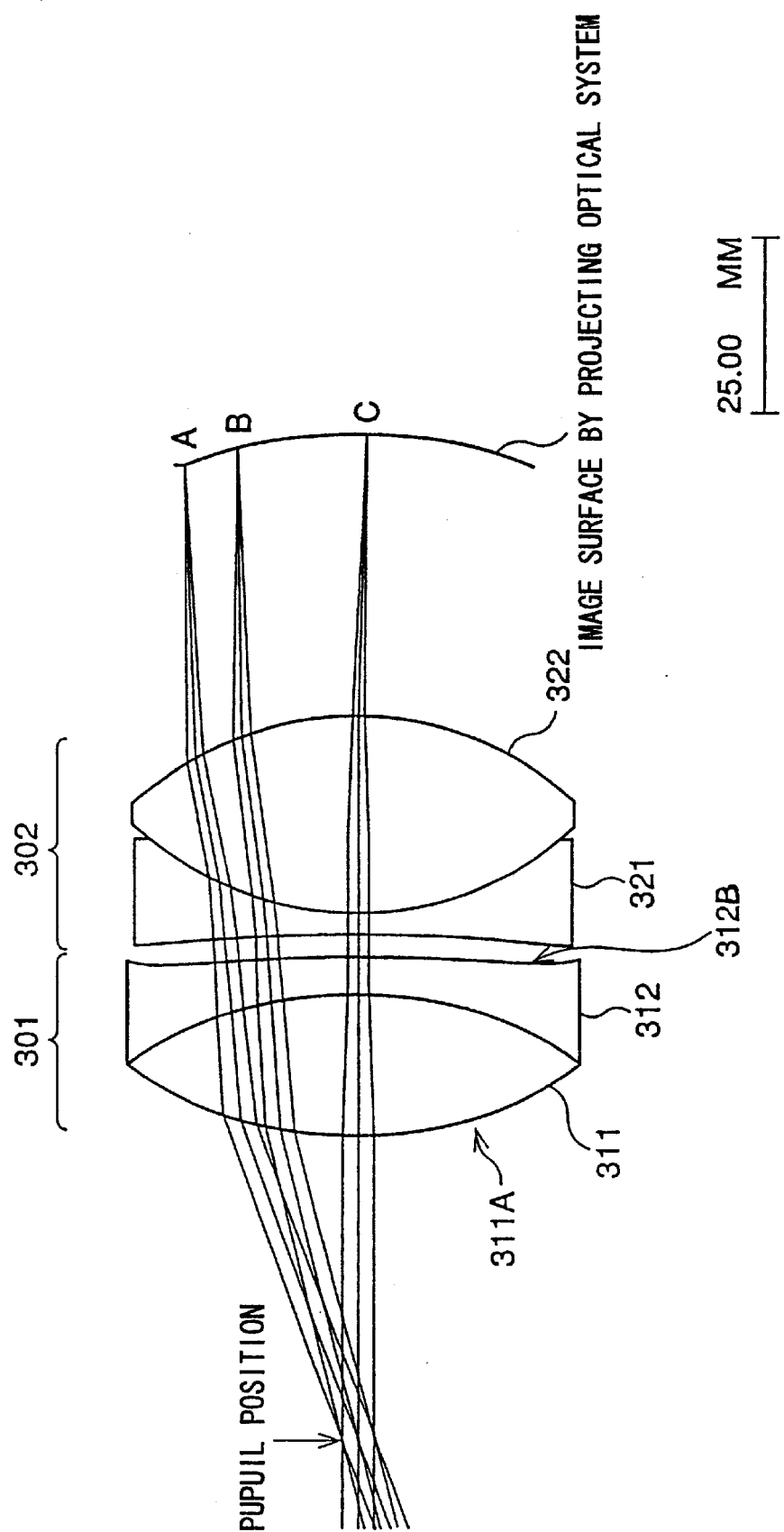
FIG. 93 is a diagram showing a constructional example of the sixth embodiment constructing an enlargement optical system.

FIG. 93 shows a constructional example of the sixth embodiment of an ocular lens which is used as lenses 13L and 13R constructing the enlargement optical system. In the diagram, portions corresponding to those in case of FIG. 78 are designated by the same reference numerals. That is, the ocular lens is fundamentally constructed in a manner similar to the case of FIG. 78.

In the sixth embodiment, in the first lens group 301 or second lens group 302, only a surface 312B on the screen side of the lens 312 constructing the first lens group 301 is formed by an aspherical surface. In this case, further, now assuming that a quartic aspherical coefficient of the surface 312B on the screen side of the first lens group 301 is labeled as $a_{12}$ and the focal distance of the whole system of the ocular lens is set to f and a predetermined coefficient is set to $k_{12}$ respectively, the coefficient $k_{12}$ is set so as to satisfy the following relational expression.

$-0.1<k_{12}<1.2$ where, $a_{12}=(k_{12}/f)^3$ \hfill (28)

This is because if the coefficient $k_{12}$ is equal to −0.1 or less, the image surface in the peripheral region of the picture plane of the video image is excessively bent in the positive direction and the resolution deteriorates. On the other hand, this is also because if the coefficient $k_{12}$ is equal to 1.2 or more, when the pupil moves from the optical axis, the image surface in the peripheral portion of the picture plane of the video image on the side opposite to the moving direction falls down in the positive direction and the resolution deteriorates.

Subsequently, in the case where only the surface 312B on the screen side of the lens 312 in the first lens group 301 is formed by the aspherical surface and the coefficient $k_{12}$ is set to 1.1 as a value within the intermediate range of the range shown in the relational expression (28), each parameter of the ocular lens is, for instance, as shown below.

$$r0=\infty \, d0=40.000000$$
$$r1=47.90263 \quad d1=20.532074 \quad nd1=1.549677 \quad \nu d1=64.6446$$
$$r2=-61.94314 \quad d2=4.449320 \quad nd2=1.487000 \quad \nu d2=70.4000$$
$$r3=-142.84458 \quad d3=4.095881$$
$$r4=-280.44421 \quad d4=3.000000 \quad nd4=1.748102 \quad \nu d4=36.2474$$
$$r5=41.59350 \quad d5=27.922724 \quad nd5=1.487000 \quad \nu d5=70.4000$$
$$r6=-49.29290 \quad d6=40.000000$$
$$r7=-75.00000$$
$$a_{12}=0.376570\times 10^{-5}$$
$$b_{12}=0.403927\times 10^{-9}$$
$$f=70.704 \tag{29}$$

where, $b_{12}$ denotes a sextic aspherical coefficient of the surface 312B on the screen side of the lens 312 of the first lens group 301 as an aspherical surface.

Figure 94C:
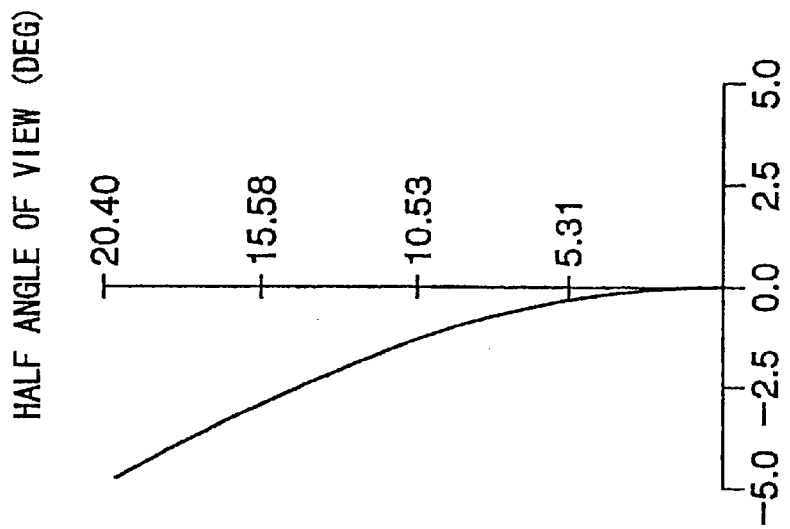
FIG. 94 is a diagram showing a spherical aberration (chromatic aberration), an astigmatism, and a distortion aberration of an ocular lens in FIG. 93.
Figure 94B:
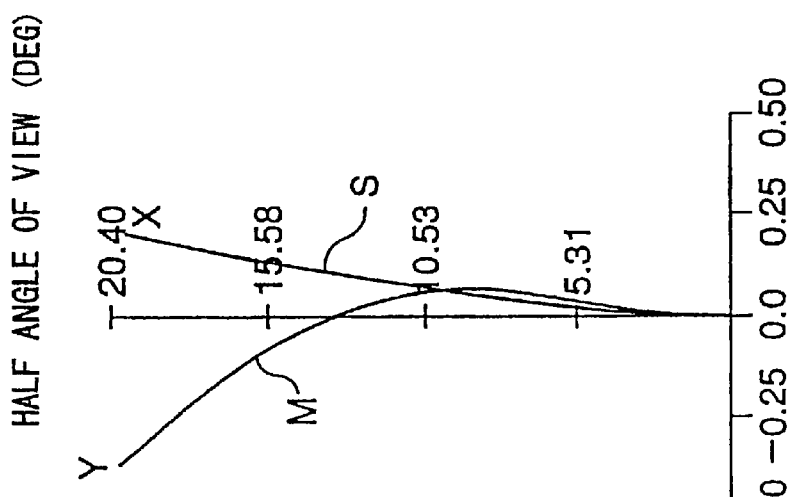
Figure 94A:
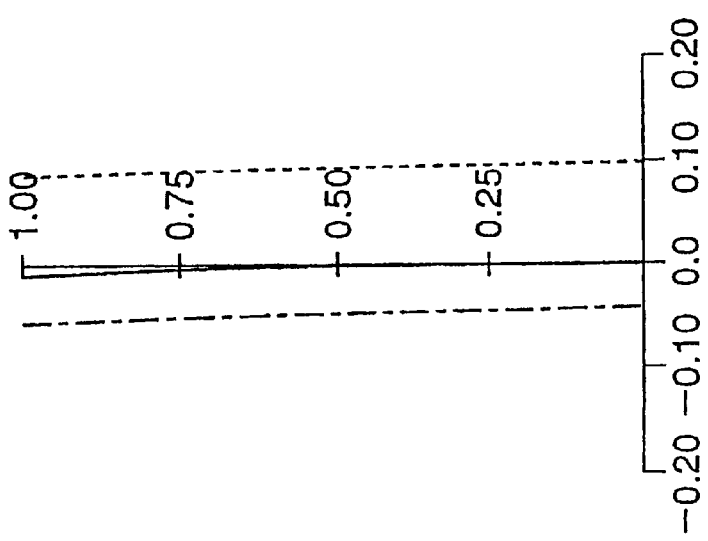

When each parameter of the ocular lens is set as shown by the equations (29), shapes of the lenses 311, 312, 321, and 322 are as shown in FIG. 93. Further, when the pupil exists on the optical axis, an optical path diagram as shown in FIG. 93 is drawn. A spherical aberration, an astigmatism, and a distortion aberration in this case are as shown in FIG. 94 and lateral aberrations on the image surface are as shown in FIG. 95.

Figure 96:
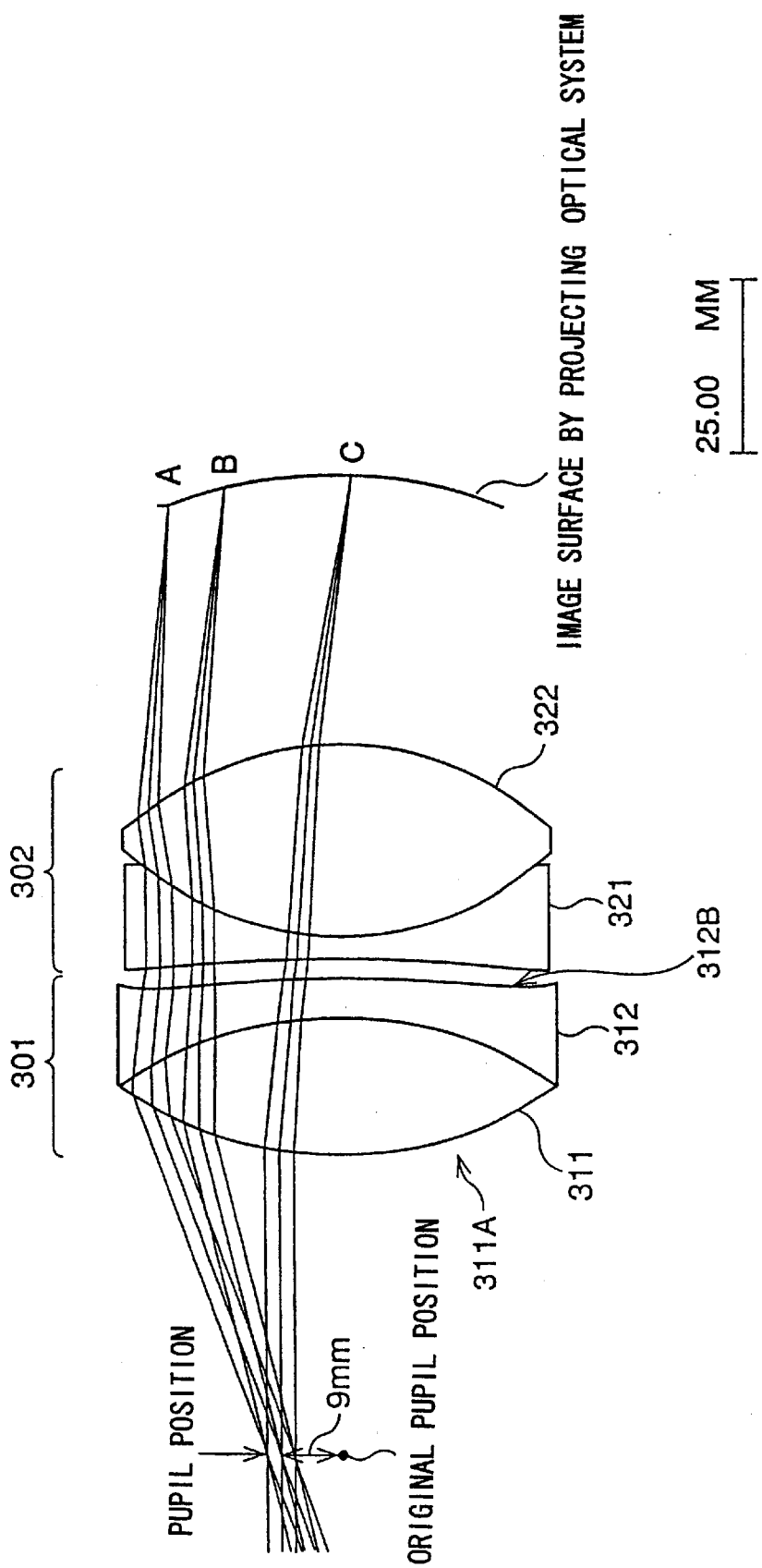
FIG. 96 is an optical path diagram showing an optical path in the case where the pupil position is deviated in FIG. 93.
Figure 97A:
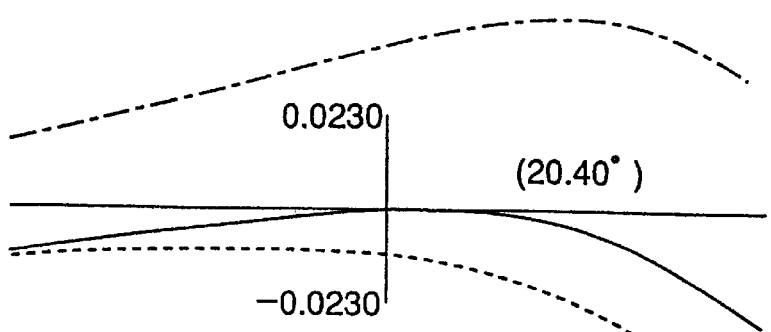
FIGS. 97A to 97E are diagrams showing lateral aberrations of the ocular lens in FIG. 93 in the case where the pupil position is deviated.
Figure 97B:
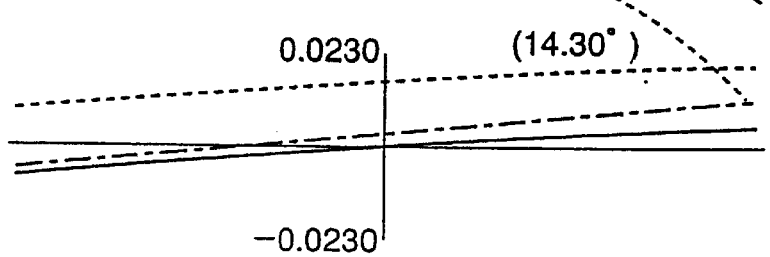
Figure 97C:
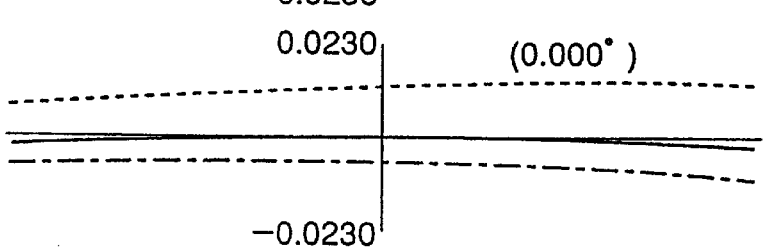
Figure 97D:
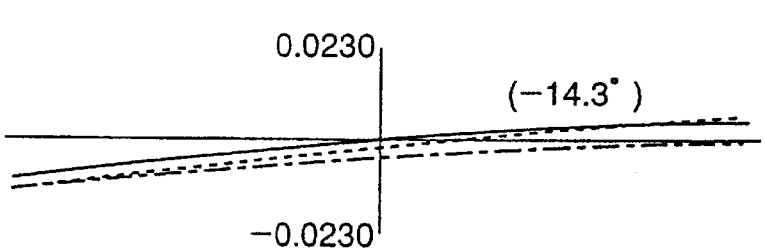
Figure 97E:
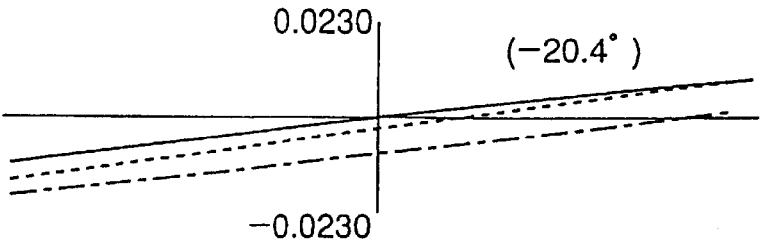

FIG. 96 shows an optical path diagram which is drawn when the pupil is deviated from the optical axis by only 9 mm in the case where each parameter of the ocular lens is set as shown in the equations (29). Further, FIG. 97 shows lateral aberrations on the image surface in this case.

Subsequently, in the case where only the surface 312B on the screen side of the lens 312 in the first lens group 301 is formed by the aspherical surface and the coefficient $k_{12}$ is set to −0.1 as a lower limit value within the range shown in the relational expression (28), each parameter of the ocular lens is, for instance, as shown below.

$$r0=\infty \, d0=40.000000$$
$$r1=59.60024 \quad d1=22.208164 \quad nd1=1.561732 \quad \nu d1=61.3018$$
$$r2=-39.79904 \quad d2=9.621365 \quad nd2=1.744000 \quad \nu d2=44.7000$$
$$r3=-110.13093 \quad d3=1.000000$$
$$r4=73.87884 \quad d4=8.203051 \quad nd4=1.747301 \quad \nu d4=37.6311$$
$$r5=30.04885 \quad d5=18.967420 \quad nd5=1.487000 \quad \nu d5=70.4000$$
$$r6=-266.58052 \quad d6=40.000000$$
$$r7=-75.00000$$
$$a_{12}=-0.282923\times 10^{-8}$$
$$b_{12}=-0.298726\times 10^{-9}$$
$$f=70.704 \tag{30}$$

Figure 98:
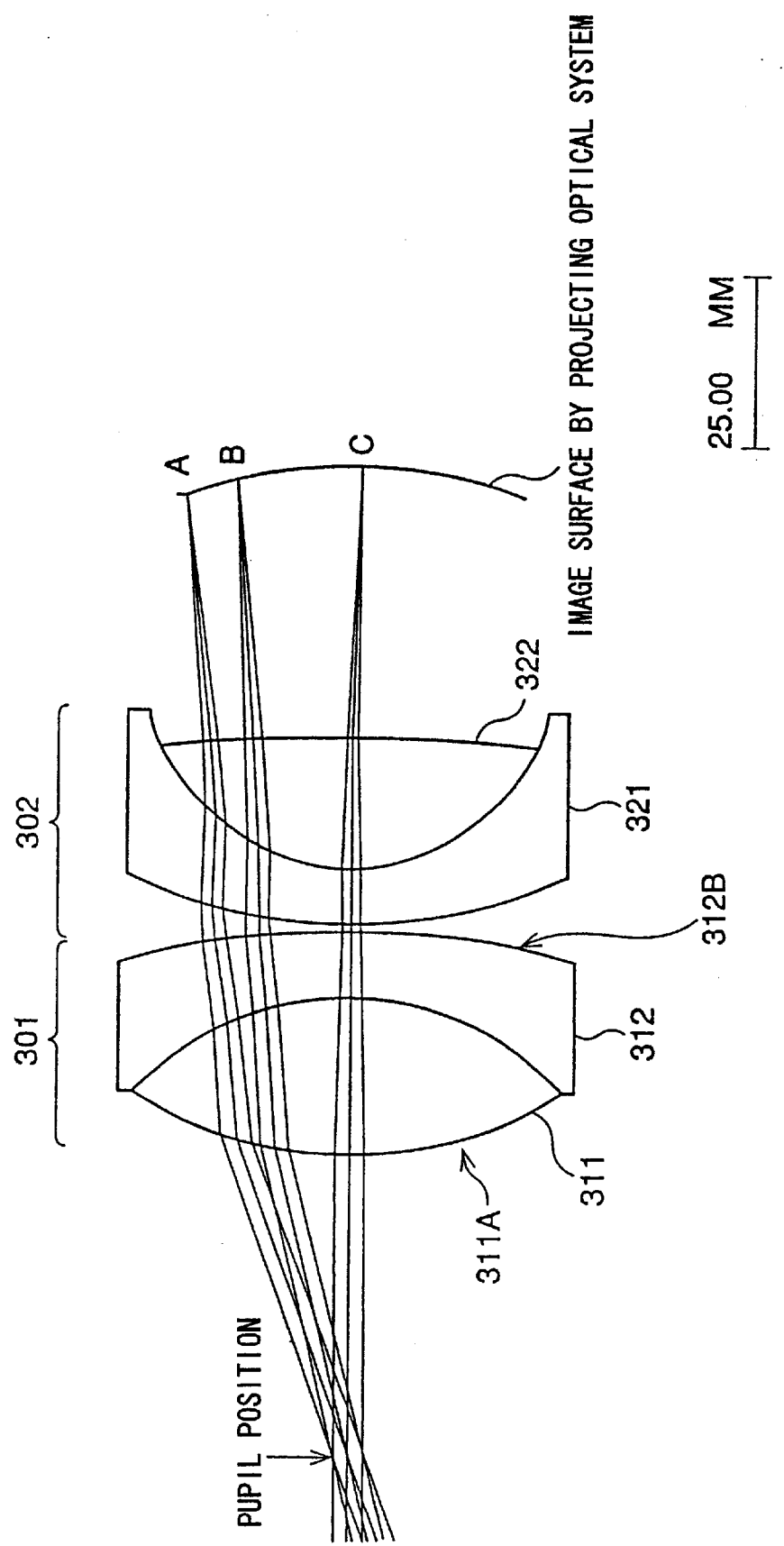
FIG. 98 is a diagram showing a constructional example in which parameters of the ocular lens in the sixth embodiment are changed.
Figure 102A:
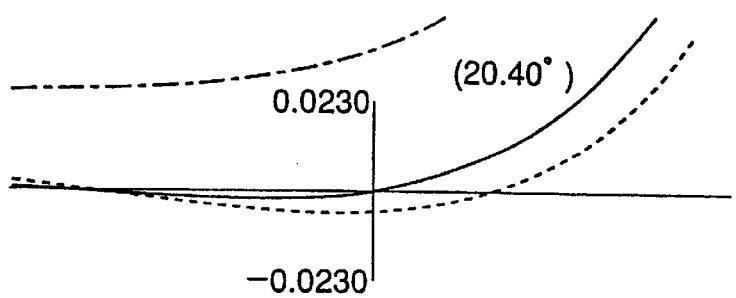
FIGS. 102A to 102E are diagrams showing lateral aberrations of the ocular lens in FIG. 98 in the case where the pupil position is deviated.
Figure 102B:
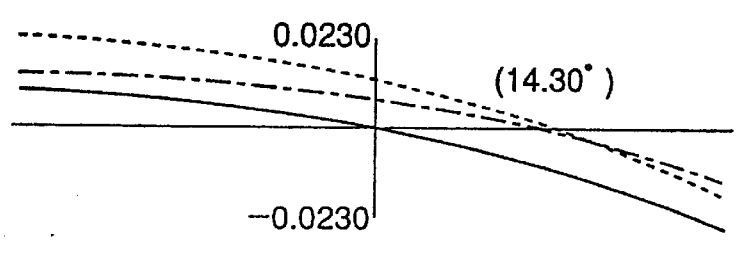
Figure 102C:
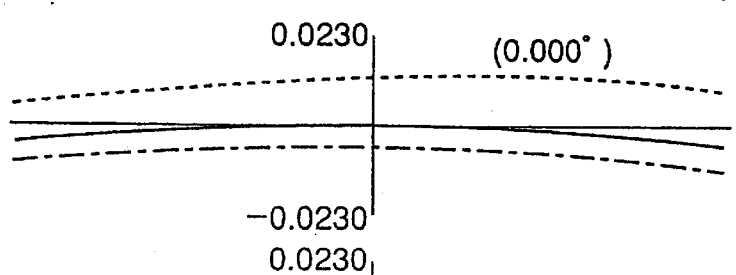
Figure 102D:
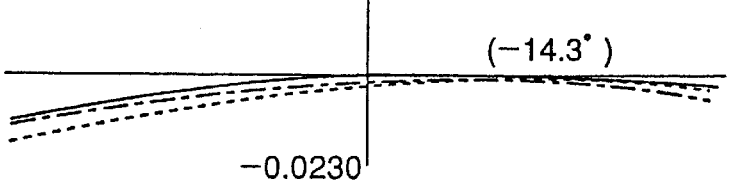
Figure 102E:
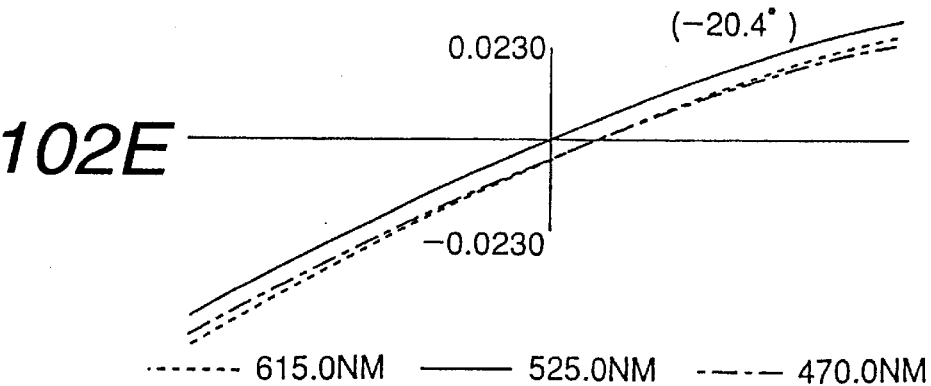

When each parameter of the ocular lens is set as shown by the equations (30), shapes of the lenses 311, 312, 321, and 322 are as shown in FIG. 98. Further, when the pupil exists on the optical axis, an optical path diagram as shown in FIG. 98 is drawn. A spherical aberration, an astigmatism, and a distortion aberration in this case are as shown in FIG. 99 and lateral aberrations on the image surface are as shown in FIG. 100.

FIG. 101 shows an optical path diagram which is drawn when the pupil is deviated from the optical axis by only 9 mm in the case where each parameter of the ocular lens is set as shown in the equations (30). Further, FIG. 102 shows lateral aberrations on the image surface in this case.

Subsequently, in the case where only the surface 312B on the screen side of the lens 312 in the first lens group 301 is formed by the aspherical surface and the coefficient $k_{12}$ is set to 1.2 as an upper limit value within the range shown in the relational expression (28), each parameter of the ocular lens is, for instance, as shown below.

$$r0=\infty \, d0=40.000000$$
$$r1=45.35307 \quad d1=24.984328 \quad nd1=1.511234 \quad \nu d1=64.2827$$
$$r2=-46.28172 \quad d2=3.000000 \quad nd2=1.487000 \quad \nu d2=70.4000$$
$$r3=-86.15767 \quad d3=4.572285$$
$$r4=-128.71885 \quad d4=3.000000 \quad nd4=1.747277 \quad \nu d4=37.6752$$
$$r5=43.40071 \quad d5=24.443387 \quad nd5=1.487000 \quad \nu d5=70.4000$$
$$r6=-43.83295 \quad d6=40.000007$$
$$r7=-75.00000$$
$$a_{12}=0.488893\times 10^{-5}$$
$$b_{12}=0.401212\times 10^{-9}$$
$$f=70.704 \tag{31}$$

Figure 103:
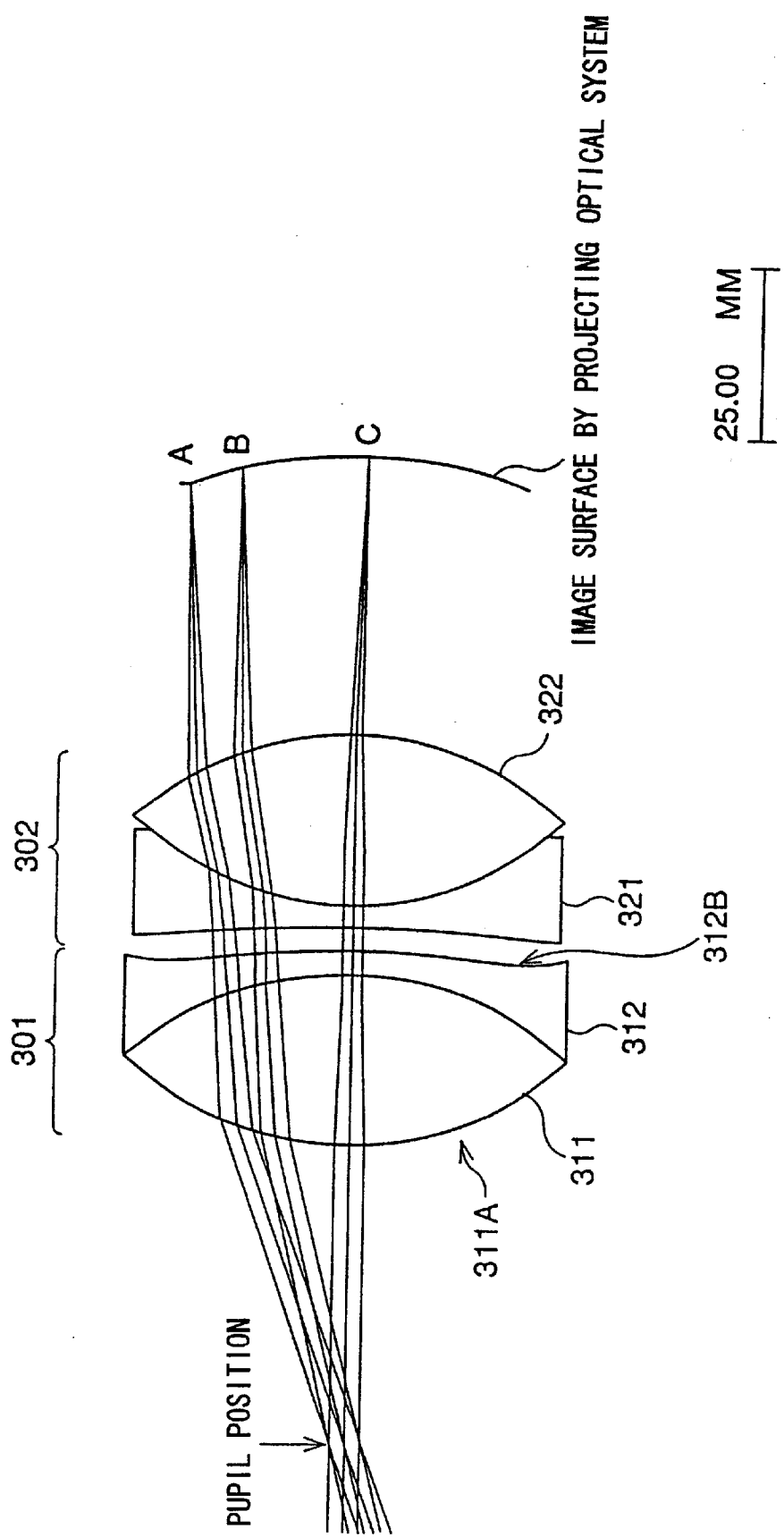
FIG. 103 is a diagram showing another constructional example in which parameters of the ocular lens in the sixth embodiment are changed.
Figures 104A, 104B, 104C:
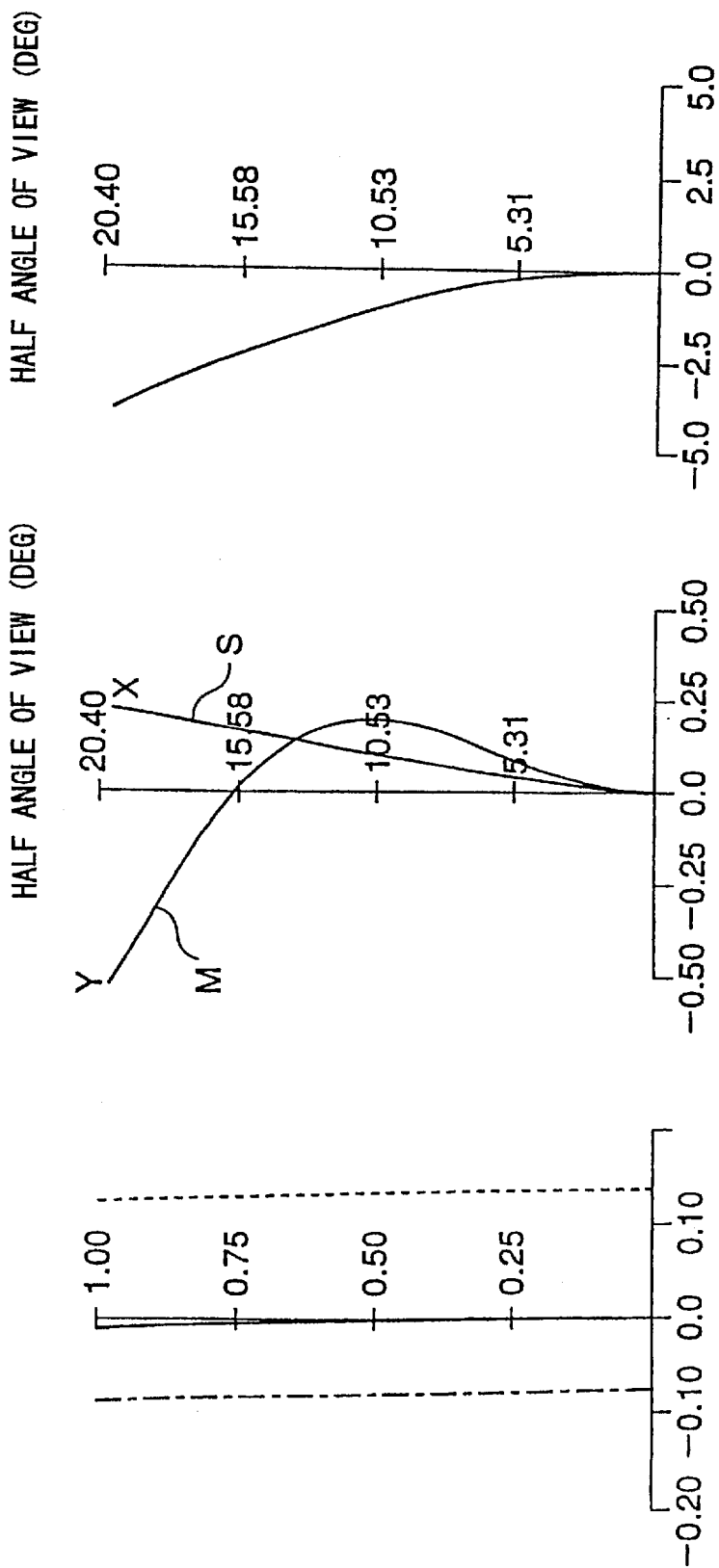
FIG. 104 is a diagram showing a spherical aberration (chromatic aberration), an astigmatism, and a distortion aberration of the ocular lens in FIG. 103.
Figure 105A:
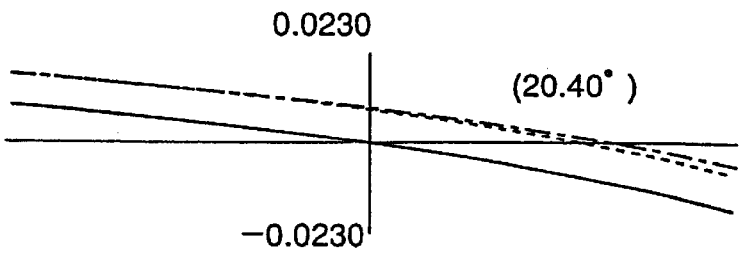
FIGS. 105A to 105E are diagrams showing lateral aberrations of the ocular lens in FIG. 103.
Figure 105B:
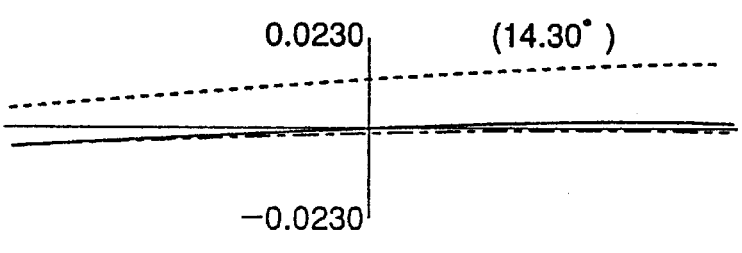
Figure 105C:
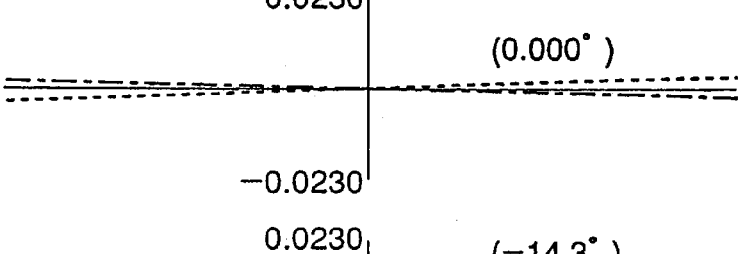
Figure 105D:
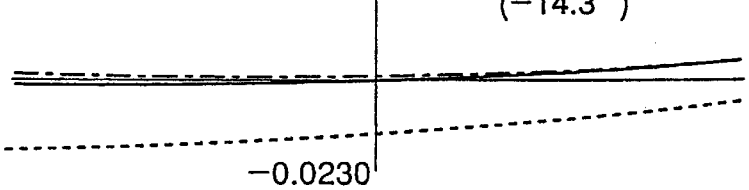
Figure 105E:
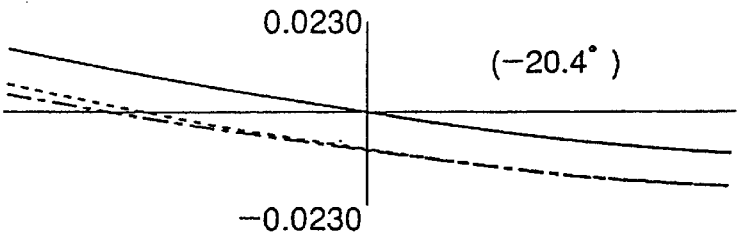

When each parameter of the ocular lens is set as shown by the equations (31), shapes of the lenses 311, 312, 321, and 322 are as shown in FIG. 103. Further, when the pupil exists on the optical axis, an optical path diagram as shown in FIG. 103 is drawn. A spherical aberration, an astigmatism, and a distortion aberration in this case are as shown in FIG. 104 and lateral aberrations on the image surface are as shown in FIG. 105.

FIG. 106 shows an optical path diagram which is drawn when the pupil is deviated from the optical axis by only 9 mm in the case where each parameter of the ocular lens is set as shown in the equations (31). Further, FIG. 107 shows lateral aberrations on the image surface in this case.

Figure 108:
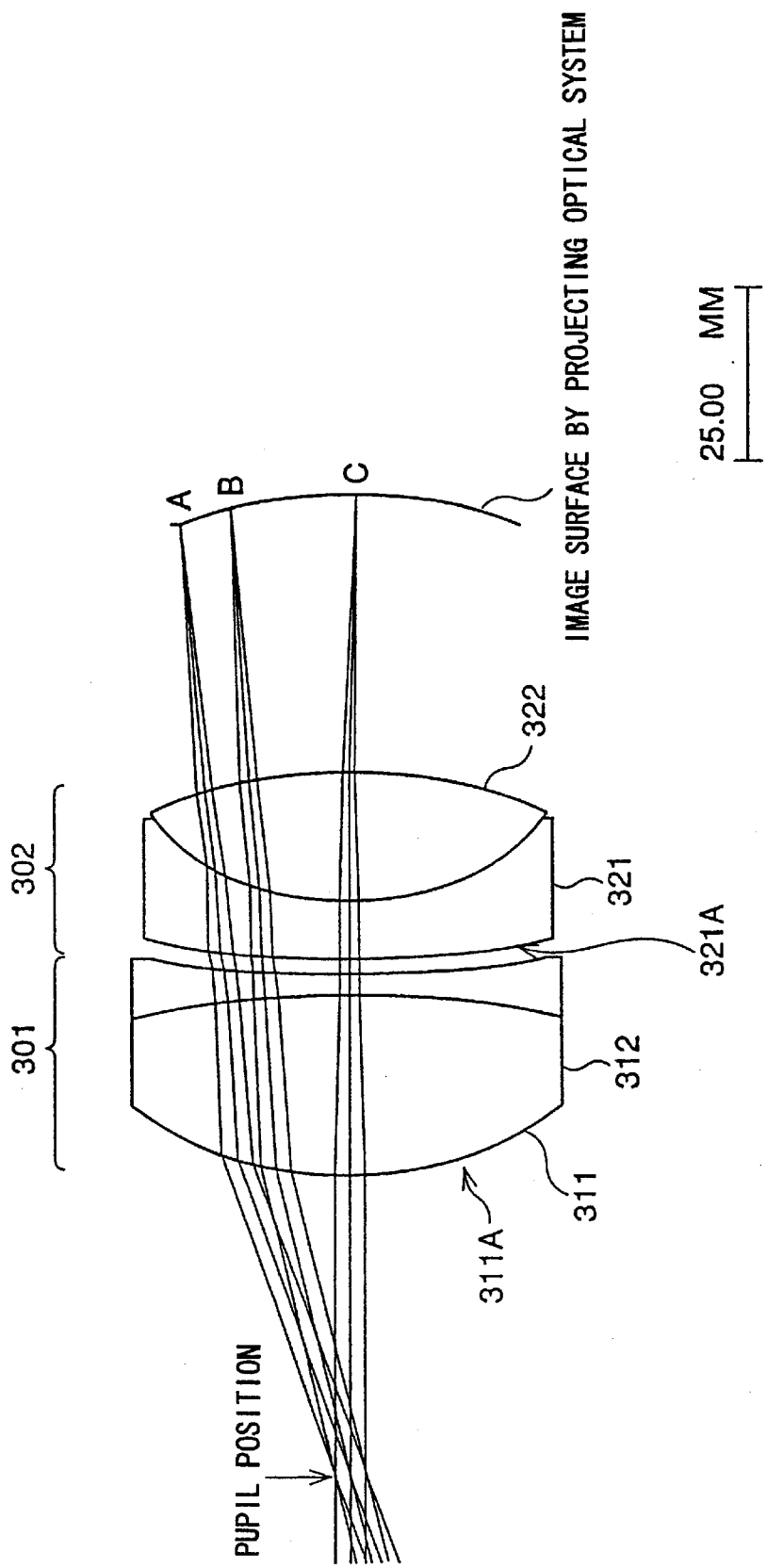
FIG. 108 is a diagram showing a construction of the seventh embodiment constructing an enlargement optical system.
Figure 110A:
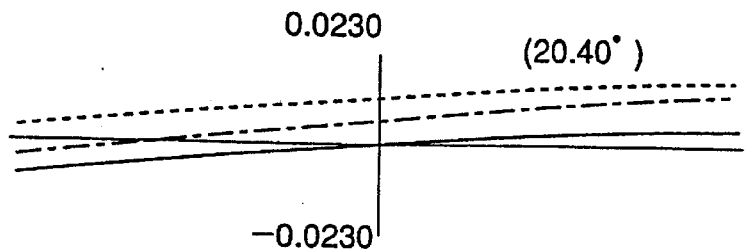
FIGS. 110A to 110E are diagrams showing lateral aberrations of the ocular lens in FIG. 108.
Figure 110B:
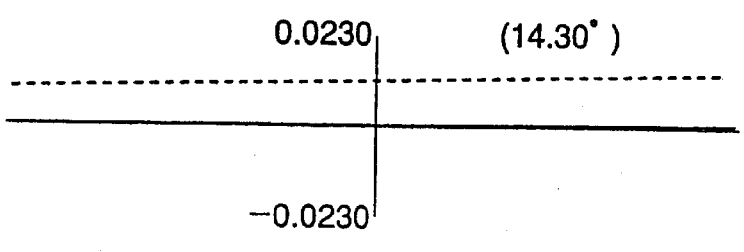
Figure 110C:
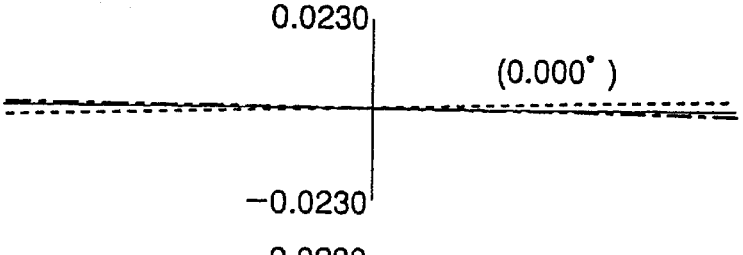
Figure 110D:
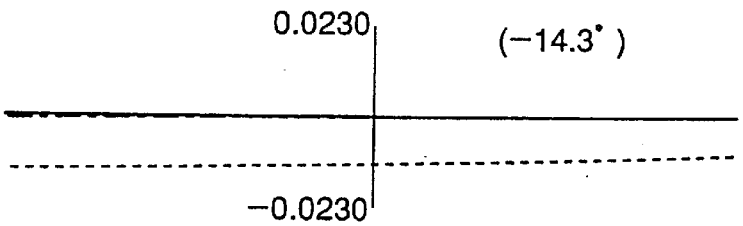
Figure 110E:
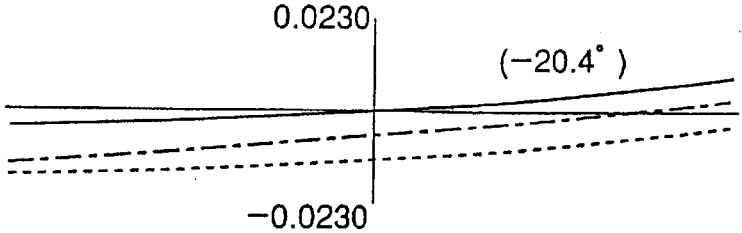

FIG. 108 shows a constructional example of the seventh embodiment of an ocular lens which is used as lenses 13L and 13R constructing the enlargement optical system. In the diagram, portions corresponding to those in case of FIG. 78 are designated by the same reference numerals. That is, the ocular lens is fundamentally constructed in a manner similar to the case of FIG. 78.

In the seventh embodiment, in the first lens group 301 or second lens group 302, only a surface 321A on the pupil side of the lens 321 constructing the second lens group 302 is formed by an aspherical surface. In this case, further, now assuming that a quartic aspherical coefficient of the surface 321A on the pupil side of the second lens group 302 is labeled as $a_{21}$ and the focal distance of the whole system of the ocular lens is set to f and a predetermined coefficient is set to $k_{21}$, respectively, the coefficient $k_{21}$ is set so as to satisfy the following relational expression.

$$-1.0 < k_2 < -0.5 \text{ where, } a_{21} = (k_{21}/f)^3 \quad (32)$$

This is because if the coefficient $k_{21}$ is equal to −1.0 or less, the image surface in the peripheral region of the picture plane of the video image is excessively bent in the negative direction and the resolution deteriorates. On the other hand, this is also because if the coefficient $k_{21}$ is equal to −0.5 or more, when the pupil moves from the optical axis, the image surface in the peripheral portion of the picture plane of the video image on the side opposite to the moving direction falls down in the positive direction and the resolution deteriorates.

Subsequently, in the case where only the surface 321A on the pupil side of the lens 321 in the second lens group 302 is formed by the aspherical surface and the coefficient $k_{21}$ is set to −0.8 as a value within the intermediate range of the range shown in the relational expression (32), each parameter of the ocular lens is, for instance, as shown below.

$r0=\infty \; d0=40.000000$ $r1=51.53362 \; d1=25.734500 \; nd1=1.637960 \; \upsilon d1=56.9431$ $r2=-138.26306 \; d2=3.000000 \; nd2=1.755000 \; \upsilon d2=27.6000$ $r3=177.92592 \; d3=2.134425$ $r4=92.12853 \; d4=8.878594 \; nd4=1.744000 \; \upsilon d4=44.7000$ $r5=38.73840 \; d5=18.683144 \; nd5=1.501478 \; \upsilon d5=68.8479$ $r6=-72.62546 \; d6=40.000000$ $r7=-75.00000$ $a_{21}=-0.144856 \times 10^{-5}$ $b_{21}=-0.456271 \times 10^{-9}$ $f=70.704 \quad (33)$ where, $b_{21}$ denotes a sextic aspherical coefficient of the surface 321A on the pupil side of the lens 321 of the second lens group 302 as an aspherical surface.

When each parameter of the ocular lens is set as shown by the equations (33), shapes of the lenses 311, 312, 321, and 322 are as shown in FIG. 108. Further, when the pupil exists on the optical axis, an optical path diagram as shown in FIG. 108 is drawn. A spherical aberration, an astigmatism, and a distortion aberration in this case are as shown in FIG. 109 and lateral aberrations on the image surface are as shown in FIG. 110.

Figure 111:
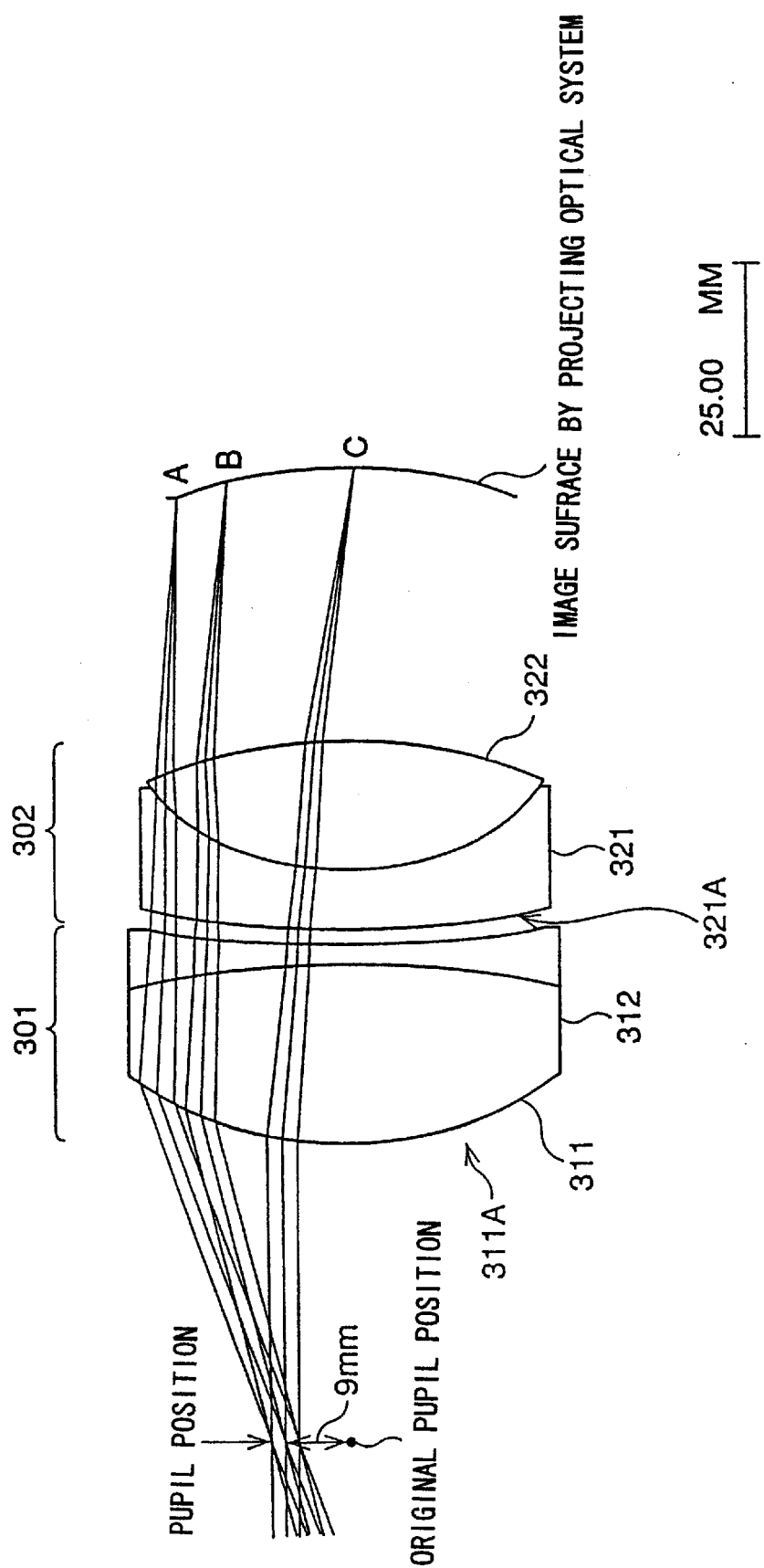
FIG. 111 is an optical path diagram showing an optical path in the case where the pupil position is deviated in FIG. 108.

FIG. 111 shows an optical path diagram which is drawn when the pupil is deviated from the optical axis by only 9 mm in the case where each parameter of the ocular lens is set as shown in the equations (33). Further, FIG. 112 shows lateral aberrations on the image surface in this case.

Subsequently, in the case where only the surface 321A on the pupil side of the lens 321 in the second lens group 302 is formed by the aspherical surface and the coefficient $k_{21}$ is set to −1.0 as a lower limit value within the range shown in the relational expression (32), each parameter of the ocular lens is, for instance, as shown below.

$r0=\infty \; d0=40.000000$ $r1=50.93361 \; d1=30.810164 \; nd1=1.638947 \; \upsilon d1=56.7747$ $r2=-80.61686 \; d2=3.000000 \; nd2=1.755000 \; \upsilon d2=27.6000$ $r3=130.33798 \; d3=4.739208$ $r4=116.91932 \; d4=3.000000 \; nd4=1.501781 \; \upsilon d4=68.8172$ $r5=48.67346 \; d5=18.379810 \; nd5=1.487000 \; \upsilon d5=70.4000$ $r6=-66.31831 \; d6=40.074024$ $r7=-75.00000$ $a_{21}=-0.282896 \times 10^{-5}$ $b_{21}=-0.135659 \times 10^{-8}$ $f=70.708 \quad (34)$ When each parameter of the ocular lens is set as shown by the equations (34), shapes of the lenses 311, 312, 321, and 322 are as shown in FIG. 113. Further, when the pupil exists on the optical axis, an optical path diagram as shown in FIG. 113 is drawn. A spherical aberration, an astigmatism, and a distortion aberration in this case are as shown in FIG. 114 and lateral aberrations on the image surface are as shown in FIG. 115.

FIG. 116 shows an optical path diagram which is drawn when the pupil is deviated from the optical axis by only 9 mm in the case where each parameter of the ocular lens is set as shown in the equations (34). Further, FIG. 117 shows lateral aberrations on the image surface in this case.

Subsequently, in the case where only the surface 321A on the pupil side of the lens 321 in the second lens group 302 is formed by the aspherical surface and the coefficient $k_{21}$ is set to −0.5 as an upper limit value within the range shown in the relational expression (32), each parameter of the ocular lens is, for instance, as shown below.

Figure 118:
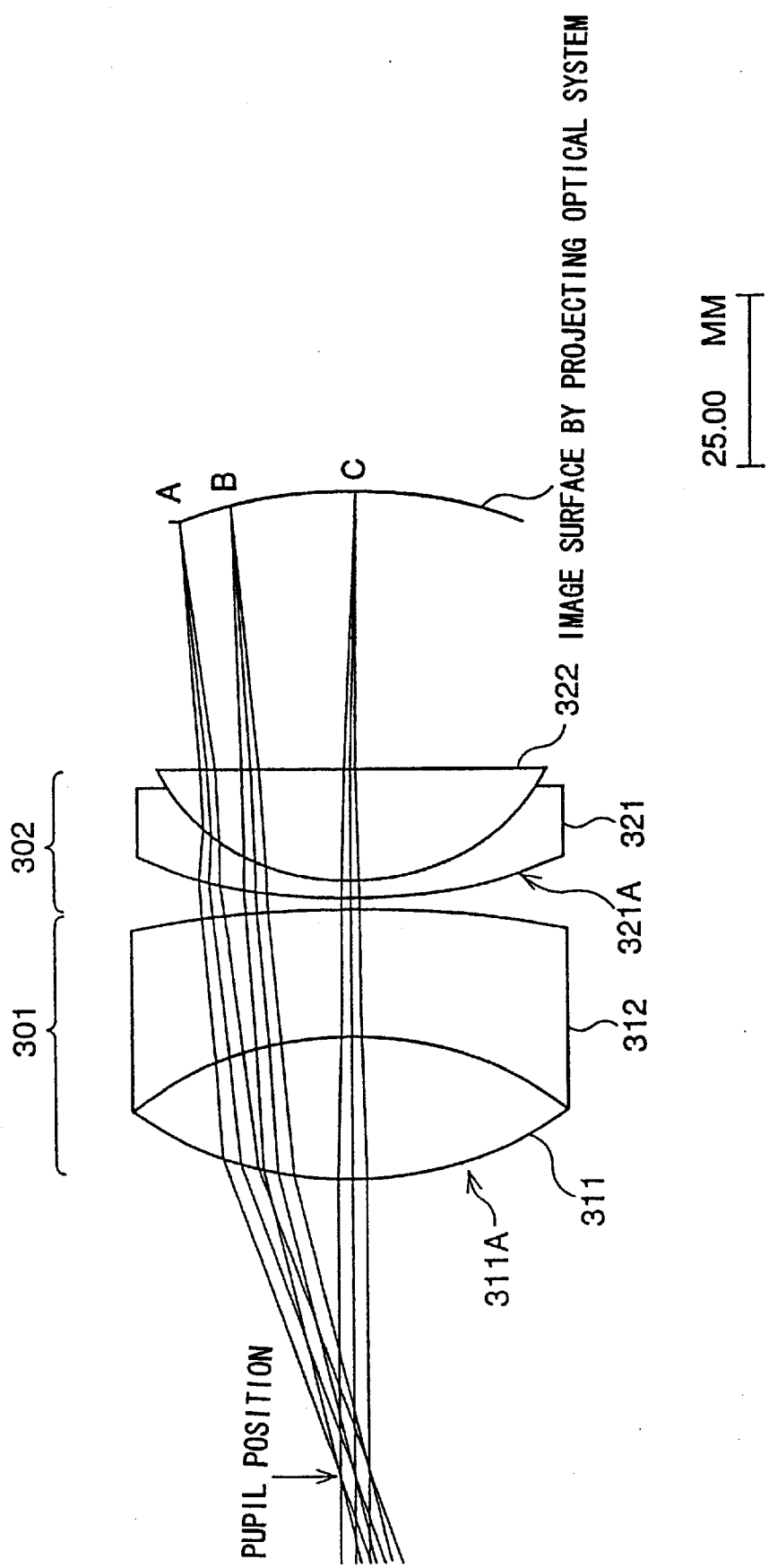
FIG. 118 is a diagram showing another constructional example in which parameters of the ocular lens in the seventh embodiment are changed.
Figure 120A:
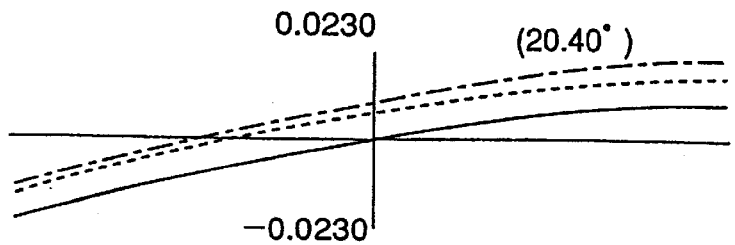
Figure 120B:
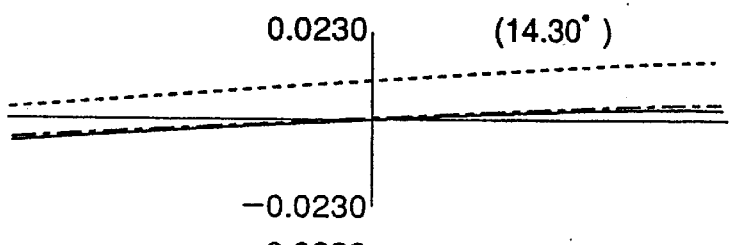
Figure 120C:
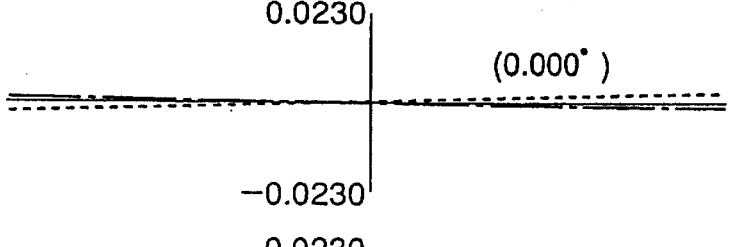
Figure 120D:
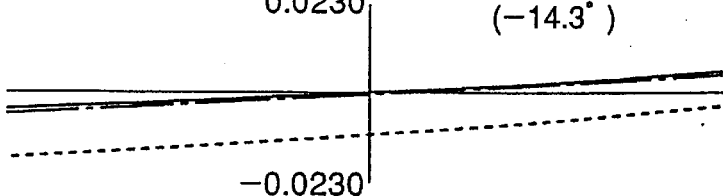
Figure 120E:
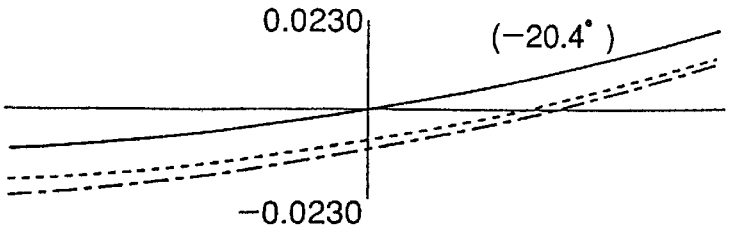

$r0=\infty \; d0=40.000000$ $r1=54.25936 \; d1=20.371520 \; nd1=1.593045 \; \upsilon d1=61.7750$ $r2=-49.98184 \; d2=18.762553 \; nd2=1.744000 \; \upsilon d2=44.7000$ $r3=-153.31734 \; d3=1.000000$ $r4=72.07611 \; d4=3.000000 \; nd4=1.748554 \; \upsilon d4=35.5128$ $r5=31.41941 \; d5=16.865927 \; nd5=1.487000 \; \upsilon d5=70.4000$ $r6=-1306.83799 \; d6=40.000000$ $r7=-75.00000$ $a_{21}=-0.353654 \times 10^{-6}$ $b_{21}=-0.296813 \times 10^{-9}$ $f=70.704 \quad (35)$ When each parameter of the ocular lens is set as shown by the equations (35), shapes of the lenses 311, 312, 321, and 322 are as shown in FIG. 118. Further, when the pupil exists on the optical axis, an optical path diagram as shown in FIG. 118 is drawn. A spherical aberration, an astigmatism, and a distortion aberration in this case are as shown in FIG. 119 and lateral aberrations on the image surface are as shown in FIG. 120.

FIG. 121 shows an optical path diagram which is drawn when the pupil is deviated from the optical axis by only 9 mm in the case where each parameter of the ocular lens is set as shown in the equations (35). Further, FIG. 122 shows lateral aberrations on the image surface in this case.

Figure 123:
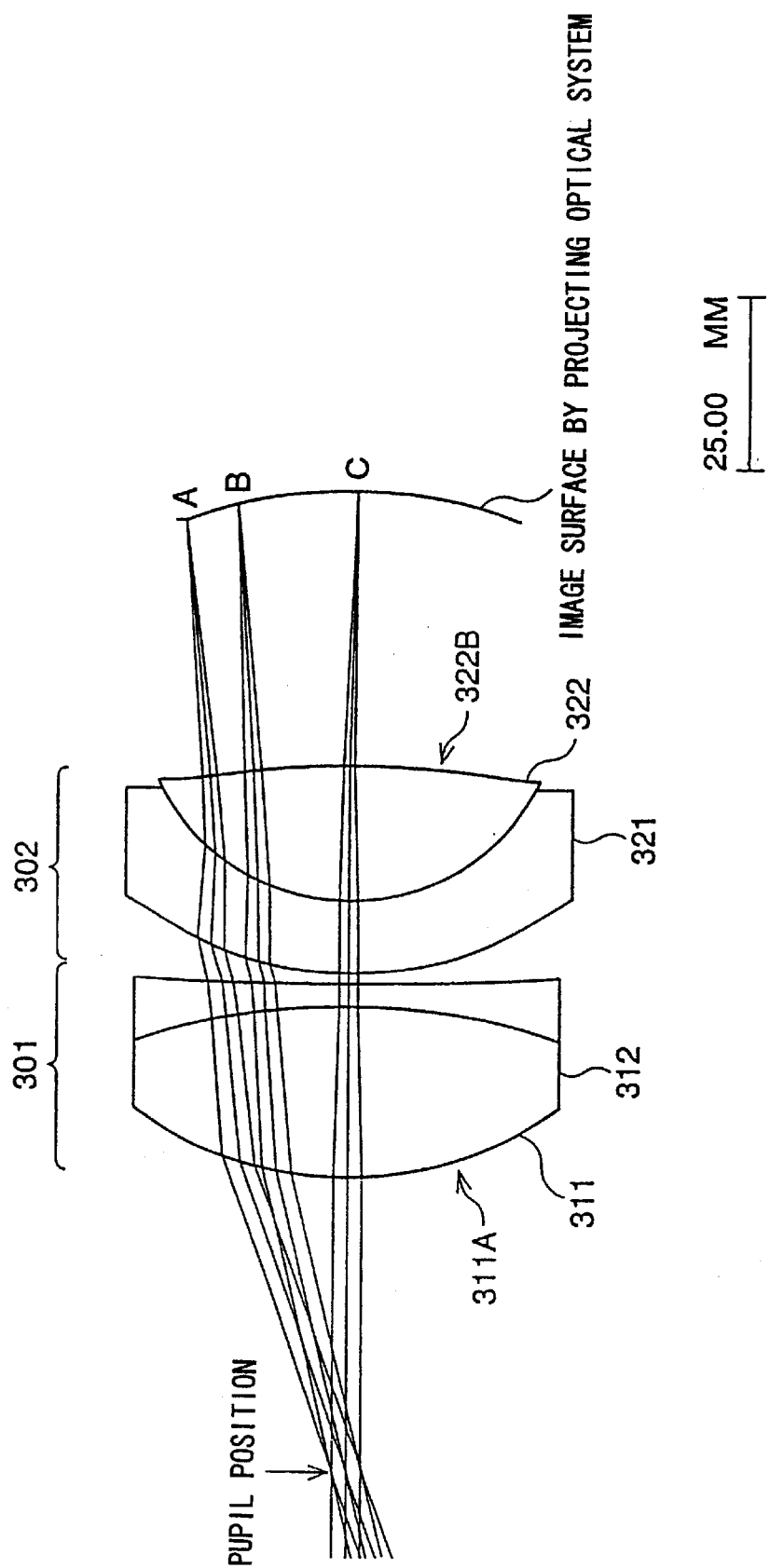
Figure 125A:
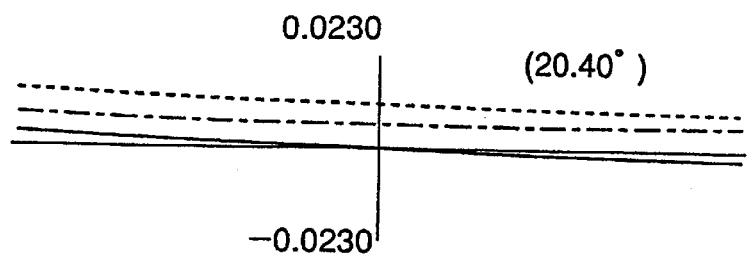
Figure 125B:
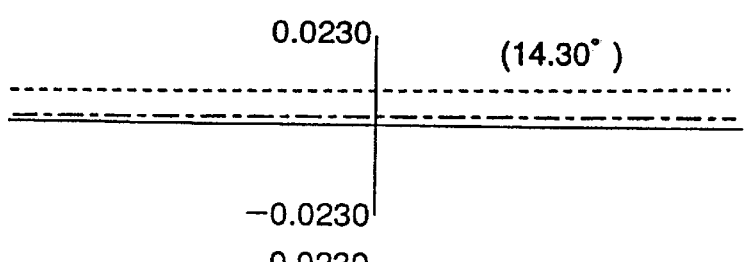
Figure 125C:
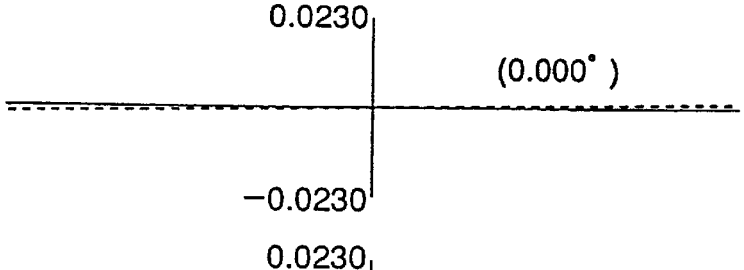
Figure 125D:
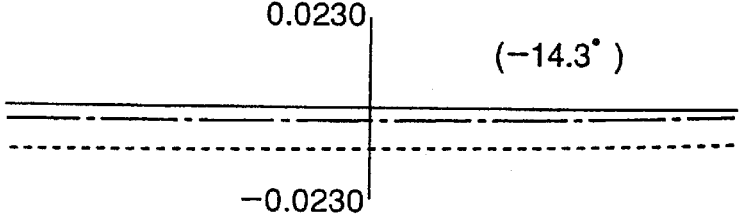
Figure 125E:
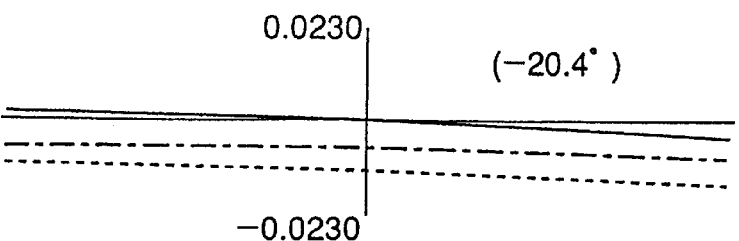

FIG. 123 shows a constructional example of the eighth embodiment of an ocular lens which is used as lenses 13L and 13R constructing the enlargement optical system. In the diagram, portions corresponding to those in case of FIG. 78 are designated by the same reference numerals. That is, the ocular lens is fundamentally constructed in a manner similar to the case of FIG. 78.

In the eighth embodiment, in the first lens group 301 or second lens group 302, only a surface 322B on the screen side of the lens 322 constructing the second lens group 302 is formed by an aspherical surface. In this case, further, now assuming that a quartic aspherical coefficient of the surface 322B on the screen side of the second lens group 302 is labeled as $a_{22}$ and the focal distance of the whole system of the ocular lens is set to f and a predetermined coefficient is set to $k_{22}$, respectively, the coefficient $k_{22}$ is set so as to satisfy the following relational expression.

$$-0.2 < k_{22} < 1.4 \text{ where, } a_{22} = (k_{22}/f) \tag{36}$$

This is because if the coefficient $k_{22}$ is equal to −0.2 or less, the image surface in the peripheral region of the picture plane of the video image on the side opposite to the moving direction falls down in the positive direction and the resolution deteriorates. On the other hand, this is also because if the coefficient $k_{22}$ is equal to 1.4 or more, the image surface in the intermediate region (hatched portion in FIG. 23) between the center portion and the peripheral portion of the picture plane of the video image is excessively bent in the positive direction, the image surface in the peripheral portion is excessively bent in the negative direction, and the resolution deteriorates.

Subsequently, in the case where only the surface 322B on the screen side of the lens 322 in the second lens group 302 is formed by the aspherical surface and the coefficient $k_{22}$ is set to 1.0 as a value within the intermediate range of the range shown in the relational expression (36), each parameter of the ocular lens is, for instance, as shown below.

$r0=\infty d0=40.000000$ $r1=53.25800\ d1=24.594861\ nd1=1.489267\ \upsilon d1=69.0034$ $r2=-95.29804\ d2=3.000000\ nd2=1.751184\ \upsilon d2=31.7766$ $r3=470.65448\ d3=1.905110$ $r4=51.15860\ d4=10.173024\ nd4=1.744000\ \upsilon d4=44.7000$ $r5=31.00215\ d5=20.327005\ nd5=1.487000\ \upsilon d5=70.4000$ $r6=-105.92664\ d6=40.000000$ $r7=-75.00000$ $a_{22}=0.282923\times10^{-5}$ $b_{22}=0.263858\times10^{-11}$ $f=70.704 \tag{37}$ where, $b_{22}$ denotes a sextic aspherical coefficient of the surface 322B on the screen side of the lens 322 of the second lens group 302 as an aspherical surface.

When each parameter of the ocular lens is set as shown by the equations (37), shapes of the lenses 311, 312, 321, and 322 are as shown in FIG. 123. Further, when the pupil exists on the optical axis, an optical path diagram as shown in FIG. 123 is drawn. A spherical aberration, an astigmatism, and a distortion aberration in this case are as shown in FIG. 124 and lateral aberrations on the image surface are as shown in FIG. 125.

Figure 126:
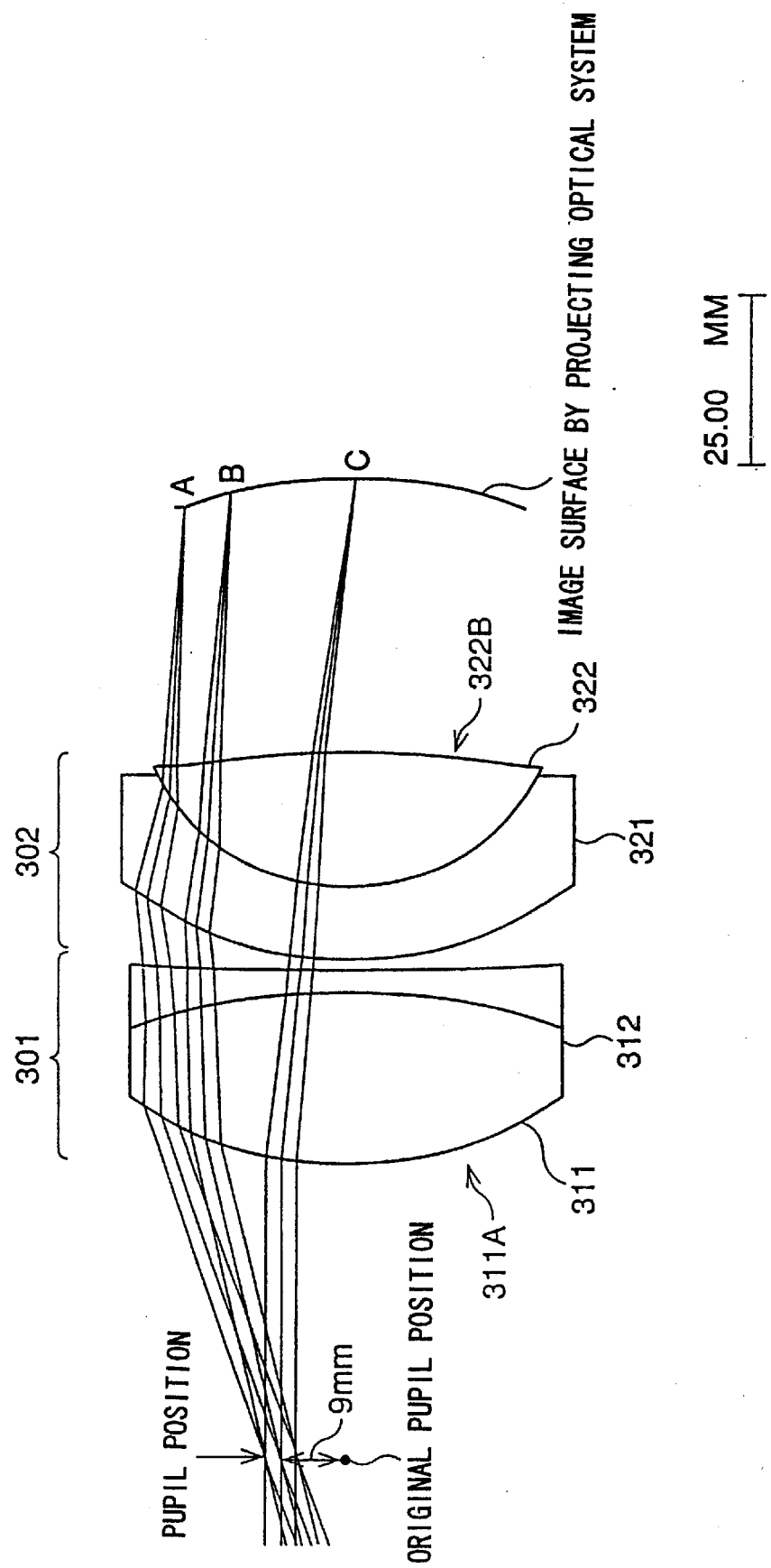
Figure 127A:
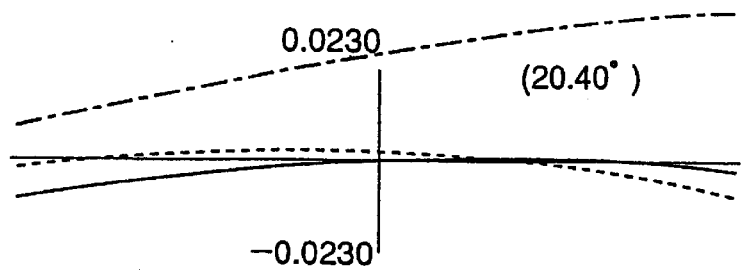
Figure 127B:
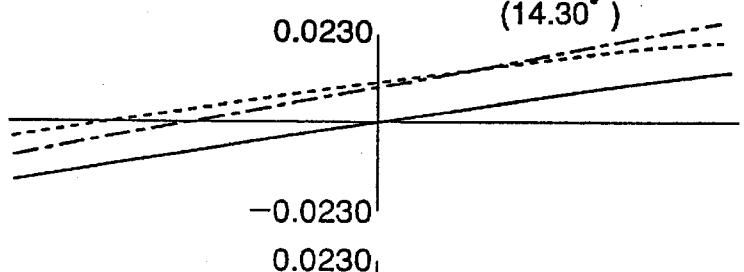
Figure 127C:
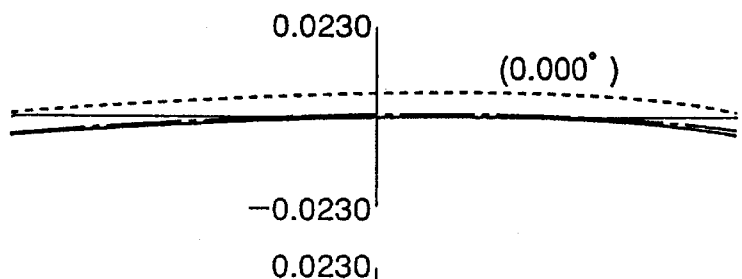
Figure 127D:
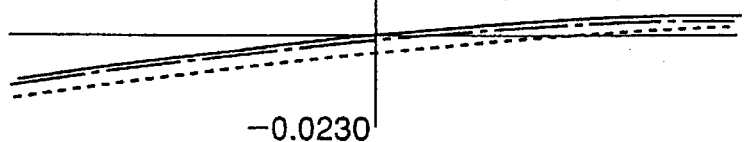
Figure 127E:
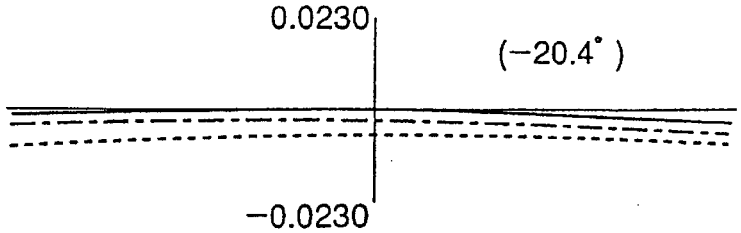

FIG. 126 shows an optical path diagram which is drawn when the pupil is deviated from the optical axis by only 9 mm in the case where each parameter of the ocular lens is set as shown in the equations (37). Further, FIG. 127 shows lateral aberrations on the image surface in this case.

Subsequently, in the case where only the surface 322B on the screen side of the lens 322 in the second lens group 302 is formed by the aspherical surface and the coefficient $k_{22}$ is set to −0.2 as a lower limit value within the range shown in the relational expression (36), each parameter of the ocular lens is, for instance, as shown below.

Figures 129A, 129B, 129C:
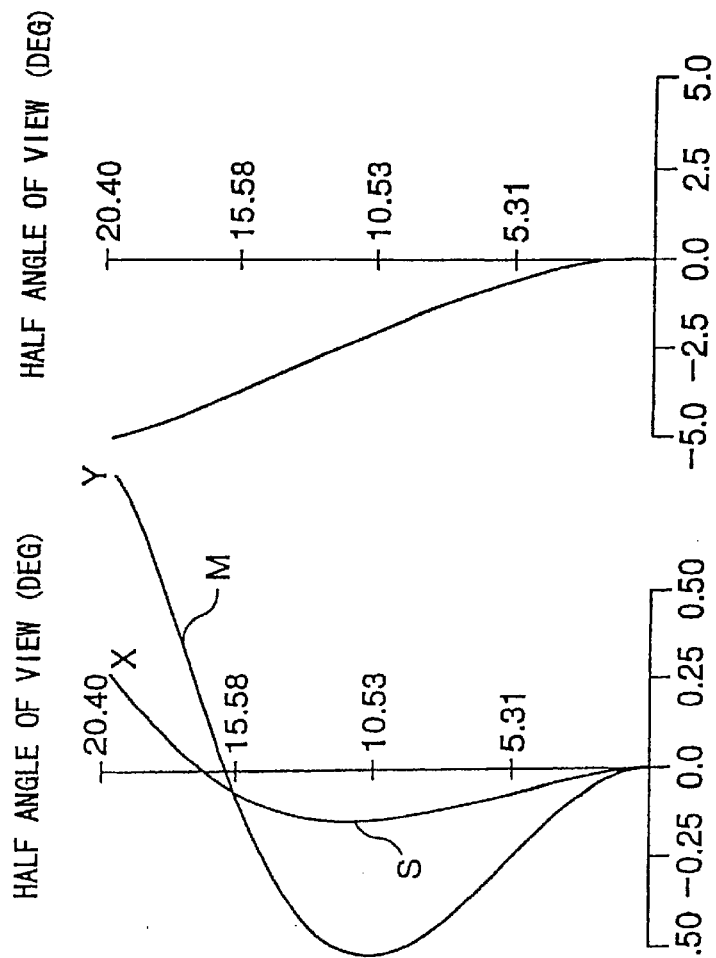
Figure 130A:
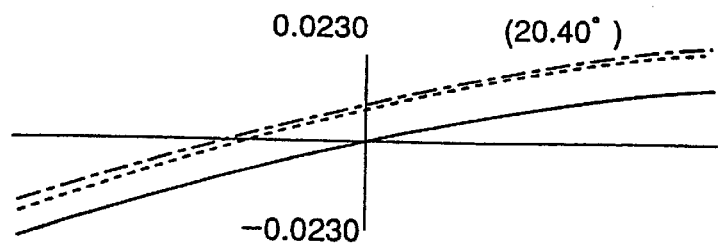
Figure 130B:
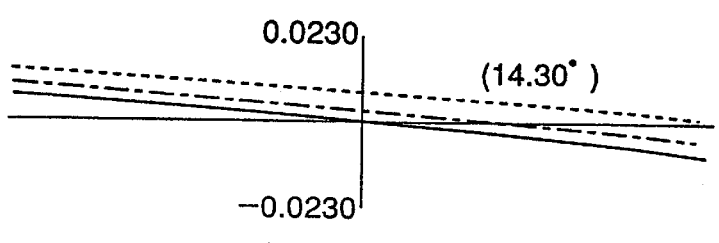
Figure 130C:
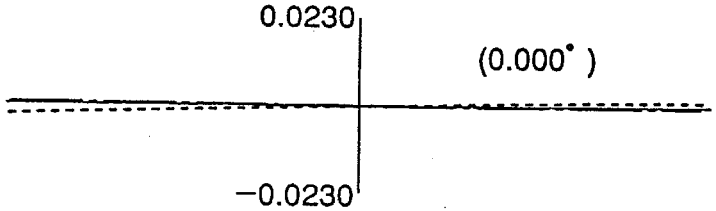
Figure 130D:
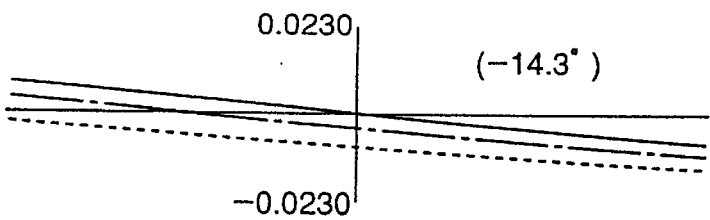
Figure 130E:
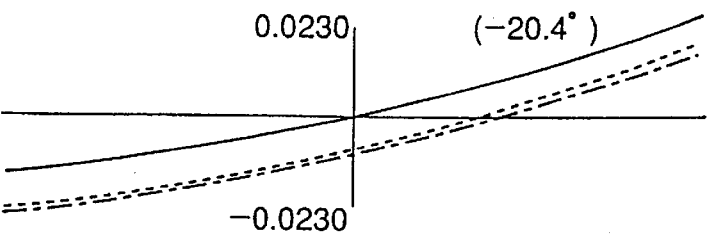

$r0=\infty d0=40.000000$ $r1=54.45186\ d1=20.611380\ nd1=1.587757\ \upsilon d1=62.0893$ $r2=-48.72213\ d2=20.140800\ nd2=1.744913\ \upsilon d2=42.4859$ $r3=-142.45322\ d3=1.000000$ $r4=62.92736\ d4=3.000000\ nd4=1.749529\ \upsilon d4=34.0261$ $r5=30.83249\ d5=15.247820\ nd4=1.487000\ \upsilon d4=70.4000$ $r6=357.62396\ d6=40.000000$ $r7=-75.00000$ $a_{22}=-0.226338\times10^{-7}$ $b_{22}=0.223811\times10^{-8}$ $f=70.704 \tag{38}$ When each parameter of the ocular lens is set as shown by the equations (38), shapes of the lenses 311, 312, 321, and 322 are as shown in FIG. 128. Further, when the pupil exists on the optical axis, an optical path diagram as shown in FIG. 128 is drawn. A spherical aberration, an astigmatism, and a distortion aberration in this case are as shown in FIG. 129 and lateral aberrations on the image surface are as shown in FIG. 130.

FIG. 131 shows an optical path diagram which is drawn when the pupil is deviated from the optical axis by only 9 mm in the case where each parameter of the ocular lens is set as shown in the equations (38). Further, FIG. 132 shows lateral aberrations on the image surface in this case.

Subsequently, in the case where only the surface 322B on the screen side of the lens 322 in the second lens group 302 is formed by the aspherical surface and the coefficient $k_{22}$ is set to 1.4 as an upper limit value within the range shown in the relational expression (36), each parameter of the ocular lens is, for instance, as shown below.

$r0=\infty d0=40.000000$ $r1=40.50842\ d1=20.778826\ nd1=1.512048\ \upsilon d1=58.0043$ $r2=-147.28690\ d2=3.000000\ nd2=1.749294\ \upsilon d2=34.3723$ $r3=78.38449\ d3=1.000000$ $r4=34.45382\ d4=3.000000\ nd4=1.737236\ \upsilon d4=45.2369$ $r5=24.59147\ d5=23.037221\ nd5=1.487000\ \upsilon d5=70.4000$ $r6=-238.11515\ d6=40.000000$ $r7=-75.00000$ $a_{22}=0.776340\times10^{-5}$ $b_{22}=0.332592\times10^{-8}$
$f=70.704$ (39)

When each parameter of the ocular lens is set as shown by the equations (39), shapes of the lenses 311, 312, 321, and 322 are as shown in FIG. 133. Further, when the pupil exists on the optical axis, an optical path diagram as shown in FIG. 133 is drawn. A spherical aberration, an astigmatism, and a distortion aberration in this case are as shown in FIG. 134 and lateral aberrations on the image surface are as shown in FIG. 135.

FIG. 136 shows an optical path diagram which is drawn when the pupil is deviated from the optical axis by only 9 mm in the case where each parameter of the ocular lens is set as shown in the equations (39). Further, FIG. 137 shows lateral aberrations on the image surface in this case.

According to the construction as described above, high resolution is obtained over angles of view of 40° or more as a diagonal angle, and the ocular lens which has high resolution can be provided even if the pupil position is slightly deviated from the optical axis. The eye relief and back focus with a good balance and a long distance can be assured.

As will be obviously understood from the equations (25) to (27), (29) to (31), (33) to (35), and (37) to (39), both of the eye relief d0 and the back focus d6 are equal to or larger than 0.56f and they are well balanced and a long distance is assured.

The display apparatus 7 for forming a virtual image of a video image by the ocular lens and providing as described above will now be described.

FIG. 138 shows a 20th constructional example of the display apparatus 7.

A display element (image display element) 331 is, for example, a display device of the self light emitting type or transmitting type constructed in a manner similar to the display element 151 in FIG. 67 and displays a video image to be provided for the user. The video image displayed in the display element 331 enters a half mirror 334 through a projecting lens 332. In the half mirror 334, the light from the projecting lens 332 is reflected by 90° and is irradiated to a reflecting type screen 333. The reflecting type screen 333 is a screen having a curved surface such that it coincides with an image surface of an ocular lens 335 and it reflects the light from the half mirror 334 by 180°. The reflected light transmits the half mirror 334 and passes through the ocular lens 335 constructed as shown in FIGS. 78, 93, 123, or the like, so that it enters the eyeballs of the user. Thus, a virtual image of the video image displayed in the display element 331 is observed by the eyeballs of the user.

FIG. 139 shows a 21st constructional example of the display apparatus 7. In the diagram, portions corresponding to those in case of FIG. 138 are designated by the same reference numerals. That is, this video image providing apparatus is constructed in a manner similar to the case of FIG. 138 except that the half mirror 334 is arranged between the projecting lens 332 and reflecting type screen 333 instead of a position between the reflecting type screen 333 and ocular lens 335.

In FIG. 139, the video image displayed in the display element 331 is irradiated to the reflecting type screen 333 through the projecting lens 332 and half mirror 334. In the reflecting type screen 333, light from the half mirror 334 is reflected by 180°. The reflected light is further reflected by 90° in the half mirror 334 and enters the ocular lens 335. In a manner similar to the case of FIG. 138, a virtual image of the video image displayed in the display element 331 is observed by the eyeballs of the user.

FIG. 140 shows a 22nd constructional example of the display apparatus 7. In the diagram, portions corresponding to those in case of FIG. 138 are designated by the same reference numerals. That is, this display apparatus 7 is constructed in a manner similar to the case of FIG. 138 except that a display element 351 and a PBS 352 are provided in place of the display element 331.

Light as illumination light emitted from a light source (not shown) is reflected by 90° in the PBS 352 and enters the display element (image display element) 351. The display element 351 is, for example, a reflecting type display device which is constructed in a manner similar to the display element 171 in FIG. 70. The light entering there is reflected, thereby displaying a video image to be provided for the user.

The video image as reflection light reflected by the display element 171 transmits the PBS 352 and enters the projecting lens 332. In a manner similar to the case of FIG. 138, a virtual image is observed by the eyeballs of the user.

A half mirror and another element for dividing the light can be also provided in place of the PBS 352.

FIG. 141 shows a 23rd constructional example of the display apparatus 7. In the diagram, portions corresponding to those in case of FIG. 140 are designated by the same reference numerals. That is, this video image providing apparatus is constructed in a manner similar to the case of FIG. 140 except that the PBS 352 is arranged between the projecting lens 332 and half mirror 334 instead of a position between the display element 351 and projecting lens 332.

In this case, light as illumination light emitted from a light source (not shown) is reflected by 90° in the PBS 352 and enters the display element 351 through the projecting lens 332. In the display element 351, the light entering there is reflected, the video image as a reflection light transmits the projecting lens 333332 and PBS 352, and enters the half mirror 334. In a manner similar to the case of FIG. 140, a virtual image is observed by the eyeballs of the user.

FIG. 142 shows a 24th constructional example of the display apparatus 7.

In light emitting diodes 391R, 391G, and 391B, light of red, green, and blue is emitted as illumination light, respectively. The light enters a PBS 395 through a dichroic prism 392, a fly eye lens 393, and a field lens 394, respectively. In the PBS 395, the light from the field lens 394 is reflected by 90° and its reflected light enters a reflecting type video display panel 396 as a reflecting type display element. In the reflecting type video display panel 396, by reflecting the light entering there, a video image to be provided to the user is formed. The reflected light as a video image enters a half mirror 400 through the PBS 395 and a projecting lens 397. In the half mirror 400, the video image from the projecting lens 397 is reflected by 90°, so that the video image is enlarged and projected to a reflecting type screen 398. The enlarged and projected image enters the eyeballs of the user through an ocular lens 399 constructed as shown in FIGS. 78, 93, 108, 123, or the like. Thus, a virtual image of the video image displayed on the reflecting type video display panel 396 is observed by the eyeballs of the user.

In this case, since the light of red, green, and blue is irradiated as illumination light to the reflecting type display panel 396, a color virtual image can be provided by what is called a field sequential system.

FIG. 143 shows a 25th constructional example of the display apparatus 7. In the diagram, portions corresponding to those in the case of FIG. 142 are designated by the same reference numerals. That is, this video image providing apparatus is constructed in a manner similar to the case of FIG. 142 except that a mirror 401 is provided between the fly eye lens 393 and field lens 394.

In the embodiment, light as illumination light from the fly eye lens 393 is reflected by 90° by the mirror 401 and enters the PBS 395 through the field lens 394. In the PBS 395, the light from the field lens 394 is reflected by 90° and the reflected light enters the reflecting type video display panel 396. In the reflecting type video display panel 396, the light entering there is reflected, thereby forming a video image to be provided to the user. The reflected light as a video image enters the half mirror 400 through the PBS 395 and projecting lens 397. In the half mirror 400, the light from the projecting lens 397 is reflected by 90° and the reflected light is projected to the reflecting type screen 398. In a manner similar to the case of FIG. 142, a virtual image of the video image displayed on the reflecting video display panel 396 is observed by the eyeballs of the user.

In this case, since the optical path is bent by the mirror 401, the apparatus can be miniaturized.

FIG. 144 shows a 26th constructional example of the display apparatus 7.

In the embodiment, two sets of video image providing apparatuses shown in FIG. 143 are provided, thereby enabling virtual images which are formed to be observed by the right and left eyes, respectively.

That is, in FIG. 144, light emitting diodes 391RL, 391GL, and 391BL, a dichroic prism 392L, a fly eye lens 393L, a field lens 394L, a PBS 395L, a reflecting type video display panel 396L, a projecting lens 397L, a reflecting type screen 398L, an ocular lens 399L, a half mirror 400L, and a mirror 401L are constructed in a manner similar to the light emitting diodes 391R, 391G, and 391B, dichroic prism 392, fly eye lens 393, field lens 394, PBS 395, reflecting type video display panel 396, projecting lens 397, reflecting type screen 398, ocular lens 399, half mirror 400, and mirror 401 in FIG. 143, respectively, thereby enabling a virtual image to be provided to the left eye of the user. In FIG. 144, light emitting diodes 391RR, 391GR, and 391BR, a dichroic prism 392R, a fly eye lens 393R, a field lens 394R, a PBS 395R, a reflecting type video display panel 396R, a projecting lens 397R, a reflecting type screen 398R, an ocular lens 399R, a half mirror 400R, and a mirror 401R are also constructed in a manner similar to the light emitting diodes 391R, 391G, and 391B, dichroic prism 392, fly eye lens 393, field lens 394, PBS 395, reflecting type video display panel 396, projecting lens 397, reflecting type screen 398, ocular lens 399, half mirror 400, and mirror 401 in FIG. 143, respectively, thereby enabling a virtual image to be provided to the right eye of the user.

In this case, therefore, the user can observe the virtual images by the right and left eyes.

The arranging positions of the mirror 401 in FIG. 143 and the mirrors 401L and 401R in FIG. 144 are not limited to the positions shown in FIGS. 143 and 144. That is, in the embodiment of FIGS. 143 or 144, the mirrors are arranged so as to bend the optical path in the direction which is parallel with the drawing. However, as another arrangement, for example, the mirrors can be also arranged so as to bend the optical path in the direction perpendicular to the drawing.

The ocular lens shown in FIGS. 78, 93, 108, 123, or the like can be also used, for example, in case of observing a virtual image of the aerial image 161 as shown in FIG. 68. In this case, for example, it is desirable to form the aerial image 161 in a curved shape like the reflecting type screen 333 shown in FIG. 138.

The ocular lens shown in FIGS. 78, 93, 108, 123, or the like can be also used, for example, as an ocular lens 199 (199L, 199R) or the like shown in FIGS. 75 to 77 or the like.

That is, the ocular lens shown in FIGS. 78, 93, 108, 123, or the like can be also used in case of observing a virtual image of an image (video image) formed without using the reflecting type screen.

As mentioned above, according to the display apparatus 7 using the ocular lens constructed as shown in FIGS. 78, 93, 108, 123, or the like as an ocular lens, a video image of high resolution and a wide angle of view can be provided. Further, even if the pupil of the user is out of the optical axis, a video image (virtual image) of high resolution can be provided. Besides, the eye relief and back focus can be assured with a good balance. Therefore, it is possible to cope with a case where the user moves in the optical axial direction and the screen and the ocular lens can be arranged at separate positions. Since the number of lenses constructing the ocular lens is small, the miniaturization and light weight of the apparatus can be realized.

In the foregoing case, in the first lens group 301 or second lens group 302, only any one of the surfaces is formed by the aspherical surface. However, two or more surfaces can be also formed by aspherical surfaces.

Further, as for the ocular lens shown in FIGS. 78, 93, 108, 123, or the like, the quartic aspherical coefficient of the lens has been limited. In those ocular lenses as well, however, for instance, by limiting the sextic aspherical coefficient of the lens, performance similar to that in case of limiting the quartic aspherical coefficient of the lens can be obtained.

According to the display apparatus disclosed in claim 1, since the video image providing apparatus is fixed to a predetermined object other than the user by the fixing means, the user can appreciate a virtual image with presence without, for example, attaching it.

According to the display apparatus disclosed in claim 42, among a plurality of lenses constructing the enlargement optical system, the lens arranged at the position that is the closest to the display means has a refractive power larger than those of the other lenses, while the lens arranged at the position that is the farthest from the display means has a refractive power smaller than those of the other lenses. Therefore, even if the position of the eyeballs of the user is slightly moved, a clear virtual image can be observed.

What is claimed is:

1. A display apparatus having a video image providing apparatus for providing a video image to a user, said video image providing apparatus comprising:

display means for displaying the video image;

an enlargement optical system for forming a virtual image by enlarging the video image displayed on said display means and for arranging, at a position in a space, a right eye image presented to the right eye of the user and a left eye image presented to the left eye of the user, said enlargement optical system including a left eye optical system for the left eye and a right eye optical system for the right eye which have different optical axes, said enlargement system further including a concave surface mirror; and fixing means for fixing said video image providing apparatus to a predetermined object other than the user, wherein each of said left eye optical system and said right eye optical system includes at least one lens for enlarging the video image.

2. A display apparatus according to claim 1, characterized in that said video image providing apparatus provides a 2-dimensional virtual image.

3. A display apparatus according to claim 1, characterized in that said video image providing apparatus has left eye display means for the left eye and right eye display means for the right eye as said display means and allows the left eye display means and the right eye display means to display a left eye video image for the left eye and a right eye video image for the right eye, thereby providing a stereoscopic virtual image.

4. A display apparatus according to claim 1, characterized in that said display means including a self light emitting device for displaying the video image by light emitting elements for emitting light on a pixel unit basis.

5. A display apparatus according to claim 1, characterized in that said display means including a transmitting light control device for displaying the video image by controlling transmission of light.

6. A display apparatus according to claim 1, characterized in that said display means including a reflecting light control device for displaying the video image by controlling reflection of light.

7. A display apparatus according to claim 1, characterized in that entry of external light is allowed into said video image providing apparatus.

8. A display apparatus according to claim 1, characterized in that the left eye optical system and the right eye optical system have optical axes different than an enlargement optical axis.

9. A display apparatus according to claim 8, characterized in that said video image providing apparatus further has incident means for individually inputting said video image which is displayed by said display means into said left eye optical system and said right eye optical system.

10. A display apparatus according to claim 1, characterized in that the distance between the lens adjacent the left eye and the lens adjacent the right eye is equal to about 2 to 8 mm.

11. A display apparatus according to claim 1, characterized in that said video image providing apparatus further has curving means for curving a surface on which the virtual image that is formed by said enlargement optical system is arranged.

12. A display apparatus according to claim 1, characterized in that said fixing means can move said video image providing apparatus to a predetermined position.

13. A display apparatus according to claim 1, characterized in that said video image providing apparatus provides a video image in which a horizontal angle of visibility is equal to or larger than 15°.

14. A display apparatus according to claim 1, characterized in that said enlargement optical system projects the video image displayed on said display means onto a reflecting screen to form a projected virtual image.

15. A display apparatus according to claim 1, characterized in that said enlargement optical system projects the video image displayed on said display means onto a translucent screen to form a projected virtual image.

16. A display apparatus according to claim 1, characterized in that said enlargement optical system forms a virtual image of an aerial image of the video image displayed on said display means.

17. A display apparatus according to claim 1, characterized in that
said apparatus further has user holding means for holding the user, and
said fixing means fixes said video image providing apparatus to said user holding means.

18. A display apparatus according to claim 17, characterized in that said user holding means can change a user holding state.

19. A display apparatus according to claim 17, characterized in that said user holding means vibrates in correspondence to an acoustic signal.

20. A display apparatus according to claim 17, characterized in that said user holding means holds the user in a sitting state.

21. A display apparatus according to claim 17, characterized in that said enlargement optical system is constructed in a manner such that at least in a range where a head portion of the user held in said user holding means is movable, the virtual image is observable in its entirety.

22. A display apparatus according to claim 17, characterized in that said fixing means is constructed so as to cover a head portion of the user in a state where the user is held in said user holding means and said video image providing apparatus is fixed in said fixing means.

23. A display apparatus according to claim 22, characterized in that said fixing means including a device in which a transmittance of light is variable.

24. A display apparatus according to claim 17, characterized in that said user holding means holds the user so that an interval between a head portion of the user and said video image providing apparatus lies within 45 cm.

25. A display apparatus having a video image providing apparatus for providing a video image to a user, said video image providing apparatus comprising:

display means for displaying the video image, said display means including a backlight that emits light onto the rear of a transmitting light control device, said transmitting light control device, having pixels formed therein, displaying the video image on the front of the transmitting light control device by controlling the pixels;

an enlargement optical system for forming a virtual image by enlarging the video image displayed on said display means and for arranging at a position in a space, a right eye image presented to the right eye of the user and a left eye image presented to the left eye of the user, said enlargement optical system including a concave surface mirror, and fixing means for fixing said video image providing apparatus to a predetermined object other than the user.

26. A display apparatus having a video image providing apparatus for providing a video image to a user, said video image providing apparatus comprising:

display means for displaying the video image, said display means including a reflecting light control device for displaying the video image, said reflecting light control device having elements corresponding to pixels, reflection of light from each of said elements being controlled in correspondence to a video signal;

an enlargement optical system for forming a virtual image by enlarging the video image displayed on said display means and for arranging at a position in a space, a right eye image presented to the right eye of the user and a left eye image presented to the left eye of the user and fixing means for fixing said video image providing apparatus to a predetermined object other than the user.

27. A display apparatus having a video image providing apparatus for providing a video image to a user, said video image providing apparatus comprising:

display means for displaying the video image;

an enlargement optical system for forming a virtual image by enlarging the video image displayed on said display means and for arranging at a position in a space, a right eye image presented to the right eye of the user and a left eye image presented to the left eye of the user, and fixing means for fixing said video image providing apparatus to a predetermined object other than the user, wherein said video image providing apparatus includes a shutter apparatus allowing entry of external light into said video image providing apparatus.

28. A display apparatus having a video image providing apparatus for providing a video image to a user, said video image providing apparatus comprising:
- display means for displaying the video image;
- an enlargement optical system for forming a virtual image by enlarging the video image displayed on said display means and for arranging at a position in a space, a right eye image presented to the right eye of the user and a left eye image presented to the left eye of the user, said enlargement optical system being an optical system of one optical axis and including a concave surface mirror, and fixing means for fixing said video image providing apparatus to a predetermined object other than the user.

29. A display apparatus having a video image providing apparatus for providing a video image to a user, said video image providing apparatus comprising:
- a display means for displaying the video image;
- an enlargement optical system for forming a virtual image by enlarging the video image displayed on said display means and for arranging said virtual image at a position in a space, said enlargement optical system including an optical system for the left eye and an optical system for the right eye and further including a concave surface mirror;
- incident means for individually inputting said video image which is displayed by said display means into said optical system for the left eye and said optical system for the right eye, and fixing means for fixing said video image providing apparatus to a predetermined object other than the user.

30. A display apparatus having a video image providing apparatus for providing a video image to a user, said video image providing apparatus comprising:
- display means for displaying the video image;
- an enlargement optical system for forming a virtual image by enlarging the video image displayed on said display means and for arranging at a position in a space, a right eye image presented to the right eye of the user and a left eye image presented to the left eye of the user, said enlargement optical system including a left eye optical system for the left eye and a right eye optical system for the right eye, and fixing means for fixing said video image providing apparatus to a predetermined object other than the user, and
- wherein the distance between the lens adjacent the left eye and the lens adjacent the right eye is equal to about 2 to 8 mm.

31. A display apparatus having a video image providing apparatus for providing a video image to a user, said video image providing apparatus comprising:
- display means for displaying the video image;
- an enlargement optical system for forming a virtual image by enlarging the video image displayed on said display means and for arranging at a position in a space, a right eye image presented to the right eye of the user and a left eye image presented to the left eye of the user;
- curving means for curving a surface on which the virtual image that is formed by said enlargement optical system is arranged, and fixing means for fixing said video image providing apparatus to a predetermined object other than the user.

32. A display apparatus having a video image providing apparatus for providing a video image to a user, said video image providing apparatus comprising:
- display means for displaying the video image;
- an enlargement optical system for forming a virtual image by enlarging the video image displayed on said display means and for arranging said virtual images which are observed by the right and left eyes of the user at a same position in a space;
- user holding means for holding the user wherein said user holding means vibrates in correspondence to an acoustic signal; and
- fixing means for fixing said video image providing apparatus to said user holding means.

33. A display apparatus according to claim 32, wherein said user holding means can change a user holding state.

34. A display apparatus according to claim 32, wherein said user holding means holds the user in a sitting state.

35. A display apparatus according to claim 32, wherein said enlargement optical system is constructed in a manner such that at least in a range where a head portion of the user held in said user holding means is movable, the whole virtual image can be observed.

36. A display apparatus according to claim 32, wherein said user holding means holds the user so that an interval between a head portion of the user and said video image providing apparatus lies within 45 cm.

37. A display apparatus according to claim 32, wherein said fixing means is constructed so as to cover a head portion of the user in a state where the user is held in said user holding means and said video image providing apparatus is fixed in said fixing means.

38. A display apparatus according to claim 37, wherein said fixing means including a device in which a transmittance of light is variable.

39. A display apparatus having a video image providing apparatus for providing a video image to a user, said video image providing apparatus comprising:
- display means for displaying the video image;
- an enlargement optical system for forming a virtual image by enlarging the video image displayed on said display means and for arranging at a position in a space, a right eye image presented to the right eye of the user and a left eye image presented to the left eye of the user; and
- means for (1) fixing said video image providing apparatus to a user holding means, wherein said user holding means vibrates in correspondence to an acoustic signal and (2) moving said video image providing apparatus to a predetermined position.

40. A display apparatus having a video image providing apparatus for providing a video image to a user, said video image providing apparatus comprising:
- display means for displaying the video image;
- an enlargement optical system for forming a virtual image by enlarging the video image displayed on said display means and for arranging at a position in a space, a right eye image presented to the right eye of the user and a left eye image presented to the left eye of the user; and
- fixing means for fixing said video image providing apparatus to a user holding means,
- wherein said video image providing apparatus provides a video image in which a horizontal angle of visibility is equal to or larger than 15°.

41. A display apparatus having a video image providing apparatus for providing a video image to a user, said video image providing apparatus comprising:
- display means for displaying the video image;
- an enlargement optical system for forming a virtual image by enlarging the video image displayed on said display means and for arranging at a position in a space, a right eye image presented to the right eye of the user and a left eye image presented to the left eye of the user; and fixing means for fixing said video image providing apparatus to a user holding means, wherein a backlight that emits light onto the rear of a translucent light control unit, said translucent light control unit, having pixels formed therein, displaying the video image on the front of the translucent light control device by controlling the pixels.

42. A display apparatus having a video image providing apparatus for providing a video image to a user, said video image providing apparatus comprising:

display means for displaying the video image;

an enlargement optical system for forming a virtual image by enlarging the video image displayed on said display means and for arranging at a position in a space, a right eye image presented to the right eye of the user and a left eye image presented to the left eye of the user; and fixing means for fixing said video image providing apparatus to a user holding means, wherein said enlargement optical system forms a virtual image of an aerial image of the video image displayed on said display means.

* * * * *